US012699660B1

(12) United States Patent
Konda

(10) Patent No.: US 12,699,660 B1
(45) Date of Patent: *Aug. 4, 2026

(54) SCALABLE DETERMINISTIC INTERCONNECTION NETWORK FOR EFFICIENT DATA MOVEMENT

(71) Applicant: Venkat Konda, San Jose, CA (US)

(72) Inventor: Venkat Konda, San Jose, CA (US)

(73) Assignee: Konda Technologies Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/386,249

(22) Filed: Nov. 1, 2023

Related U.S. Application Data

(60) Provisional application No. 63/426,749, filed on Nov. 19, 2022.

(51) Int. Cl.
*G06F 13/20* (2006.01)
(52) U.S. Cl.
CPC .......... *G06F 13/20* (2013.01); *G06F 2213/40* (2013.01)
(58) Field of Classification Search
CPC ............................ G06F 13/20; G06F 2213/40
See application file for complete search history.

(56) References Cited

U.S. PATENT DOCUMENTS 5,153,843 A  10/1992  Batcher
5,451,936 A  9/1995  Yang et al.
(Continued)

FOREIGN PATENT DOCUMENTS

WO    WO2008109756        9/2008
WO    WO 2008/147928 A1   12/2008
(Continued)

OTHER PUBLICATIONS

Yeh, C.-H., E.A. Varvarigos, and B. Parhami, "Efficient VLSI layouts of hypercubic networks," Proc. Symp. Frontiers of Massively Parallel Computation, Feb. 1999.
(Continued)

*Primary Examiner* — Henry Tsai
*Assistant Examiner* — Harry Z Wang

(57)                ABSTRACT

A scalable 2D-BFTHypercube interconnection network between two or more processing elements ("PEs") or processing cores ("PCs") arranged in a 2D-grid with shared memory using vertical and horizontal buses (i.e., each bus is one or more wires) is disclosed. At each PE, the interconnection network comprises a router ("interconnect") with concurrently capable to send and receive packets from one PE to another PE through the buses connected between them. Each PE, in addition to interconnect, comprises a processor such as CPU or DSA for DNN acceleration and/or local memory. In one embodiment main memory or shared main memory is physically located on the east side and west side of the 2D-grid of PEs and all the PEs in the 2D-grid access (i.e., read data or write data) main memory via the 2D-BFTHypercube interconnection network.

Various methods for all the PEs of the 2D-grid scalable for any number of PEs 1) concurrently broadcasting packets to all the other PEs in the entire 2D-grid or simultaneously in several sub-2D-grids or simultaneously in several sub-1D-grids, 2) simultaneous multicasting of packets in a row or rows of PEs in both directions from shared memory, 3) concurrent multiple unicasts or parallel loading of packets from shared memory one each it into a row of PEs, in a non-blocking, collision-free and without requiring to queue in a deterministic number of time steps are disclosed.

20 Claims, 57 Drawing Sheets

(56) References Cited

U.S. PATENT DOCUMENTS

| | | | |
|---|---|---|---|
| 6,018,523 A | 1/2000 | Even | |
| 6,185,220 B1 | 2/2001 | Muthukrishnan et al. | |
| 6,940,308 B2 | 9/2005 | Wong | |
| 8,170,040 B2 | 5/2012 | Konda | |
| 8,270,400 B2 | 9/2012 | Konda | |
| 8,363,649 B2 | 1/2013 | Konda | |
| 11,860,814 B1 | 1/2024 | Konda | |
| 2010/0135286 A1 | 6/2010 | Konda | |
| 2010/0172349 A1 | 7/2010 | Konda | |
| 2011/0037498 A1 | 2/2011 | Konda | |
| 2011/0044329 A1 | 2/2011 | Konda | |
| 2014/0143470 A1* | 5/2014 | Dobbs | G06F 11/3419 |
| | | | 710/308 |
| 2016/0188481 A1* | 6/2016 | Miller | G06F 12/00 |
| | | | 711/118 |
| 2018/0189631 A1* | 7/2018 | Sumbul | G06N 3/049 |
| 2020/0236038 A1* | 7/2020 | Liu | H04L 45/125 |
| 2023/0125522 A1* | 4/2023 | Kibardin | G06N 3/084 |
| | | | 706/15 |

FOREIGN PATENT DOCUMENTS

| | | |
|---|---|---|
| WO | WO2008147926 | 12/2008 |
| WO | WO2008147927 | 12/2008 |

OTHER PUBLICATIONS

P. Manuel, W. K. Qureshi, A. William, A. Muthumalai, "VLSI layout of Benes networks,", J. of Discrete Math. Sci. & Cryptography, vol. 10, No. 4, pp. 461-472, 2007.

Ronald I. Greenberg, "The Fat-Pyramid and Universal Parallel Computation Independent of wire delay" IEEE Trans. Computers, 43(12):1358-1364, Dec. 1994.

Hypertree: A Multiprocessor Interconnection Topology , by James R. Goodman and Carlo H Sequin, Computer Science Technical Report #427, Dept , of EECS, University of California.

Data Movement Techniques for the pyramid computer, Russ Miller and Quentin F. Stout, SIAM Journal on Computing, vol. 16, No. 1, pp. 38-60, Feb. 1987.

Avior, A et. al., A Tight Layout of the Butterfly Network. Proc. 8-th Annual ACM Symp. on Parallel Alg. and Arch. (SPAA '96), ACM Press Ed., 1996, pp. 170-175.

Y. Yamada, et. al. , "Folded Fat H-Tree: an interconnection topology for Dynamically Reconfigurable Processor Array", Embed and Ubiq. Cmpting, Intl Conf. EUC 2004.

André DeHon. Compact, Multilayer Layout for Butterfly Fat-Tree. In Twelfth Annual ACM Symposium on Parallel Algs and Architectures (SPAA 2000), pp. 206-215, Jul. 9-12, 2000.

F. Petrini et. al., k-ary n-trees: High performance networks for massively parallel architectures, in: Proceedings of the 11th Intl Parallel Proc. Symp. , IPPS'97, pp. 87-93.

P.Pande et al. "Evaluation of MP-SoC Interconnect Architectures: a Case Study", Proceedings of 4th IWSOC, Banff, Alberta, Canada, Jul. 19-21, 2004.

Yeh, C.-H., Varvarigos, E.A., Parhami, B.: Multilayer VLSI layout for interconnection networks. In: Proc. Intl. Conf. on Parallel Processing, 2000.

Lukas Cavigelli and Luca Benini. 2016. Origami: A 803-GOp/s/W Convolutional Network Accelerator. IEEE Transactions on Circuits and Systems for Video Technology (Jul. 2016), 2461-2475.

Francisco Muñoz-Martinez, José L. Abellán, Manuel E. Acacio, Tushar Krishna: A novel network fabric for efficient spatio-temporal reduction in flexible DNN accelerators. NOCS '21: Proceedings of the 15th IEEE/ACM International Symposium on Networks-on-Chip, Oct. 2021 pp. 1-8.

Albert Reuther, Peter Michaleas, Michael Jones, Vijay Gadepally, Siddharth Samsi, and Jeremy Kepner: Survey and Benchmarking of Machine Learning Accelerators, IEEE High Performance Extreme Computing Conf., HPEC, Sep. 24-26, 2019.

Sheng-Chun Kao , Michael Pellauery, Angshuman Parashary, Tushar Krishna: DiGamma: Domain-aware Genetic Algorithm for HW-Mapping Co-optimization for DNN Accelerators, ICCAD '20, Nov. 2-5, 2020, Virtual Event, USA.

Kiseok Kwon, Alon Amid, Amir Gholami, Bichen Wu, Krste Asanovic, Kurt Keutzer: Co-Design of Deep Neural Nets and Neural Net Accelerators for Embedded Vision Applications, DAC '18, Jun. 24-29, 2018, San Francisco, CA, USA.

Zidong Du, Robert Fasthuber, Tianshi Chen, Paolo Ienne, Ling Li, Tao Luo, Xiaobing Feng, Yunji Chen, Olivier Temam: ShiDianNao: shifting vision processing closer to the sensor. International Symposium on Computer Architecture 2015: 92-104.

Kartik Hegde, Po-An Tsai, Sitao Huang, Vikas Chandra, Angshuman Parashar, Christopher W. Fletcher: Mind mappings: enabling efficient algorithm-accelerator mapping space search, ASPLOS '21: Proceedings of the 26th ACM International Conference on Architectural Support for Programming Languages and Operating SystemsApr. 2021 pp. 943-958.

Yu-Hsin Chen, Joel S. Emer, and Vivienne Sze. 2017. Using Dataflow to Optimize Energy Efficiency of Deep Neural Network Accelerators. IEEE Micro 37, (Jun. 3, 2017), 12-21.

Yu-Hsin Chen, Joel S. Emer, Tushar Krishna, and Vivienne Sze. 2017. Eyeriss: An Energy-Efficient Reconfigurable Accelerator for Deep Convolutional Neural Networks. IEEE Journal of Solid-State Circuits 52, (Jan. 1, 2017), 127-138.

Yu-Hsin Chen, Tien-Ju Yang, Joel Emer, and Vivienne Sze. 2019. Eyeriss v2: A Flexible Accelerator for Emerging Deep Neural Networks on Mobile Devices. IEEE Journal on Emerging and Selected Topics in Circuits and Systems 9, (Jun. 2, 2019), 292-308.

Y. Shen, M. Ferdman, and P. Milder, "Maximizing cnn accelerator efficiency through resource partitioning," in 2017 ACM/IEEE 44th Annual International Symposium on Computer Architecture (ISCA). IEEE, 2017, pp. 535-547.

Hyoukjun Kwon, Ananda Samajdar, and Tushar Krishna. 2018. MAERI: Enabling Flexible Dataflow Mapping over DNN Accelerators via Reconfigurable Interconnects. International Conf. on Architectural Support for Programming Languages and Operating Systems (ASPLOS) (Mar. 2018), 461-475.

Zhongyuan Zhao, Hyoukjun Kwon, Sachit Kuhar, Weiguang Sheng, Zhigang Mao, and Tushar Krishna. 2019. mRNA: Enabling Efficient Mapping Space Exploration for a Reconfigurable Neural Accelerator. International Symposium on Performance Analysis of Systems and Software (ISPASS) (Apr. 2019), 282-292.

Kun-Chih (Jimmy) Chen, Masoumeh Ebrahimi, et al.: 2019. NoC-Based DNN Accelerator: A Future Design Paradigm. In Proceedings of the 13th IEEE/ACM International Symposium on Networks-on-Chip. 1-8.

Hyoukjun Kwon, Prasanth Chatarasi, Michael Pellauer, Angshuman Parashar, Vivek Sarkar, and Tushar Krishna. 2019. Understanding Reuse, Performance, and Hardware Cost of DNN Dataflow: A Data-Centric Approach. International Symposium on Microarchitecture (Micro) (Oct. 2019), 754-768.

Eric Qin, Ananda Samajdar, Hyoukjun Kwon, Vineet Nadella, Sudarshan Srinivasan, Dipankar Das, Bharat Kaul, and Tushar Krishna. 2020. Sigma: A Sparse and Irregular GEMM Accelerator with Flexible Interconnects for DNN Training. IEEE International Symposium on High-Performance Computer Architecture (HPCA) (Mar. 2020).

Yakun Sophia Shao, Jason Clemons, Rangharajan Venkatesan, Brian Zimmer, Matthew Fojtik, Nan Jiang, et. al.,: Simba: Scaling Deep-Learning Inference with Multi-Chip-Module-Based Architecture, Micro '52: Proceedings of the 52nd Annual IEEE/ACM International Symposium on Microarchitecture, Oct. 2019 pp. 14-27.

Ashish Gondimalla, Noah Chesnut, Mithuna Thottethodi, T. N. Vijaykumar: SparTen: A Sparse Tensor Accelerator for Convolutional Neural Networks, Micro '52: Proceedings of the 52nd Annual IEEE/ACM International Symposium on Microarchitecture, Oct. 2019 pp. 151-165.

Vivienne Sze, Yu-Hsin Chen, Tien-Ju Yang, and Joel Emer. 2017. Efficient Processing of Deep Neural Networks: A Tutorial and Survey. arXiv preprint arXiv: 1703.09039v2 (2017) (Aug. 2017).

(56)             References Cited

OTHER PUBLICATIONS

Hyoukjun Kwon, Ananda Samajdar, and Tushar Krishna. 2017. Rethinking NoCs for spatial neural network accelerators. In 2017 Eleventh IEEE/ACM International Symposium on Networks-on-Chip (NOCS). 1-8.

A. Parashar, P. Raina, Y. S. Shao, Y.-H. Chen, V. A. Ying, A. Mukkara, R. Venkatesan, B. Khailany, S. W. Keckler, and J. Emer, "Timeloop: A systematic approach to DNN accelerator evaluation," in 2019 IEEE international symposium on performance analysis of systems and software (ISPASS). IEEE, 2019, pp. 304-315.

Andrei Ivanov, Nikoli Dryden, Tal Ben-Nun, Shigang Li, and Torsten Hoefler. "Data Movement Is All You Need: A Case Study on Optimizing Transformers." Conference on Machine Learning and Systems, 2021.

L. N. Bhuyan and D. P. Agrawal. Generalized hypercube and hyperbus structures for a computer network. IEEE Trans. Computers, 33(4):323-333, 1984.

Avinash Karanth Kodi, Ashwini Sarathy, Ahmed Louri: iDEAL: Inter-router Dual-Function Energy and Area-Efficient Links for Network-on-Chip (NoC) Architectures. International Symposium on Computer Architecture, 2008: 241-250.

P Merolla, J Arthur, R Alvarez, JM Bussat, K Boahen; A Multicast Tree Router for Multichip Neuromorphic Systems, Circuits and Systems I: Regular Papers, IEEE Transactions 61 (3), 820-833.

J. Kim, W. J. Dally, and D. Abts. Flattened Butterfly : A Cost Efficient Topology for High-Radix Networks. In Proc. of the International Symposium on Computer Architecture (ISCA), pp. 126-137, San Diego, CA, Jun. 2007.

John Kim, James Balfour, and William Dally. Flattened butterfly topology for on-chip networks. In Proc. of the 40th International Symposium on Microarchitecture, pp. 172-182, Dec. 2007.

Kun Chih Chen, Masoumeh Ebrahimi, Ting Yi Wang and Yuch Chi Yang, "NoC-based DNN Accelerator: A Future Design Paradigm", Proceedings of IEEE/ACM International Symposium on Networks-on-Chip, pp. 1-8. 2019.

Pejman Lotfi-Kamran, Boris Grot, Babak Falsafi: NOC-Out: Microarchitecting a Scale-Out Processor. Proceedings of the 45th Annual International Symposium on Microarchitecture, Vancouver, Canada, Dec. 2012.

Alessandro Carrega; Suresh Singh; Roberto Bruschi, Raffaele Bolla; Traffic merging for energy-efficient datacenter networks, 2012, International Symposium on Performance Evaluation of Computer & Telecommunication Systems (SPECTS) Jul. 8-11, 2012.

* cited by examiner

FIG. 1A1
100A1
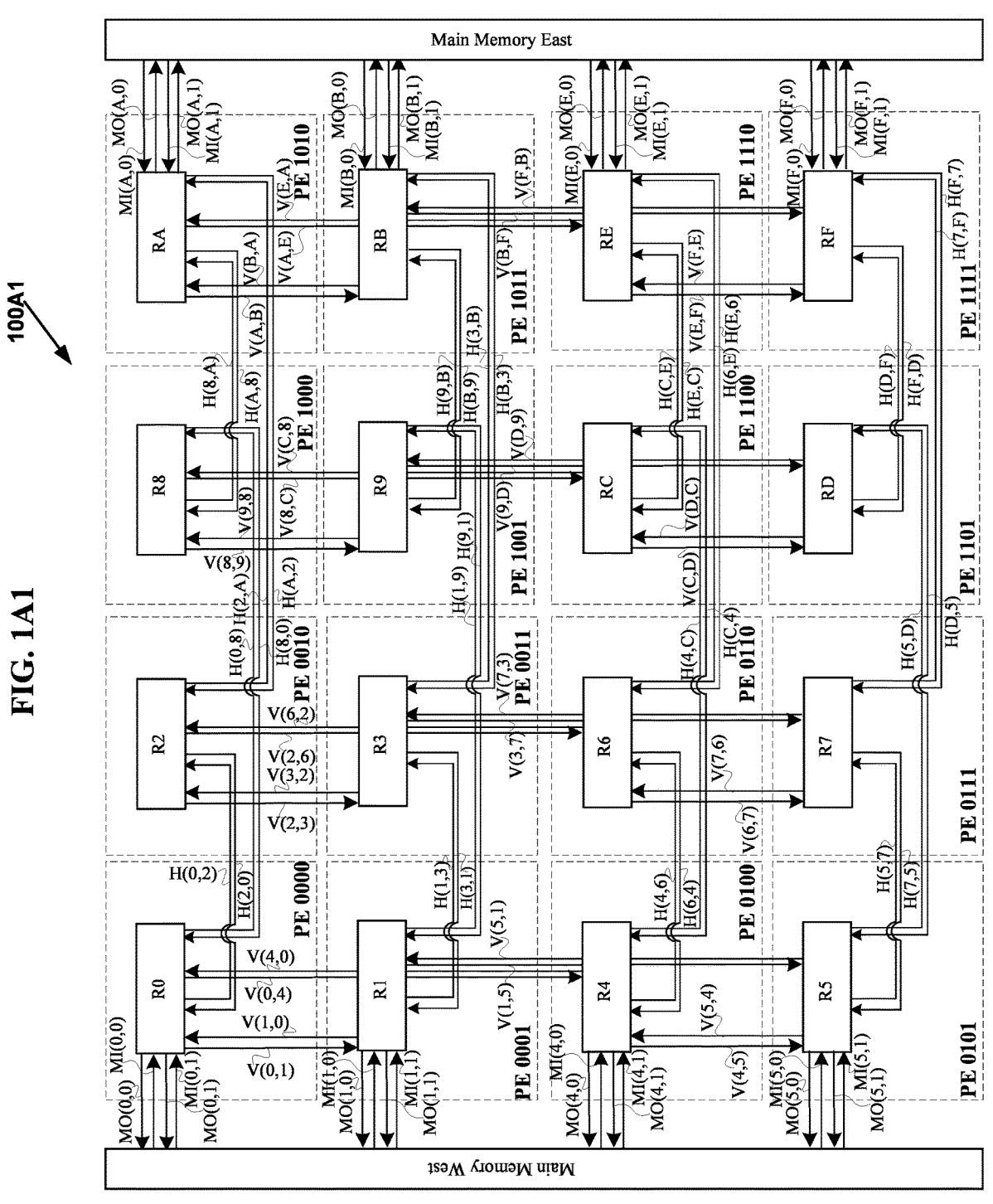

FIG. 1A2
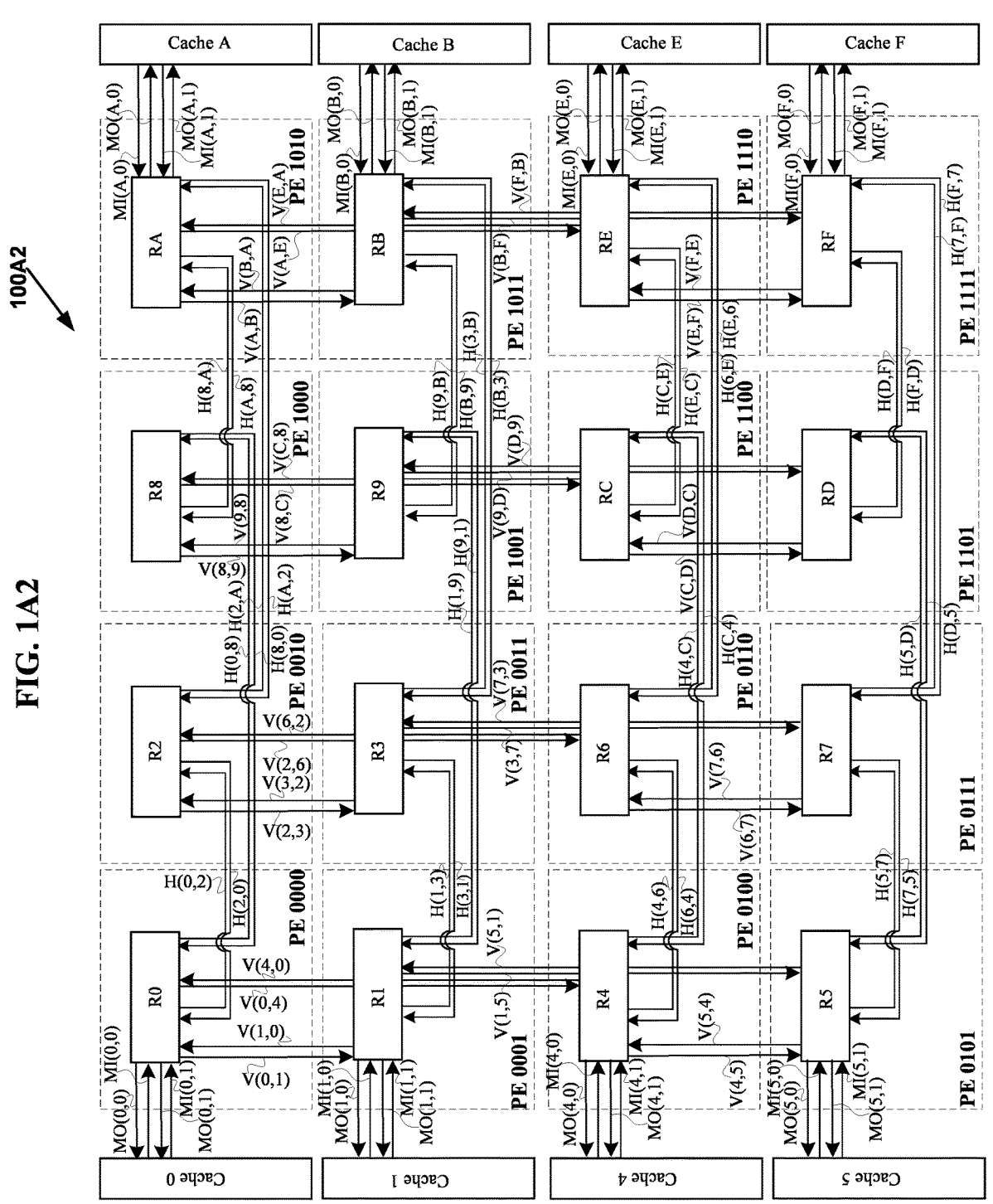

Main Memory East

Main Memory West

FIG. 5A1
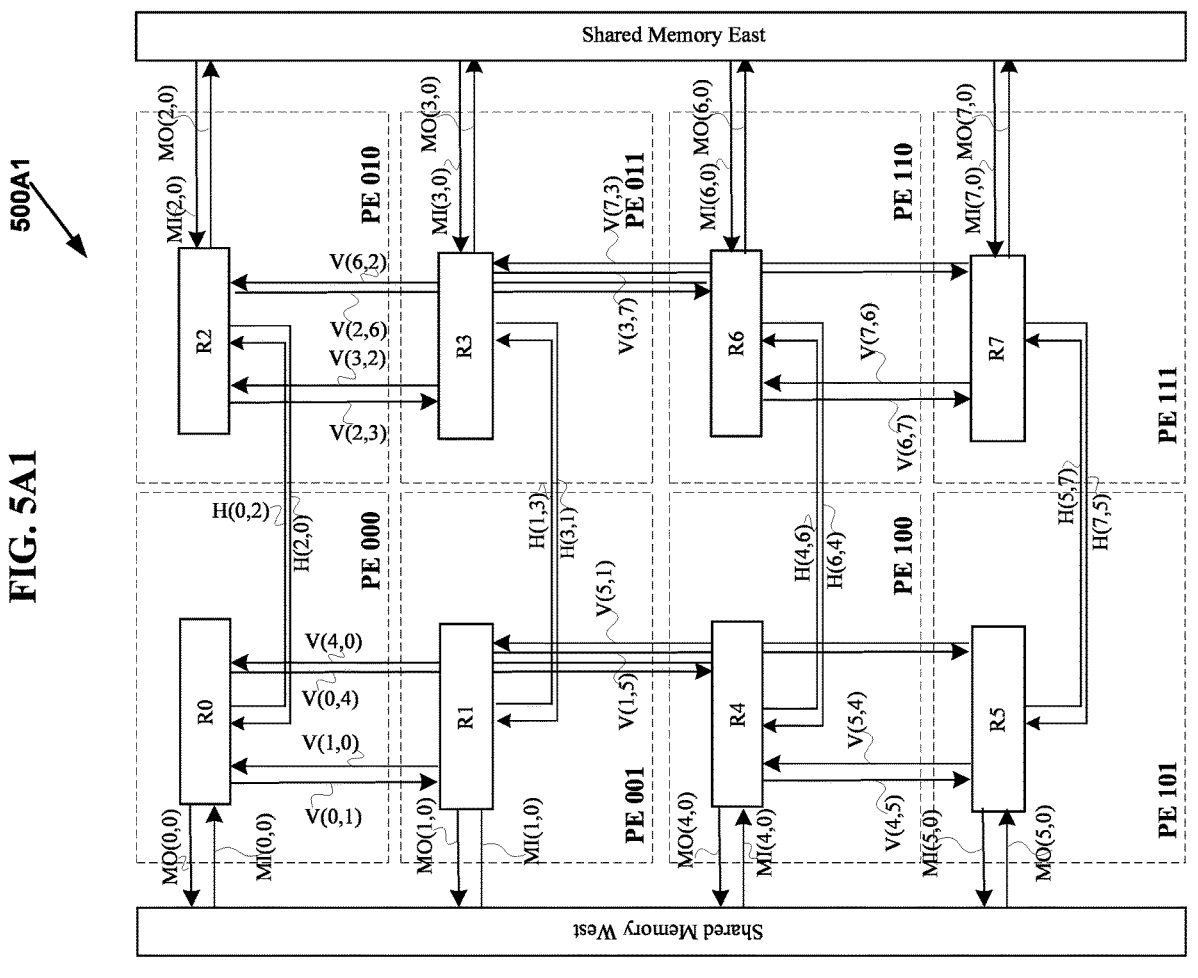

FIG. 5A2
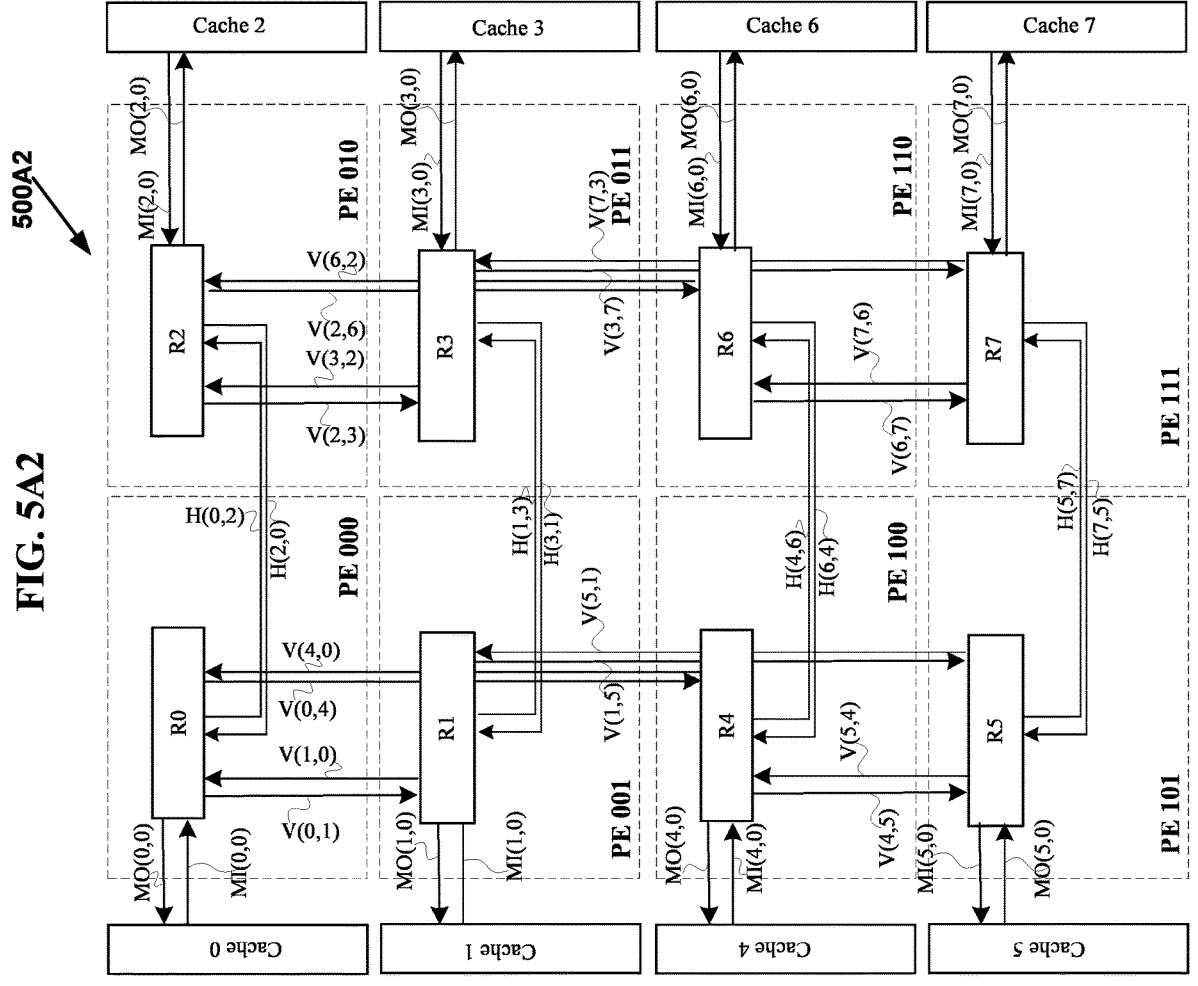

FIG. 5B1
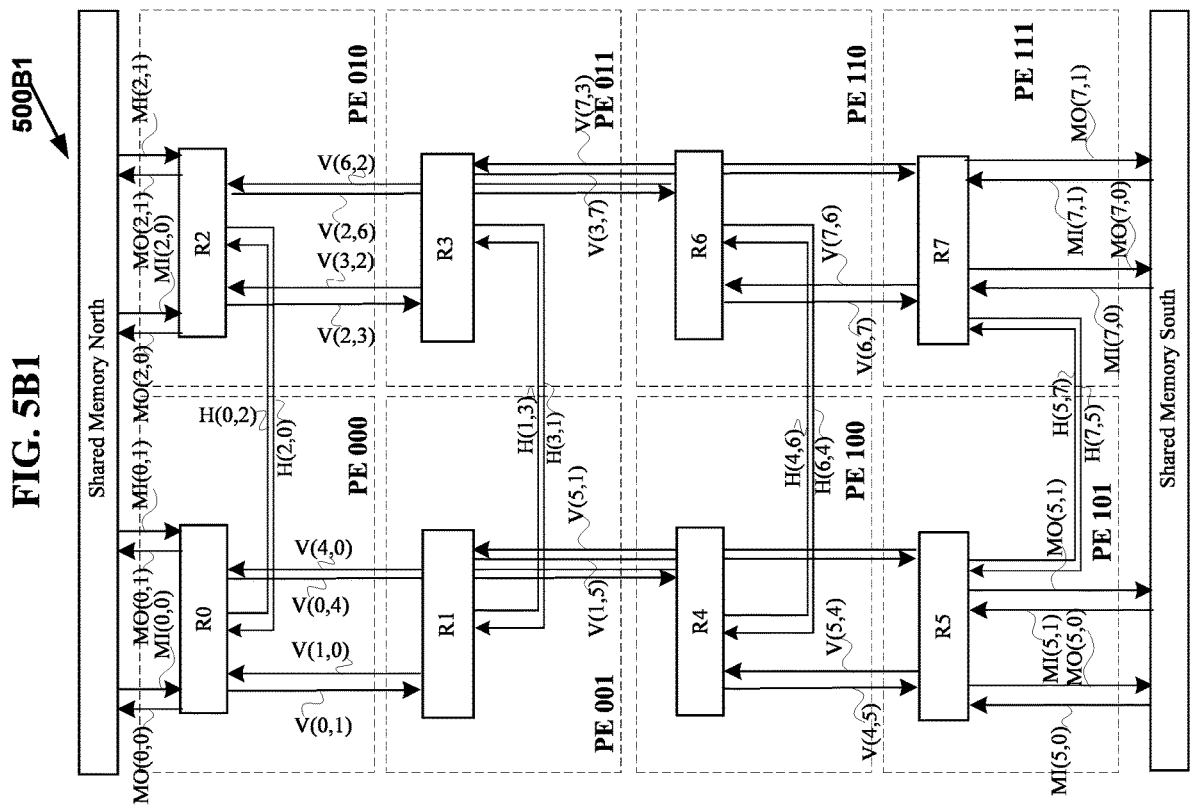

FIG. 5B2
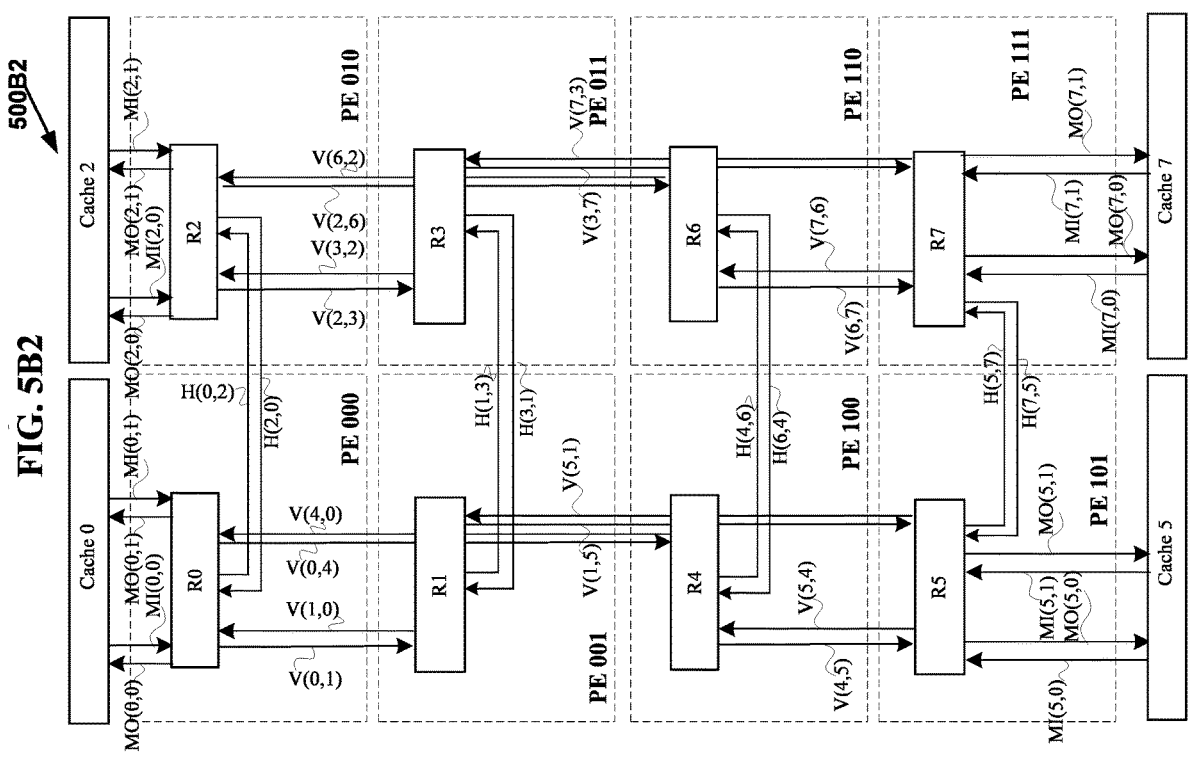

FIG. 6A1
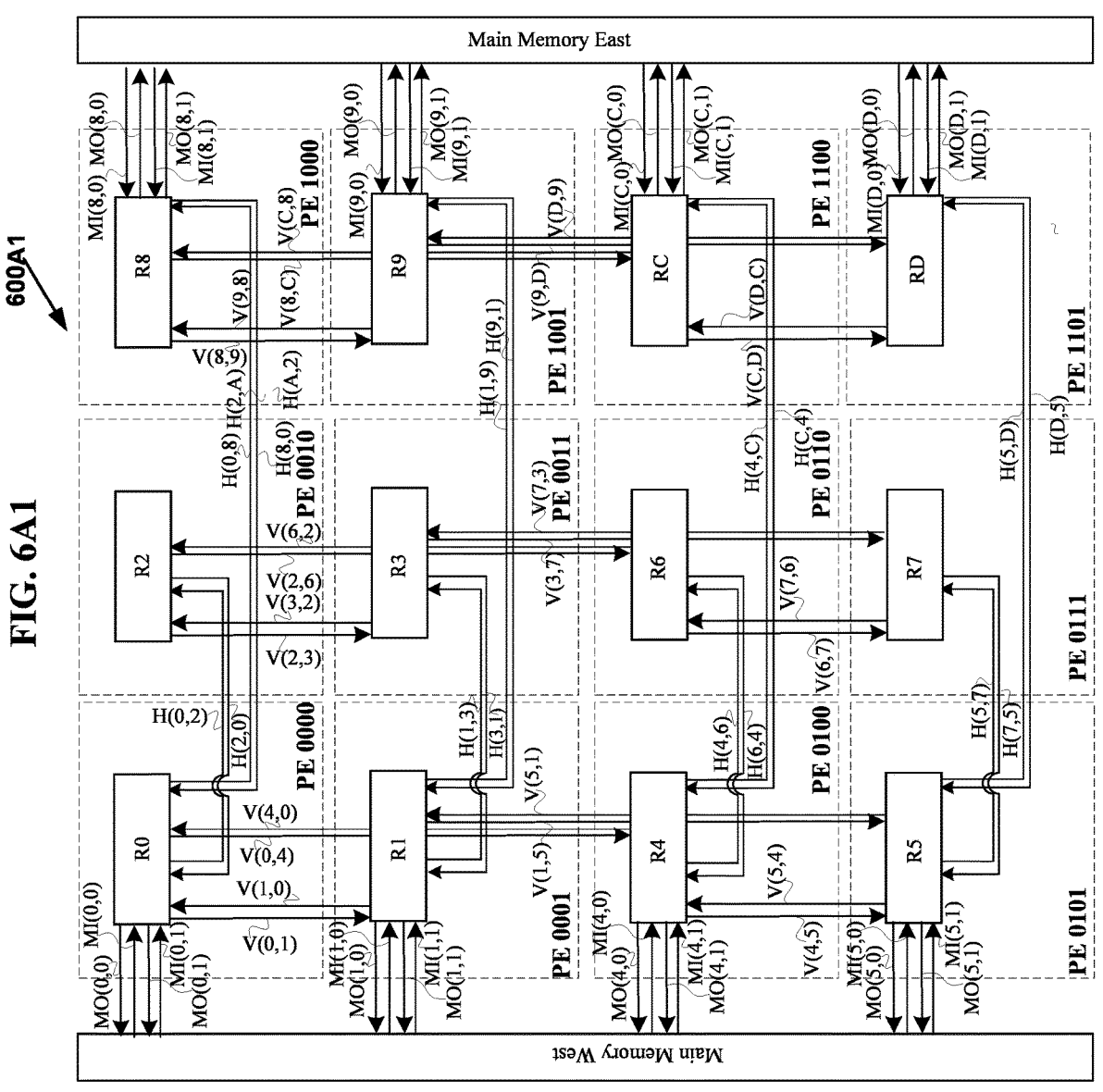

FIG. 6A2
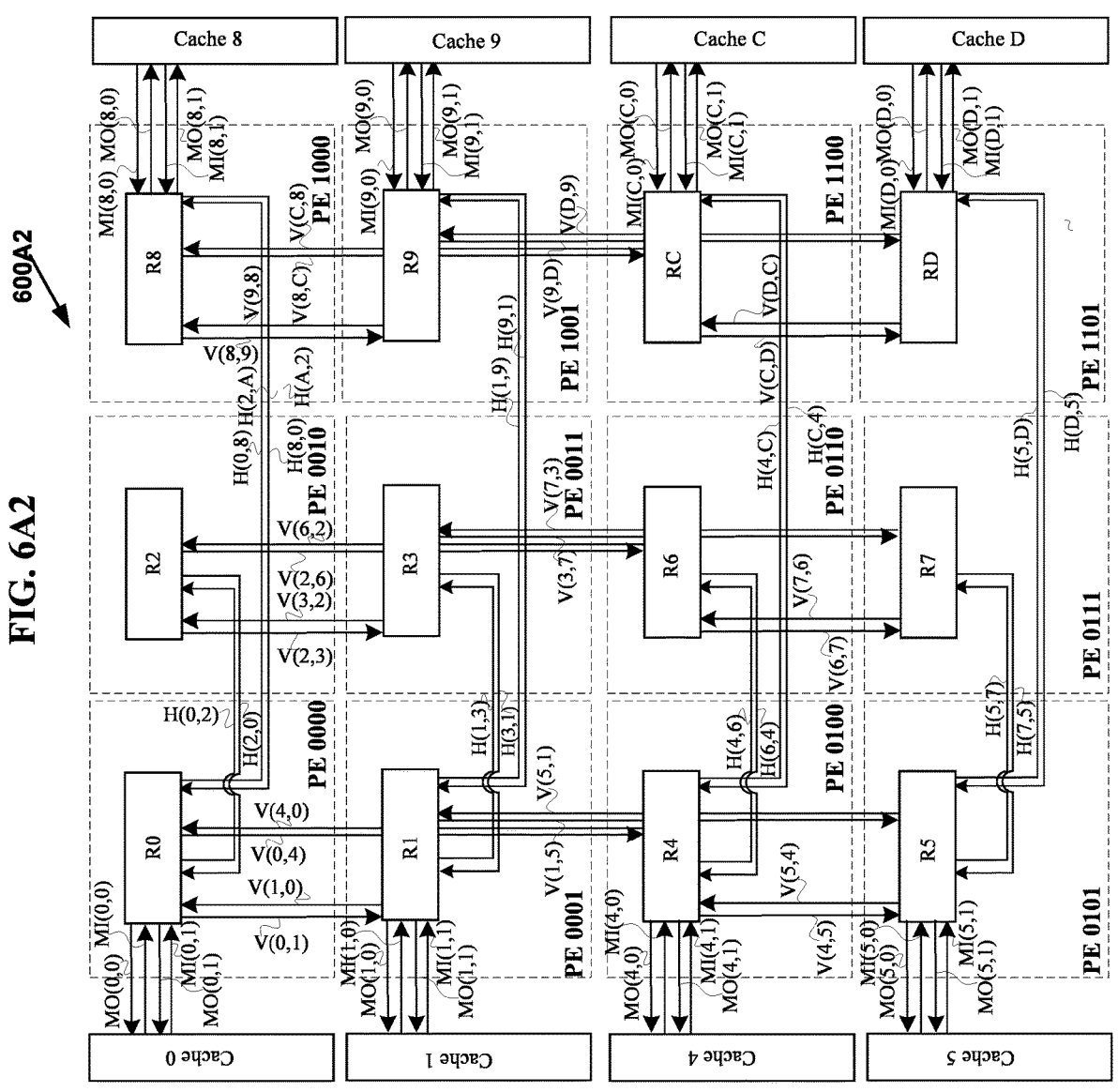

FIG. 7A1
700A1
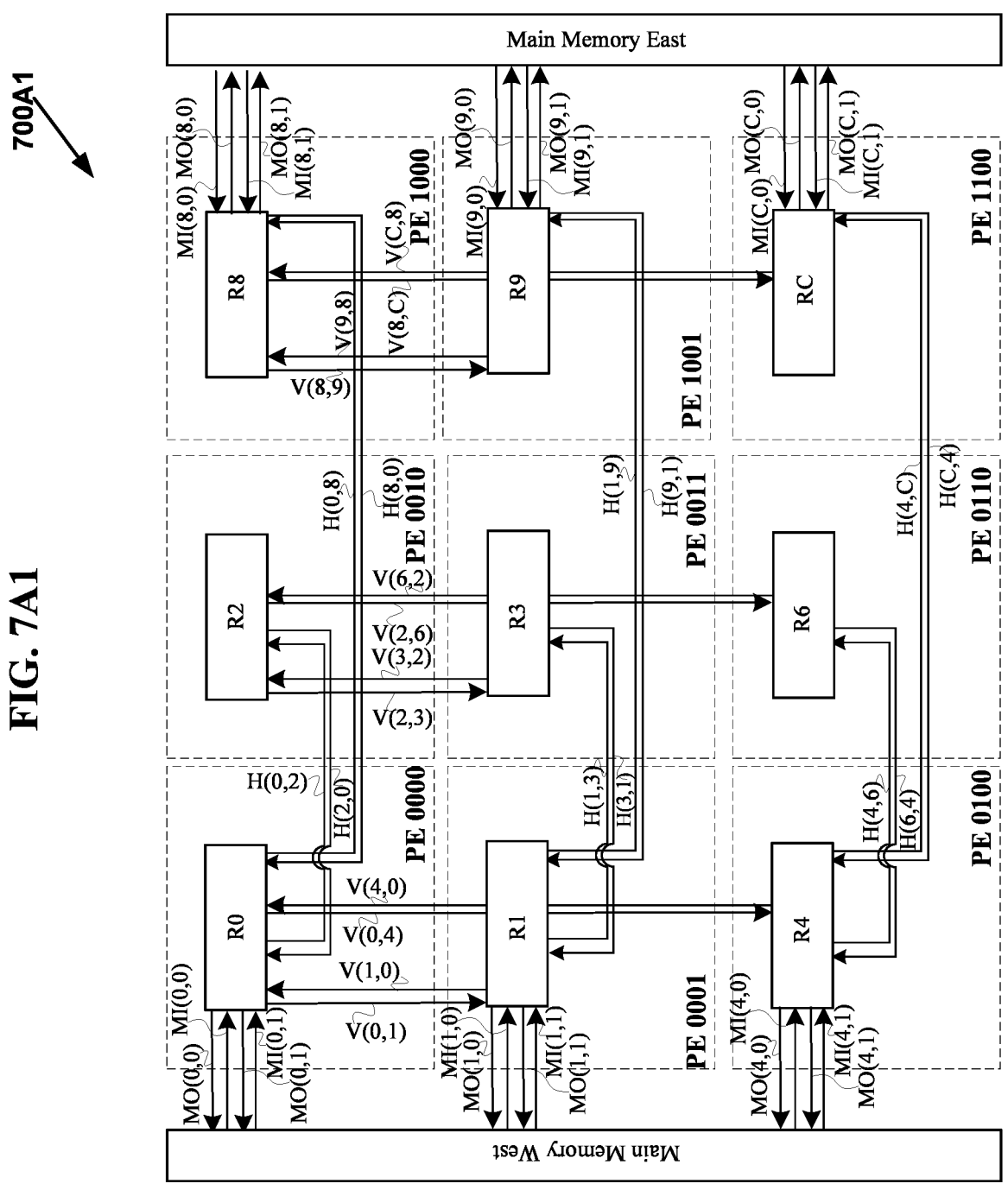

FIG. 7A2
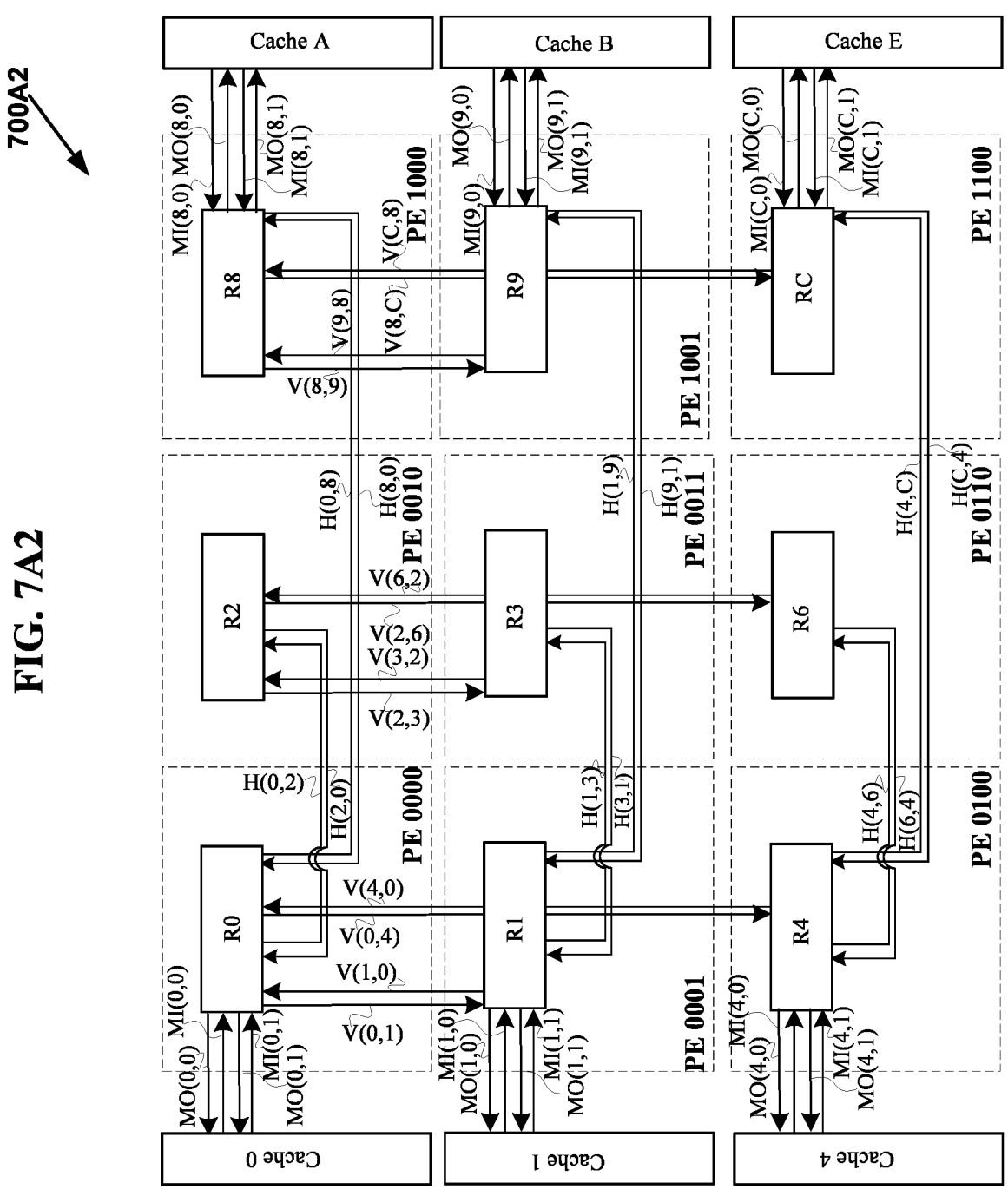

700B

FIG. 7C1
700C1
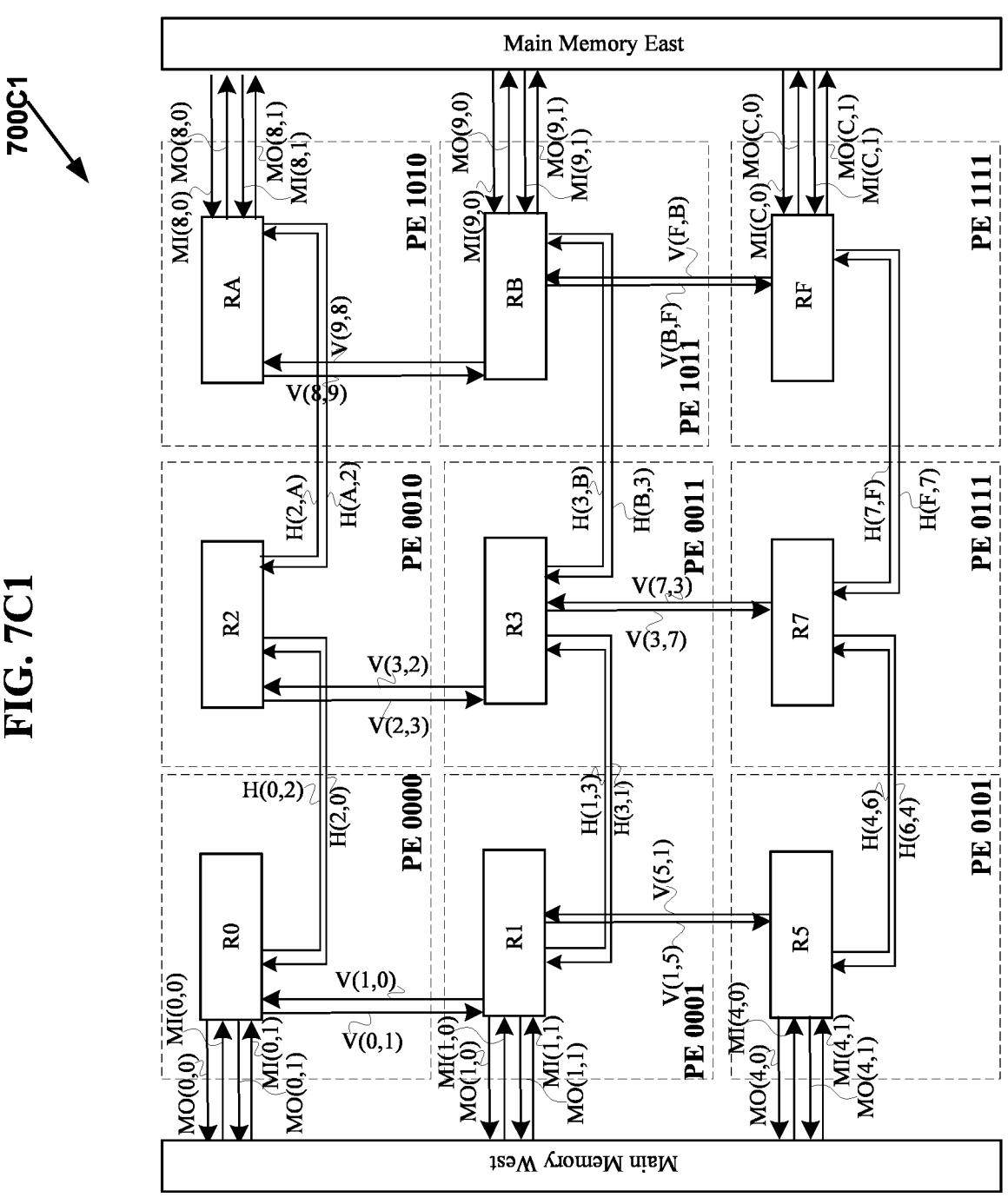

FIG. 7C2
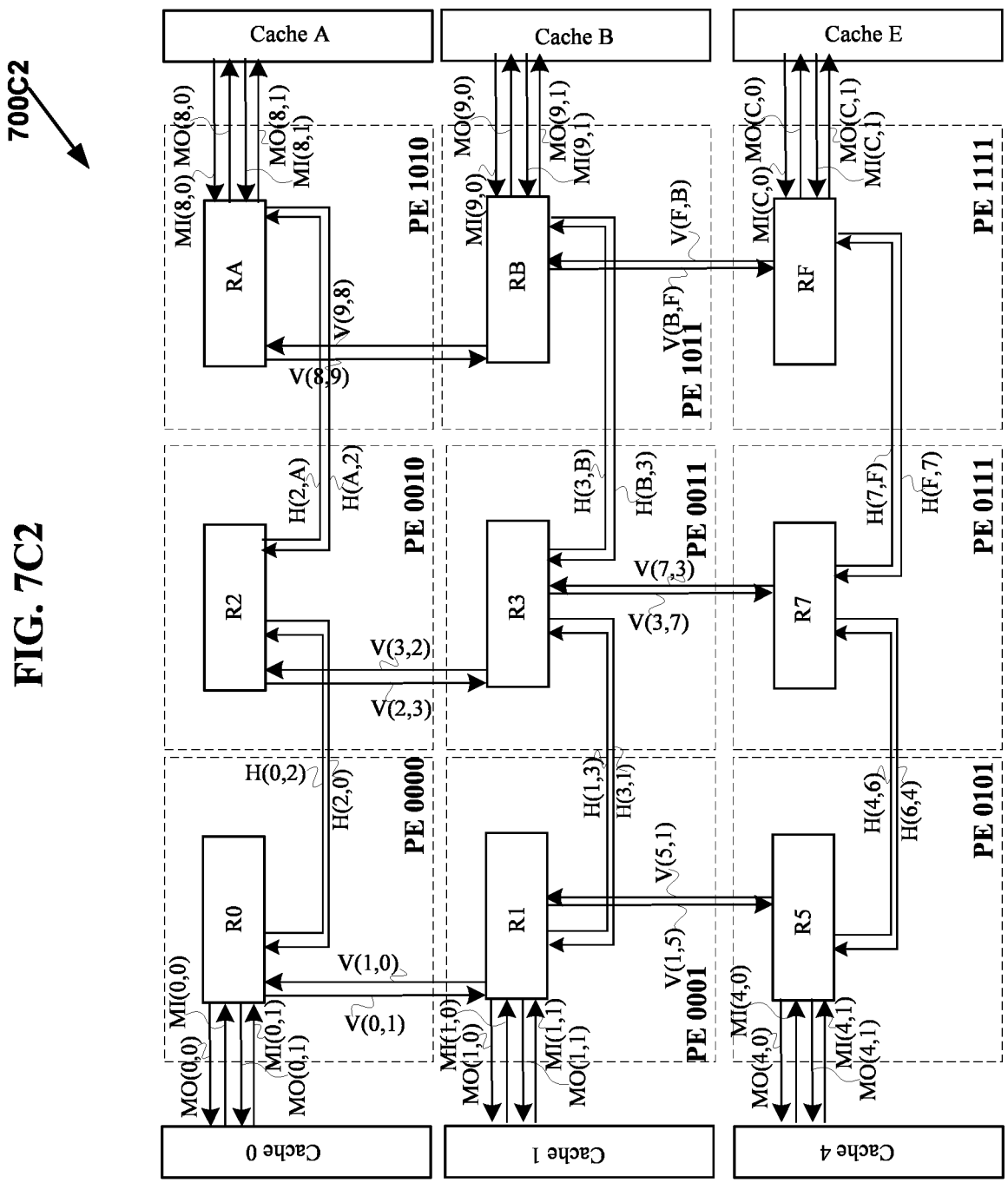

700D

FIG. 9A
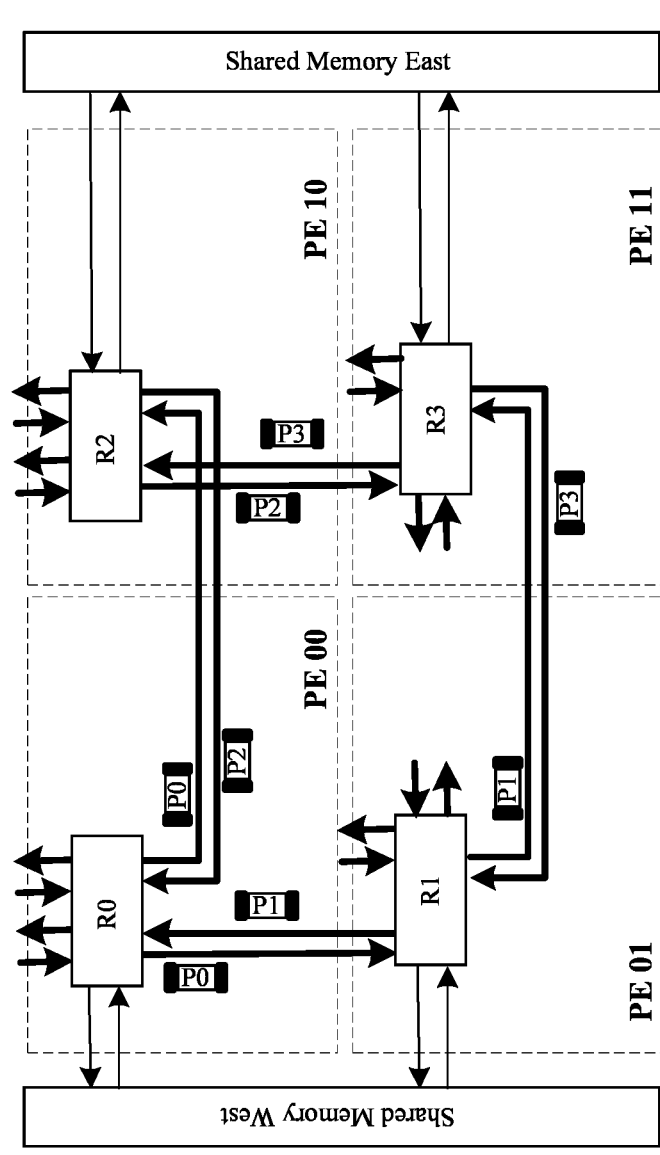

1300

FIG. 21A1
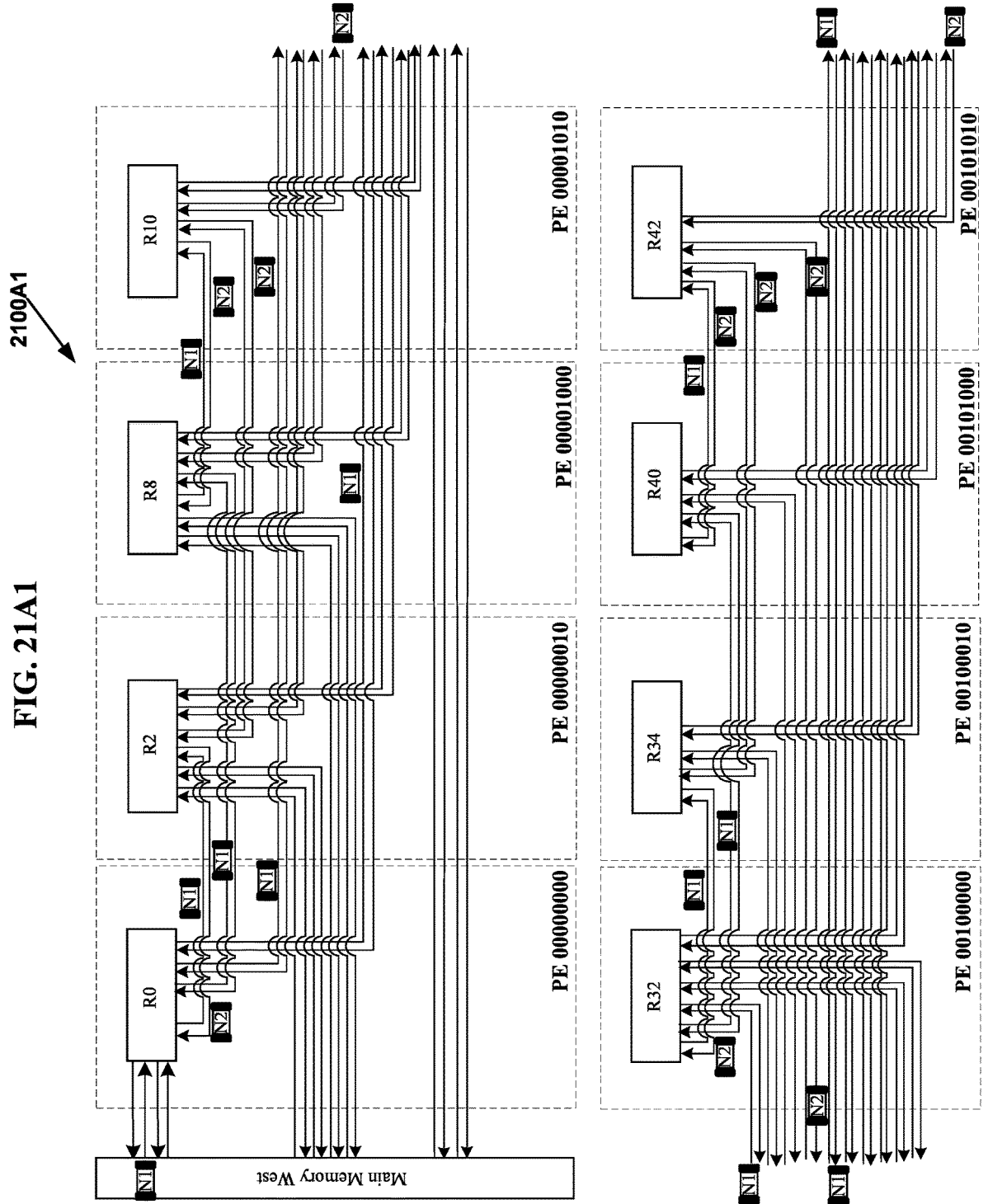

FIG. 21A2
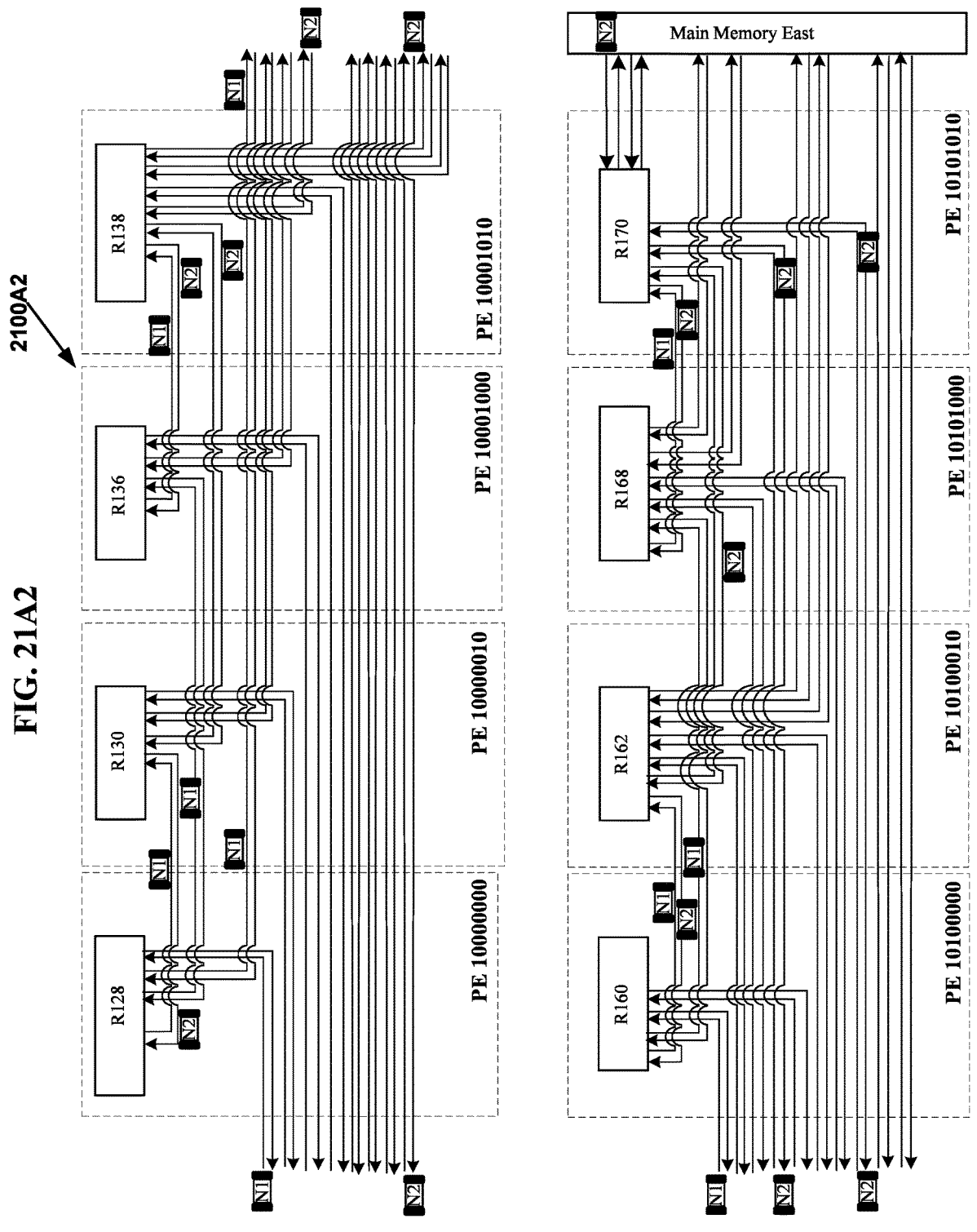

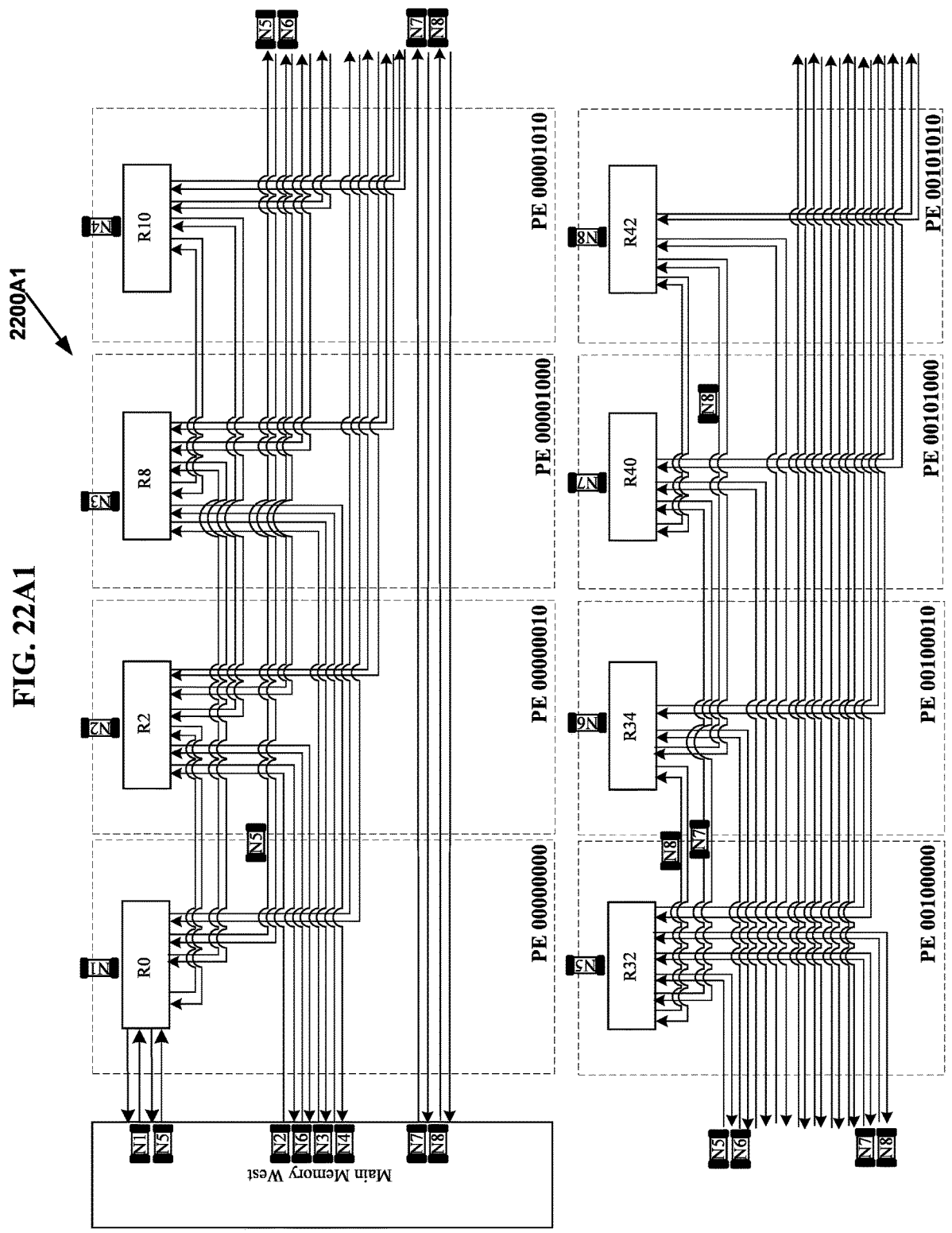
FIG. 22A1

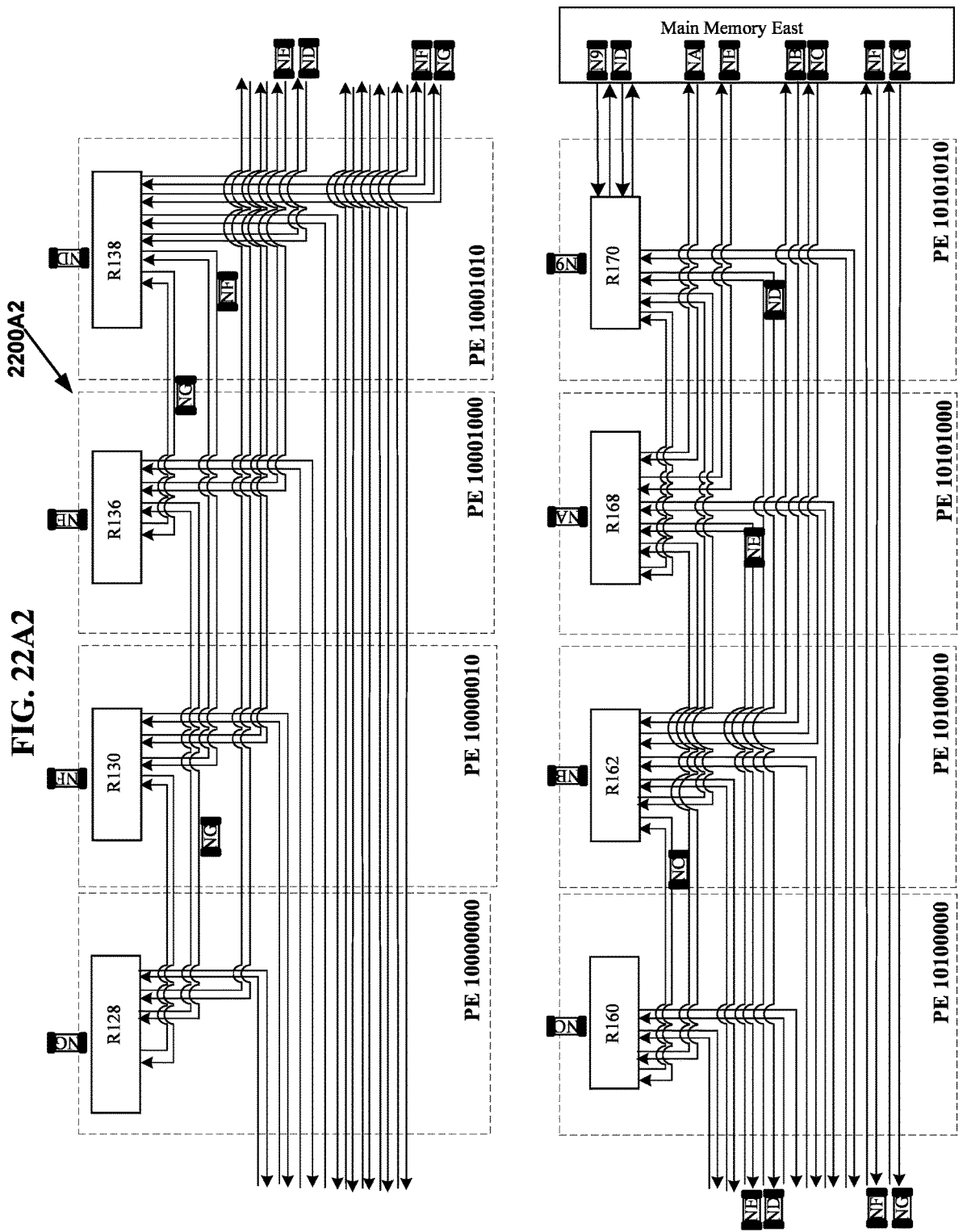
FIG. 22A2

SCALABLE DETERMINISTIC INTERCONNECTION NETWORK FOR EFFICIENT DATA MOVEMENT

CROSS REFERENCE TO RELATED APPLICATIONS

This application is Continuation In Part Application and claims priority to the U.S. Provisional Patent Application Ser. No. 63/426,749 entitled "DETERMINISTIC INTER-CONNECTION NETWORK SCALABLE FOR DISTRIB-UTED COMPUTING SYSTEM WITH SHARED MEMORY" by Venkat Konda assigned to the same assignee as the current application, filed Nov. 19, 2022.

BACKGROUND OF INVENTION

This specification relates to distributed computing for massively parallel computational applications which requires scalable interconnection network. An example of such massively parallel computational application is distrib-uted computing hardware for neural network training and inference.

Deep neural networks ("DNN") employ large number of hidden layers with an input layer and an output layer. The output of the input layer or each hidden layer is (hereinafter also called activation) used as input to the next layer in the network, which is the next hidden layer or the output layer of the network. Each hidden layer of the network generates an output from a received input with current values of a respective set of reused weights.

Some of the well-known DNNs are: 1) Multi-Layer Perceptrons ("MLP"): Each hidden layer is a set of nonlinear functions of weighted sum of all outputs from preceding layer with the respective set of reused weights. MLP is fully connected network and so in distributed computing hard-ware requires concurrent broadcast of outputs or activations; 2) Convolutional Neural Networks ("CNN"): Each hidden layer is a set of nonlinear functions of weighted sums of spatially nearby subsets of outputs or activations from the preceding hidden layer with the respective set of reused weights. Since CNN is spatially nearby subsets of outputs in contrast to all outputs from the preceding hidden layer, distributed computing hardware requires concurrent multi-cast of certain fan-out of outputs or activations from the preceding hidden layer; 3) Recurrent Neural Networks ("RNN"): Each succeeding layer is a collection of nonlinear functions of weighted sums of outputs or activations from the preceding hidden layer and the previous state. An example of well-known RNN is Long Short-Term Memory (LSTM). The respective set of weights is reused across time steps.

Both the weighted sums of outputs or activations from the preceding hidden layer and the set of weights can be represented as matrix structures typically in large dimen-sional space. Sparse neural networks ("SNN") are any of MLP, CNN, and LSTM where a significant percentage of values in the matrix structures are zeros.

Distributed computing hardware for massively parallel computational applications, in general, including DNN training and inference requires scalable interconnection net-work with capabilities of a) concurrent broadcast and scal-able concurrent multicast of outputs or data tokens, b) simultaneous multicast of packets with each packet multi-casting in a row, simultaneous multicast of packets with each packet multicasting in a column, simultaneous multicast of packets with each packet multicasting in a row or in a column, c) concurrent multiple unicasts or parallel loading of packets from shared memory one each it into different Processing elements in a row or a column.

One way of building distributed computing hardware is with interconnection network that heuristically employs concurrent broadcast and multicast of data token requiring large buffers, resulting in out-of-order receipt of data tokens, frequent blocking in the interconnection network requiring complex software or compiler. However, the scalability of the distributed computing hardware is limited by the inter-connection network architecture. Another way of building multiple interconnection networks is each of them doing a different task but will remain idle for the other tasks. In any case these implementations of interconnection networks are expensive, power hungry, blocking which results in high latency, low throughput, larger training and inference time and not scalable.

SUMMARY OF INVENTION

A scalable 2D-BFTHypercube deterministic interconnec-tion network hereinafter "2D-BFTHypercube interconnec-tion network" between two or more processing elements ("PEs") or processing cores ("PCs") arranged in a 2D-grid with shared memory using vertical and horizontal buses (i.e., each bus is one or more wires) is disclosed. At each PE, the interconnection network comprises a router ("intercon-nect") with concurrently capable to send and receive packets from one PE to another PE through the buses connected between them. Each packet comprises data token, routing information such as source and destination address of PEs and other information.

Each PE, in addition to interconnect, comprises a proces-sor and/or local memory. In one embodiment the processor is a Central Processing Unit ("CPU") comprises functional units that perform such as additions, multiplications, or logical operations, for executing computer programs. In another embodiment the processor comprises a domain specific architecture ("DSA") based Deep Neural Network ("DNN") processor comprising one or more multiply accu-mulate ("MAC") units for matrix multiply operations. In yet another embodiment the processor comprises one or more multiply accumulate ("MAC") units for matrix multiply operations in addition to functional units that perform such as additions, multiplications, or logical operations, for executing computer programs. In one embodiment at each PE processor, local memory and interconnect are directly connected to each other. The 2D-grid of PEs is of size a×b, where a≥1, b≥1, a+b>2, and both a and b are integers is disclosed. In one embodiment main memory or shared main memory is physically located on the east side and west side of the 2D-grid of PEs and all the PEs in the 2D-grid access (i.e., read data or write data) main memory via the 2D-BFT-Hypercube interconnection network. In another embodiment main memory or shared main memory is physically located on the north side and south side of the 2D-grid of PEs and all the PEs in the 2D-grid access (i.e., read data or write data) main memory via the 2D-BFTHypercube interconnection network.

Methods for all the PEs of the 2D-grid scalable for any number of PEs concurrently broadcasting packets to all the other PEs in the 2D-grid in a non-blocking, collision-free and without requiring queueing in a deterministic number of time steps are disclosed.

Methods for concurrently broadcasting packets to all the other PEs in several sub-2D-grids in a 2D-grid scalable for any number of PEs, i.e., simultaneously in each sub-2D- grid, in a non-blocking, collision-free and without requiring queueing in a deterministic number of time steps are disclosed.

Methods for concurrently broadcasting packets to all the other PEs in several sub-1D-grids (i.e., each sub-1D-grid is only in a single row or only in a single column), in a 2D-grid scalable for any number of PEs, i.e., simultaneously in each sub-2D-grid, in a non-blocking, collision-free and without requiring to queue in a deterministic number of time steps are disclosed.

Methods for a) simultaneous multicast of packets with each packet multicasting in a row of PEs scalable for any number of PEs from shared memory located on the both sides of the row of PEs, b) simultaneous multicast of packets with two packets one each in both directions multicasting in a row of PEs scalable for any number of PEs from shared memory located on the both sides of the row of PEs, and c) methods for simultaneous multicast of packets with two packets one each in both directions multicasting in each row of PEs scalable for any number of PEs in a non-blocking, collision-free and without requiring to queue in a deterministic number of time steps are disclosed.

Methods for concurrent multiple unicasts or parallel loading of packets from shared memory one each it into a row of PEs from shared memory located on the both sides of the row of PEs scalable for any number of PEs in a non-blocking, collision-free and without requiring queueing in a deterministic number of time steps are disclosed.

BRIEF DESCRIPTION OF DRAWINGS

FIG. 1A1 is a diagram 100A1 of an exemplary 2D-BFT-Hypercube interconnection network with 4*4 2D-grid of Processing Elements ("PEs") scalable for distributed computing system with shared memory, in accordance with the invention.

FIG. 1A2 is a diagram 100A2 of an exemplary 2D-BFT-Hypercube interconnection network with 4*4 2D-grid of PEs for scalable distributed computing system with cache and shared memory, in accordance with the invention.

FIG. 2E is a diagram 200E of an exemplary 2D-BFTHypercube interconnection network with 16*8 2D-grid of 128 PEs scalable for distributed computing system with shared memory, in accordance with the invention.

FIG. 2G is a diagram 200G of an exemplary 2D-BFTHypercube interconnection network with 16*16 2D-grid of 256 PEs scalable for distributed computing system with shared memory, in accordance with the invention.

FIG. 5A1 is a diagram 500A1 of an exemplary 2D-BFT-Hypercube interconnection network with 4*2 2D-grid of PEs scalable for distributed computing system with shared memory in the east and west sides, in accordance with the invention.

FIG. 5A2 is a diagram 500A2 of an exemplary 2D-BFT-Hypercube interconnection network with 4*2 2D-grid of PEs scalable for distributed computing system with cache and shared memory in the east and west sides, in accordance with the invention.

FIG. 5B1 is a diagram 500A1 of an exemplary 2D-BFT-Hypercube interconnection network with 4*2 2D-grid of PEs scalable for distributed computing system with shared memory in the north and south sides, in accordance with the invention.

FIG. 5B2 is a diagram 500A2 of an exemplary 2D-BFT-Hypercube interconnection network with 4*2 2D-grid of PEs scalable for distributed computing system with cache and shared memory in the north and south sides, in accordance with the invention.

FIG. 6A1 is a diagram 600A1 of an exemplary 2D-BFT-Hypercube interconnection network with 4*3 2D-grid of PEs scalable for distributed computing system with shared memory, in accordance with the invention.

FIG. 6A2 is a diagram 600A2 of an exemplary 2D-BFT-Hypercube interconnection network with 4*3 2D-grid of PEs scalable for distributed computing system with cache and shared memory, in accordance with the invention.

FIG. 7A1 is a diagram 700A1 of an exemplary 2D-BFT-Hypercube interconnection network with 3*3 2D-grid of PEs scalable for distributed computing system with shared memory, in accordance with the invention.

FIG. 7A2 is a diagram 700A2 of an exemplary 2D-BFT-Hypercube interconnection network with 3*3 2D-grid of PEs scalable for distributed computing system with cache and shared memory, in accordance with the invention.

FIG. 9A is a diagram 900A of illustration of time step 1 of deterministic concurrent broadcast by all PEs in two time steps in an exemplary 2D-BFTHypercube interconnection network with 2*2 2D-grid of PEs scalable for distributed computing system with shared memory, in accordance with the invention.

FIG. 21A1 is a diagram 2100A1 and FIG. 21A2 is a diagram 2100A2 together are an illustration of non-blocking multicast of a packet from main memory west to all PEs and simultaneously non-blocking multicast of another packet from main memory east to all PEs in the left half of top row of PEs illustrated in diagram 1400A of FIG. 14A and also in the right half of top row of PEs illustrated in diagram 1400B of FIG. 14B in an exemplary 2D-BFTHypercube interconnection network either with diagrams 200G-H in FIG. 2G-H of 16*16 2D-grid of PEs or with a 32*16 2D-grid of PEs scalable for distributed computing system coupled with shared memory in the east and west sides, in accordance with the invention.

FIG. 22A1 is a diagram 2200A1 and FIG. 22A2 is a diagram 2200A2 together are an illustration of non-blocking multiple unicast or parallel loading of eight packets from main memory west to the eight left half of top row of PEs and simultaneously non-blocking multiple unicast or parallel loading of eight packets from main memory east to the eight right half of top row of PEs in the same row in the left half of top row of PEs illustrated in diagram 1400A of FIG. 14A and in the right half of top row of PEs illustrated in diagram 1400B of FIG. 14B in an exemplary 2D-BFTHypercube interconnection network either with diagrams 200G-H in FIG. 2G-H of 16*16 2D-grid of PEs or with a 32*16 2D-grid of PEs scalable for distributed computing system coupled with shared memory in the east and west sides, in accordance with the invention.

DETAILED DESCRIPTION OF THE INVENTION

Figure 1B:
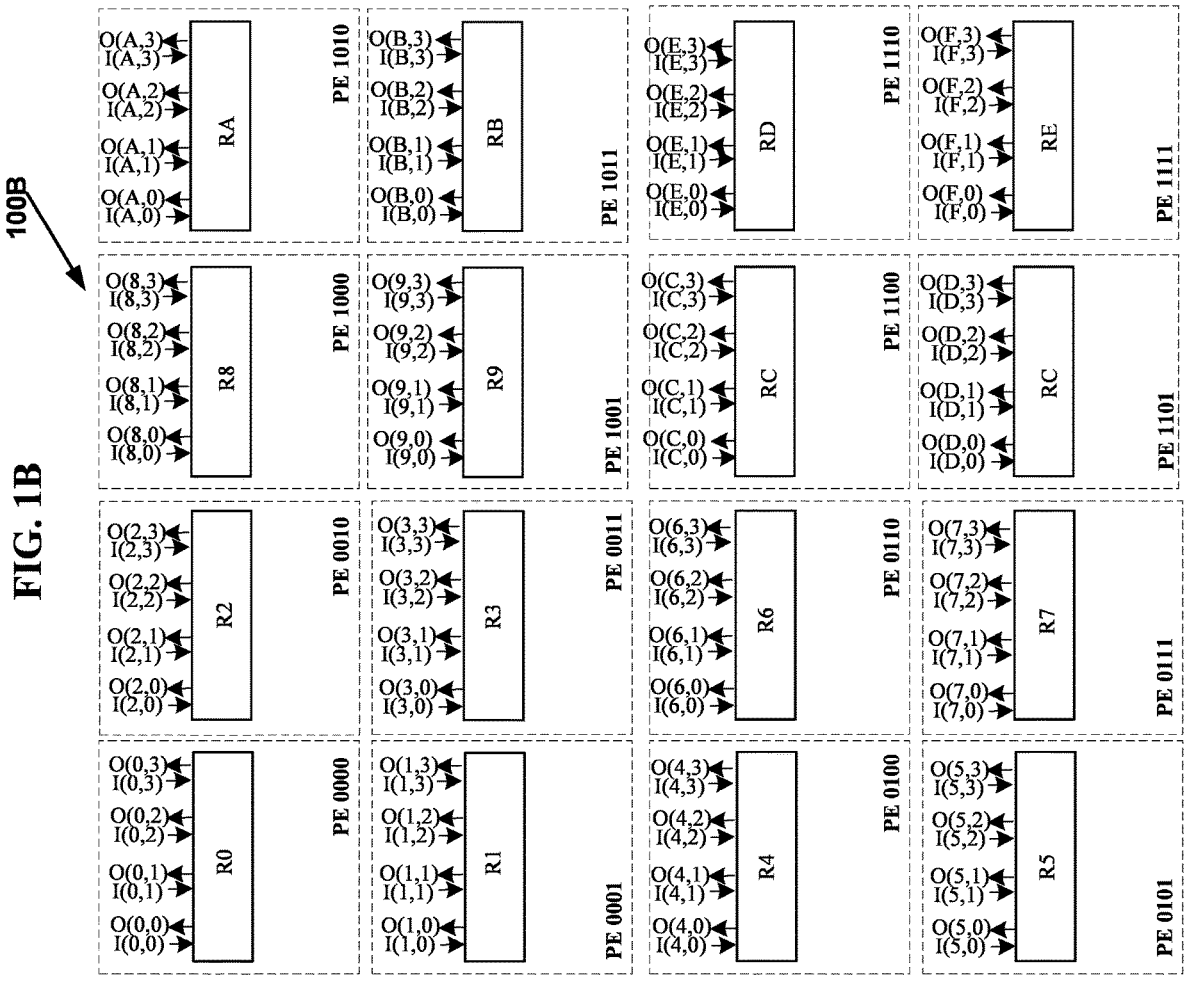
FIG. 1B is a diagram 100B with illustration of local inlet buses ("or local inlet ports") and local outlet buses ("or local outlet ports") in each PE of an exemplary 2D-BFTHypercube interconnection network with 4*4 2D-grid of PEs scalable for distributed computing system with shared memory, or cache and shared memory, in accordance with the invention.

The present invention discloses systems and methods for deterministic concurrent communication between PEs implemented in a two dimensional grid ("2D-grid") 1) in a single die, or 2) in a plurality of dies on a semiconductor wafer, or 3) in a plurality of integrated circuit chips with the main memory located on two sides of the 2D-grid either on a) east and west sides or 2) north and south sides; all the scenarios are collectively called scalable distributed computing system with shared memory or massively parallel system with shared memory or multiprocessor system with shared memory ("MPS with SM").

In one embodiment the concurrent communication is each PE broadcasts data tokens to all the rest of PEs concurrently in a deterministic number of time steps. In another embodiment the concurrent communication is each PE multicasts data tokens to one or more of PEs concurrently in a deterministic number of time steps; if each PE concurrently transmits to another PE it is unicast and if each PE concurrently transmits to two or more other PEs it is multicast. The 2D-grid of PEs is of size a×b, where a≥1, b≥1, a+b>2, and both a and b are integers is disclosed. In all the embodiments disclosed in the entire current invention, scalable 2D-BFT-Hypercube deterministic interconnection network and scalable 2D-BFTHypercube interconnection network both mean the same.

In one embodiment the 2D-grid of PEs are connected by a scalable 2D-BFTHypercube interconnection network using vertical and horizontal buses is disclosed. Accordingly, each two PEs with connection between them, are connected by a separate bus in each direction where a bus is one or more wires. At each PE, the interconnection network comprises one or more ports (collectively "interconnect or router") with each port concurrently capable to send and receive packets from one PE to another PE through the bus connected between them. (To be specific, interconnection network is the combination of interconnects or routers of all PEs i.e., including the ports and all buses.) Each packet comprises data token, routing information such as source and destination addresses of PEs.

Each PE, in addition to interconnect, comprises a processor and local memory. In one embodiment the processor is a Central Processing Unit ("CPU") comprises functional units that perform such as additions, multiplications, or logical operations, for executing computer programs. In another embodiment the processor comprises a domain specific architecture ("DSA") based Deep Neural Network ("DNN") processor or accelerator comprising one or more multiply accumulate ("MAC") units for matrix multiply operations. In yet another embodiment processor is Digital signal processor ("DSP"), Graphical Processing Unit ("GPU") or any combination of a CPU, DNN accelerator, DSP or GPU. In one embodiment each PE comprises processor, local memory and interconnect which are directly connected to each two of them.

In one embodiment main memory or shared main memory is physically located on the east side and west side of the 2D-grid of PEs and all the PEs in the 2D-grid access (i.e., read data or write data) main memory via the 2D-BFTHypercube interconnection network. In another embodiment there is a cache or multiple levels of cache between the main memory and the 2D-grid of PEs on east side or west side. In another embodiment one or more caches are shared between one or more rows of the 2D-grid of PEs. In yet another embodiment main memory is accessed via a high-speed serial computer expansion bus or interface such as PCI Express or ethernet.

In another embodiment main memory or shared main memory is physically located on the north side and south side of the 2D-grid of PEs and all the PEs in the 2D-grid access (i.e., read data or write data) main memory via the 2D-BFTHypercube interconnection network. In another embodiment there is a cache or multiple levels of cache between the main memory and the 2D-grid of PEs on east side or west side. In another embodiment one or more caches are shared between one or more rows of the 2D-grid of PEs. In yet another embodiment main memory is accessed via a high-speed serial computer expansion bus or interface such as PCI Express or ethernet.

A balanced MPS architecture between processor, local memory and interconnect is disclosed. That is the typical bottleneck in the interconnect is alleviated for the overall throughput of the MPS close to the peak throughout especially for embarrassingly parallel applications for example, today's popular DNNs such as Multi-Layer Perceptrons ("MLP"), Convolutional Neural Networks ("CNN"), Recurrent Neural Networks ("RNN") and Sparse Neural Networks ("SNN"). A scalable MPS to implement DNN processing requires concurrent broadcast and multicast between PEs in deterministic number of time steps. At each PE, matching the broadcast and multicast capability of interconnect, the capabilities for processor, local memory and the bandwidth between each two of them will be provided for a balanced MPS architecture in accordance with the current invention. This is in contrast to providing maximum capabilities to processor, local memory and the bandwidth between processor and local memory but with a bottlenecked interconnect resulting in poor performance and throughput in the prior art solutions. The balanced MPS architecture disclosed in the current invention is power efficient with maximum performance at lower silicon area and enables software simplicity.

Methods for all the PEs of the 2D-grid of PEs concurrently broadcasting packets to all the other PEs in the 2D-grid in a non-blocking, collision-free and without requiring queueing in a deterministic number of time steps, in a fixed predetermined path between each two PEs are disclosed. Methods for all the PEs of the 2D-grid of PEs concurrently arbitrary fan-out multicasting and unicasting packets to the other PEs in the 2D-grid in a non-blocking, collision-free and without requiring queueing in a deterministic number of time steps, in a fixed predetermined path between each two PEs are also disclosed.

Methods for concurrently broadcasting packets to all the other PEs in several sub-2D-grids in a 2D-grid scalable for any number of PEs, i.e., simultaneously in each sub-2D-grid, in a non-blocking, collision-free and without requiring queueing in a deterministic number of time steps are disclosed.

Methods for concurrently broadcasting packets to all the other PEs in several sub-1D-grids (i.e., each sub-1D-grid is only in a single row or only in a single column), in a 2D-grid scalable for any number of PEs, i.e., simultaneously in each sub-2D-grid, in a non-blocking, collision-free and without requiring to queue in a deterministic number of time steps are disclosed.

Methods for a) simultaneous multicast of packets with each packet multicasting in a row of PEs scalable for any number of PEs from shared memory located on the both sides of the row of PEs, b) simultaneous multicast of packets with two packets one each in both directions multicasting in a row of PEs scalable for any number of PEs from shared memory located on the both sides of the row of PEs, and c) methods for simultaneous multicast of packets with two packets one each in both directions multicasting in each row of PEs scalable for any number of PEs in a non-blocking, collision-free and without requiring to queue in a deterministic number of time steps are disclosed.

Methods for concurrent multiple unicasts or parallel loading of packets from shared memory one each it into a row of PEs from shared memory located on the both sides of the row of PEs scalable for any number of PEs in a non-blocking, collision-free and without requiring queueing in a deterministic number of time steps are disclosed.

Scalable 2D-BFTHypercube Interconnection Network with 4*4 2D-Grid of PEs with Shared memory:

Referring to diagram 100A1 in FIG. 1A1, in one embodiment, an exemplary 2D-BFTHypercube interconnection network between 16 PEs arranged in 4*4 grid where the number of rows is four and the number of columns is four. The 16 PEs are represented in binary format namely PE 0000, PE 0001, PE 0010, PE 0011, PE 0100, PE 0101, PE 0110, PE 0111, PE 1000, PE 1001, PE 1010, PE 1011, PE 1100, PE 1101, PE 1110, and PE 1111, since 4 bits are needed to represent 16 numbers and the corresponding decimal format being PE 0, PE 1, PE 2, PE 3, PE 4, PE 5, PE 6, PE 7, PE 8, PE 9, PE 10 or PE A, PE 11 or PE B, PE 12 or PE C, PE 13 or PE D, PE 14 or PE E, and PE 15 or PE F respectively.

Each PE comprises a router. For example, PE 0000 comprises router R0, PE 0001 comprises router R1, . . . . PE 1001 comprises router R9, PE 1010 comprises router RA or R10, PE 1011 comprises router RB or R11, PE 1100 comprises router RC or R12, PE 1101 comprises router RD or R13, PE 1110 comprises router RE or R14, and PE 1111 comprises router RF or R15. In one embodiment, each router comprises 4 local inlet buses and four local outlet buses as shown in diagram 100B of FIG. 1B.

For example in PE 0000, router R0, in one embodiment, comprises local inlet buses I(0,0), I(0,1), I(0,2) and I(0,3) and local outlet buses O(0,0), O(0,1), O(0,2) and O(0,3). For simplicity of illustration the local inlet buses and local outlet buses to each router of each PE are not shown in diagram 100A1 of FIG. 1A1. Accordingly with the addition of local inlet buses and local outlet buses illustrated in diagram 100B of FIG. 1B to diagram 100A1 of FIG. 1A1 completes the 2D-BFTHypercube interconnection network between 16 PEs arranged in 4*4 grid.

As illustrated in diagram 100A1 of FIG. 1A1, the buses between PEs are either vertical buses or horizontal buses. Vertical buses are also referred as interconnect vertical buses and horizontal buses are also referred as interconnect horizontal buses. Vertical buses and horizontal buses together are referred as interconnect buses. A vertical bus is denoted by V(x,y) where x and y are decimal number representation of PEs and vertical bus is connected from PE x to PE y. Similarly a horizontal bus is denoted by H(x,y) where x and y are decimal number representation of PEs and horizontal bus is connected from PE x to PE y. In the 2D-BFTHypercube interconnection network diagram 100A1 of FIG. 1A1, since all the 16 PEs are represented by 4 bits each, each PE is connected, by buses in both directions, to four other PEs where the PE number differs in only one bit. The number of PEs each PE is connected to is called the degree of the 2D-BFTHypercube interconnection network disclosed in diagram 100A1 of FIG. 1A1. Accordingly, the degree of the 2D-BFTHypercube interconnection network disclosed in diagram 100A1 of FIG. 1A1 is four. For example, PE 0000 number being 0000 the four PEs it is connected to are 1) PE 0001 where the least significant bit is different, 2) PE 0010 where the second least significant bit is different, 3) PE 0100 where the second most significant bit is different, and 4) PE 1000 where the most significant bit is different.

In general, a×b processing elements, where a and b are positive integers, are arranged in two dimensional grid so that a first processing element of a×b processing elements is placed $2^k$ hops away either vertically or horizontally from a second processing element of a×b processing elements if all n bits of representation in binary format of the first processing element and representation in binary format of the second processing element are the same in each bit excepting in one of either (2×k+1)th least significant bit or (2×k+2)th least significant bit differ where k≥0 and k is an integer.

Also, in general, a router of a first processing element of a×b processing elements is connected, by a $2^k$ hop length horizontal bus or a $2^k$ hop length vertical bus, to a router of a second processing element of a×b processing elements if all n bits of representation in binary format of the first processing element and representation in binary format of the second processing element are the same in each bit excepting in one of either (2×k+1)th least significant bit or (2×k+2)th least significant bit differ where k≥0; k is an integer and also the router of the first processing element of a×b processing elements is connected, by a $2^k$ hop length horizontal bus or a $2^k$ hop length vertical bus, from the router of the second processing element of a×b processing elements if all n bits of representation in binary format of the first processing element and the representation in binary format of the second processing element are the same in each bit excepting in one of either (2×k+1)th least significant bit or (2×k+2)th least significant bit differ where k≥0 so that the interconnect or router of each processing element of a×b processing elements comprising one or more horizontal buses connecting to the interconnect or router of one or more processing elements of a×b processing elements and the router of each processing element of a×b processing elements comprising one or more vertical buses connecting to the router of one or more processing elements of a×b processing elements. Applicant notes that the PEs are connected by horizontal busses and vertical busses as in a binary hypercube network.

The diagram 100A1 of FIG. 1A1 with 4*4 2D-grid of PEs, a=4 and b=4. In the embodiment of diagram 100A1 of FIG. 1A1, for example PE 0001 is placed $2^0$ =1 hop away from PE 0000 since (2×0+1)th=$1^{st}$ least significant bit for PE 0000 is 0 which is different from $1^{st}$ least significant bit of PE 0001 which is 1. Accordingly, PE 0001 is placed one hop away vertically down from PE 0000. Similarly, Also PE 0010 is placed $2^0$ =1 hop away from PE 0000 since (2×0+2)th=$2^{nd}$ least significant bit for PE 0000 is 0 which is different from $2^{nd}$ least significant bit of PE 0010 which is 1. Accordingly, PE 0010 is placed one hop away horizontally to the right from PE 0000.

Alternatively, in accordance with the current invention, in another embodiment PE 0001 will be placed one hop away horizontally to the right from PE 0000 and PE 0010 will be placed one hop away vertically down from PE 0000. More embodiments with modifications, adaptations and implementations described herein will be apparent to the skilled artisan.

There are four quadrants in diagram 100A1 of FIG. 1A1 namely top-left, bottom-left, top-right and bottom-right quadrants. Top-left quadrant implements PE 0000, PE 0001, PE 0010, and PE 0011. Bottom-left quadrant implements PE 0100, PE 0101, PE 0110, and PE 0111. Top-right quadrant implements PE 1000, PE 1001, PE 1010, and PE 1011. Bottom-right quadrant implements PE 1100, PE 1101, PE 1110, and PE 1111. There are two halves in diagram 100A1 of FIG. 1A1 namely left-half and right-half. Left-half consists of top-left and bottom-left quadrants. Right-half consists of top-right and bottom-right quadrants.

Recursively in each quadrant there are four sub-quadrants. For example, in top-left quadrant there are four sub-quadrants namely top-left sub-quadrant, bottom-left sub-quadrant, top-right sub-quadrant and bottom-right sub-quadrant. Top-left sub-quadrant of top-left quadrant implements PE 0000. Bottom-left sub-quadrant of top-left quadrant implements PE 0001. Top-right sub-quadrant of top-left quadrant implements PE 0010. Finally bottom-right sub-quadrant of top-left quadrant implements PE 0011. Similarly, there are two sub-halves in each quadrant. For example, in top-left quadrant there are two sub-halves namely left-sub-half and right-sub-half. Left-sub-half of top-left quadrant implements PE 0000 and PE 0001. Right-sub-half of top-left quadrant implements PE 0010 and PE 0011.

Recursively in larger 2D-BFTHypercube interconnection network where the number of PEs>16, the diagram in this embodiment in accordance with the current invention, will be such that the super-quadrants will also be connected as in a binary hypercube network.

Some of the key aspects of the 2D-BFTHypercube interconnection network are 1) the buses for each PE are connected as alternate vertical and horizontal buses. Interconnection network scales recursively for large number of PEs>16 as will be illustrated later; 2) the hop length of both vertical buses and horizontal buses are 2^0=1 and 2^1=2. And the longest bus is ceiling of half of the breadth (or width) of the complete 2D-grid. The hop length is measured as the number of hops between PEs; for example, the hop length between nearest neighbor PEs is one. Breadth and width being 3 the longest bus is of size 2 or ceiling of 1.5. Interconnection network also scales recursively for large number of PEs>16 as will be illustrated later.

Referring to diagram 100A1 in FIG. 1A1, in one embodiment, there is main memory or shared main memory physically located on the east side and west side of the 2D-grid of PEs and all the PEs in the 2D-grid access (i.e., read data or write data) main memory via the 2D-BFTHypercube interconnection network. The left most column of PEs namely PE 0000, PE 0001, PE 0100 and PE 0101 are directly connected to the Main Memory West. Router R0 in PE 0000 is connected from Main Memory West with two buses MI(0,0) and MI(0,1). Main Memory West is connected from Router R0 in PE 0000 with two buses MO(0,0) and MO(0,1). Router R1 in PE 0001 is connected from Main Memory West with two buses MI(1,0) and MI(1,1). Main Memory West is connected from Router R1 in PE 0001 with two buses MO(1,0) and MO(1,1). Router R4 in PE 0100 is connected from Main Memory West with two buses MI(4,0) and MI(4,1). Main Memory West is connected from Router R4 in PE 0100 with two buses MO(4,0) and MO(4,1). Router R5 in PE 0101 is connected from Main Memory West with two buses MI(5,0) and MI(5,1). Main Memory West is connected from Router R5 in PE 0101 with two buses MO(5,0) and MO(5,1).

All the MI(*,*) buses are also hereinafter in this invention referred as memory input buses. All the MO(*,*) buses are also hereinafter in this invention referred as memory output buses. Memory input buses and memory output buses are together hereinafter in this invention referred as memory buses.

Similarly, the right most column of PEs namely PE 1010, PE 1011, PE 1101 and PE 1111 are directly connected to the Main Memory East. Router RA in PE 1010 is connected from Main Memory East with two buses MI(A,0) and MI(A,1). Main Memory East is connected from Router RA in PE 1010 with two buses MO(A,0) and MO(A,1). Router RB in PE 1011 is connected from Main Memory East with two buses MI(B,0) and MI(B,1). Main Memory East is connected from Router RB in PE 1011 with two buses MO(B,0) and MO(B,1). Router RE in PE 1110 is connected from main memory east with two buses MI(E,0) and MI(E,1). Main Memory East is connected from Router RE in PE 1110 with two buses MO(B,0) and MO(B,1). Router RF in PE 1111 is connected from Main Memory East with two buses MI(F,0) and MI(F,1). Main Memory East is connected from Router RF in PE 1111 with two buses MO(F,0) and MO(F,1).

Referring to diagram 100A2 in FIG. 1A2, it is the same as the diagram 100A1 in FIG. 1A1 excepting that Main Memory West is replaced by Cache 0, Cache 1, Cache 4, and Cache 5 and Main Memory East is replaced by Cache A, Cache B, Cache E, and Cache F. Specifically the left most column of PEs namely PE 0000, PE 0001, PE 0100 and PE 0101 are directly connected to Cache 0, Cache 1, Cache 4, and Cache 5 respectively. Router R0 in PE 0000 is connected from Cache 0 with two buses MI(0,0) and MI(0,1). Cache 0 is connected from Router R1 in PE 0000 with two buses MO(0,0) and MO(0,1). Router R1 in PE 0001 is connected from Cache 1 with two buses MI(1,0) and MI(1,1). Cache 1 is connected from Router R1 in PE 0001 with two buses MO(1,0) and MO(1,1). Router R4 in PE 0100 is connected from Cache 4 with two buses MI(4,0) and MI(4,1). Cache 4 is connected from Router R4 in PE 0100 with two buses MO(4,0) and MO(4,1). Router R5 in PE 0101 is connected from Cache 5 with two buses MI(5,0) and MI(5,1). Cache 5 is connected from Router R5 in PE 0101 with two buses MO(5,0) and MO(5,1).

Also referring to diagram 100A2 in FIG. 1A2, the right most column of PEs namely PE 1010, PE 1011, PE 1110 and PE 1111 are directly connected to Cache A, Cache B, Cache E, and Cache F respectively. Router RA in PE 1010 is connected from Cache A with two buses MI(A,0) and MI(A,1). Cache A is connected from Router RA in PE 1010 with two buses MO(A,0) and MO(A,1). Router RB in PE 1011 is connected from Cache B with two buses MI(B,0) and MI(B,1). Cache B is connected from Router RB in PE 1011 with two buses MO(B,0) and MO(B,1). Router RE in PE 1101 is connected from Cache E with two buses MI(E,0) and MI(E,1). Cache E is connected from Router RE in PE 1101 with two buses MO(E,0) and MO(E,1). Router RF in PE 1111 is connected from Cache F with two buses MI(F,0) and MI(F,1). Cache F is connected from Router RF in PE 1111 with two buses MO(F,0) and MO(F,1).

Even though it is not illustrated in diagram 100A2 in FIG. 1A2, behind Cache 0, Cache 1, Cache 4 and Cache 5 are coupled with Main Memory West and behind Cache a, Cache B, Cache E and Cache F are coupled with Main Memory East.

Just like in diagram 100A1 in FIG. 1A1 in diagram 100A2 in FIG. 1A2 each router comprises four local inlet buses and four local outlet buses as shown in diagram 100B of FIG. 1B. For example in PE 0000, router R0, in one embodiment, comprises local inlet buses I(0,0), I(0,1), I(0,2) and I(0,3) and local outlet buses O(0,0), O(0,1), O(0,2) and O(0,3). For simplicity of illustration the local inlet buses and local outlet buses to each router of each PE are not shown in diagram 100A2 of FIG. 1A2. Accordingly with the addition of local inlet buses and local outlet buses illustrated in diagram 100B of FIG. 1B to diagram 100A2 of FIG. 1A2 completes the 2D-BFTHypercube interconnection network between 16 PEs arranged in 4*4 grid.

In another embodiment there are multiple levels of cache between the main memory and the 2D-grid of PEs on the east side or west side. In another embodiment one or more caches are shared between one or more rows of the 2D-grid of PEs. In yet another embodiment, the main memory is accessed via a high-speed serial computer expansion bus or interface such as PCI Express or ethernet.

In another embodiment main memory or shared main memory is physically located on the north side and south side of the 2D-grid of PEs and all the PEs in the 2D-grid access (i.e., read data or write data) main memory via the 2D-BFTHypercube interconnection network. In another embodiment there is a cache or multiple levels of cache between the main memory and the 2D-grid of PEs on east side or west side. In another embodiment one or more caches are shared between one or more rows of the 2D-grid of PEs. In yet another embodiment, the main memory is accessed via a high-speed serial computer expansion bus or interface such as PCI Express or ethernet.

The diagram 100A1 in FIG. 1A1 and 100B in FIG. 1B and the diagram 100A2 in FIG. 1A2 and 100B in FIG. 1B are recursively extended for any larger size 2D-BFTHypercube interconnection network with the sub-quadrants, quadrants, and super-quadrants are arranged in binary hypercube manner and the vertical and horizontal buses are accordingly connected in binary hypercube topology.

Figure 2A:
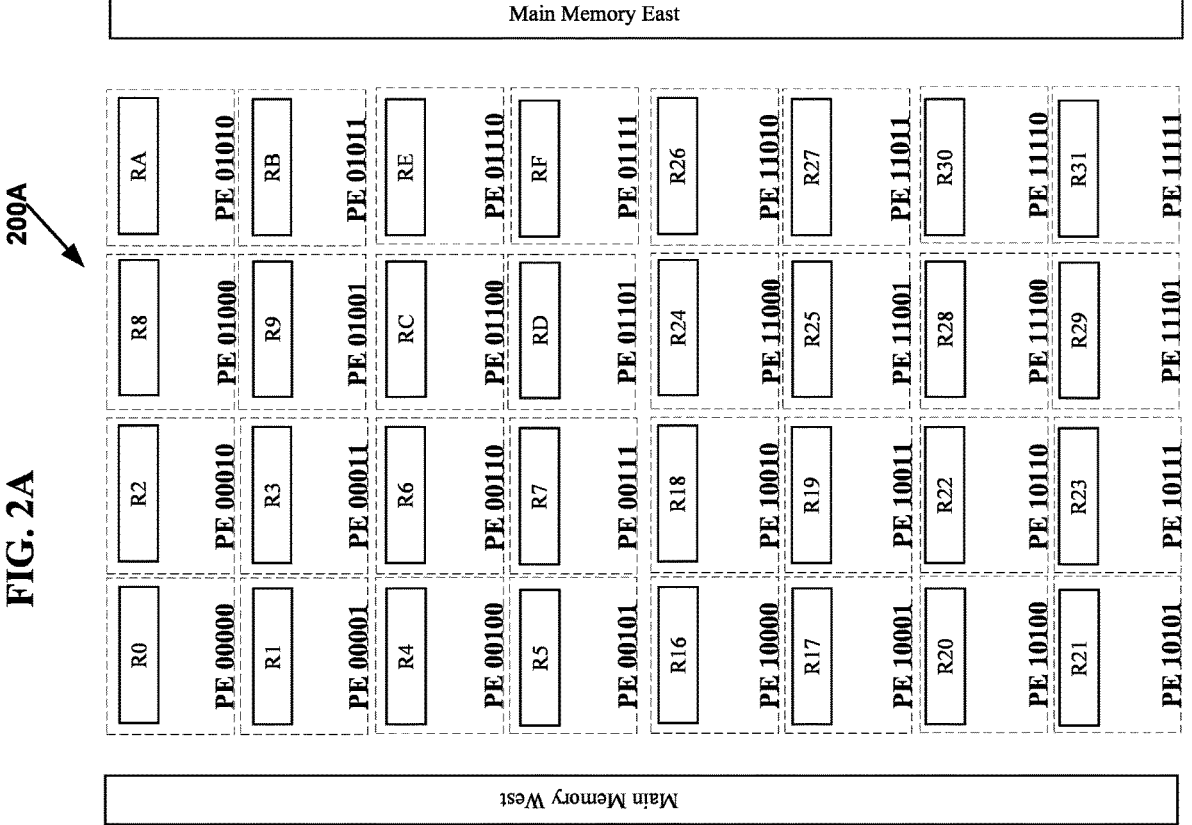
FIG. 2A is a diagram 200A of an exemplary 2D-BFTHypercube interconnection network with 8*4 2D-grid of 32 PEs scalable for distributed computing system, with shared memory, in accordance with the invention.

Referring to diagram 200A of FIG. 2A, illustrates the extension of 2D-BFTHypercube interconnection network 100A1 of FIG. 1A1, and 100B in FIG. 1B for 2D-grid of size 8*4. There are two super-halfs in diagram 200A namely top super-half and bottom super-half. Total number of PEs in diagram 200A is thirty two. Top super-half implements PEs from PE 00000 to PE 01111. Each PE in both the super-halfs have one more bit to represent the PE number in binary format representation and has one more local inlet bus and one more local outlet bus. The interconnect bus topology is the same between the routers R0-R15 as is shown in diagram 100A1 of FIG. 1A1. In addition, for example, since PE

10000 is placed $2^2=4$ hop away from PE 0000 since $(2\times2+1)$th=$5^{th}$ least significant bit for PE 00000 is 0 which is different from 5th least significant bit of PE 10000 which is 1. Accordingly, PE 10000 is placed four hops vertically down from PE 00000. For example a vertical bus denoted by V(0,16) is connected from PE 0 to PE 16 and a vertical bus denoted by V(16,0) is connected from PE 16 to PE 0; Both V(0,16) and V(16,0) have hop length of four. Accordingly, the degree of the 2D-BFTHypercube interconnection network disclosed in diagram 200A of FIG. 2A is five.

Bottom super-half implements the blocks from PE 10000 to PE 11111. Just like the top super-half, in bottom super-half also, the interconnect bus topology is the same between the routers R0-R15 as it is shown in diagram 100 of FIG. 1A1 with the addition of a four hop vertical bus in both directions from each PE.

Figure 2B:
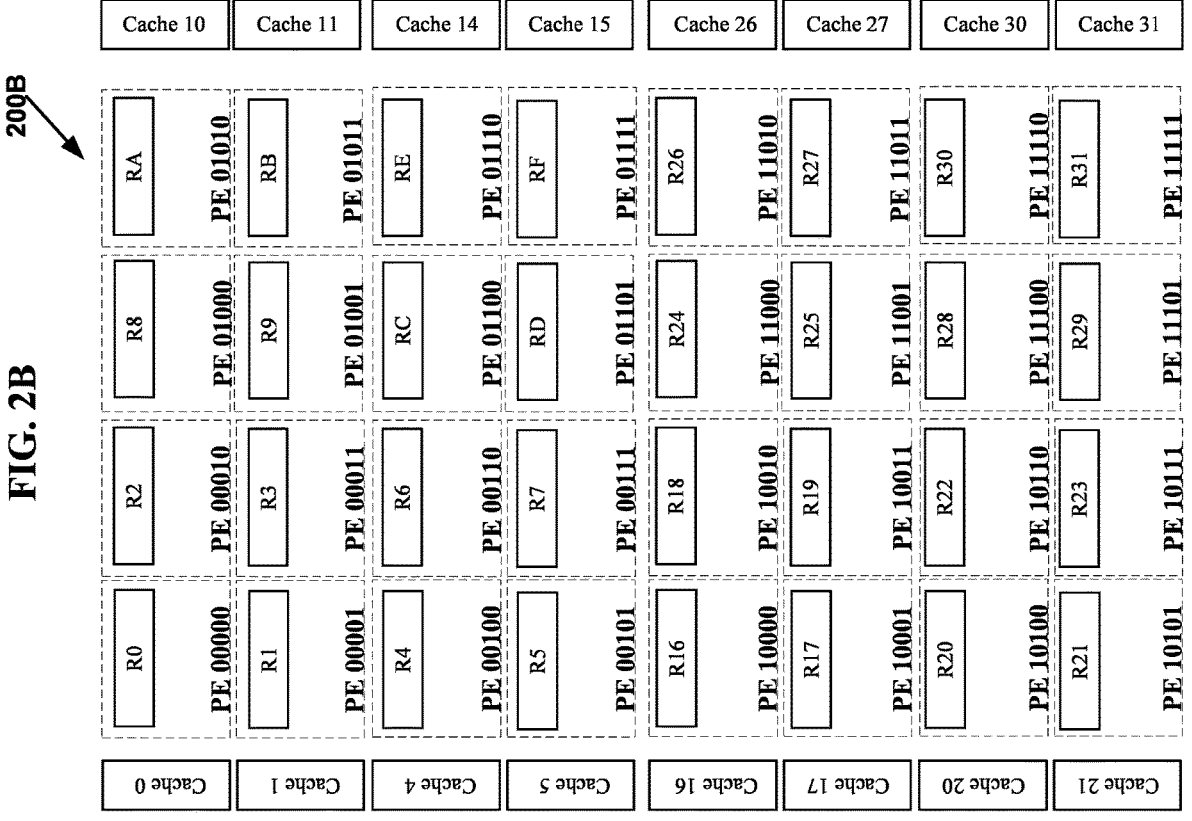
FIG. 2B is a diagram 200B of an exemplary 2D-BFTHypercube interconnection network with 8*4 2D-grid of 32 PEs scalable for distributed computing system, with cache and shared memory, in accordance with the invention.

Referring to diagram 200B in FIG. 2B, it is the same as the diagram 200A in FIG. 2A excepting that Main Memory West is replaced by Cache 0, Cache 1, Cache 4, Cache 5, Cache 16, Cache 17, Cache 20, and Cache 21 and Main Memory East is replaced by Cache 42, Cache 43, Cache 46, Cache 47, Cache 58, Cache 59, Cache 62, and Cache 63. Alternatively, diagram 200B in FIG. 2B is the extension of 2D-BFTHypercube interconnection network 100A2 of FIG. 1A2, and 100B in FIG. 1B for 2D-grid of size 8*4. Specifically, the left most column of PEs namely PE 00000, PE 00001, PE 00100 and PE 00101, PE 10000, PE 10001, PE 10100 and PE 10101 are directly connected to Cache 0, Cache 1, Cache 4, Cache 5, Cache 16, Cache 17, Cache 20, and Cache 21 respectively. And the right most column of PEs namely PE 01010, PE 01011, PE 01101, PE 01111, PE 11010, PE 11011, PE 11101 and PE 11111 are directly connected to Cache 42, Cache 43, Cache 46, Cache 47, Cache 58, Cache 59, Cache 62, and Cache 63 respectively.

Figure 2C:
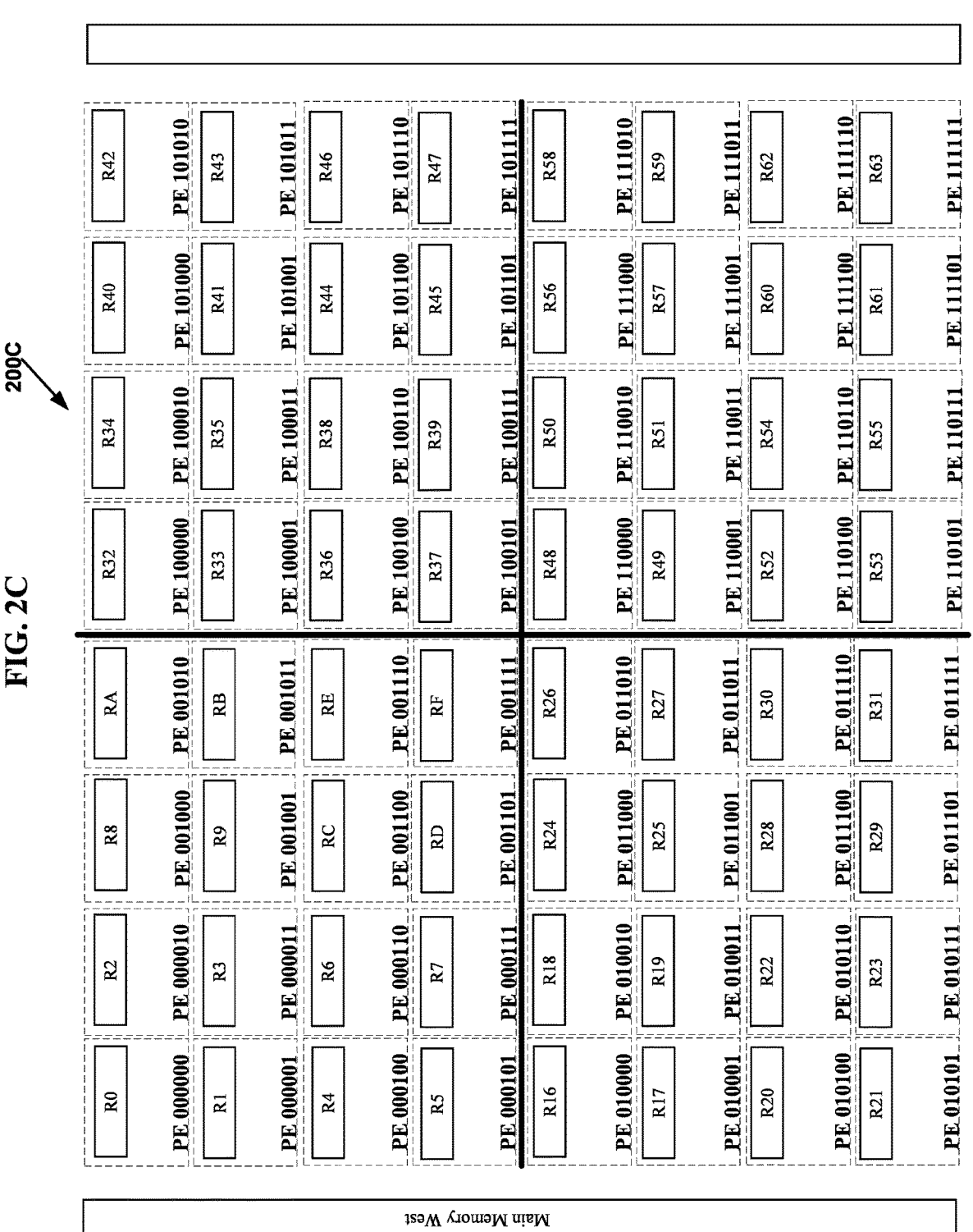
FIG. 2C is a diagram 200C of an exemplary 2D-BFTHypercube interconnection network with 8*8 2D-grid of 64 PEs scalable for distributed computing system with shared memory, in accordance with the invention.

Referring to diagram 200C of FIG. 2C, illustrates the extension of 2D-BFTHypercube interconnection network 200A in FIG. 2A for 2D-grid of size 8*8. There are two super-halfs in diagram 200C namely left super-half and right super-half. Total number of PEs in diagram 200C is sixty four. Left super-half implements PEs from PE 000000 to PE 011111. Each PE in both the super-halfs have one more bit to represent the PE number in binary format representation and also has one more local inlet bus and one more local outlet bus. The interconnect bus topology is the same between the routers R0-R31. In addition, for example, since PE 100000 is placed $2^2=4$ hop away from PE 000000 since $(2\times2+2)$th=$6^{th}$ least significant bit for PE 000000 is 0 which is different from 6th least significant bit of PE 100000 which is 1. Accordingly, PE 100000 is placed four hops away horizontally right from PE 000000. For example a horizontal bus denoted by H(0,32) is connected from PE 0 to PE 32 and a horizontal bus denoted by H(32,0) is connected from PE 32 to PE 0; Both H(0,32) and H(32,0) have hop length of four. The degree of the 2D-BFTHypercube interconnection network disclosed in diagram 200C of FIG. 2C is six.

Right super-half implements the blocks from PE 100000 to PE 111111. Just like the left super-half, in right super-half also, the interconnect bus topology is the same between the routers R0-R31 with the addition of a four hop horizontal bus in both directions from each PE.

Figure 2D:
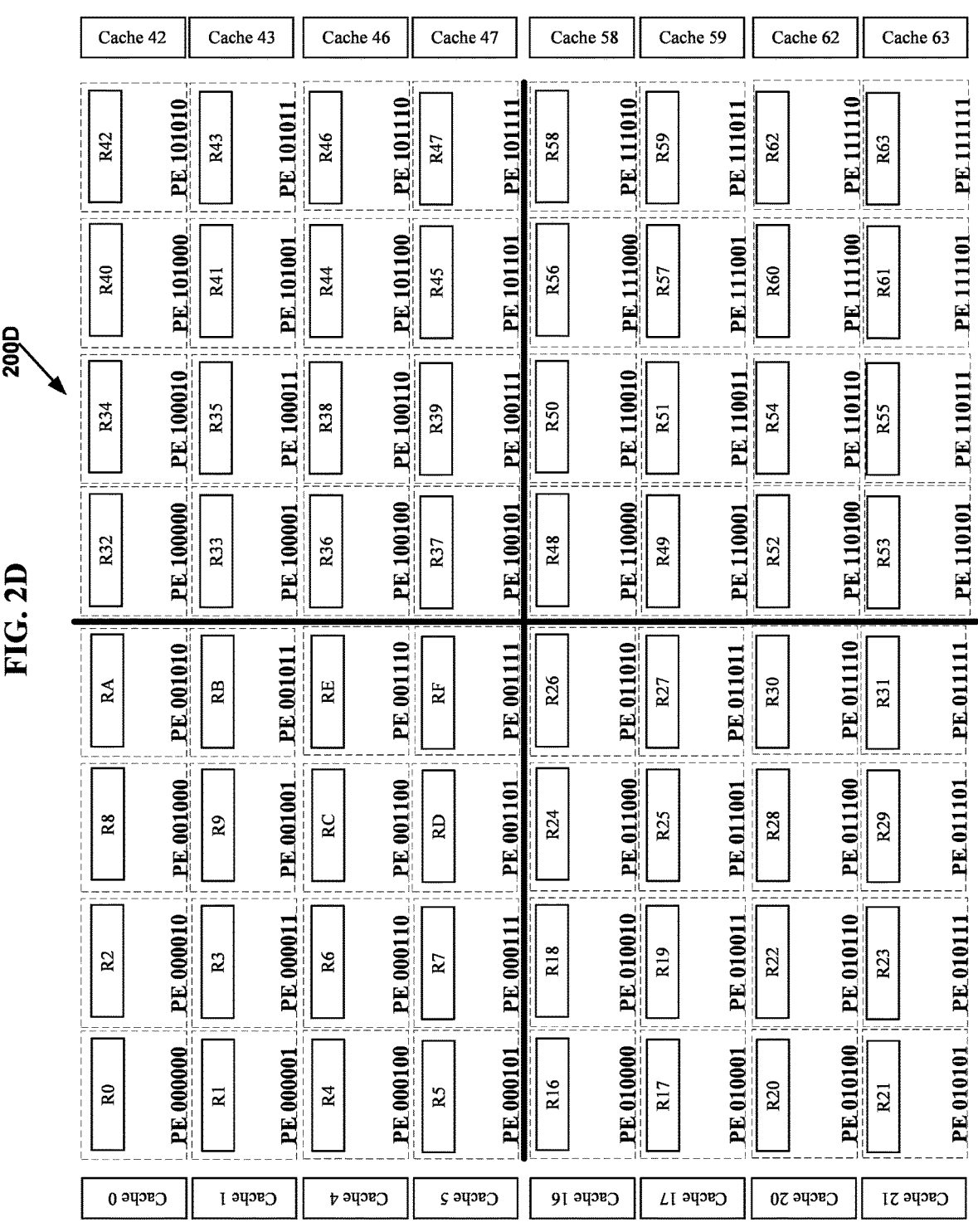
FIG. 2D is a diagram 200D of an exemplary 2D-BFTHypercube interconnection network with 8*8 2D-grid of 64 PEs scalable for distributed computing system, with cache and shared memory, in accordance with the invention.

Referring to diagram 200D in FIG. 2D, it is the same as the diagram 200C in FIG. 2C excepting that Main Memory West is replaced by Cache 0, Cache 1, Cache 4, Cache 5, Cache 16, Cache 17, Cache 20, and Cache 21 and Main Memory East is replaced by Cache 42, Cache 43, Cache 46, Cache 47, Cache 58, Cache 59, Cache 62, and Cache 63. Specifically, the left most column of PEs namely PE 000000, PE 000001, PE 000100, PE 000101, PE 010000, PE 010001, PE 010100 and PE 010101 are directly connected to Cache 0, Cache 1, Cache 4, Cache 5, Cache 16, Cache 17, Cache 20, and Cache 21 respectively. And the right most column of PEs namely PE 101010, PE 101011, PE 101101, PE 101111, PE 111010, PE 111011, PE 111101 and PE 111111 are directly connected to Cache 42, Cache 43, Cache 46, Cache 47, Cache 58, Cache 59, Cache 62, and Cache 63 respectively.

Figure 2E:
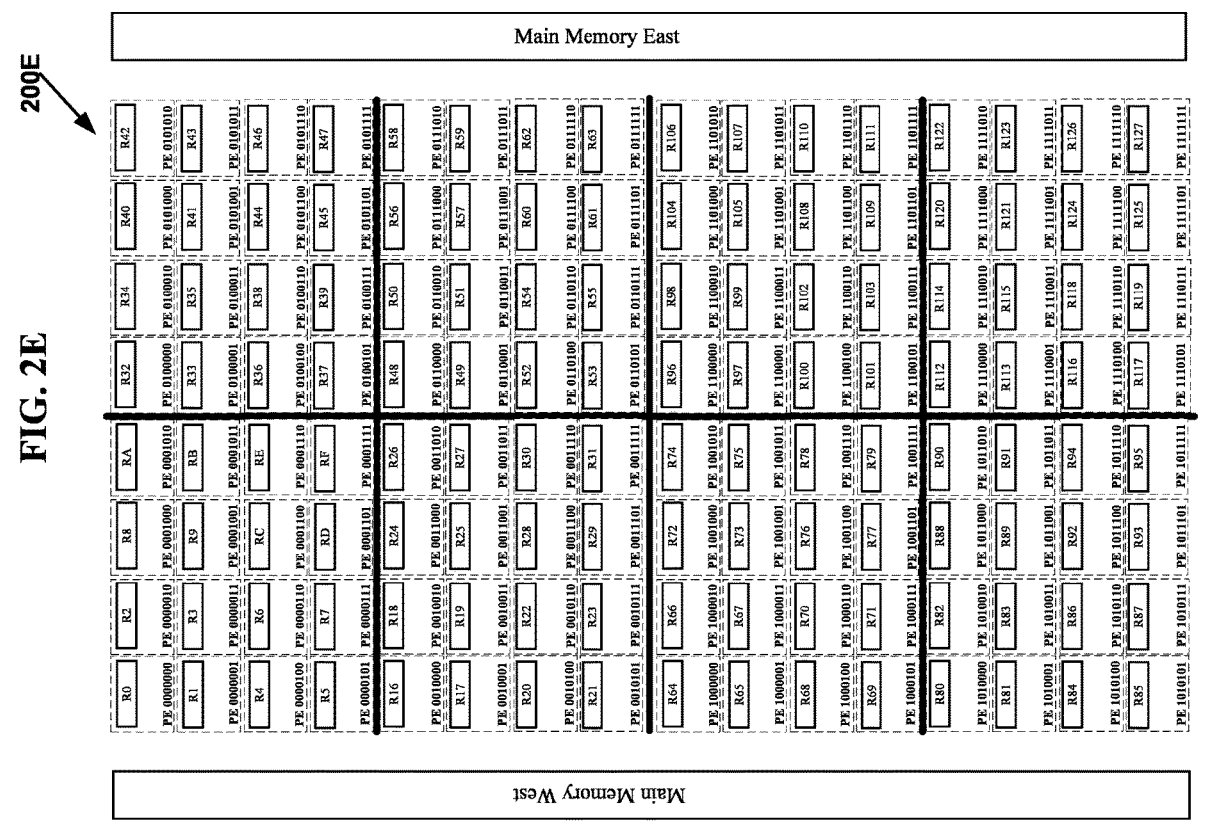

Referring to diagram 200E of FIG. 2E, illustrates the extension of 2D-BFTHypercube interconnection network 200C in FIG. 2C for 2D-grid of size 16*8. There are two super-halfs in diagram 200E namely top super-half and bottom super-half. Total number of PEs in diagram 200E is one hundred twenty eight. Top super-half implements PEs from PE 0000000 to PE 0111111. Each PE in both the super-halfs have one more bit to represent the PE number in binary format representation and has one more local inlet bus and one more local outlet bus. The interconnect bus topology is the same between the routers R0-R63. In addition, for example, since PE 1000000 is placed $2^3=8$ hop away from PE 0000000 since $(2\times3+1)$th=$7^{th}$ least significant bit for PE 0000000 is 0 which is different from $7^{th}$ least significant bit of PE 1000000 which is 1. Accordingly, PE 1000000 is placed eight hops away vertically down from PE 0000000. For example a vertical bus denoted by V(0,64) is connected from PE 0 to PE 64 and a vertical bus denoted by V(64,0) is connected from PE 64 to PE 0; Both V(0,64) and V(64,0) have hop length of eight. Accordingly, the degree of the 2D-BFTHypercube interconnection network disclosed in diagram 200E of FIG. 2E is seven.

Bottom super-half implements the blocks from PE 1000000 to PE 1111111. Just like the top super-half, in bottom super-half also, the interconnect bus topology is the same between the routers R0-R63 with the addition of an eight hop vertical bus in both directions from each PE.

Figure 2F:
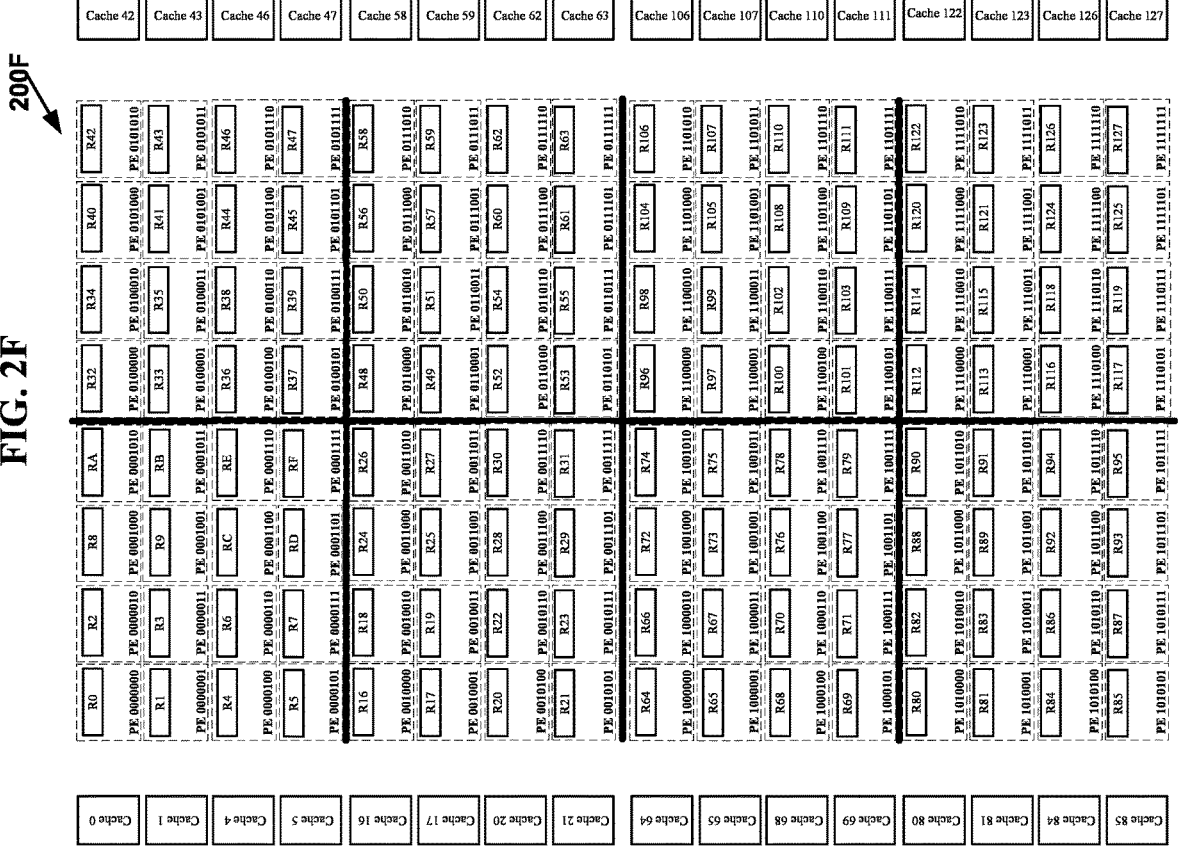
FIG. 2F is a diagram 200F of an exemplary 2D-BFTHypercube interconnection network with 16*8 2D-grid of 128 PEs scalable for distributed computing system, with cache and shared memory, in accordance with the invention.

Referring to diagram 200F in FIG. 2F, it is the same as the diagram 200E in FIG. 2E excepting that Main Memory West is replaced by Cache 0, Cache 1, Cache 4, Cache 5, Cache 16, Cache 17, Cache 20, Cache 21, Cache 64, Cache 65, Cache 68, Cache 69, Cache 80, Cache 81, Cache 84, and Cache 85 and Main Memory East is replaced by Cache 42, Cache 43, Cache 46, Cache 47, Cache 58, Cache 59, Cache 62, Cache 63, Cache 106, Cache 107, Cache 110, Cache 111, Cache 122, Cache 123, Cache 126, and Cache 127. Specifically the left most column of PEs namely PE 0000000, PE 0000001, PE 0000100, PE 0000101, PE 0010000, PE 0010001, PE 0010100, PE 0010101, PE 1000000, PE 1000001, PE 1000100, PE 1000101, PE 1010000, PE 1010001, PE 1010100 and PE 1010101 are directly connected to Cache 0, Cache 1, Cache 4, Cache 5, Cache 16, Cache 17, Cache 20, Cache 21, Cache 64, Cache 65, Cache 68, Cache 69, Cache 80, Cache 81, Cache 84, and Cache 85 respectively. And the right most column of PEs namely PE 0101010, PE 0101011, PE 0101101, PE 0101111, PE 0111010, PE 0111011, PE 0111101, PE 0111111, PE 1101010, PE 1101011, PE 1101101, PE 1101111, PE 1111010, PE 1111011, PE 1111101 and PE 1111111 are directly connected to Cache 42, Cache 43, Cache 46, Cache 47, Cache 58, Cache 59, Cache 62, Cache 63, Cache 106, Cache 107, Cache 110, Cache 111, Cache 122, Cache 123, Cache 126, and Cache 127 respectively.

Figure 2G:
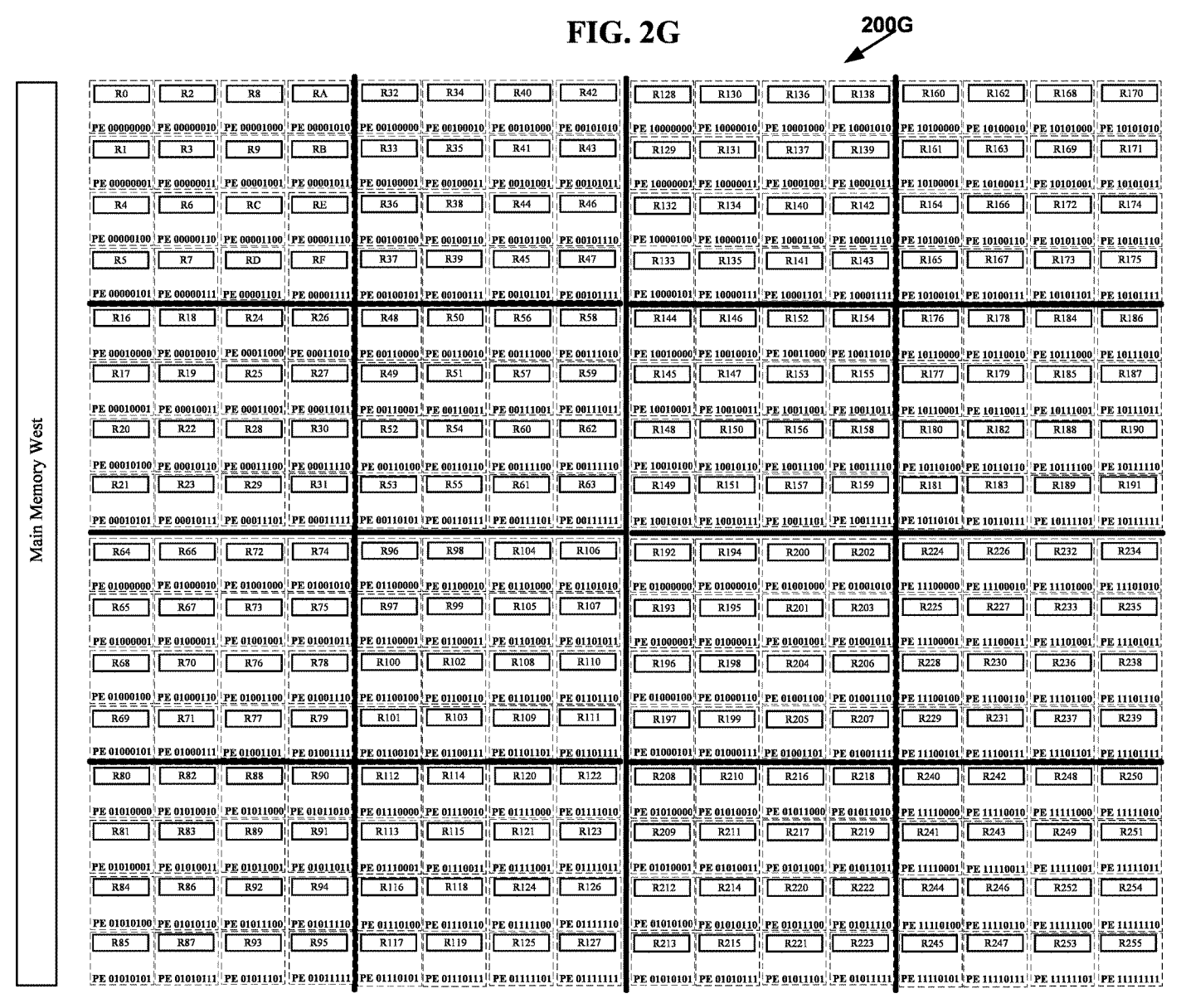

Referring to diagram 200G of FIG. 2G, illustrates the extension of 2D-BFTHypercube interconnection network 200E in FIG. 2E for 2D-grid of size 16*16. There are two super-halfs in diagram 200G namely left super-half and right super-half. Total number of PEs in diagram 200G is two hundred and fifty six. Left super-half implements PEs from PE 00000000 to PE 01111111. Each PE in both the super-halfs have one more bit to represent the PE number in binary format representation and also has one more local inlet bus and one more local outlet bus. The interconnect bus topology is the same between the routers R0-R127. In addition, for example, since PE 10000000 is placed $2^3=8$ hop away from PE 00000000 since $(2\times3+2)th=8^{th}$ least significant bit for PE 00000000 is 0 which is different from 8th least significant bit of PE 10000000 which is 1. Accordingly, PE 10000000 is placed eight hops away horizontally right from PE 00000000. For example a horizontal bus denoted by H(0,128) is connected from PE 0 to PE 128 and a horizontal bus denoted by H(128,0) is connected from PE 128 to PE 0; Both H(0,128) and H(128,0) have hop length of eight. The degree of the 2D-BFTHypercube interconnection network disclosed in diagram 200C of FIG. 2 is eight.

Right super-half implements the blocks from PE 10000000 to PE 11111111. Just like the left super-half, in right super-half also, the interconnect bus topology is the same between the routers R0-R127 with the addition of an eight hop horizontal bus in both directions from each PE.

Figure 2H:
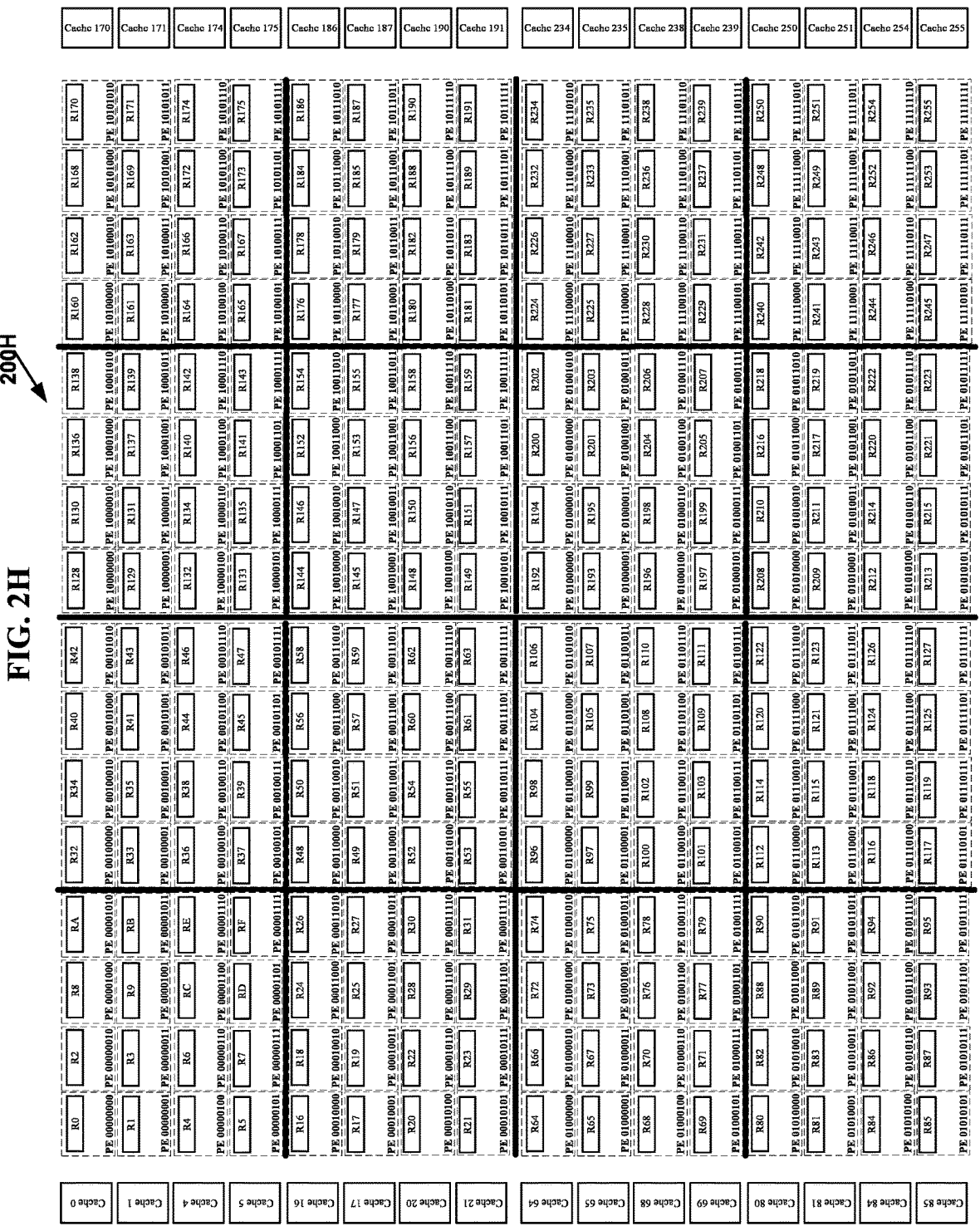
FIG. 2H is a diagram 200H of an exemplary 2D-BFTHypercube interconnection network with 16*16 2D-grid of 256 PEs scalable for distributed computing system, with cache and shared memory, in accordance with the invention.

Referring to diagram 200H in FIG. 2H, it is the same as the diagram 200G in FIG. 2G excepting that Main Memory West is replaced by Cache 0, Cache 1, Cache 4, Cache 5, Cache 16, Cache 17, Cache 20, Cache 21, Cache 64, Cache 65, Cache 68, Cache 69, Cache 80, Cache 81, Cache 84, and Cache 85 and Main Memory East is replaced by Cache 170, Cache 171, Cache 174, Cache 175, Cache 186, Cache 187, Cache 190, Cache 191, Cache 234, Cache 235, Cache 238, Cache 239, Cache 250, Cache 251, Cache 254, and Cache 255.

Specifically the left most column of PEs namely PE 00000000, PE 00000001, PE 00000100, PE 00000101, PE 00010000, PE 00010001, PE 00010100, PE 00010101, PE 01000000, PE 01000001, PE 01000100, PE 01000101, PE 01010000, PE 01010001, PE 01010100 and PE 01010101 are directly connected to Cache 0, Cache 1, Cache 4, Cache 5, Cache 16, Cache 17, Cache 20, Cache 21, Cache 64, Cache 65, Cache 68, Cache 69, Cache 80, Cache 81, Cache 84, and Cache 85 respectively. And the right most column of PEs namely PE 10101010, PE 10101011, PE 10101101, PE 10101111, PE 10111010, PE 10111011, PE 10111101, PE 10111111, PE 11101010, PE 11101011, PE 11101101, PE 11101111, PE 11111010, PE 11111011, PE 11111101 and PE 11111111 are directly connected to Cache 170, Cache 171, Cache 174, Cache 175, Cache 186, Cache 187, Cache 190, Cache 191, Cache 234, Cache 235, Cache 238, Cache 239, Cache 250, Cache 251, Cache 254, and Cache 255 respectively.

Figure 3D:
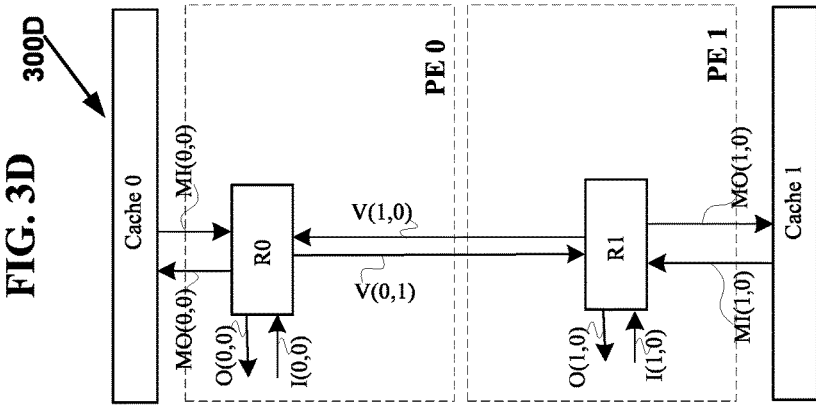
FIG. 3D is a diagram 300D of an exemplary 2D-BFTHypercube interconnection network with 2*1 2D-grid of PEs scalable for distributed computing system with cache in the north and south sides, in accordance with the invention.

Now 2D-BFTHypercube interconnection network for 2D-grid where number of PEs is less than 16 using shared memory is illustrated. Referring to diagram 300A of FIG. 3A is 2D-BFTHypercube interconnection network of 2*1 2D-grid with the number of PEs is 2. There are two PEs i.e., PE 0 and PE 1 with PE 0 comprising router R0 and PE 1 comprising router R1. Router R0 in PE 0 has one local inlet bus I(0,0) and one local outlet bus O(0,0). Router R1 in PE 1 has one local inlet bus I(1,0) and one local outlet bus O(1,0). There is one vertical bus V(0,1) connected from Router R0 in PE 0 to Router R1 in PE 1 and there is one vertical bus V(1,0) connected from Router R1 in PE 1 to Router R0 in PE 0. The degree of the 2D-BFTHypercube interconnection network disclosed in diagram 300A of FIG. 3A is one. Applicant notes that the buses between PE 0 and PE 1 are vertical buses in this embodiment. In another embodiment PE 0 and PE 1 is placed horizontally and the buses between PE 0 and PE 1 are horizontal buses.

Referring to diagram 300A in FIG. 3A, in one embodiment, there is main memory or shared main memory physically located on the east side of the 2D-grid of PEs and all the PEs in the 2D-grid access (i.e., read data or write data) main memory via the 2D-BFTHypercube interconnection network. PE 0 and PE 1 are directly connected to the Main Memory West. Router R0 in PE 0 is connected from Main Memory West with one bus MI(0,0). Main Memory West is connected from Router R0 in PE 0 with one bus MO(0,0). Router R1 in PE 1 is connected from Main Memory West with one bus MI(1,0). Main Memory West is connected from Router R1 in PE 1 with one bus MO(1,0). Applicant notes that in another embodiment, the main memory or shared main memory is physically located on the west side of the 2D-grid of PEs.

Figure 3C:
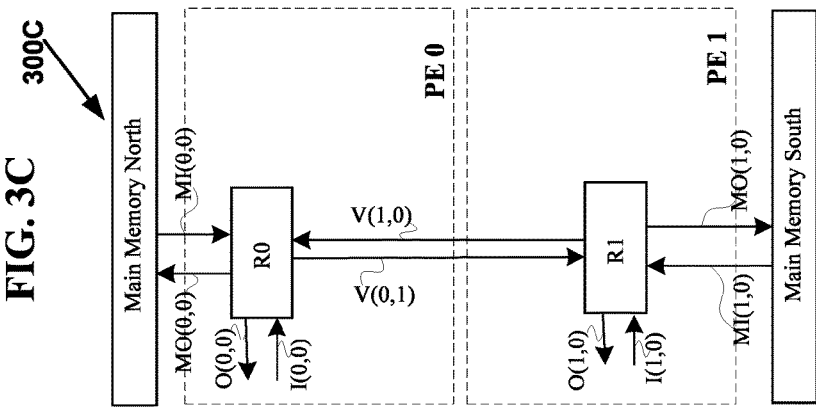
FIG. 3C is a diagram 300C of an exemplary 2D-BFTHypercube interconnection network with 2*1 2D-grid of PEs scalable for distributed computing system with shared memory in the north and south sides, in accordance with the invention.
Figure 3A:
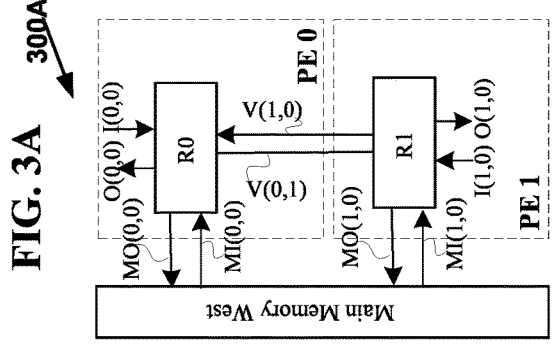
FIG. 3A is a diagram 300A of an exemplary 2D-BFTHypercube interconnection network with 2*1 2D-grid of PEs scalable for distributed computing system with shared memory in the west side, in accordance with the invention.
Figure 3B:
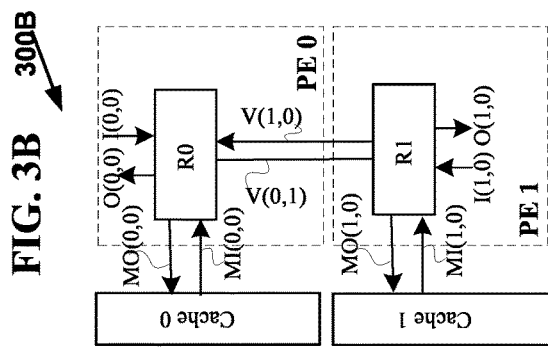
FIG. 3B is a diagram 300B of an exemplary 2D-BFTHypercube interconnection network with 2*1 2D-grid of PEs scalable for distributed computing system with cache memory in the west side, in accordance with the invention.

Referring to diagram 300B in FIG. 3B, in one embodiment, it is the same as the diagram 300A in FIG. 3A excepting that Main Memory West is replaced by Cache 0 and Cache 1. Specifically, PE 0 and PE 1 are directly connected to Cache 0 and Cache 1 respectively. Router R0 in PE 0 is connected from Cache 0 with one bus MI(0,0). Cache 0 is connected from Router R0 in PE 0 with one bus MO(0,0). Router R1 in PE 1 is connected from Cache 1 with one bus MI(1,0). Cache 1 is connected from Router R1 in PE 1 with one bus MO(1,0). Applicant notes that in another embodiment, the cache and main memory are physically located on the west side of the 2D-grid of PEs.

Referring to diagram 300C in FIG. 3C, in one embodiment, it is the same as the diagram 300A in FIG. 3A excepting that Main Memory West is replaced by Main Memory North and Main Memory South. Specifically, PE 0 is directly connected to Main Memory North and PE 1 is directly connected to Main Memory South. Router R0 in PE 0 is connected from Main Memory North with one bus MI(0,0). Main Memory North is connected from Router R0 in PE 0 with one bus MO(0,0). Router R1 in PE 1 is connected from Main Memory South with one bus MI(1,0). Main Memory South is connected from Router R1 in PE 1 with one bus MO(1,0).

Referring to diagram 300D in FIG. 3D, in one embodiment, it is the same as the diagram 300C in FIG. 3C excepting that Main Memory North and Main Memory South are replaced by Cache 0 and Cache 1. Specifically, PE 0 is directly connected to Cache 0 and PE 1 is directly connected to Cache 1. Router R0 in PE 0 is connected from Cache 0 with one bus MI(0,0). Cache 0 is connected from Router R0 in PE 0 with one bus MO(0,0). Router R1 in PE 1 is connected from Cache 1 with one bus MI(1,0). Cache 1 is connected from Router R1 in PE 1 with one bus MO(1,0).

Figure 4A:
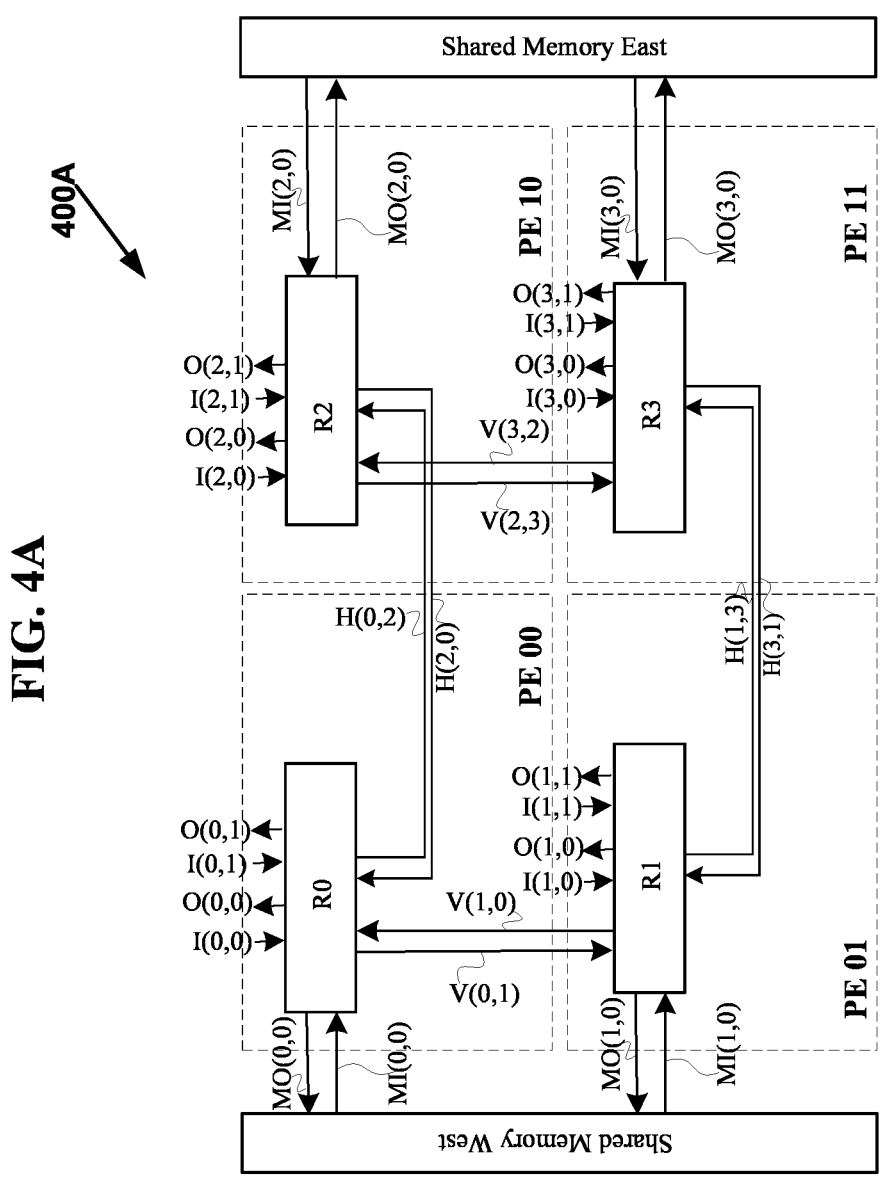
FIG. 4A is a diagram 400A of an exemplary 2D-BFTHypercube interconnection network with 2*2 2D-grid of PEs scalable for distributed computing system with shared memory, in accordance with the invention.

Referring to diagram 400A of FIG. 4A is 2D-BFTHypercube interconnection network of 2*2 2D-grid with the number of PEs is 4. There are four PEs namely PE 00, PE 01, PE 10, and PE 11. Each PE comprises a router and each router comprises two local inlet buses and two local outlet buses. For example, PE 00 has Router R0. Router R0 comprises local inlet buses I(0,0) and I(0,1) and local outlet buses O(0,0) and O(0,1).

In accordance with the current invention, in the 2D-BFT-Hypercube interconnection network diagram 400A of FIG. 4A, since all the 4 PEs are represented by 2 bits each, each PE is connected, by buses in both the directions, to two other PEs where the PE number differs in only one bit. For example, PE 00 number being 00 the two PEs it is connected to are 1) PE 01 where the least significant bit is different and 2) PE 10 where the most significant bit is different. Accordingly, Router R0 in PE 00 is connected to Router R1 in PE 01 by vertical bus V(0,1) and Router R1 in PE 01 is connected to Router R0 in PE 00 by vertical bus V(1,0). Router R0 in PE 00 is connected to Router R2 in PE 10 by horizontal bus H(0,2) and Router R2 in PE 10 is connected to Router R0 in PE 00 by horizontal bus H(2,0). The degree of the 2D-BFTHypercube interconnection network disclosed in diagram 400A of FIG. 4A is two.

Referring to diagram 400A in FIG. 4A, in one embodiment, there is main memory or shared main memory physically located on the east side and west side of the 2D-grid of PEs and all the PEs in the 2D-grid access (i.e., read data or write data) main memory via the 2D-BFTHypercube interconnection network. The left most column of PEs namely PE 00 and PE 01 are directly connected to the Main Memory West. Router R0 in PE 00 is connected from Main Memory West with one bus MI(0,0). Main Memory West is connected from Router R0 in PE 00 with one bus MO(0,0). Router R1 in PE 01 is connected from Main Memory West with one bus MI(1,0). Main Memory West is connected from Router R1 in PE 01 with one bus MO(1,0).

Similarly, the right most column of PEs namely PE 10 and PE 11 are directly connected to the Main Memory East. Router R2 in PE 10 is connected from Main Memory East with one bus MI(2,0). Main Memory East is connected from Router R2 in PE 10 with one bus MO(2,0). Router R3 in PE 11 is connected from Main Memory East with one bus MI(3,0). Main Memory East is connected from Router R3 in PE 11 with one bus MO(3,0).

Figure 4B:
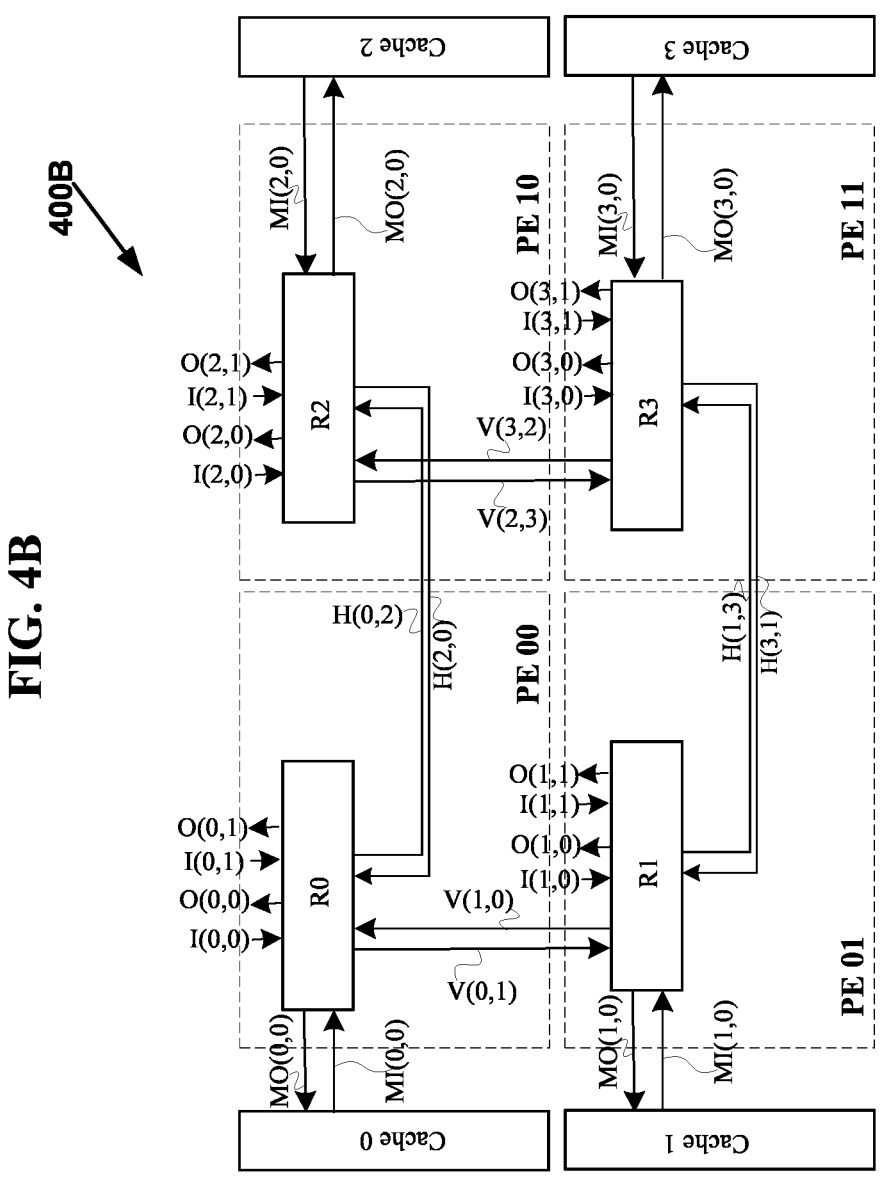
FIG. 4B is a diagram 400B of an exemplary 2D-BFTHypercube interconnection network with 2*2 2D-grid of PEs scalable for distributed computing system with cache and shared memory, in accordance with the invention.

Referring to diagram 400B in FIG. 4B, it is the same as the diagram 400A in FIG. 4A excepting that Main Memory West is replaced by Cache 0 and Cache 1, and Main Memory East is replaced by Cache 2 and Cache 3. Specifically, the left most column of PEs namely PE 00 and PE 01 are directly connected to Cache 0 and Cache respectively. Router R0 in PE 00 is connected from Cache 0 with one bus MI(0,0). Cache 0 is connected from Router R0 in PE 00 with one bus MO(0,0). Router R1 in PE 01 is connected from Cache 1 with one bus MI(1,0). Cache 1 is connected from Router R1 in PE 01 with one bus MO(1,0).

Also referring to diagram 400B in FIG. 4B, the right most column of PEs namely PE 10 and PE 11 are directly connected to Cache 2 and Cache 3 respectively. Router R2 in PE 10 is connected from Cache 2 with one bus MI(2,0). Cache 2 is connected from Router R2 in PE 10 with one bus MO(2,0). Router R3 in PE 11 is connected from Cache 3 with one bus MI(3,0). Cache 3 is connected from Router R3 in PE 11 with one bus MO(3,0). Even though it is not illustrated in diagram 400B in FIG. 4B, behind Cache 0 and Cache 1 are coupled with Main Memory West and behind Cache 2 and Cache 3 are coupled with Main Memory East.

Figure 5C:
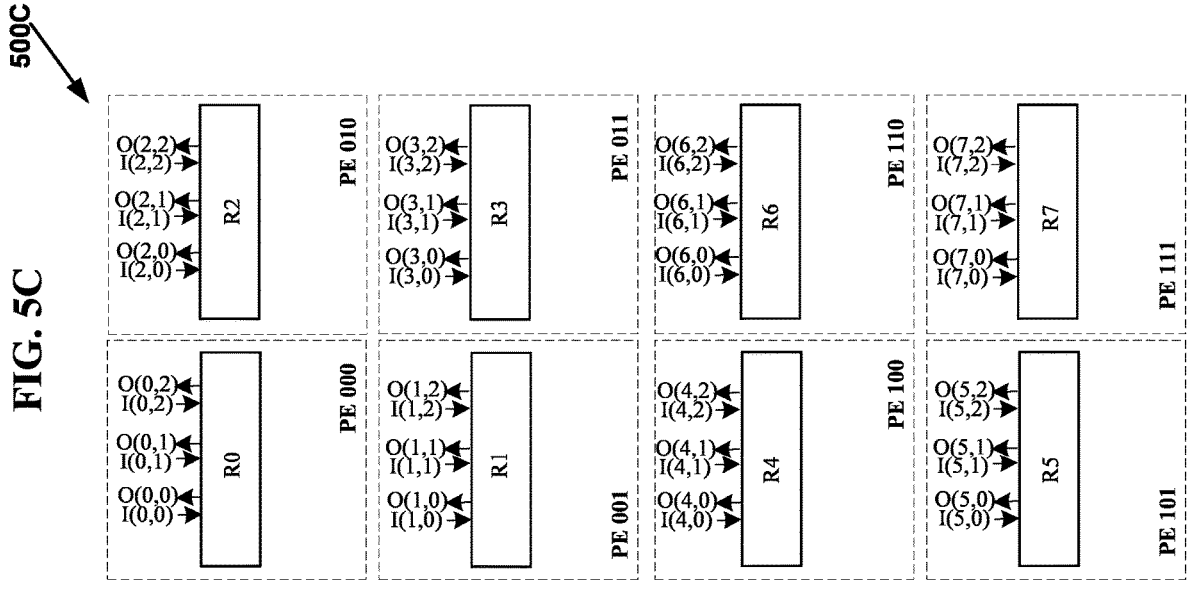
FIG. 5C is a diagram 500C with illustration of local inlet buses and local outlet buses in each PE of an exemplary 2D-BFTHypercube interconnection network with 4*2 2D-grid of PEs scalable for distributed computing system either with shared memory or cache, in accordance with the invention.

Referring to diagram 500A1 in FIG. 5A1, in one embodiment, an exemplary 2D-BFTHypercube interconnection network between 8 PEs arranged in 4*2 grid where the number of rows is four and the number of columns is two. The 8 PEs are represented in binary format namely PE 000, PE 001, PE 010, PE 011, PE 100, PE 101, PE 110, and PE 111, since 3 bits are needed to represent 8 numbers and the corresponding decimal format being PE 0, PE 1, PE 2, PE 3, PE 4, PE 5, PE 6, and PE 7 respectively. Each PE comprises a router. For example, PE 000 comprises router R0, PE 001 comprises router R1, . . . , PE 111 comprises router R7. In one embodiment, each router comprises three local inlet buses and three local outlet buses as shown in diagram 500C of FIG. 5C.

For example in PE 000, router R0, in one embodiment, comprises local inlet buses I(0,0), I(0,1), and I(0,2) and local outlet buses O(0,0), O(0,1) and O(0,2). For simplicity of illustration the local inlet buses and local outlet buses to each router of each PE are not shown in diagram 500A1 of FIG. 5A1. Accordingly with the addition of local inlet buses and local outlet buses illustrated in diagram 500C of FIG. 5C to diagram 500A1 of FIG. 5A1 completes the 2D-BFTHypercube interconnection network between 8 PEs arranged in 4*2 grid. Applicant notes that the PEs are connected as a binary hypercube network, in accordance with the current invention. The degree of the 2D-BFTHypercube interconnection network disclosed in diagram 500A1 of FIG. 5A1 is three.

In the 2D-BFTHypercube interconnection network diagram 500A1 of FIG. 5A1, since all the 8 PEs are represented by 3 bits each, each PE is connected, by buses in both the directions, to three other PEs where the PE number differs in only one bit. For example, PE 000 number being 000 the three PEs it is connected to are 1) PE 001 where the least significant bit is different, 2) PE 010 where the second least significant bit is different, and 3) PE 100 where the most significant bit is different. Accordingly, Router R0 in PE 000 is connected to Router R1 in PE 001 by vertical bus V(0,1) and Router R1 in PE 001 is connected to Router R0 in PE 000 by vertical bus V(1,0). Router R0 in PE 000 is connected to Router R2 in PE 010 by horizontal bus H(0,2) and Router R2 in PE 010 is connected to Router R0 in PE 000 by horizontal bus H(2,0). Router R0 in PE 000 is connected to Router R4 in PE 100 by vertical bus H(0,4) and Router R4 in PE 100 is connected to Router R0 in PE 000 by vertical bus H(4,0).

Referring to diagram 500A1 in FIG. 5A1, in one embodiment, there is main memory or shared main memory physically located on the east side and west side of the 2D-grid of PEs and all the PEs in the 2D-grid access (i.e., read data or write data) main memory via the 2D-BFTHypercube interconnection network. The left most column of PEs namely PE 000, PE 001, PE 010 and PE 101 are directly connected to the Main Memory West. Router R0 in PE 000 is connected from Main Memory West with one bus MI(0,0). Main Memory West is connected from Router R0 in PE 000 with one bus MO(0,0). Router R1 in PE 001 is connected from Main Memory West with one bus MI(1,0). Main Memory West is connected from Router R1 in PE 001 with one bus MO(1,0). Router R4 in PE 100 is connected from Main Memory West with one bus MI(4,0). Main Memory West is connected from Router R4 in PE 100 with one bus MO(4,0). Router R5 in PE 101 is connected from Main Memory West with one bus MI(5,0). Main Memory West is connected from Router R5 in PE 101 with one bus MO(5,0).

Similarly, the right most column of PEs namely PE 010, PE 111, PE 110 and PE 111 are directly connected to the Main Memory East. Router R2 in PE 010 is connected from Main Memory East with one bus MI(2,0). Main Memory East is connected from Router R2 in PE 010 with one bus MO(2,0). Router R3 in PE 011 is connected from Main Memory East with one bus MI(3,0). Main Memory East is connected from Router R3 in PE 011 with one bus MO(3,0). Router R6 in PE 110 is connected from main memory east with one bus MI(6,0). Main Memory East is connected from Router R6 in PE 110 with one buses MO(6,0). Router R7 in PE 111 is connected from Main Memory East with one bus MI(7,0). Main Memory East is connected from Router R7 in PE 111 with one bus MO(7,0).

Referring to diagram 500A2 in FIG. 5A2, it is the same as the diagram 500A1 in FIG. 5A1 excepting that Main Memory West is replaced by Cache 0, Cache 1, Cache 4, and Cache 5 and Main Memory East is replaced by Cache 2, Cache 3, Cache 6, and Cache 7. Specifically, the left most column of PEs namely PE 000, PE 001, PE 100 and PE 101 are directly connected to Cache 0, Cache 1, Cache 4, and Cache 5 respectively. Router R0 in PE 000 is connected from Cache 0 with one bus MI(0,0). Cache 0 is connected from Router R0 in PE 000 with one bus MO(0,0). Router R1 in PE 001 is connected from Cache 1 with one bus MI(1,0). Cache 1 is connected from Router R1 in PE 001 with one bus MO(1,0). Router R4 in PE 100 is connected from Cache 4 with one bus MI(4,0). Cache 4 is connected from Router R4 in PE 100 with one bus MO(4,0). Router R5 in PE 101 is connected from Cache 5 with one bus MI(5,0). Cache 5 is connected from Router R5 in PE 101 with one bus MO(5,0).

Also referring to diagram 500A2 in FIG. 5A2, the right most column of PEs namely PE 010, PE 011, PE 110 and PE 111 are directly connected to Cache 2, Cache 3, Cache 6, and Cache 7 respectively. Router R2 in PE 010 is connected from Cache 2 with one bus MI(A,0). Cache 2 is connected from Router R2 in PE 010 with one bus MO(A,0). Router R3 in PE 011 is connected from Cache 3 with one bus MI(3,0). Cache 3 is connected from Router R3 in PE 011 with one bus MO(3,0). Router R6 in PE 110 is connected from Cache 6 with one bus MI(6,0). Cache 6 is connected from Router R6 in PE 110 with one bus MO(6,0). Router R7 in PE 111 is connected from Cache 7 with one bus MI(7,0). Cache 7 is connected from Router R7 in PE 111 with one bus MO(7,0).

Even though it is not illustrated in diagram 500A2 in FIG. 5A2, behind Cache 0, Cache 1, Cache 4 and Cache 5 are coupled with Main Memory West and behind Cache 2, Cache 3, Cache 6 and Cache 7 are coupled with Main Memory East.

Just like in diagram 500A1 in FIG. 5A1 in diagram 500A2 in FIG. 5A2 each router comprises three local inlet buses and three local outlet buses as shown in diagram 500C of FIG. 5C. For example in PE 000, router R0, in one embodiment, comprises local inlet buses I(0,0), I(0,1) and I(0,2) and local outlet buses O(0,0), O(0,1) and O(0,2). For simplicity of illustration the local inlet buses and local outlet buses to each router of each PE are not shown in diagram 500A2 of FIG. 5A2. Accordingly with the addition of local inlet buses and local outlet buses illustrated in diagram 500C of FIG. 5C to diagram 500A2 of FIG. 5A2 completes the 2D-BFTHypercube interconnection network between 8 PEs arranged in 4*2 grid.

In another embodiment there are multiple levels of cache between the main memory and the 2D-grid of PEs on east side or west side. In another embodiment one or more caches are shared between one or more rows of the 2D-grid of PEs. In yet another embodiment, the main memory is accessed via a high-speed serial computer expansion bus or interface such as PCI Express or ethernet.

Referring to diagram 500B1 in FIG. 5B1, in one embodiment, an exemplary 2D-BFTHypercube interconnection network between 8 PEs arranged in 4*2 grid where the number of rows is four and the number of columns is two. The 8 PEs are represented in binary format namely PE 000, PE 001, PE 010, PE 011, PE 100, PE 101, PE 110, and PE 111, since 3 bits are needed to represent 8 numbers and the corresponding decimal format being PE 0, PE 1, PE 2, PE 3, PE 4, PE 5, PE 6, and PE 7 respectively. Each PE comprises a router. For example, PE 000 comprises router R0, PE 001 comprises router R1, . . . , PE 111 comprises router R7. In one embodiment, each router comprises three local inlet buses and three local outlet buses as shown in diagram 500C of FIG. 5C.

For example in PE 000, router R0, in one embodiment, comprises local inlet buses I(0,0), I(0,1), and I(0,2) and local outlet buses O(0,0), O(0,1) and O(0,2). For simplicity of illustration the local inlet buses and local outlet buses to each router of each PE are not shown in diagram 500B1 of FIG. 5B1. Accordingly with the addition of local inlet buses and local outlet buses illustrated in diagram 500C of FIG. 5C to diagram 500B1 of FIG. 5B1 completes the 2D-BFTHypercube interconnection network between 8 PEs arranged in 4*2 grid. Applicant notes that the PEs are connected as a binary hypercube network, in accordance with the current invention. The degree of the 2D-BFTHypercube interconnection network disclosed in diagram 500B1 of FIG. 5B1 is three.

In the 2D-BFTHypercube interconnection network diagram 500B1 of FIG. 5B1, since all the 8 PEs are represented by 3 bits each, each PE is connected, by buses in both directions, to three other PEs where the PE number differs in only one bit. For example, PE 000 number being 000 the three PEs it is connected to are 1) PE 001 where the least significant bit is different, 2) PE 010 where the second least significant bit is different, and 3) PE 100 where the most significant bit is different. Accordingly, Router R0 in PE 000 is connected to Router R1 in PE 001 by vertical bus V(0,1) and Router R1 in PE 001 is connected to Router R0 in PE 000 by vertical bus V(1,0). Router R0 in PE 000 is connected to Router R2 in PE 010 by horizontal bus H(0,2) and Router R2 in PE 010 is connected to Router R0 in PE 000 by horizontal bus H(2,0). Router R0 in PE 000 is connected to Router R4 in PE 100 by vertical bus H(0,4) and Router R4 in PE 100 is connected to Router R0 in PE 000 by vertical bus H(4,0).

Referring to diagram 500B1 in FIG. 5B1, in one embodiment, there is main memory or shared main memory physically located on the north side and south side of the 2D-grid of PEs and all the PEs in the 2D-grid access (i.e., read data or write data) main memory via the 2D-BFTHypercube interconnection network. The top most column of PEs namely PE 000 and PE 010 are directly connected to the Main Memory North. Router R0 in PE 000 is connected from Main Memory North with two buses MI(0,0) and MI(0,1). Main Memory North is connected from Router R0 in PE 000 with two buses MO(0,0) and MO(0,1). Router R2 in PE 010 is connected from Main Memory North with two buses MI(2,0) and MI(2,1). Main Memory North is connected from Router R2 in PE 010 with two buses MO(2,0) and MO(2,1).

Similarly, the bottom most column of PEs namely PE 101 and PE 111 are directly connected to the Main Memory South. Router R5 in PE 101 is connected from Main Memory South with two buses MI(5,0) and MI(5,1). Main Memory South is connected from Router R5 in PE 101 with two buses MO(5,0) and MO(5,1). Router R7 in PE 111 is connected from Main Memory South with two buses MI(7, 0) and MI(7,1). Main Memory South is connected from Router R7 in PE 111 with two buses MO(7,0) and MO(7,1).

Referring to diagram 500B2 in FIG. 5B2, it is the same as the diagram 500B1 in FIG. 5B1 excepting that Main Memory North is replaced by Cache 0 and Cache 2, and Main Memory South is replaced by Cache 5 and Cache 7. Specifically, the top most column of PEs namely PE 000 and PE 110 are directly connected to Cache 0 and Cache 2 respectively. Router R0 in PE 000 is connected from Cache 0 with two buses MI(0,0) and MI(0,1). Cache 0 is connected from Router R0 in PE 000 with two buses MO(0,0) and MO(0,1). Router R2 in PE 010 is connected from Cache 2 with two buses MI(2,0) and MI(2,1). Cache 2 is connected from Router R2 in PE 010 with two buses MO(2,0) and MO(2,1).

Also Router R5 in PE 101 is connected from Cache 5 with two buses MI(5,0) and MI(5,1). Cache 5 is connected from Router R5 in PE 101 with two buses MO(5,0) and MO(5,1). Router R7 in PE 111 is connected from Cache 7 with two buses MI(7,0) and MI(7,1). Cache 7 is connected from Router R7 in PE 111 with two buses MO(7,0) and MO(7,1). Even though it is not illustrated in diagram 500B2 in FIG. 5B2, behind Cache 0 and Cache 2 are coupled with Main Memory North and behind Cache 5 and Cache 7 are coupled with Main Memory South.

Just like in diagram 500B1 in FIG. 5B1 in diagram 500B2 in FIG. 5B2 each router comprises three local inlet buses and three local outlet buses as shown in diagram 500C of FIG. 5C. For example in PE 000, router R0, in one embodiment, comprises local inlet buses I(0,0), I(0,1) and I(0,2) and local outlet buses O(0,0), O(0,1) and O(0,2). For simplicity of illustration the local inlet buses and local outlet buses to each router of each PE are not shown in diagram 500B2 of FIG. 5B2. Accordingly with the addition of local inlet buses and local outlet buses illustrated in diagram 500C of FIG. 5C to diagram 500B2 of FIG. 5B2 completes the 2D-BFTHypercube interconnection network between 8 PEs arranged in 4*2 grid.

In another embodiment there are multiple levels of cache between the main memory and the 2D-grid of PEs on east side or west side. In another embodiment one or more caches are shared between one or more rows of the 2D-grid of PEs. In yet another embodiment, the main memory is accessed via a high-speed serial computer expansion bus or interface such as PCI Express or ethernet.

Scalable 2D-BFTHypercube Interconnection Network with 2D-Grid of PEs with Shared Memory (Total Number of PEs is not a Perfect Power of 2):

Now 2D-BFTHypercube interconnection network for 2D-grid where number of PEs is non-perfect power of 2 are disclosed. Referring to diagram 600A1 in FIG. 6A1, in one embodiment, an exemplary 2D-BFTHypercube interconnection network between 12 PEs arranged in 4*3 grid where the number of rows is four and the number of columns is three. Number 12 is not a perfect power of 2. First the next biggest perfect power of 2 for 12 (or equivalently smallest of all bigger perfect powers of 2 greater than 12) which is 16 PEs network is built. As illustrated in diagram 100A1 of FIG. 1A1, 2D-BFTHypercube interconnection network between 16 PEs arranged in 4*4 grid is built first. In one embodiment, the PEs in the fourth column are removed. All the vertical and horizontal buses connected to and connected from the PEs in the fourth column are also removed, as shown in diagram 600A1 of FIG. 6A1. The degree of the 2D-BFT-Hypercube interconnection network disclosed in diagram 600A1 of FIG. 6A1 is four since it requires 4 bits to represent all the PEs.

In general, a×b processing elements are numbered with a representation in binary format having n bits, where $2^{n-1} < a \times b \leq 2^n$ and where n is a positive number. In diagram 600A1 of FIG. 6A1 and diagram 600B of FIG. 6B, a=4, b=3, according to the current invention, it requires n=4 bits since $2^3 < 12 \leq 2^4$.

Figure 6B:
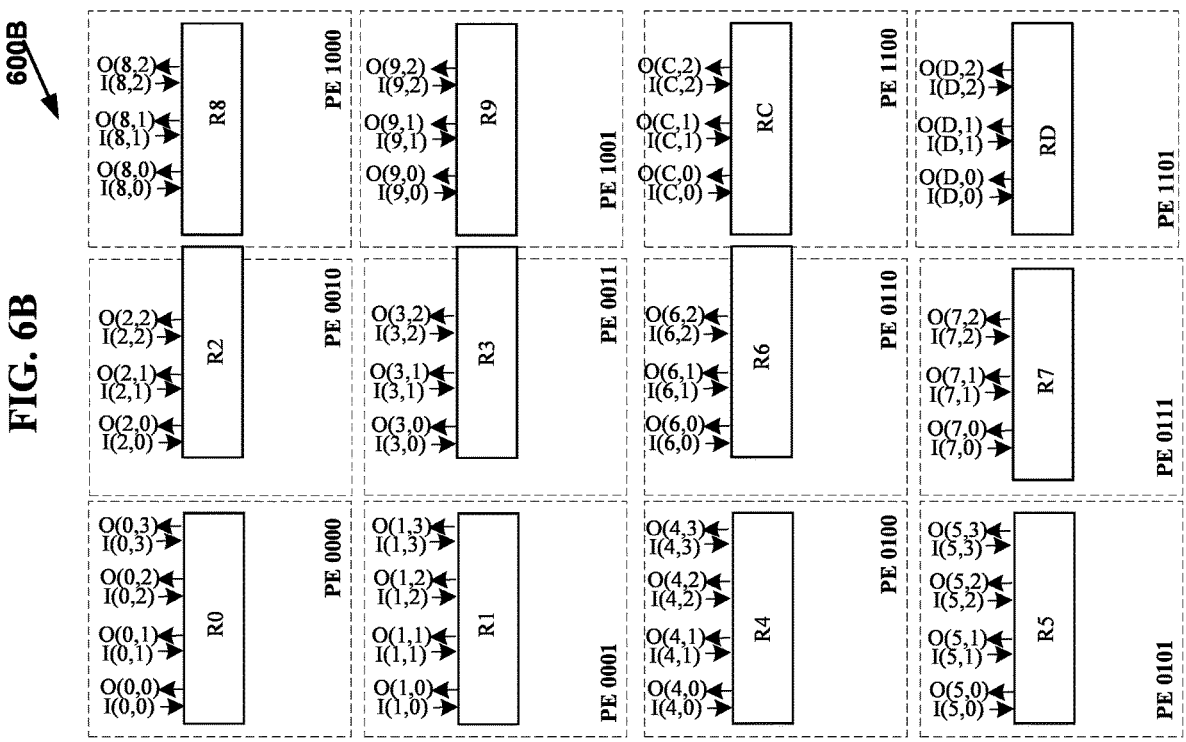
FIG. 6B is a diagram 600B with illustration of local inlet buses and local outlet buses in each PE of an exemplary 2D-BFTHypercube interconnection network with 4*3 2D-grid of PEs scalable for distributed computing system with shared memory or cache, in accordance with the invention.

Just like in diagram 100A1 of FIG. 1A1 and diagram 100B of FIG. 1B, for simplicity of illustration the local inlet buses and local outlet buses to each router of each PE are not shown in diagram 600A1 of FIG. 6A1. Accordingly with the addition of local inlet buses and local outlet buses illustrated in diagram 600B of FIG. 6B to diagram 600A1 of FIG. 6A1 completes the 2D-BFTHypercube interconnection network between 12 PEs arranged in 4*3 grid, in accordance with the current invention.

Applicant notes that in this embodiment the key aspects of 2D-BFTHypercube interconnection network between 2 PEs arranged in 4*3 grid are: 1) the numbering of PEs in 4*3 2D-grid is consistent with the numbering of PEs in 4*4 2D-grid. That is even though there are only 12 PEs in 4*3 grid, the PE number in the third row and third column is PE 1100 and the PE number in the fourth row and third column is PE 1101 with the decimal equivalent of them being 12 and 13 respectively. They are not changed to 1010 and 1011 which are 10 and 11 respectively. This will preserve the bus connecting pattern in binary hypercube as disclosed earlier which is a PE is connected to another if there is only one bit different in their binary format and 2) some of the PEs have 4 buses connected to and 4 buses connected from other PEs, for example PE 0000. Some other PEs have 3 buses connected to and 3 buses connected from other PEs, for example PE 0010.

Referring to diagram 600A1 in FIG. 6A1, in one embodiment, there is main memory or shared main memory physically located on the east side and west side of the 2D-grid of PEs and all the PEs in the 2D-grid access (i.e., read data or write data) main memory via the 2D-BFTHypercube interconnection network. The left most column of PEs namely PE 0000, PE 0001, PE 0100 and PE 0101 are directly connected to the Main Memory West. Router R0 in PE 0000 is connected from Main Memory West with two buses MI(0,0) and MI(0,1). Main Memory West is connected from Router R0 in PE 0000 with two buses MO(0,0) and MO(0,1). Router R1 in PE 0001 is connected from Main Memory West with two buses MI(1,0) and MI(1,1). Main Memory West is connected from Router R1 in PE 0001 with two buses MO(1,0) and MO(1,1). Router R4 in PE 0100 is connected from Main Memory West with two buses MI(4,0) and MI(4,1). Main Memory West is connected from Router R4 in PE 0100 with two buses MO(4,0) and MO(4,1). Router R5 in PE 0101 is connected from Main Memory West with two buses MI(5,0) and MI(5,1). Main Memory West is connected from Router R5 in PE 0101 with two buses MO(5,0) and MO(5,1).

Similarly, the right most column of PEs namely PE 1000, PE 1001, PE 1100 and PE 1101 are directly connected to the Main Memory East. Router R8 in PE 1000 is connected from Main Memory East with two buses MI(8,0) and MI(8,1). Main Memory East is connected from Router R8 in PE 1000 with two buses MO(8,0) and MO(8,1). Router R9 in PE 1001 is connected from Main Memory East with two buses MI(9,0) and MI(9,1). Main Memory East is connected from Router R9 in PE 1001 with two buses MO(9,0) and MO(9,1). Router RC in PE 1100 is connected from main memory east with two buses MI(C,0) and MI(C,1). Main Memory East is connected from Router RC in PE 1100 with two buses MO(C,0) and MO(C,1). Router RD in PE 1101 is connected from Main Memory East with two buses MI(D,0) and MI(D,1). Main Memory East is connected from Router RD in PE 1101 with two buses MO(D,0) and MO(D,1).

Referring to diagram 600A2 in FIG. 6A2, it is the same as the diagram 600A1 in FIG. 6A1 excepting that Main Memory West is replaced by Cache 0, Cache 1, Cache 4, and Cache 5 and Main Memory East is replaced by Cache 8, Cache 9, Cache C, and Cache D. Specifically the left most column of PEs namely PE 0000, PE 0001, PE 0100 and PE 0101 are directly connected to Cache 0, Cache 1, Cache 4, and Cache 5 respectively. Router R0 in PE 0000 is connected from Cache 0 with two buses MI(0,0) and MI(0,1). Cache 0 is connected from Router R0 in PE 0000 with two buses MO(0,0) and MO(0,1). Router R1 in PE 0001 is connected from Cache 1 with two buses MI(1,0) and MI(1, 1). Cache 1 is connected from Router R1 in PE 0001 with two buses MO(1,0) and MO(1,1). Router R4 in PE 0100 is connected from Cache 4 with two buses MI(4,0) and MI(4, 1). Cache 4 is connected from Router R4 in PE 0100 with two buses MO(4,0) and MO(4,1). Router R5 in PE 0101 is connected from Cache 5 with two buses MI(5,0) and MI(5, 1). Cache 5 is connected from Router R5 in PE 0101 with two buses MO(5,0) and MO(5,1).

Also referring to diagram 600A2 in FIG. 6A2, the right most column of PEs namely PE 1000, PE 1001, PE 1100 and PE 1101 are directly connected to Cache 8, Cache 9, Cache C, and Cache D respectively. Router R8 in PE 1000 is connected from Cache 8 with two buses MI(8,0) and MI(8, 1). Cache 8 is connected from Router R8 in PE 1000 with two buses MO(8,0) and MO(8,1). Router R9 in PE 1001 is connected from Cache 9 with two buses MI(9,0) and MI(9, 1). Cache 9 is connected from Router R9 in PE 1001 with two buses MO(9,0) and MO(9,1). Router RC in PE 1100 is connected from Cache C with two buses MI(C,0) and MI(C,1). Cache C is connected from Router RC in PE 1100 with two buses MO(C,0) and MO(C,1). Router RD in PE 1101 is connected from Cache D with two buses MI(D,0) and MI(D,1). Cache D is connected from Router RD in PE 1101 with two buses MO(D,0) and MO(D,1).

Even though it is not illustrated in diagram 600A2 in FIG. 6A2, behind Cache 0, Cache 1, Cache 4 and Cache 5 are coupled with Main Memory West and behind Cache 8, Cache 9, Cache C and Cache D are coupled with Main Memory East.

Just like in diagram 600A1 in FIG. 6A1 in diagram 600A2 in FIG. 6A2 each router comprises four or three local inlet buses and four or three local outlet buses as shown in diagram 600B of FIG. 6B. For example in PE 0000, router R0, in one embodiment, comprises local inlet buses I(0,0), I(0,1), I(0,2) and I(0,3) and local outlet buses O(0,0), O(0,1), O(0,2) and O(0,3). For simplicity of illustration the local inlet buses and local outlet buses to each router of each PE are not shown in diagram 600A2 of FIG. 6A2. Accordingly, with the addition of local inlet buses and local outlet buses illustrated in diagram 600B of FIG. 6B to diagram 600A2 of FIG. 6A2 completes the 2D-BFTHypercube interconnection network between 12 PEs arranged in 4*3 grid.

Now 2D-BFTHypercube interconnection network for 2D-grid where number of PEs is non-perfect power of 2 and 2D-grid is a square grid are disclosed. Referring to diagram 700A1 in FIG. 7A1, in one embodiment, an exemplary 2D-BFTHypercube interconnection network between 9 PEs arranged in 3*3 grid where the number of rows is three and the number of columns is three. Number 9 is not a perfect power of 2. First the next biggest perfect power of 2 for 9 (or equivalently smallest of all bigger perfect powers of 2 greater than 9) which is 16 PEs network is built. As illustrated in diagram 100A1 of FIG. 1A1, 2D-BFTHypercube interconnection network between 9 PEs arranged in 3*3 grid is built first. In one embodiment, PEs in the fourth column and fourth row are removed. All the vertical and horizontal buses connected to and connected from the PEs in the fourth row and fourth column are also removed, as shown in diagram 700A1 of FIG. 7A1. The degree of the 2D-BFTHypercube interconnection network disclosed in diagram 700A1 of FIG. 7A1 is four since it requires 4 bits to represent all the PEs.

In general, a×b processing elements are numbered with a representation in binary format having n bits, where $2^{n-1} < a \times b \leq 2^n$ and where n is a positive number. In diagram 700A1 of FIG. 7A1 and diagram 700B of FIG. 7B, a=3, b=3, in accordance with the current invention, it requires n=4 bits since $2^3 < 9 \leq 2^4$.

Figure 7B:
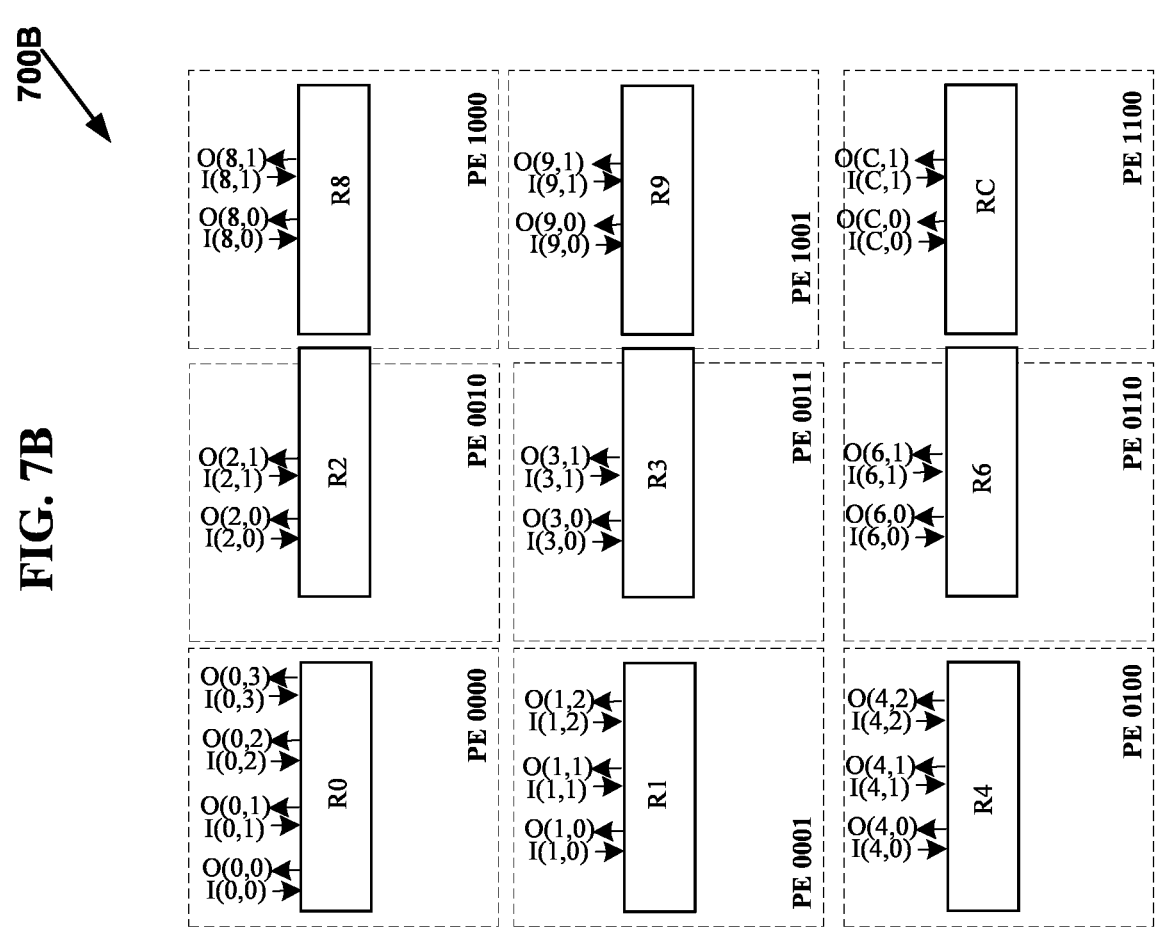
FIG. 7B is a diagram 700B with illustration of local inlet buses and local outlet buses in each PE of an exemplary 2D-BFTHypercube interconnection network with 3*3 2D-grid of PEs scalable for distributed computing system with shared memory or cache, in accordance with the invention.
Figure 7D:
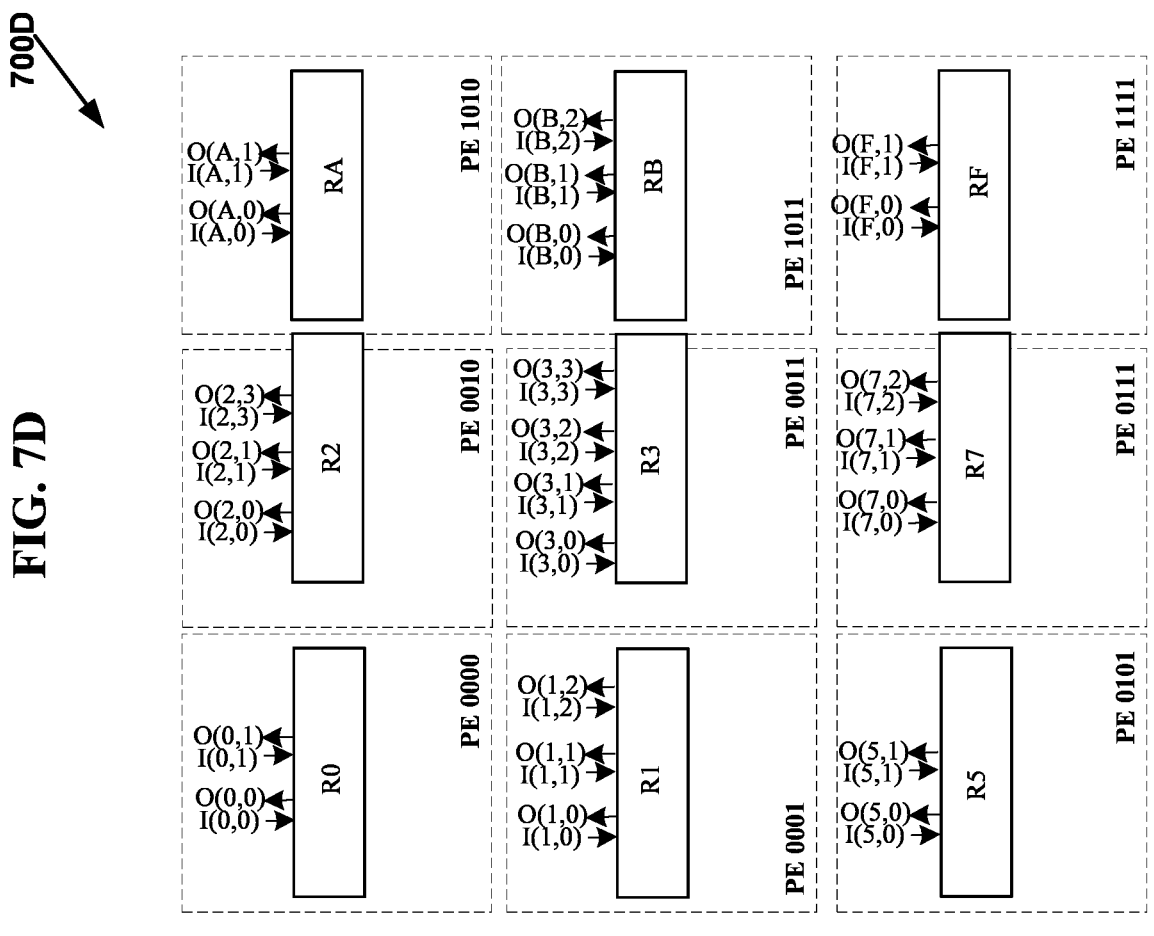

Just like in diagram 100A1 of FIG. 1A1 and diagram 100B of FIG. 1B, for simplicity of illustration the local inlet buses and local outlet buses to each router of each PE are not shown in diagram 700A1 of FIG. 7A1. Accordingly with the addition of local inlet buses and local outlet buses illustrated in diagram 700B of FIG. 7B to diagram 700A1 of FIG. 7A1 completes the 2D-BFTHypercube interconnection network between 9 PEs arranged in 3*3 grid, in accordance with the current invention.

Applicant notes that in this embodiment the key aspects of 2D-BFTHypercube interconnection network between 2 PEs arranged in 3*3 grid are: 1) the numbering of PEs in 3*3 2D-grid is consistent with the numbering of PEs in 4*4 2D-grid. That is even though there are only 9 PEs in 3*3 grid, PE number in the second row and third column is PE 1001 and PE number in the third row and third column is PE 1100 with the decimal equivalent of them being 9 and 12 respectively. Again, this will preserve the bus connecting pattern in binary hypercube as disclosed earlier which is a PE is connected to another if there is only one bit different in their binary format. And 2) some of the PEs have 4 buses connected to and 4 buses connected from other PEs, for example PE 0000. Some other PEs have 3 buses connected to and 3 buses connected from other PEs, for example PE 0010. Some other PEs have 2 buses connected to and 2 buses connected from other PEs, for example PE 1001.

Referring to diagram 700A1 in FIG. 7A1, in one embodiment, there is main memory or shared main memory physically located on the east side and west side of the 2D-grid of PEs and all the PEs in the 2D-grid access (i.e., read data or write data) main memory via the 2D-BFTHypercube interconnection network. The left most column of PEs namely PE 0000, PE 0001 and PE 0100 are directly connected to the Main Memory West. Router R0 in PE 0000 is connected from Main Memory West with two buses MI(0,0) and MI(0,1). Main Memory West is connected from Router R0 in PE 0000 with two buses MO(0,0) and MO(0,1). Router R1 in PE 0001 is connected from Main Memory West with two buses MI(1,0) and MI(1,1). Main Memory West is connected from Router R1 in PE 0001 with two buses MO(1,0) and MO(1,1). Router R4 in PE 0100 is connected from Main Memory West with two buses MI(4,0) and MI(4,1). Main Memory West is connected from Router R4 in PE 0100 with two buses MO(4,0) and MO(4,1).

Similarly, the right most column of PEs namely PE 1000, PE 1001 and PE 1100 are directly connected to the Main Memory East. Router R8 in PE 1000 is connected from Main Memory East with two buses MI(8,0) and MI(8,1). Main Memory East is connected from Router R8 in PE 1000 with two buses MO(8,0) and MO(8,1). Router R9 in PE 1001 is connected from Main Memory East with two buses MI(9,0) and MI(9,1). Main Memory East is connected from Router R9 in PE 1001 with two buses MO(9,0) and MO(9, 1). Router RC in PE 1100 is connected from main memory east with two buses MI(C,0) and MI(C,1). Main Memory East is connected from Router RC in PE 1100 with two buses MO(C,0) and MO(C,1).

Referring to diagram 700B2 in FIG. 7B2, it is the same as the diagram 700A1 in FIG. 7A1 excepting that Main Memory West is replaced by Cache 0, Cache 1 and Cache 4 and Main Memory East is replaced by Cache 8, Cache 9 and Cache C. Specifically the left most column of PEs namely PE 0000, PE 0001 and PE 0100 are directly connected to Cache 0, Cache 1 and Cache 4 respectively. Router R0 in PE

0000 is connected from Cache 0 with two buses MI(0,0) and MI(0,1). Cache 0 is connected from Router R0 in PE 0000 with two buses MO(0,0) and MO(0,1). Router R1 in PE 0001 is connected from Cache 1 with two buses MI(1,0) and MI(1,1). Cache 1 is connected from Router R1 in PE 0001 with two buses MO(1,0) and MO(1,1). Router R4 in PE 0100 is connected from Cache 4 with two buses MI(4,0) and MI(4,1). Cache 4 is connected from Router R4 in PE 0100 with two buses MO(4,0) and MO(4,1).

Also referring to diagram 700A2 in FIG. 7A2, the right most column of PEs namely PE 1000, PE 1001 and PE 1100 are directly connected to Cache 8, Cache 9 and Cache C respectively. Router R8 in PE 1000 is connected from Cache 8 with two buses MI(8,0) and MI(8,1). Cache 8 is connected from Router R8 in PE 1000 with two buses MO(8,0) and MO(8,1). Router R9 in PE 1001 is connected from Cache 9 with two buses MI(9,0) and MI(9,1). Cache 9 is connected from Router R9 in PE 1001 with two buses MO(9,0) and MO(9,1). Router RC in PE 1100 is connected from Cache C with two buses MI(C,0) and MI(C,1). Cache C is connected from Router RC in PE 1100 with two buses MO(C,0) and MO(C,1).

Even though it is not illustrated in diagram 700A2 in FIG. 7A2, behind Cache 0, Cache 1 and Cache 4 are coupled with Main Memory West and behind Cache 8, Cache 9 and Cache C are coupled with Main Memory East.

Just like in diagram 700A1 in FIG. 7A1 in diagram 700A2 in FIG. 7A2 each router comprises four or three or two local inlet buses and four or three or two local outlet buses as shown in diagram 700B of FIG. 7B. For example in PE 0000, router R0, in one embodiment, comprises local inlet buses I(0,0), I(0,1), I(0,2) and I(0,3) and local outlet buses O(0,0), O(0,1), O(0,2) and O(0,3). For simplicity of illustration the local inlet buses and local outlet buses to each router of each PE are not shown in diagram 700A2 of FIG. 7A2. Accordingly with the addition of local inlet buses and local outlet buses illustrated in diagram 700B of FIG. 7B to diagram 700A2 of FIG. 7A2 completes the 2D-BFTHypercube interconnection network between 9 PEs arranged in 3*3 grid.

Figure 8:
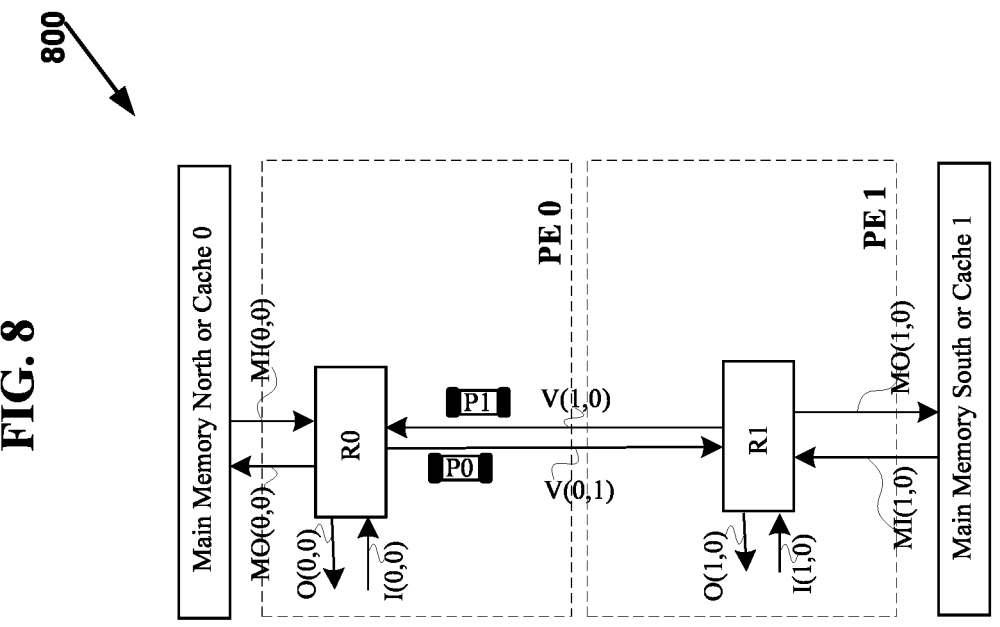
FIG. 8 is a diagram 800 of illustration of deterministic concurrent broadcast by all PEs in one time step in an exemplary 2D-BFTHypercube interconnection network with 2*1 2D-grid of PEs scalable for distributed computing system with shared memory or cache, in accordance with the invention.

Deterministic Concurrent Broadcast by all PEs in One Time Step in an Exemplary 2D-BFTHypercube Interconnection Network with 2*1 2D-Grid of PEs:

Referring to diagram 800 of FIG. 8 illustrates of deterministic concurrent broadcast by all PEs in one time step in the exemplary 2D-BFTHypercube interconnection network with 2*1 2D-grid of PEs shown in diagram 300A of FIG. 3A; Even though it is not illustrated it is also similar in diagram 300B of FIG. 3B, diagram 300C of FIG. 3C and diagram 300D of FIG. 3D. PE 0 has packet P0 and PE 1 has packet P1 to broadcast to the rest of PEs. That is each PE needs to transmit its packet to only one other PE. In time step 1, Packet P0 is unicasted from PE 0 to PE 1 via local inlet bus I(0,0), Router R0, vertical bus V(0,1), Router R1, and local outlet bus O(1,0). Concurrently in time step 1, Packet P1 is unicasted from PE 1 to PE 0 via local inlet bus I(1,0), Router R1, vertical bus V(1,0), Router R0, and local outlet bus O(0,0). A time step is certain time duration determined by the length of the packet, the length of the bus, the number of wires in the local inlet buses, local outlet buses and vertical buses, the number of wires in the horizontal buses, the implemented non-transitory medium of each bus and clock speed of operation.

So, in the 2D-BFTHypercube interconnection network with 2*1 2D-grid of PEs shown in diagram 800 of FIG. 8, for concurrent broadcast by each of the two PEs to transmit a packet to the other PE, it takes one time step. Since the interconnection network is non-blocking, as illustrated in diagram 800 of FIG. 8, no queuing of packets is needed, and no collisions will occur. Also, all the vertical buses i.e., the two vertical buses are completely and concurrently utilized.

To broadcast "n" number of packets, where n is positive number, by each PE to the rest of the PEs, it requires "n" number of time steps in the exemplary 2D-BFTHypercube interconnection network with 2*1 2D-grid of 2 PEs shown in diagram 300 of FIG. 3. In one embodiment, applicant notes that all "n" packets from PE 0 will be transmitted to PE 1 in the same fixed path as packet P0 as illustrated in diagram 800 of FIG. 8. Similarly, all "n" packets from PE 1 will be transmitted to PE 0 in the same path as packet P1 as illustrated in diagram 800 of FIG. 8.

Applicant also notes that "n" number of packets from PE 0 will reach PE 1 in the order they are transmitted and similarly "n" number of packets from PE 1 will reach PE 0 in the order they are transmitted. Accordingly, to concurrently broadcast "n" number of packets by PE 0 to PE 1 and PE 1 to PE 0, in the exemplary 2D-BFTHypercube interconnection network with 2*1 2D-grid of 2 PEs shown in diagram 300 of FIG. 3, it requires "n" number of time steps and no out of order arrival of packets occurs.

Figure 9B:
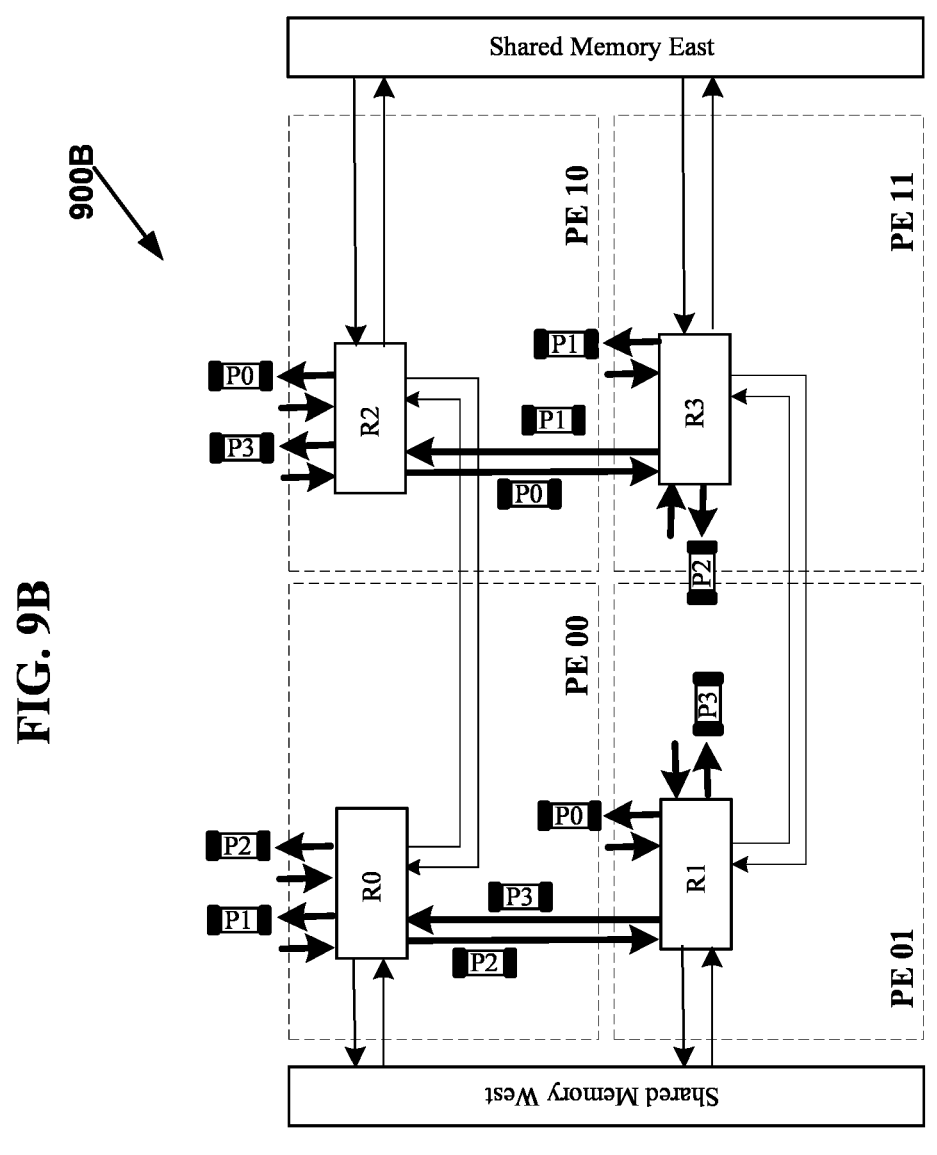
FIG. 9B is a diagram 900B of illustration of time step 2 of deterministic concurrent broadcast by all PEs in two time steps in an exemplary 2D-BFTHypercube interconnection network with 2*2 2D-grid of PEs scalable for distributed computing system with shared memory, in accordance with the invention.

Deterministic Concurrent Broadcast by all PEs in Two Time Steps in an Exemplary 2D-BFTHypercube Interconnection Network with 2*2 2D-Grid of PEs:

Diagrams 900A of FIGS. 9A and 900B of FIG. 9B illustrate deterministic concurrent broadcast by all PEs in two time steps in the exemplary 2D-BFTHypercube interconnection network with 2*2 2D-grid of 4 PEs shown in diagram 400A of FIG. 4A; Even though it is not illustrated it is also similar in diagram 400B of FIG. 4B. PE 00 has packet P0, PE 01 has packet P1, PE 10 has packet P2, and PE 11 has packet P3 to broadcast to rest of the PEs. As shown in diagram 900A of FIG. 9A, in time step 1, Packet P0 is multicasted with fan out 2 from PE 00 to PE 01 and PE 10. From PE 00 to PE 01 the path is via local inlet bus I(0,0), Router R0, vertical bus V(0,1), Router R1, and local outlet bus O(1,0). From PE 00 to PE 10 the path is via local inlet bus I(0,0), Router R0, horizontal bus H(0,2), Router R2, and local outlet bus O(2,1). Concurrently in time step 1, Packet P1 is multicasted with fan out 2 from PE 01 to PE 00 and PE 10. From PE 01 to PE 00 the path is via local inlet bus I(1,0), Router R1, vertical bus V(1,0), Router R0, and local outlet bus O(0,0). From PE 01 to PE 11 the path is via local inlet bus I(1,0), Router R1, horizontal bus H(1,2), Router R2 and local outlet bus O(2,1).

As shown in diagram 900A of FIG. 9A, in time step 1, Packet P2 is multicasted with fan out 2 from PE 10 to PE 11 and PE 00. From PE 10 to PE 11 the path is via local inlet bus I(2,0), Router R2, vertical bus V(2,3), Router R3, and local outlet bus O(3,0). From PE 10 to PE 00 the path is via local inlet bus I(2,0), Router R2, horizontal bus H(2,0), Router R1, and local outlet bus O(0,1). Concurrently in time step 1, Packet P3 is multicasted with fan out 2 from PE 11 to PE 10 and PE 01. From PE 11 to PE 10 the path is via local inlet bus I(3,0), Router R3, vertical bus V(3,2), Router R2, and local outlet bus O(2,0). From PE 11 to PE 01 the path is via local inlet bus I(3,0), Router R3, horizontal bus H(3,1), Router R1, and local outlet bus O(1,1).

Also in time step 1, the four vertical buses namely V(0,1), V(1,0), V(2,3) and V(3,2), and the four horizontal buses namely H(0,2), H(2,0), H(1,3) and H(3,1) are concurrently utilized. To summarize in time step 1, PE 00 received packets P1 and P2; PE 01 received packets P0 and P3; PE 10 received packets P0 and P3; and PE 11 received packets P1 and P2.

As shown in diagram 900B of FIG. 9B, in time step 2, Packet P2 is unicasted from PE 00 to PE 01. From PE 00 to PE 01 the path is via local inlet bus I(0,1), Router R0, vertical bus V(0,1), Router R1, and local outlet bus O(1,0). Concurrently in time step 2, Packet P3 is unicasted from PE 01 to PE 00. From PE 01 to PE 00 the path is via local inlet bus I(1,1), Router R1, vertical bus V(1,0), Router R0, and local outlet bus O(0,0).

As shown in diagram 900B of FIG. 9B, in time step 2, Packet P0 is unicasted from PE 10 to PE 11. From PE 10 to PE 11 the path is via local inlet bus I(2,1), Router R2, vertical bus V(2,3), Router R3, and local outlet bus O(3,0). Concurrently in time step 2, Packet P1 is unicasted from PE 11 to PE 10. From PE 11 to PE 10 the path is via local inlet bus I(3,1), Router R3, vertical bus V(3,2), Router R2, and local outlet bus O(2,0).

Also in time step 2, the four vertical buses namely V(0,1), V(1,0), V(2,3) and V(3,2) are concurrently utilized and the four horizontal buses namely H(0,2), H(2,0), H(1,3) and H(3,1) do not need to be utilized. (Alternatively in another embodiment, instead of vertical buses, the four horizontal buses namely H(0,2), H(2,0), H(1,3) and H(3,1) can be concurrently utilized without needing to utilize the four vertical buses namely V(0,1), V(1,0), V(2,3) and V(3,2)). To summarize in time step 2, PE 00 received packet P3; PE 01 received packet P2; PE 10 received packet P1; and PE 11 received packet P0.

As shown in diagram 900A of FIG. 9A and diagram 900B of FIG. 9B, the path for Packet P0 to transmit from PE 00 to PE 11 is via PE 10. Specifically, as shown in diagram 900A of FIG. 9A, in time step 1, Packet P0 is multicasted with fan out 2 from PE 00 to PE 01 and PE 10. From PE 00 to PE 01 the path is via local inlet bus I(0,0), Router R0, vertical bus V(0,1), Router R1, and local outlet bus O(1,0). From PE 00 to PE 10 the path is via local inlet bus I(0,0), Router R0, horizontal bus H(0,2), Router R2, and local outlet bus O(2,1). Then as shown in diagram 900B of FIG. 9B, in time step 2, Packet P0 is unicasted from PE 10 to PE 11. From PE 10 to PE 11 the path is via local inlet bus I(2,1), Router R2, vertical bus V(2,3), Router R3, and local outlet bus O(3,0). In this example, in the path for P0 to transmit from PE00 to PE11, PE 00 is hereinafter referred to as source processing element, PE 11 is hereinafter referred to as target processing element and PE 10 is hereinafter referred to as intermediate processing element. In general, with a×b processing elements arranged in two dimensional grid according to the current invention, in the path of a packet from a source processing element to a target processing element there will be one or more intermediate processing elements unless source processing element and target processing element are directly connected to each other by a vertical bus or horizontal bus.

So, in the 2D-BFTHypercube interconnection network with 2*2 2D-grid of PEs shown in diagram 900A of FIG. 9A and diagram 900B of FIG. 9B, for concurrent broadcast by each of the four PEs to transmit a packet to all the rest of the PEs, it takes two time steps. Since the interconnection network is non-blocking, as illustrated in diagram 900A of FIG. 9A and diagram 900B of FIG. 9B, no queuing of packets is needed, and no collisions will occur. Also, the four vertical buses and the four horizontal buses are concurrently utilized in time step 1 whereas in time step 2 only the four vertical buses are needed. A time step is certain time duration determined by the length of the packet, the length of the bus, the number of wires in the local inlet buses, local outlet buses and vertical buses, the number of wires in the horizontal buses, the implemented non-transitory medium of each bus and clock speed of operation.

To broadcast "n" number of packets, where n is positive number, by each PE to the rest of the PEs, it requires 2*n number of time steps in the exemplary 2D-BFTHypercube interconnection network with 2*2 2D-grid of 4 PEs shown in diagram 400A of FIG. 4A or diagram 400B of FIG. 4B. In one embodiment, applicant notes that all "n" packets from PE 0 will be transmitted to PE 1 in the same fixed path as packet P0 as illustrated in diagram 900A of FIG. 9A and diagram 900B of FIG. 9B. Similarly, all "n" packets from PE 0 will be transmitted to PE 2 in the same fixed path as packet P0 as illustrated in diagram 900A of FIG. 9A and diagram 900B of FIG. 9B. Also, all "n" packets from PE 0 will be transmitted to PE 3 in the same fixed path as packet P0 as illustrated in diagram 900A of FIG. 9A and diagram 900B of FIG. 9B.

Similarly all "n" packets from PE 1 will be transmitted to PE 0, PE 2, and PE 3 in the same path as packet P1 as illustrated in diagram 900A of FIG. 9A and diagram 900B of FIG. 9B; all "n" packets from PE 2 will be transmitted to PE 0, PE 1, and PE 3 in the same path as packet P2 as illustrated in diagram 900A of FIG. 9A and diagram 900B of FIG. 9B; and all "n" packets from PE 3 will be transmitted to PE 0, PE 1, and PE 2 in the same path as packet P3 as illustrated in diagram 900A of FIG. 9A and diagram 900B of FIG. 9B.

Applicant also notes that "n" number of packets from each PE will reach the rest of PEs in the order they are transmitted as they are transmitted in the same fixed path. For example "n" number of packets from PE 0 will reach PE 1, PE 2 and PE 3 in the order they are transmitted as they are transmitted in the same fixed path as packet P0 as illustrated in diagram 900A of FIG. 9A and diagram 900B of FIG. 9B. Accordingly, concurrent broadcast "n" number of packets from each PE to the rest of PEs, as shown in the exemplary 2D-BFTHypercube interconnection network with 2*2 2D-grid of 4 PEs in diagram 400 of FIG. 4, it requires "2*n" number of time steps and no out of order arrival of packets occurs.

Figure 10A:
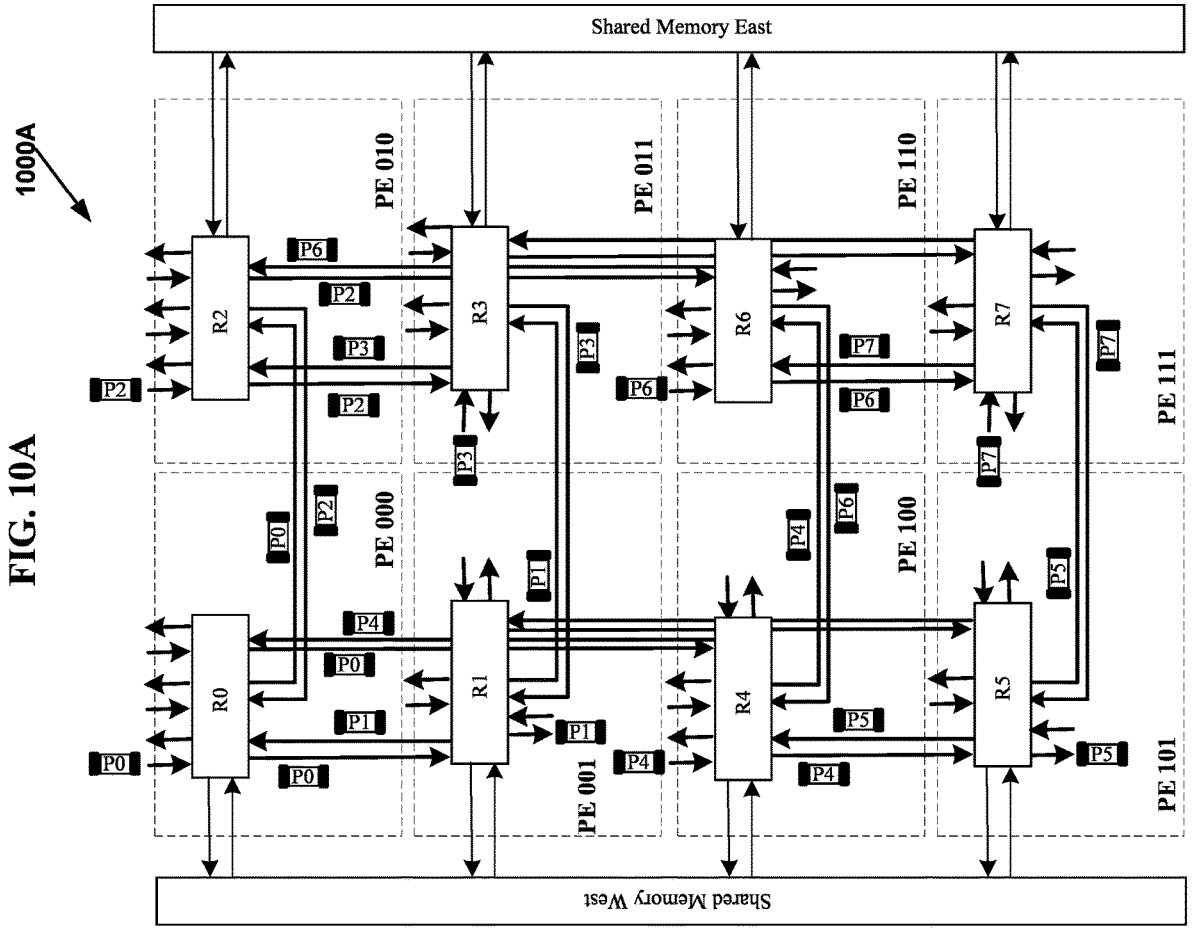
FIG. 10A is a diagram 1000A of illustration of time step 1 of deterministic concurrent broadcast by all PEs in four time steps in an exemplary 2D-BFTHypercube interconnection network with 4*2 2D-grid of PEs scalable for distributed computing system with shared memory, in accordance with the invention.
Figure 10B:
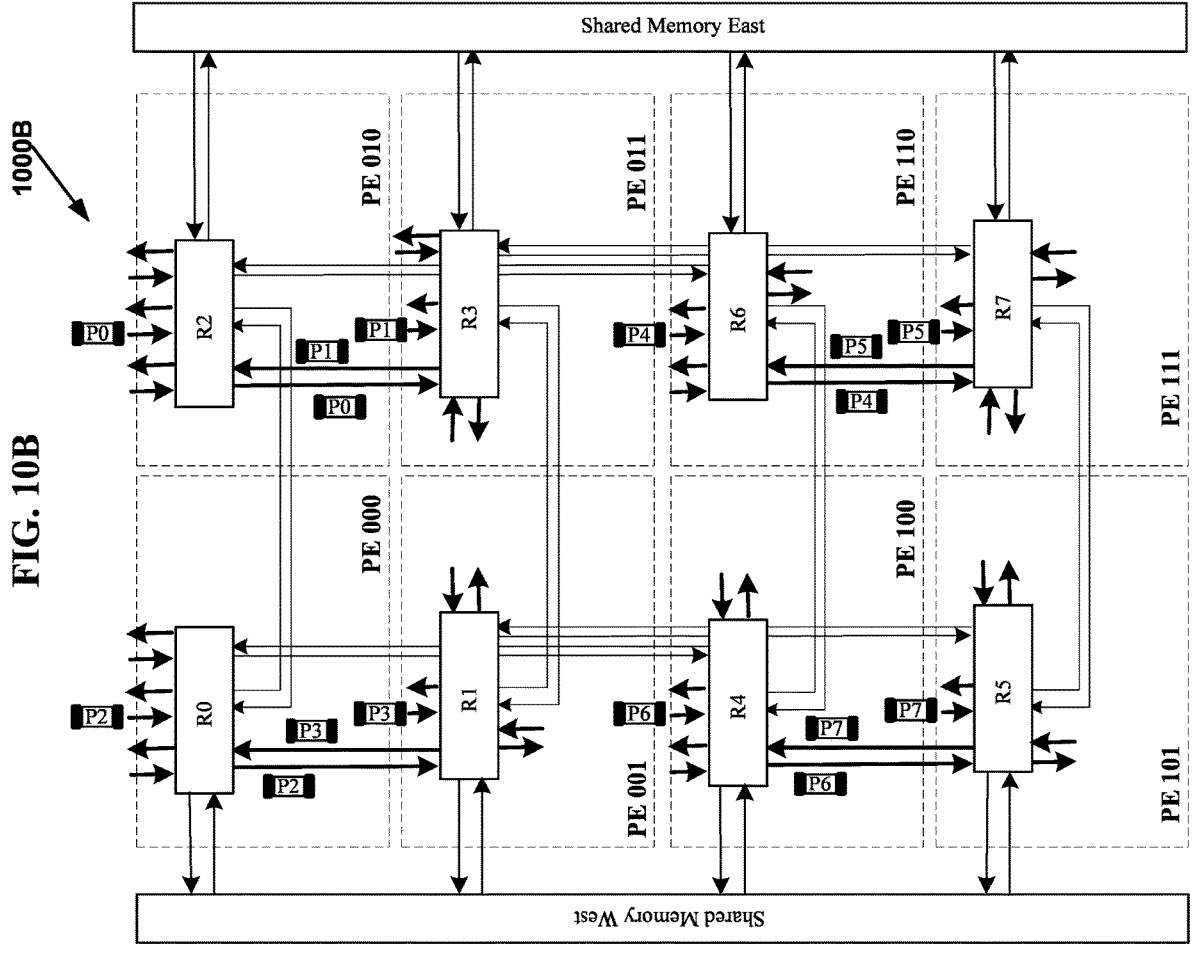
FIG. 10B is a diagram 1000B of illustration of time step 2 of deterministic concurrent broadcast by all PEs in four time steps in an exemplary 2D-BFTHypercube interconnection network with 4*2 2D-grid of PEs scalable for distributed computing system with shared memory, in accordance with the invention.
Figure 10C:
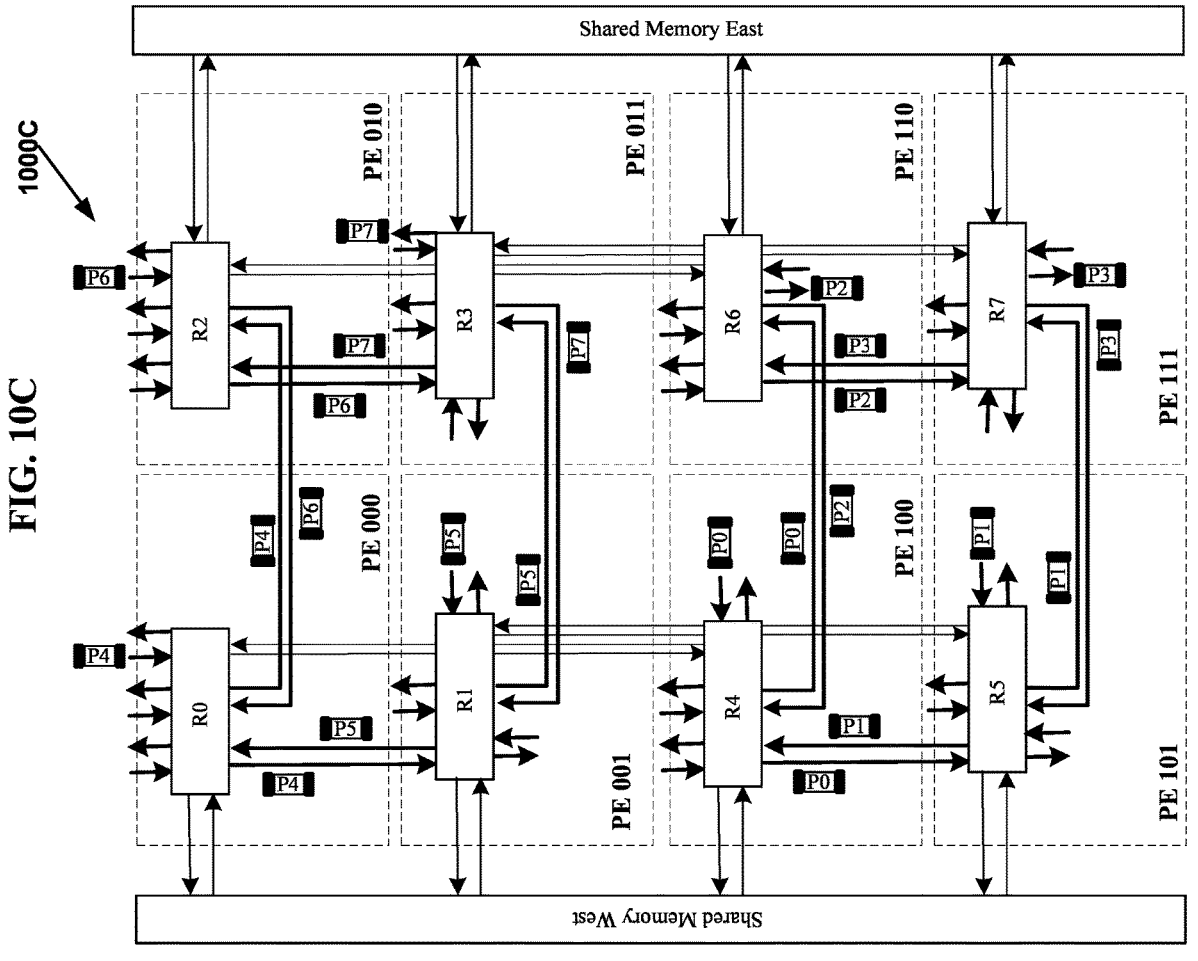
FIG. 10C is a diagram 1000C of illustration of time step 3 of deterministic concurrent broadcast by all PEs in four time steps in an exemplary 2D-BFTHypercube interconnection network with 4*2 2D-grid of PEs scalable for distributed computing system with shared memory, in accordance with the invention.
Figure 10D:
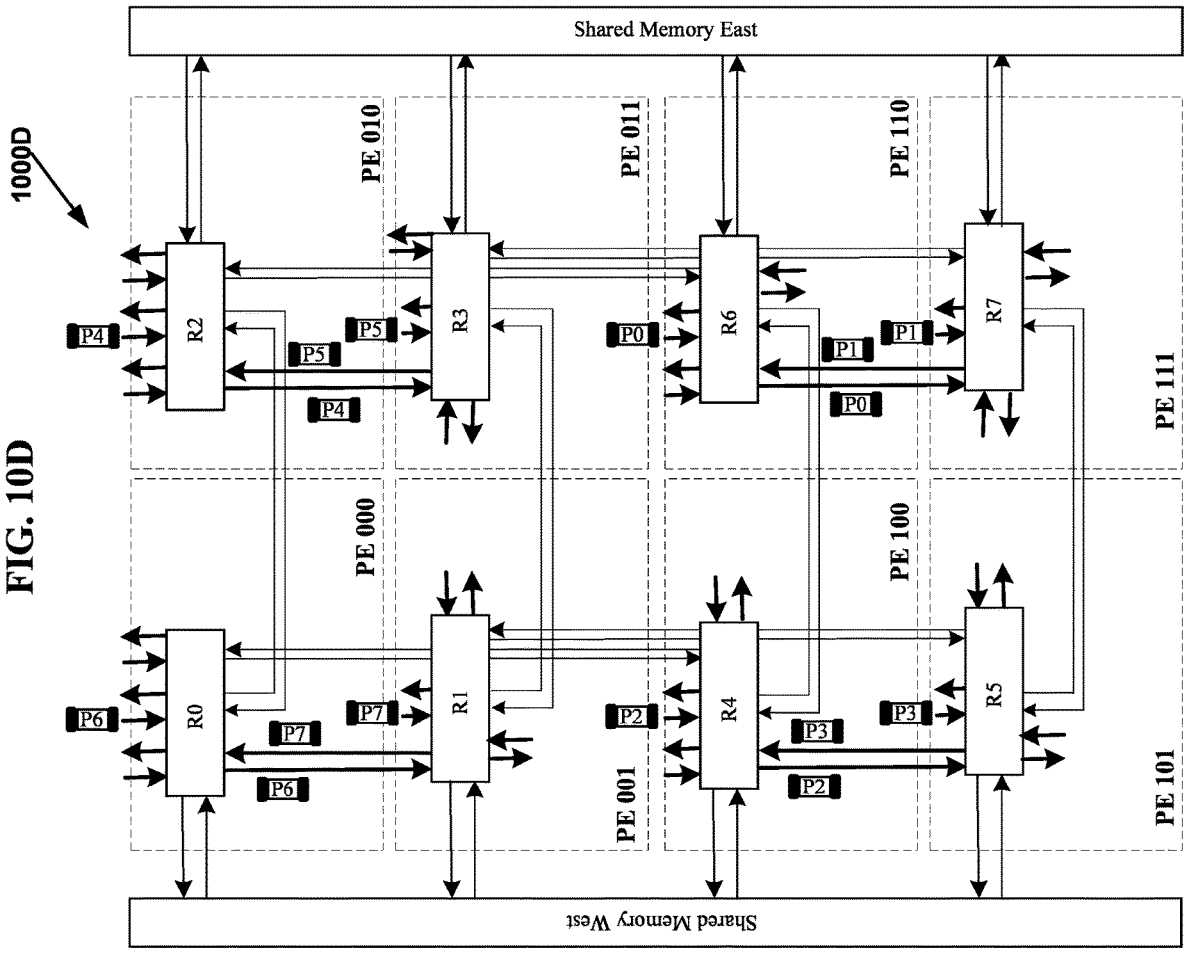
FIG. 10D is a diagram 1000D of illustration of time step 4 of deterministic concurrent broadcast by all PEs in four time steps in an exemplary 2D-BFTHypercube interconnection network with 4*2 2D-grid of PEs scalable for distributed computing system with shared memory, in accordance with the invention.

Deterministic Concurrent Broadcast by all PEs in Four Time Steps in an Exemplary 2D-BFTHypercube Interconnection Network with 4*2 2D-Grid of PEs:

Referring to diagrams 1000A of FIG. 10A, 1000B of FIG. 10B, 1000C of FIG. 10C, 1000D of FIG. 10D illustrate deterministic concurrent broadcast by all PEs in four time steps in the exemplary 2D-BFTHypercube interconnection network with 4*2 2D-grid of 8 PEs shown in diagram 500A1 of FIG. 5A1 or diagram 500A2 of FIG. 5A2 or diagram 500B1 of FIG. 5B1 or diagram 500B2 of FIG. 5B2 and diagram 500C of FIG. 5C.

PE 000 has packet P0, PE 001 has packet P1, PE 010 has packet P2, PE 011 has packet P3, PE 100 has packet P4, PE 101 has packet P5, PE 110 has packet P6, and PE 111 has packet P7 to broadcast to rest of the PEs. As shown in diagram 1000A of FIG. 10A, in time step 1, Packet P0 is multicasted with fan out 3 from PE 000 to PE 001, PE 010, and PE 100. From PE 000 to PE 001 the path is via local inlet bus I(0,0), Router R0, vertical bus V(0,1), Router R1, and local outlet bus O(1,0). From PE 000 to PE 010 the path is via local inlet bus I(0,0), Router R0, horizontal bus H(0,2), Router R2, and local outlet bus O(2,1). From PE 000 to PE 100 the path is via local inlet bus I(0,0), Router R0, vertical bus V(0,4), Router R4, and local outlet bus O(4,2).

Concurrently in time step 1, Packet P1 is multicasted with fan out 3 from PE 001 to PE 000, PE 011, and PE 101. From PE 001 to PE 000 the path is via local inlet bus I(1,0), Router R1, vertical bus V(1,0), Router R0, and local outlet bus O(0,0). From PE 001 to PE 011 the path is via local inlet bus I(1,0), Router R1, horizontal bus H(1,3), Router R3, and local outlet bus O(3,1). From PE 001 to PE 101 the path is via local inlet bus I(1,0), Router R1, vertical bus V(1,5), Router R5, and local outlet bus O(5,2).

As shown in diagram 1000A of FIG. 10A, in time step 1, Packet P2 is multicasted with fan out 3 from PE 010 to PE 011, PE 000, and PE 110. From PE 010 to PE 011 the path is via local inlet bus I(2,0), Router R2, vertical bus V(2,3), and local outlet bus O(3,0). From PE 010 to PE 000 the path is via local inlet bus I(2,0), Router R2, horizontal bus H(2,0), Router R0, and local outlet bus O(0,1). From PE 010 to PE 110 the path is via local inlet bus I(2,0), Router R2, vertical bus V(2,6), Router R6, and local outlet bus O(6,2).

Concurrently in time step 1, Packet P3 is multicasted with fan out 3 from PE 011 to PE 010, PE 001, and PE 111. From PE 011 to PE 010 the path is via local inlet bus I(3,0), Router R3, vertical bus V(3,2), Router R2, and local outlet bus O(2,0). From PE 011 to PE 001 the path is via local inlet bus I(3,0), Router R3, horizontal bus H(3,1), Router R1, and local outlet bus O(1,1). From PE 011 to PE 111 the path is via local inlet bus I(3,0), Router R3, vertical bus V(3,7), Router R7, and local outlet bus O(7,2).

As shown in diagram 1000A of FIG. 10A, in time step 1, Packet P4 is multicasted with fan out 3 from PE 100 to PE 101, PE 110, and PE 000. From PE 100 to PE 101 the path is via local inlet bus I(4,0), Router R4, vertical bus V(4,5), Router R5, and local outlet bus O(5,0). From PE 100 to PE 110 the path is via local inlet bus I(4,0), Router R4, horizontal bus H(4,6), Router R6, and local outlet bus O(6,1). From PE 100 to PE 000 the path is via local inlet bus I(4,0), Router R4, vertical bus V(4,0), Router R0, and local outlet bus O(0,2).

Concurrently in time step 1, Packet P5 is multicasted with fan out 3 from PE 101 to PE 100, PE 111, and PE 001. From PE 101 to PE 100 the path is via local inlet bus I(5,0), Router R5, vertical bus V(5,4), Router R4, and local outlet bus O(4,0). From PE 101 to PE 111 the path is via local inlet bus I(5,0), Router R5, horizontal bus H(5,7), Router R7, and local outlet bus O(7,1). From PE 101 to PE 001 the path is via local inlet bus I(5,0), Router R5, vertical bus V(5,1), Router R1, and local outlet bus O(1,2).

As shown in diagram 1000A of FIG. 10A, in time step 1, Packet P6 is multicasted with fan out 3 from PE 110 to PE 111, PE 100, and PE 010. From PE 110 to PE 111 the path is via local inlet bus I(6,0), Router R6, vertical bus V(6,7), Router R7, and local outlet bus O(7,0). From PE 110 to PE 100 the path is via local inlet bus I(6,0), Router R6, horizontal bus H(6,4), Router R4, and local outlet bus O(4,1). From PE 110 to PE 010 the path is via local inlet bus I(6,0), Router R6, vertical bus V(6,2), Router R2, and local outlet bus O(2,2).

Concurrently in time step 1, Packet P7 is multicasted with fan out 3 from PE 111 to PE 110, PE 101, and PE 011. From PE 111 to PE 110 the path is via local inlet bus I(7,0), Router R7, vertical bus V(7,6), Router R6, and local outlet bus O(6,0). From PE 111 to PE 101 the path is via local inlet bus I(7,0), Router R7, horizontal bus H(7,5), Router R5, and local outlet bus O(5,1). From PE 111 to PE 011 the path is via local inlet bus I(7,0), Router R7, vertical bus V(7,3), Router R3, and local outlet bus O(3,2).

Also in time step 1, the sixteen vertical buses namely V(0,1), V(1,0), V(2,3), V(3,2), V(4,5), V(5,4), V(6,7), V(7,6), V(0,4), V(4,0), V(1,5), V(5,1), V(2,6), V(6,2), V(3,7), and V(7,3) and the eight horizontal buses namely H(0,2), H(2,0), H(1,3), H(3,1), H(4,6), H(6,4), H(5,7) and H(7,5) are completely and concurrently utilized. To summarize in time step 1, PE 000 received packets P1 and P2; PE 001 received packets P0 and P3; PE 010 received packets P3 and P0; PE 011 received packets P2 and P1; PE 100 received packets P5 and P6; PE 101 received packets P4 and P7; PE 110 received packets P7 and P4; and PE 111 received packets P6 and P5.

As shown in diagram 1000B of FIG. 10B, in time step 2, Packet P2 is unicasted from PE 000 to PE 001. From PE 000 to PE 001 the path is via Router R0, vertical bus V(0,1), Router R1, and local outlet bus O(1,0). Concurrently in time step 2, Packet P3 is unicasted from PE 001 to PE 000. From PE 001 to PE 000 the path is via Router R1, vertical bus V(1,0), Router R0, and local outlet bus O(0,0).

Concurrently in time step 2, Packet P0 is unicasted from PE 010 to PE 011. From PE 010 to PE 011 the path is via Router R2, vertical bus V(2,3), Router R3, and local outlet bus O(3,0). Concurrently in time step 2, Packet P1 is unicasted from PE 011 to PE 010. From PE 011 to PE 010 the path is via Router R3, vertical bus V(3,2), Router R2, and local outlet bus O(2,0).

As shown in diagram 1000B of FIG. 10B, in time step 2, Packet P6 is unicasted from PE 100 to PE 101. From PE 100 to PE 101 the path is via Router R4, vertical bus V(4,5), Router R5, and local outlet bus O(5,0). Concurrently in time step 2, Packet P7 is unicasted from PE 101 to PE 100. From PE 101 to PE 100 the path is via Router R5, vertical bus V(5,4), Router R4, and local outlet bus O(4,0).

Concurrently in time step 2, Packet P4 is unicasted from PE 110 to PE 111. From PE 110 to PE 111 the path is via Router R6, vertical bus V(6,7), Router R7, and local outlet bus O(7,0). Concurrently in time step 2, Packet P5 is unicasted from PE 111 to PE 110. From PE 111 to PE 110 the path is via Router R7, vertical bus V(7,6), Router R6, and local outlet bus O(6,0).

Also in time step 2, the eight vertical buses namely V(0,1), V(1,0), V(2,3) and V(3,2), V(4,5), V(5,4), V(6,7), and V(7,6) are concurrently utilized. (Alternatively in another embodiment, instead of vertical buses, the eight horizontal buses namely H(0,2), H(2,0), H(1,3), H(3,1), H(4,6), H(6,4), H(5,7) and H(7,5) can be concurrently utilized). To summarize in time step 2, PE 000 received packet P3 and P4; PE 001 received packet P2 and P5; PE 010 received packet P1 and P6; PE 011 received packet P0 and P7; PE 100 received packet P7 and P0; PE 101 received packet P6 and P1; PE 110 received packet P5 and P2; and PE 111 received packet P4 and P3.

As shown in diagram 1000C of FIG. 10C, in time step 3, Packet P4 is multicasted with fan out 2 from PE 000 to PE 001 and PE 010. From PE 000 to PE 001 the path is via Router R0, vertical bus V(0,1), Router R1, and local outlet bus O(1,0). From PE 000 to PE 010 the path is via Router R0, horizontal bus H(0,2), Router R2, and local outlet bus O(2,1).

Concurrently in time step 3, Packet P5 is multicasted with fan out 2 from PE 001 to PE 000 and PE 011. From PE 001 to PE 000 the path is via Router R1, vertical bus V(1,0), Router R0, and local outlet bus O(0,0). From PE 001 to PE 011 the path is via Router R1, horizontal bus H(1,3), Router R3, and local outlet bus O(3,1).

As shown in diagram 1000C of FIG. 10C, in time step 3, Packet P6 is multicasted with fan out 2 from PE 010 to PE 011 and PE 000. From PE 010 to PE 011 the path is via Router R2, vertical bus V(2,3), Router R3, and local outlet bus O(3,0). From PE 010 to PE 000 the path is via Router R2, horizontal bus H(2,0), Router R0, and local outlet bus O(0,1).

Concurrently in time step 3, Packet P7 is multicasted with fan out 2 from PE 011 to PE 010 and PE 001. From PE 011 to PE 010 the path is via Router R3, vertical bus V(3,2), Router R2, and local outlet bus O(2,0). From PE 011 to PE 001 the path is via Router R3, horizontal bus H(3,1), Router R1, and local outlet bus O(1,1).

As shown in diagram 1000C of FIG. 10C, in time step 3, Packet P0 is multicasted with fan out 2 from PE 100 to PE 101 and PE 110. From PE 100 to PE 101 the path is via Router R4, vertical bus V(4,5), Router R5, and local outlet bus O(5,0). From PE 100 to PE 110 the path is via Router R4, horizontal bus H(4,6), Router R6, and local outlet bus O(6,1).

Concurrently in time step 3, Packet P1 is multicasted with fan out 2 from PE 101 to PE 100 and PE 111. From PE 101 to PE 100 the path is via Router R5, vertical bus V(5,4), Router R4, and local outlet bus O(4,0). From PE 101 to PE 111 the path is via Router R5, horizontal bus H(5,7), Router R7, and local outlet bus O(7,1).

As shown in diagram 1000C of FIG. 10C, in time step 3, Packet P2 is multicasted with fan out 2 from PE 110 to PE 111 and PE 100. From PE 110 to PE 111 the path is via Router R6, vertical bus V(6,7), Router R7, and local outlet bus O(7,0). From PE 110 to PE 100 the path is via Router R6, horizontal bus H(6,4), Router R4, and local outlet bus O(4,1).

Concurrently in time step 3, Packet P3 is multicasted with fan out 2 from PE 111 to PE 110 and PE 101. From PE 111 to PE 110 the path is via Router R7, vertical bus V(7,6), Router R6, and local outlet bus O(6,0). From PE 111 to PE 101 the path is via Router R7, horizontal bus H(7,5), Router R5, and local outlet bus O(5,1).

Also in time step 3, the eight vertical buses namely V(0,1), V(1,0), V(2,3), V(3,2), V(4,5), V(5,4), V(6,7), and V(7,6), and the eight horizontal buses namely H(0,2), H(2, 0), H(1,3), H(3,1), H(4,6), H(6,4), H(5,7) and H(7,5) are completely and concurrently utilized.

To summarize in time step 3, PE 000 received packets P5 and P6; PE 001 received packets P4 and P7; PE 010 received packets P7 and P4; PE 011 received packets P6 and P5; PE 100 received packets P1 and P2; PE 101 received packets P0 and P3; PE 110 received packets P3 and P0; PE 111 received packets P2 and P1.

As shown in diagram 1000D of FIG. 10D, in time step 4, Packet P6 is unicasted from PE 000 to PE 001. From PE 000 to PE 001 the path is via Router R0, vertical bus V(0,1), Router R1, and local outlet bus O(1,0). Concurrently in time step 4, Packet P7 is unicasted from PE 001 to PE 000. From PE 001 to PE 000 the path is via Router R1, vertical bus V(1,0), Router R0, and local outlet bus O(0,0).

Concurrently in time step 4, Packet P4 is unicasted from PE 010 to PE 011. From PE 010 to PE 011 the path is via Router R2, vertical bus V(2,3), Router R3, and local outlet bus O(3,0). Concurrently in time step 4, Packet P5 is unicasted from PE 011 to PE 010. From PE 011 to PE 010 the path is via Router R3, vertical bus V(3,2), Router R2, and local outlet bus O(2,0).

As shown in diagram 1000D of FIG. 10D, in time step 4, Packet P2 is unicasted from PE 100 to PE 101. From PE 100 to PE 101 the path is via Router R4, vertical bus V(4,5), Router R5, and local outlet bus O(5,0). Concurrently in time step 4, Packet P3 is unicasted from PE 101 to PE 100. From PE 101 to PE 100 the path is via Router R5, vertical bus V(5,4), Router R4, and local outlet bus O(4,0).

Concurrently in time step 4, Packet P0 is unicasted from PE 110 to PE 111. From PE 110 to PE 111 the path is via Router R6, vertical bus V(6,7), Router R7, and local outlet bus O(7,0). Concurrently in time step 4, Packet P1 is unicasted from PE 111 to PE 110. From PE 111 to PE 110 the path is via Router R7, vertical bus V(7,6), Router R6, and local outlet bus O(6,0).

Also in time step 4, the eight vertical buses namely V(0,1), V(1,0), V(2,3) and V(3,2), V(4,5), V(5,4), V(6,7), and V(7,6) are concurrently utilized. (Alternatively in another embodiment, instead of vertical buses, the eight horizontal buses namely H(0,2), H(2,0), H(1,3), H(3,1), H(4,6), H(6,4), H(5,7) and H(7,5) can be concurrently utilized). To summarize in time step 4, PE 000 received packet P7; PE 001 received packet P6; PE 010 received packet P5; PE 011 received packet P4; PE 100 received packet P3; PE 101 received packet P2; PE 110 received packet P1; and PE 111 received packet P0.

In general, with a×b processing elements arranged in two dimensional grid according to the current invention, in the path of a packet from a source processing element to a target processing element there will be one or more intermediate processing elements unless source processing element and target processing element are directly connected to each other by a vertical bus or horizontal bus. Applicant notes that, for example, in diagram 1000A of FIG. 10A, diagram 1000B of FIG. 10B, diagram 1000C of FIG. 1C and diagram 1000D of FIG. 10D, for example in the path of Packet P0 from PE 000 to PE 111, packet P0 traverses from PE 000 to PE 100 to PE 110 to PE 111. In this example, in the path for packet P0, PE 000 is the source processing element; PE 111 is the target processing element; And PE 100 and PE 110 are intermediate processing elements.

So, in the 2D-BFTHypercube interconnection network with 4*2 2D-grid of PEs shown in diagram 1000A of FIG. 10A, diagram 1000B of FIG. 10B, diagram 1000C of FIG. 1C and diagram 1000D of FIG. 10D, for concurrent broadcast by each of the eight PEs to transmit a packet to all the rest of the PEs, it takes four time steps. A time step is certain time duration determined by the length of the packet, the length of the bus, the number of wires in the local inlet buses, local outlet buses and vertical buses, the number of wires in the horizontal buses, the implemented non-transitory medium of each bus and clock speed of operation. Since the interconnection network is non-blocking, as illustrated in diagram 1000A of FIG. 10A, diagram 1000B of FIG. 10B, diagram 1000C of FIG. 1C and diagram 1000D of FIG. 10D, no queuing of packets is needed, and no collisions will occur.

Also, the sixteen vertical buses and the eight horizontal buses are completely and concurrently utilized in time step 1. In time step 2, only eight vertical buses are needed. Only eight vertical buses and eight horizontal buses are concurrently needed in time step 3. In time step 4, only eight vertical buses are needed.

To broadcast "n" number of packets, where n is positive number, by each PE to the rest of the PEs, it requires 4*n number of time steps in the exemplary 2D-BFTHypercube interconnection network with 4*2 2D-grid of 8 PEs shown in diagram 500A of FIG. 5A and diagram 500B of FIG. 5B.

In one embodiment, applicant notes that all "n" packets from PE 0 will be transmitted to PE 1 in the same fixed path as packet P0 as illustrated in diagram 1000A of FIG. 10A, diagram 1000B of FIG. 10B, diagram 1000C of FIG. 1C and diagram 1000D of FIG. 10D; All "n" packets from PE 0 will be transmitted to PE 2 in the same fixed path as packet P0 as illustrated in diagram 1000A of FIG. 10A, diagram 1000B of FIG. 10B, diagram 1000C of FIG. 1C and diagram 1000D of FIG. 10D; All "n" packets from PE 0 will be transmitted to PE 3 in the same fixed path as packet P0 as illustrated in diagram 1000A of FIG. 10A, diagram 1000B of FIG. 10B, diagram 1000C of FIG. 1C and diagram 1000D of FIG. 10D; All "n" packets from PE 0 will be transmitted to PE 4 in the same fixed path as packet P0 as illustrated in diagram 1000A of FIG. 10A, diagram 1000B of FIG. 10B, diagram 1000C of FIG. 1C and diagram 1000D of FIG. 10D; All "n" packets from PE 0 will be transmitted to PE 5 in the same fixed path as packet P0 as illustrated in diagram 1000A of FIG. 10A, diagram 1000B of FIG. 10B, diagram 1000C of FIG. 1C and diagram 1000D of FIG. 10D; All "n" packets from PE 0 will be transmitted to PE 6 in the same fixed path as packet P0 as illustrated in diagram 1000A of FIG. 10A, diagram 1000B of FIG. 10B, diagram 1000C of FIG. 1C and diagram 1000D of FIG. 10D; And all "n" packets from PE 0 will be transmitted to PE 7 in the same fixed path as packet P0 as illustrated in diagram 1000A of FIG. 10A, diagram 1000B of FIG. 10B, diagram 1000C of FIG. 1C and diagram 1000D of FIG. 10D.

Similarly all "n" packets from PE 1 will be transmitted to PE 0, PE 2, PE 3, PE 4, PE 5, PE 6 and PE 7 in the same path as packet P1 as illustrated in diagram 1000A of FIG. 10A, diagram 1000B of FIG. 10B, diagram 1000C of FIG. 1C and diagram 1000D of FIG. 10D; All "n" packets from PE 2 will be transmitted to PE 0, PE 1, PE 3, PE 4, PE 5, PE 6 and PE 7 in the same path as packet P2 as illustrated in diagram 1000A of FIG. 10A, diagram 1000B of FIG. 10B, diagram 1000C of FIG. 1C and diagram 1000D of FIG. 10D; All "n" packets from PE 3 will be transmitted to PE 0, PE 1, PE 2, PE 4, PE 5, PE 6 and PE 7 in the same path as packet P3 as illustrated in diagram 1000A of FIG. 10A, diagram 1000B of FIG. 10B, diagram 1000C of FIG. 1C and diagram 1000D of FIG. 10D; All "n" packets from PE 4 will be transmitted to PE 0, PE 1, PE 2, PE 3, PE 5, PE 6 and PE 7 in the same path as packet P4 as illustrated in diagram 1000A of FIG. 10A, diagram 1000B of FIG. 10B, diagram 1000C of FIG. 1C and diagram 1000D of FIG. 10D; All "n" packets from PE 5 will be transmitted to PE 0, PE 1, PE 2, PE 3, PE 4, PE 6 and PE 7 in the same path as packet P5 as illustrated in diagram 1000A of FIG. 10A, diagram 1000B of FIG. 10B, diagram 1000C of FIG. 1C and diagram 1000D of FIG. 10D; All "n" packets from PE 6 will be transmitted to PE 0, PE 1, PE 2, PE 3, PE 4, PE 5 and PE 7 in the same path as packet P6 as illustrated in diagram 1000A of FIG. 10A, diagram 1000B of FIG. 10B, diagram 1000C of FIG. 1C and diagram 1000D of FIG. 10D; And all "n" packets from PE 7 will be transmitted to PE 0, PE 1, PE 2, PE 3, PE 4, PE 5 and PE 6 in the same path as packet P7 as illustrated in diagram 1000A of FIG. 10A, diagram 1000B of FIG. 10B, diagram 1000C of FIG. 1C and diagram 1000D of FIG. 10D;

Applicant also notes that "n" number of packets from each PE will reach the rest of PEs in the order they are transmitted as they are transmitted in the same fixed path. For example "n" number of packets from PE 0 will reach PE 1, PE 2, PE 3, PE 4, PE 5, PE 6 and PE 7 in the order they are transmitted as they are transmitted in the same fixed path as packet P0 as illustrated in diagram 1000A of FIG. 10A, diagram 1000B of FIG. 10B, diagram 1000C of FIG. 1C and diagram 1000D of FIG. 10D. Accordingly, concurrent broadcast "n" number of packets from each PE to the rest of PEs, as shown in the exemplary 2D-BFTHypercube interconnection network with 4*2 2D-grid of 8 PEs in diagram 500A of FIG. 5A and diagram 500B of FIG. 5B, it requires "4*n" number of time steps and no out of order arrival of packets occurs.

Applicant also notes that in each PE packets arrive in different order as can be observed in the foregoing disclosure, particularly in diagram 900A of FIG. 9A, diagram 900B of FIG. 9B, diagram 1000A of FIG. 10A, diagram

1000B of FIG. 10B, diagram 1000C of FIG. 1C and diagram 1000D of FIG. 10D. So, each processor will be enabled to execute the instructions in the order of the arrival of packets in each PE, which means processor in each PE is based on dataflow architecture. For example PE 000 in the 2D-BFT-Hypercube interconnection network of diagram 1000A of FIG. 10A, diagram 1000B of FIG. 10B, diagram 1000C of FIG. 1C and diagram 1000D of FIG. 10D, executes instructions requiring P1, P2, P4, P3, P5, P6, and P7 in that order whereas example PE 001 executes instructions requiring P0, P3, P5, P2, P4, P7, and P6 in that order and so both PEs execute the data in different order which is dataflow architecture. Applicant notes that each time step is not the same duration as other time steps as a time duration of a time step is determined by the length of the packet, the length of the bus, the number of wires in the local inlet buses, local outlet buses and vertical buses, the number of wires in the horizontal buses, the implemented non-transitory medium of each bus and clock speed of operation. However, the packet received sooner is transmitted through the interconnection network so that time steps are interleaved without changing the order of transmission of the packets, according to the current invention.

Figure 11A:
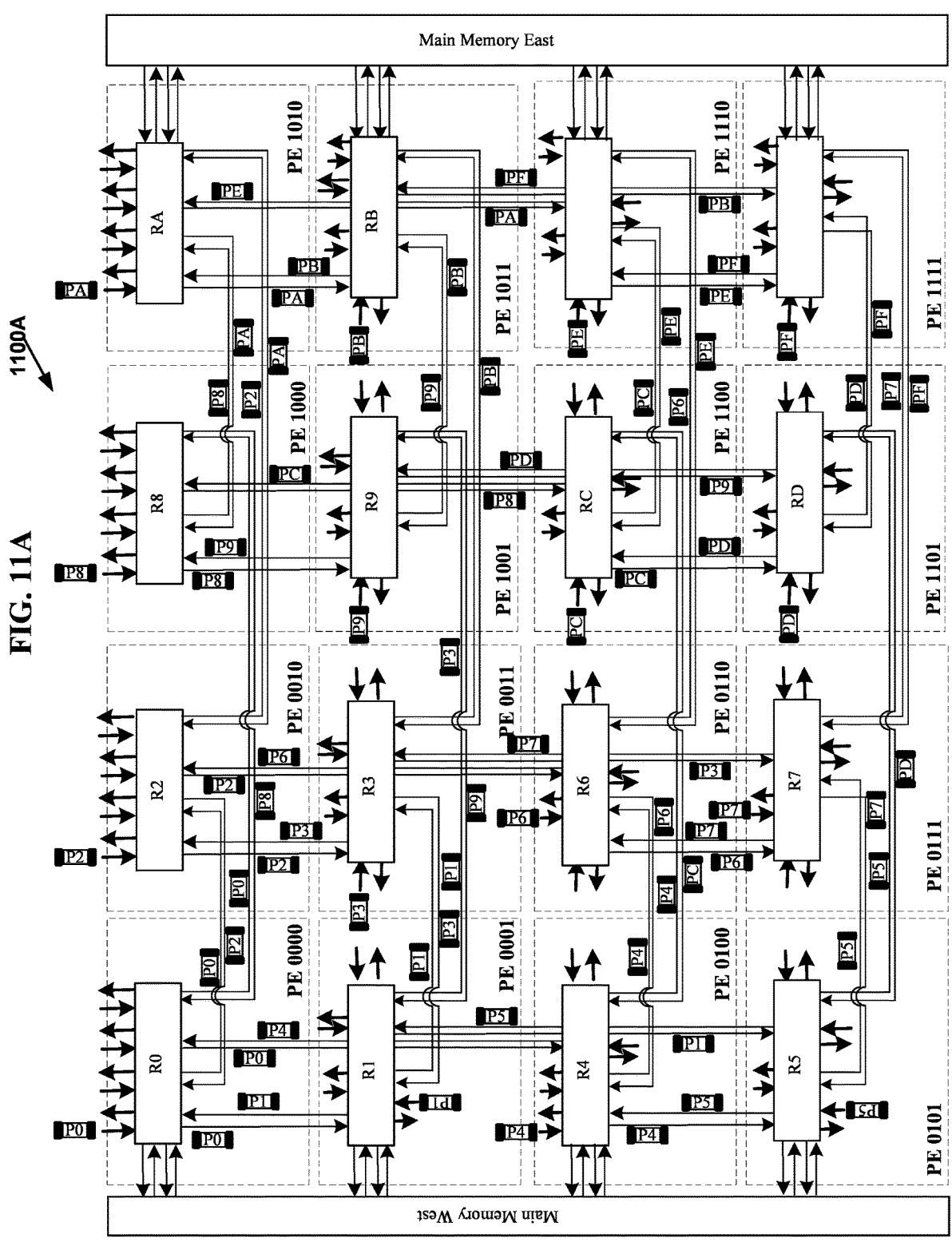
FIG. 11A is a diagram 1100A of illustration of time step 1 of deterministic concurrent broadcast by all PEs in six time steps in an exemplary 2D-BFTHypercube interconnection network with 4*4 2D-grid of PEs scalable for distributed computing system with shared memory, in accordance with the invention.
Figure 11B:
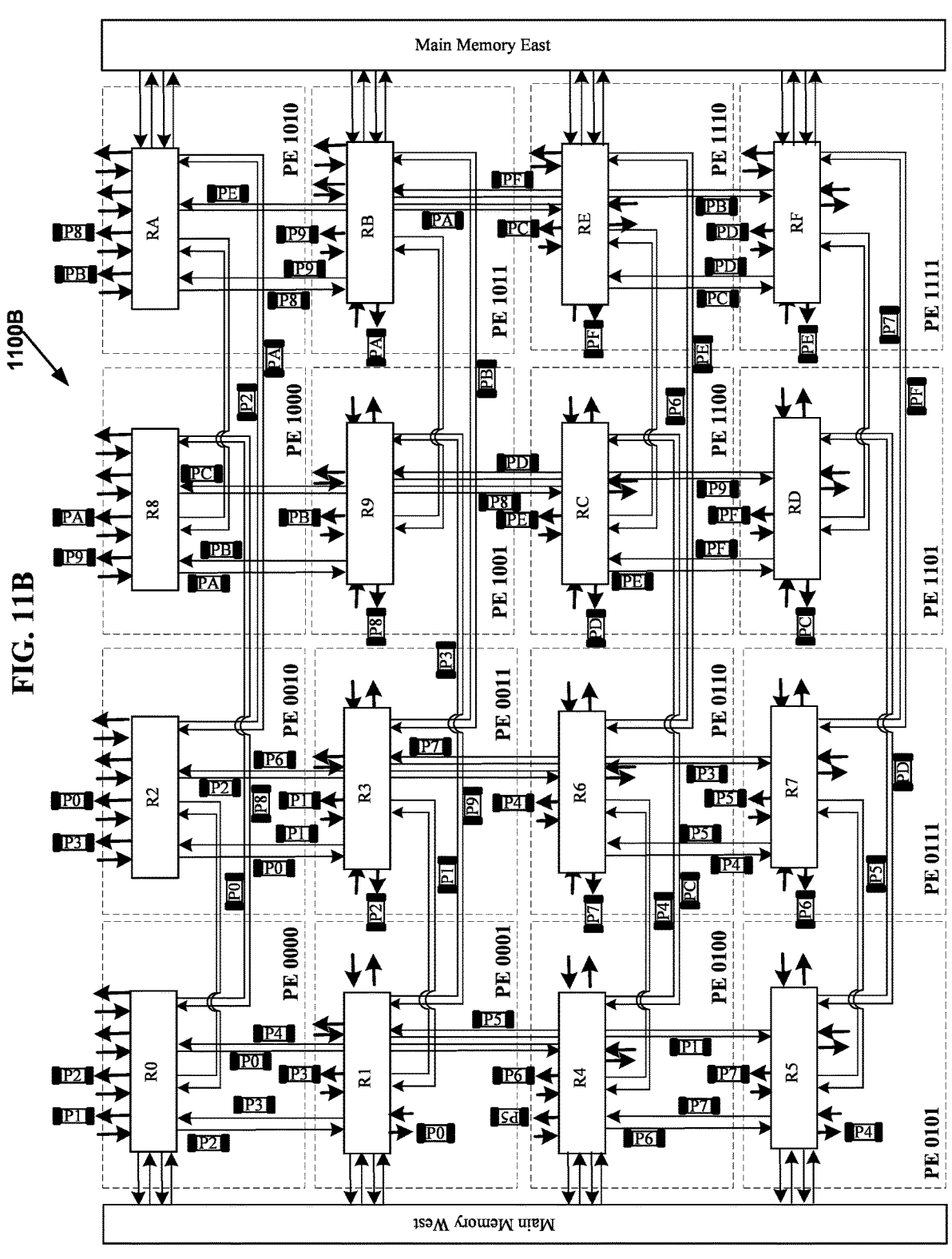
FIG. 11B is a diagram 1100B of illustration of time step 2 of deterministic concurrent broadcast by all PEs in six time steps in an exemplary 2D-BFTHypercube interconnection network with 4*4 2D-grid of PEs scalable for distributed computing system with shared memory, in accordance with the invention.
Figure 11C:
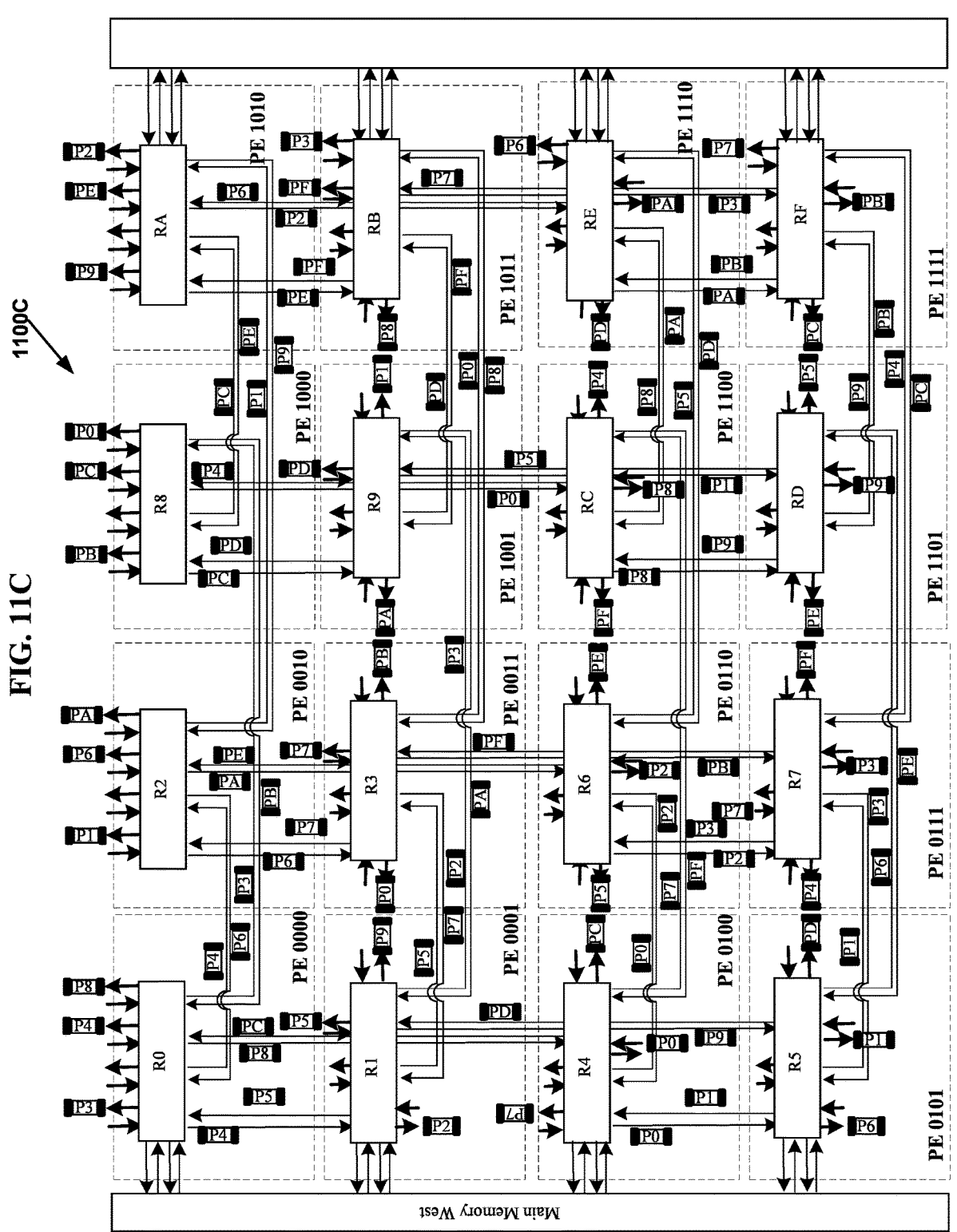
FIG. 11C is a diagram 1100C of illustration of time step 3 of deterministic concurrent broadcast by all PEs in six time steps in an exemplary 2D-BFTHypercube interconnection network with 4*4 2D-grid of PEs scalable for distributed computing system with shared memory, in accordance with the invention.
Figure 11D:
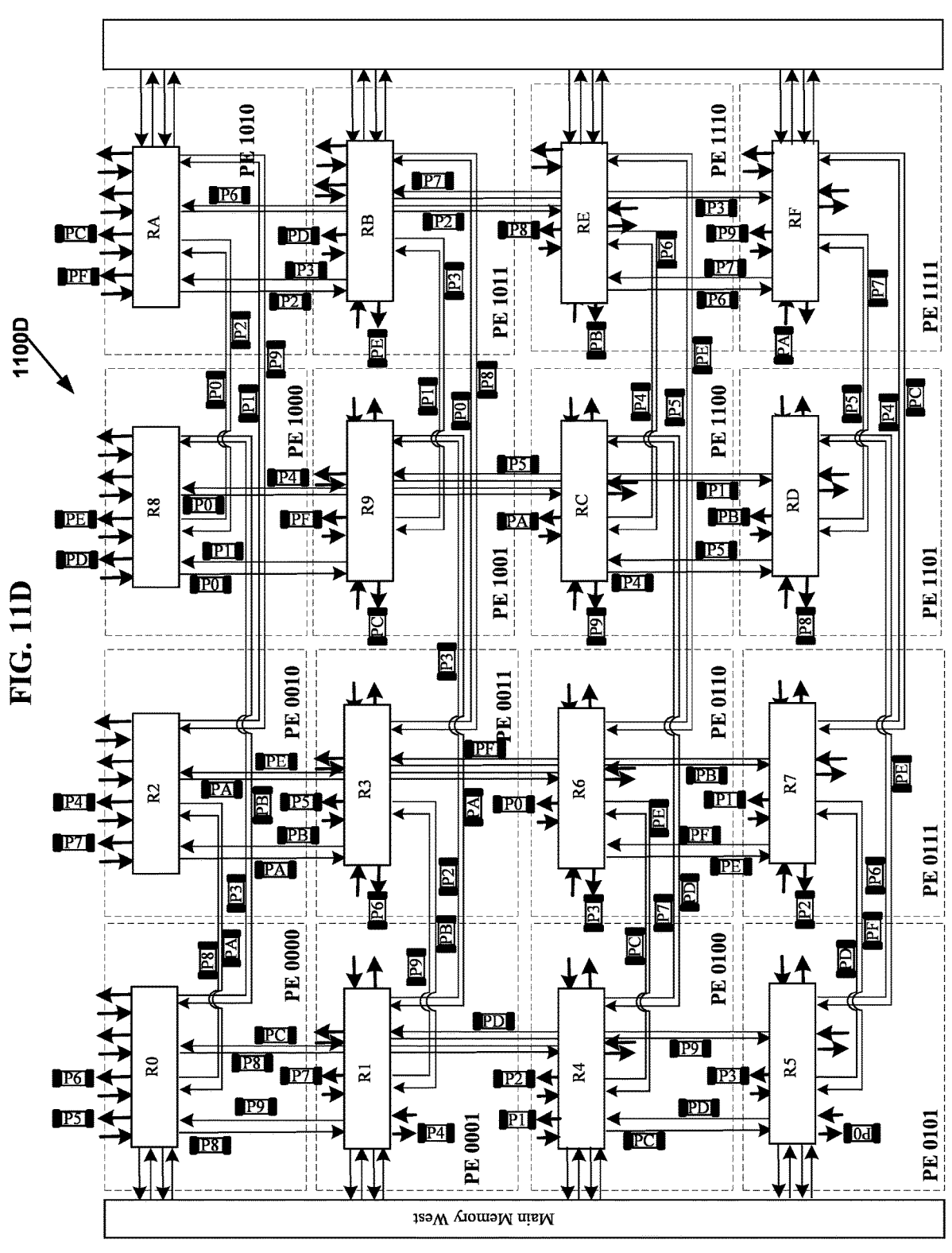
FIG. 11D is a diagram 1100D of illustration of time step 4 of deterministic concurrent broadcast by all PEs in six time steps in an exemplary 2D-BFTHypercube interconnection network with 4*4 2D-grid of PEs scalable for distributed computing system with shared memory, in accordance with the invention.
Figure 11E:
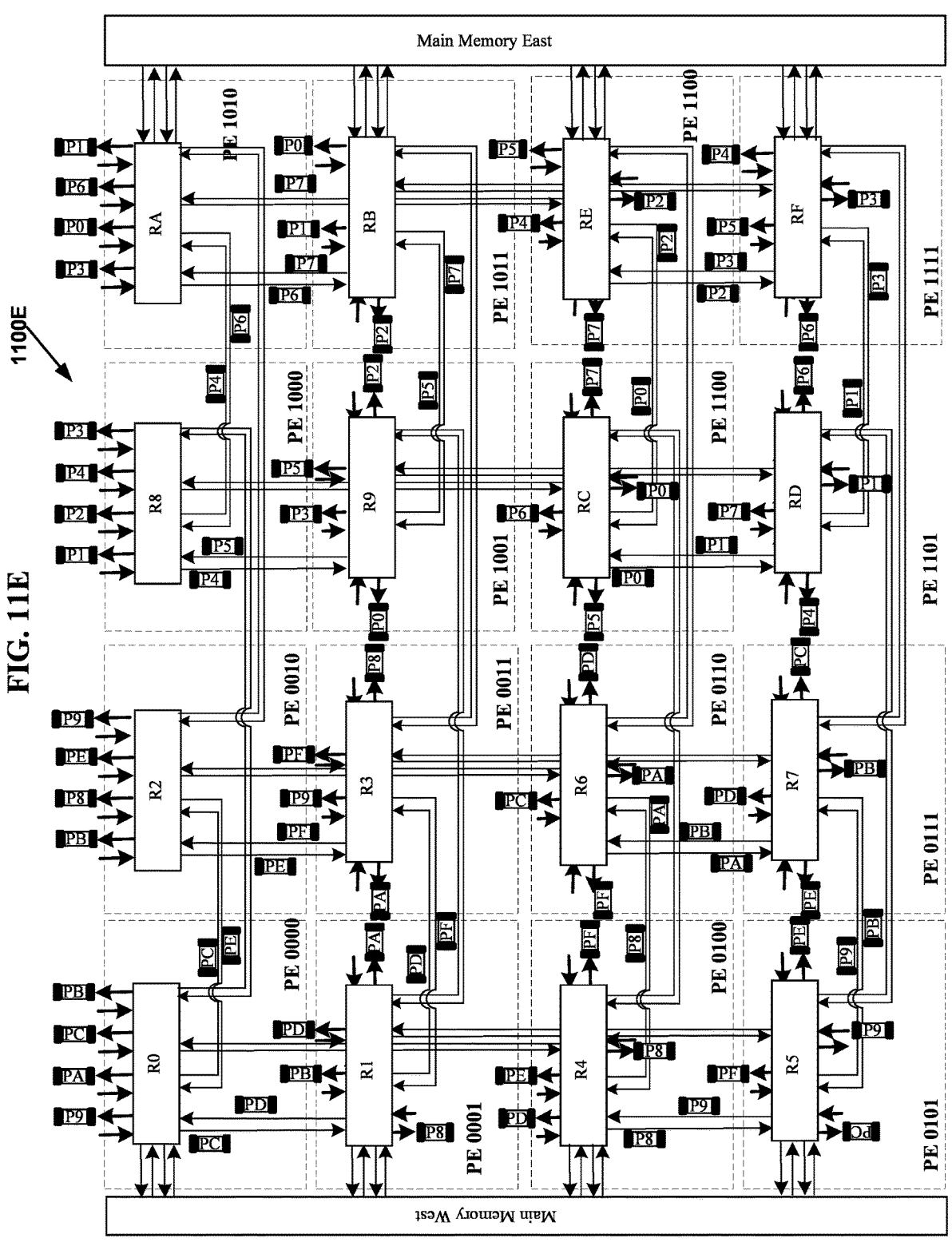
FIG. 11E is a diagram 1100E of illustration of time step 5 of deterministic concurrent broadcast by all PEs in six time steps in an exemplary 2D-BFTHypercube interconnection network with 4*4 2D-grid of PEs scalable for distributed computing system with shared memory, in accordance with the invention.
Figure 11F:
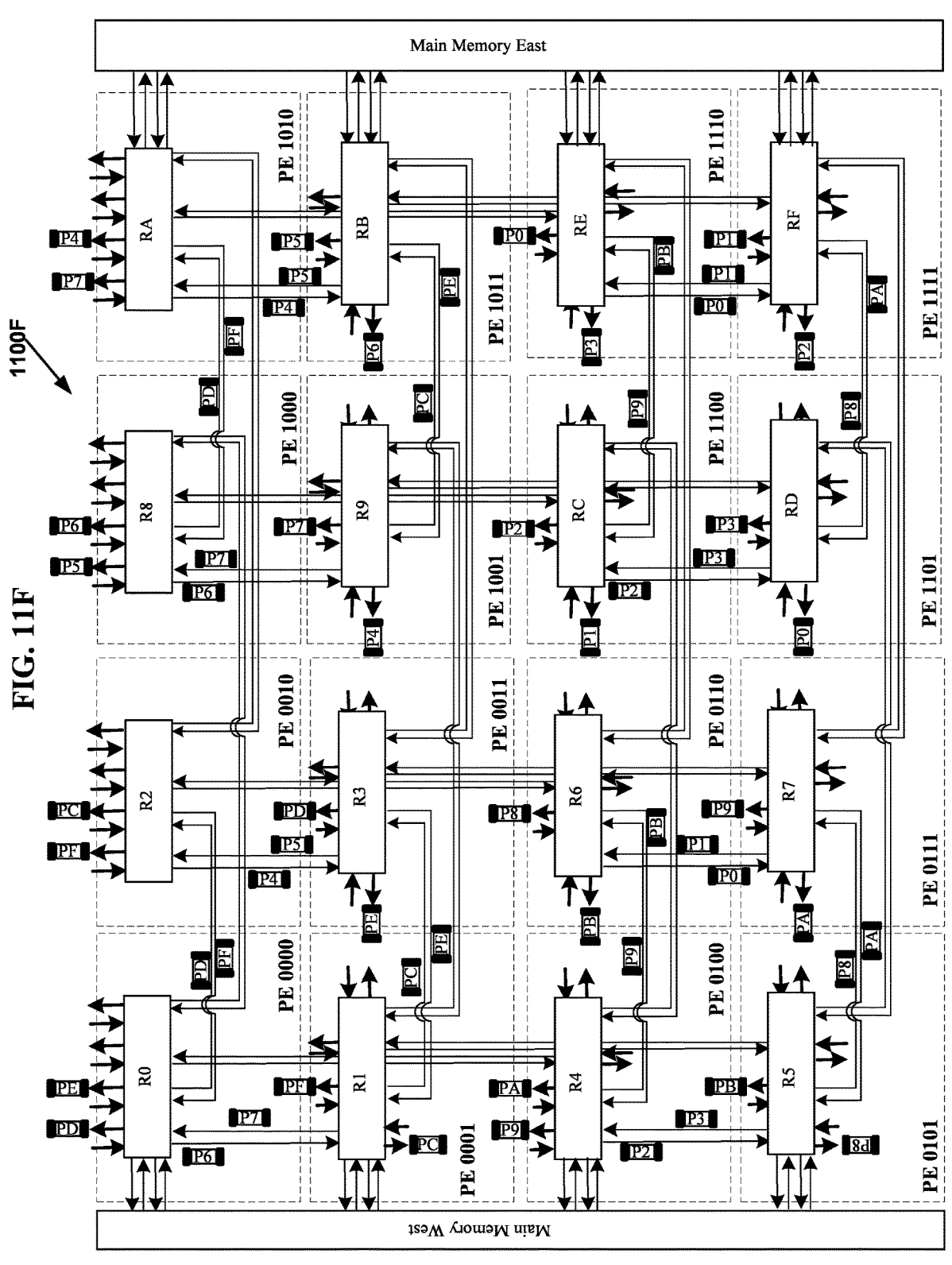
FIG. 11F is a diagram 1100F of illustration of time step 6 of deterministic concurrent broadcast by all PEs in six time steps in an exemplary 2D-BFTHypercube interconnection network with 4*4 2D-grid of PEs scalable for distributed computing system with shared memory, in accordance with the invention.

Deterministic Concurrent Broadcast by all PEs in Six Time Steps in an Exemplary 2D-BFTHypercube Interconnection Network with 4*4 2D-Grid of PEs:

Referring to diagrams 1100A of FIG. 11A, 1100B of FIG. 11B, 1100C of FIG. 11C, 1100D of FIG. 11D, 1100E of FIG. 11E, and 1100F of FIG. 11F illustrate deterministic concurrent broadcast by all PEs in six time steps in the exemplary 2D-BFTHypercube interconnection network with 4*4 2D-grid of 16 PEs shown in diagram 100A1 of FIG. 1A1 or diagram 100A2 of FIG. 1A2 and diagram 100C of FIG. 1C.

PE 0000 has packet P0, PE 0001 has packet P1, PE 0010 has packet P2, PE 0011 has packet P3, PE 0100 has packet P4, PE 0101 has packet P5, PE 0110 has packet P6, PE 0111 has packet P7, PE 1000 has packet P8, PE 1001 has packet P9, PE 1010 has packet P10 or PA, PE 1011 has packet P11 or PB, PE 1100 has packet P12 or PC, PE 1101 has packet P13 or PD, PE 1110 has packet P14 or PE, and PE 1111 has packet P15 or PF to broadcast to rest of the PEs. As shown in diagram 1100A of FIG. 11A, in time step 1, Packet P0 is multicasted with fan out 4 from PE 0000 to PE 0001, PE 0010, PE 0100 and PE 1000. From PE 0000 to PE 0001 the path is via local inlet bus I(0,0), Router R0, vertical bus V(0,1), Router R1, and local outlet bus O(1,0). From PE 0000 to PE 0010 the path is via local inlet bus I(0,0), Router R0, horizontal bus H(0,2), Router R2, and local outlet bus O(2,1). From PE 0000 to PE 0100 the path is via local inlet bus I(0,0), Router R0, vertical bus V(0,4), Router R4, and local outlet bus O(4,2). From PE 0000 to PE 1000 the path is via local inlet bus I(0,0), Router R0, horizontal bus V(0,8), Router R8, and local outlet bus O(8,3).

Concurrently in time step 1, Packet P1 is multicasted with fan out 4 from PE 0001 to PE 0000, PE 0011, PE 0101 and PE 1001. From PE 0001 to PE 0000 the path is via local inlet bus I(1,0), Router R1, vertical bus V(1,0), Router R0, and local outlet bus O(0,0). From PE 0001 to PE 0011 the path is via local inlet bus I(1,0), Router R1, horizontal bus H(1,3), Router R3, and local outlet bus O(3,1). From PE 0001 to PE 0101 the path is via local inlet bus I(1,0), Router R1, vertical bus V(1,5), Router R5, and local outlet bus O(5,2). From PE 0001 to PE 1001 the path is via local inlet bus I(1,0), Router R1, horizontal bus V(1,9), Router R9, and local outlet bus O(9,3).

As shown in diagram 1100A of FIG. 11A, in time step 1, Packet P2 is multicasted with fan out 4 from PE 0010 to PE

0011, PE 0000, PE 0110 and PE 1010. From PE 0010 to PE 0011 the path is via local inlet bus I(2,0), Router R2, vertical bus V(2,3), and local outlet bus O(3,0). From PE 0010 to PE 0000 the path is via local inlet bus I(2,0), Router R2, horizontal bus H(2,0), Router R0, and local outlet bus O(0,1). From PE 0010 to PE 0110 the path is via local inlet bus I(2,0), Router R2, vertical bus V(2,6), Router R6, and local outlet bus O(6,2). From PE 0010 to PE 1010 the path is via local inlet bus I(2,0), Router R2, horizontal bus V(2,A), Router RA, and local outlet bus O(A,3).

Concurrently in time step 1, Packet P3 is multicasted with fan out 4 from PE 0011 to PE 0010, PE 0001, PE 0111 and PE 1011. From PE 0011 to PE 0010 the path is via local inlet bus I(3,0), Router R3, vertical bus V(3,2), Router R2, and local outlet bus O(2,0). From PE 0011 to PE 0001 the path is via local inlet bus I(3,0), Router R3, horizontal bus H(3,1), Router R1, and local outlet bus O(1,1). From PE 0011 to PE 0111 the path is via local inlet bus I(3,0), Router R3, vertical bus V(3,7), Router R7, and local outlet bus O(7,2). From PE 0011 to PE 1011 the path is via local inlet bus I(3,0), Router R3, horizontal bus V(3,B), Router RB, and local outlet bus O(B,3).

As shown in diagram 1100A of FIG. 11A, in time step 1, Packet P4 is multicasted with fan out 4 from PE 0100 to PE 0101, PE 0110, PE 0000 and PE 1100. From PE 0100 to PE 0101 the path is via local inlet bus I(4,0), Router R4, vertical bus V(4,5), Router R5, and local outlet bus O(5,0). From PE 0100 to PE 0110 the path is via local inlet bus I(4,0), Router R4, horizontal bus H(4,6), Router R6, and local outlet bus O(6,1). From PE 0100 to PE 0000 the path is via local inlet bus I(4,0), Router R4, vertical bus V(4,0), Router R0, and local outlet bus O(0,2). From PE 0100 to PE 1100 the path is via local inlet bus I(4,0), Router R4, horizontal bus V(4,C), Router RC, and local outlet bus O(C,3).

Concurrently in time step 1, Packet P5 is multicasted with fan out 4 from PE 0101 to PE 0100, PE 0111, PE 0001 and PE 1101. From PE 0101 to PE 0100 the path is via local inlet bus I(5,0), Router R5, vertical bus V(5,4), Router R4, and local outlet bus O(4,0). From PE 0101 to PE 0111 the path is via local inlet bus I(5,0), Router R5, horizontal bus H(5,7), Router R7, and local outlet bus O(7,1). From PE 0101 to PE 0001 the path is via local inlet bus I(5,0), Router R5, vertical bus V(5,1), Router R1, and local outlet bus O(1,2). From PE 0101 to PE 1101 the path is via local inlet bus I(5,0), Router R5, horizontal bus V(5,D), Router RD, and local outlet bus O(D,3).

As shown in diagram 1100A of FIG. 11A, in time step 1, Packet P6 is multicasted with fan out 4 from PE 0110 to PE 0111, PE 0100, PE 0010 and PE 1110. From PE 0110 to PE 0111 the path is via local inlet bus I(6,0), Router R6, vertical bus V(6,7), Router R7, and local outlet bus O(7,0). From PE 0110 to PE 0100 the path is via local inlet bus I(6,0), Router R6, horizontal bus H(6,4), Router R4, and local outlet bus O(4,1). From PE 0110 to PE 0010 the path is via local inlet bus I(6,0), Router R6, vertical bus V(6,2), Router R2, and local outlet bus O(2,2). From PE 0110 to PE 1110 the path is via local inlet bus I(6,0), Router R6, horizontal bus V(6,C), Router RC, and local outlet bus O(C,3).

Concurrently in time step 1, Packet P7 is multicasted with fan out 4 from PE 0111 to PE 0110, PE 0101, PE 0011 and PE 1111. From PE 0111 to PE 0110 the path is via local inlet bus I(7,0), Router R7, vertical bus V(7,6), Router R6, and local outlet bus O(6,0). From PE 0111 to PE 0101 the path is via local inlet bus I(7,0), Router R7, horizontal bus H(7,5), Router R5, and local outlet bus O(5,1). From PE 0111 to PE 0011 the path is via local inlet bus I(7,0), Router R7, vertical bus V(7,3), Router R3, and local outlet bus O(3,2). From PE

0111 to PE 1111 the path is via local inlet bus I(7,0), Router R7, horizontal bus V(7,F), Router RF, and local outlet bus O(F,3).

As shown in diagram 1100A of FIG. 11A, in time step 1, Packet P8 is multicasted with fan out 4 from PE 1000 to PE 1001, PE 1010, PE 1100 and PE 0000. From PE 1000 to PE 1001 the path is via local inlet bus I(8,0), Router R8, vertical bus V(8,9), Router R9, and local outlet bus O(9,0). From PE 1000 to PE 1010 the path is via local inlet bus I(8,0), Router R8, horizontal bus H(8,A), Router RA, and local outlet bus O(A,1). From PE 1000 to PE 1100 the path is via local inlet bus I(8,0), Router R8, vertical bus V(8,C), Router RC, and local outlet bus O(C,2). From PE 1000 to PE 0000 the path is via local inlet bus I(8,0), Router R8, horizontal bus V(8,0), Router R0, and local outlet bus O(0,3).

Concurrently in time step 1, Packet P9 is multicasted with fan out 4 from PE 1001 to PE 1000, PE 1011, PE 1101 and PE 0001. From PE 1001 to PE 1000 the path is via local inlet bus I(9,0), Router R9, vertical bus V(9,8), Router R8, and local outlet bus O(8,0). From PE 1001 to PE 1011 the path is via local inlet bus I(9,8), Router R9, horizontal bus H(9,B), Router RB, and local outlet bus O(B,1). From PE 1001 to PE 1101 the path is via local inlet bus I(9,0), Router R9, vertical bus V(9,D), Router RD, and local outlet bus O(D,2). From PE 1001 to PE 0001 the path is via local inlet bus I(9,0), Router R9, horizontal bus V(9,1), Router R1, and local outlet bus O(1,3).

As shown in diagram 1100A of FIG. 11A, in time step 1, Packet PA is multicasted with fan out 4 from PE 1010 to PE 1011, PE 1000, PE 1110 and PE 0010. From PE 1010 to PE 1011 the path is via local inlet bus I(A,0), Router RA, vertical bus V(A,B), and local outlet bus O(A,0). From PE 1010 to PE 1000 the path is via local inlet bus I(A,0), Router RA, horizontal bus H(A,8), Router R8, and local outlet bus O(8,1). From PE 1010 to PE 1110 the path is via local inlet bus I(A,0), Router RA, vertical bus V(A,E), Router RE, and local outlet bus O(E,2). From PE 1010 to PE 0010 the path is via local inlet bus I(A,0), Router RA, horizontal bus V(A,2), Router R2, and local outlet bus O(2,3).

Concurrently in time step 1, Packet PB is multicasted with fan out 4 from PE 1011 to PE 1010, PE 1001, PE 1111 and PE 0011. From PE 1011 to PE 1010 the path is via local inlet bus I(B,0), Router RB, vertical bus V(B,A), Router RA, and local outlet bus O(A,0). From PE 1011 to PE 1001 the path is via local inlet bus I(B,0), Router RB, horizontal bus H(B,9), Router R9, and local outlet bus O(9,1). From PE 1011 to PE 1111 the path is via local inlet bus I(B,0), Router RB, vertical bus V(B,F), Router RF, and local outlet bus O(F,2). From PE 1011 to PE 0011 the path is via local inlet bus I(B,0), Router RB, horizontal bus V(B,3), Router R3, and local outlet bus O(3,3).

As shown in diagram 1100A of FIG. 11A, in time step 1, Packet PC is multicasted with fan out 4 from PE 1100 to PE 1101, PE 1110, PE 1000 and PE 0100. From PE 1100 to PE 1101 the path is via local inlet bus I(C,0), Router RC, vertical bus V(C,D), Router RD, and local outlet bus O(D,0). From PE 1100 to PE 1110 the path is via local inlet bus I(C,0), Router RC, horizontal bus H(C,E), Router RE, and local outlet bus O(E,1). From PE 1100 to PE 1000 the path is via local inlet bus I(C,0), Router RC, vertical bus V(C,8), Router R8, and local outlet bus O(8,2). From PE 1100 to PE 0100 the path is via local inlet bus I(C,0), Router RC, horizontal bus V(C,4), Router R4, and local outlet bus O(4,3).

Concurrently in time step 1, Packet PD is multicasted with fan out 4 from PE 1101 to PE 1100, PE 1111, PE 1001 and PE 0101. From PE 1101 to PE 1100 the path is via local inlet bus I(D,0), Router RD, vertical bus V(D,C), Router RC, and local outlet bus O(C,0). From PE 1101 to PE 1111 the path is via local inlet bus I(D,0), Router RD, horizontal bus H(D,F), Router RF, and local outlet bus O(F,1). From PE 1101 to PE 1001 the path is via local inlet bus I(D,0), Router RD, vertical bus V(D,9), Router R9, and local outlet bus O(9,2). From PE 1101 to PE 0101 the path is via local inlet bus I(D,0), Router RD, horizontal bus V(D,5), Router R5, and local outlet bus O(5,3).

As shown in diagram 1100A of FIG. 11A, in time step 1, Packet PE is multicasted with fan out 4 from PE 1110 to PE 1111, PE 1100, PE 1010 and PE 0101. From PE 1110 to PE 1111 the path is via local inlet bus I(E,0), Router RE, vertical bus V(E,F), Router RF, and local outlet bus O(F,0). From PE 1110 to PE 1100 the path is via local inlet bus I(E,0), Router RE, horizontal bus H(E,C), Router RC, and local outlet bus O(C,1). From PE 1110 to PE 1010 the path is via local inlet bus I(E,0), Router RE, vertical bus V(E,A), Router RA, and local outlet bus O(A,2). From PE 1110 to PE 0110 the path is via local inlet bus I(E,0), Router RE, horizontal bus V(E,6), Router R6, and local outlet bus O(6,3).

Concurrently in time step 1, Packet PF is multicasted with fan out 4 from PE 1111 to PE 1110, PE 1101, PE 1011 and PE 0111. From PE 1111 to PE 1110 the path is via local inlet bus I(F,0), Router RF, vertical bus V(F,E), Router RE, and local outlet bus O(E,0). From PE 1111 to PE 1101 the path is via local inlet bus I(F,0), Router RF, horizontal bus H(F,D), Router RD, and local outlet bus O(F,1). From PE 1111 to PE 1011 the path is via local inlet bus I(F,0), Router RF, vertical bus V(F,B), Router RB, and local outlet bus O(B,2). From PE 1111 to PE 0111 the path is via local inlet bus I(F,0), Router RF, horizontal bus V(F,7), Router R7, and local outlet bus O(7,3).

Also in time step 1, the thirty two vertical buses namely V(0,1), V(1,0), V(2,3), V(3,2), V(4,5), V(5,4), V(6,7), V(7,6), V(0,4), V(4,0), V(1,5), V(5,1), V(2,6), V(6,2), V(3,7), V(7,3), V(8,9), V(9,8), V(A,B), V(B,A), V(C,D), V(D,C), V(E,F), V(F,E), V(8,C), V(C,8), V(9,D), V(D,9), V(A,E), V(E,A), V(B,F), and V(F,B) and the thirty two horizontal buses namely H(0,2), H(2,0), H(1,3), H(3,1), H(4,6), H(6,4), H(5,7), H(7,5), H(0,8), H(8,0), H(1,9), H(9,1), H(2,A), H(A,2), H(3,B), H(B,3), H(8,A), H(A,8), H(9,B), H(B,9), H(C,E), H(E,C), H(D,F), H (F,D), H(4,C), H(C,4), H(5,E), H(E,5), H(5,D), H(D,5), H(7,F), and H (F,7) are completely and concurrently utilized. To summarize in time step 1, PE 0000 received packets P1 and P2; PE 0001 received packets P0 and P3; PE 0010 received packets P3 and P0; PE 0011 received packets P2 and P1; PE 0100 received packets P5 and P6; PE 0101 received packets P4 and P7; PE 0110 received packets P7 and P4; PE 0111 received packets P6 and P5; PE 1000 received packets P9 and PA; PE 1001 received packets P8 and PB; PE 1010 received packets PB and P8; PE 1011 received packets PA and P9; PE 1100 received packets PD and PE; PE 1101 received packets PC and PF; PE 1110 received packets PF and PC; and PE 1111 received packets PE and PD.

As shown in diagram 1100B of FIG. 11B, in time step 2, Packet P2 is unicasted from PE 0000 to PE 0001. From PE 0000 to PE 0001 the path is via Router R0, vertical bus V(0,1), Router R1, and local outlet bus O(1,0). Concurrently in time step 2, Packet P3 is unicasted from PE 0001 to PE 0000. From PE 0001 to PE 0000 the path is via Router R1, vertical bus V(1,0), Router R0, and local outlet bus O(0,0).

Concurrently in time step 2, Packet P0 is unicasted from PE 0010 to PE 0011. From PE 0010 to PE 0011 the path is via Router R2, vertical bus V(2,3), Router R3, and local outlet bus O(3,0). Concurrently in time step 2, Packet P1 is unicasted from PE 0011 to PE 0010. From PE 0011 to PE 0010 the path is via Router R3, vertical bus V(3,2), Router R2, and local outlet bus O(2,0).

As shown in diagram 1100B of FIG. 11B, in time step 2, Packet P6 is unicasted from PE 0100 to PE 0101. From PE 0100 to PE 0101 the path is via Router R4, vertical bus V(4,5), Router R5, and local outlet bus O(5,0). Concurrently in time step 2, Packet P7 is unicasted from PE 0101 to PE 0100. From PE 0101 to PE 0100 the path is via Router R5, vertical bus V(5,4), Router R4, and local outlet bus O(4,0).

Concurrently in time step 2, Packet P4 is unicasted from PE 0110 to PE 0111. From PE 0110 to PE 0111 the path is via Router R6, vertical bus V(6,7), Router R7, and local outlet bus O(7,0). Concurrently in time step 2, Packet P5 is unicasted from PE 0111 to PE 0110. From PE 0111 to PE 0110 the path is via Router R7, vertical bus V(7,6), Router R6, and local outlet bus O(6,0).

As shown in diagram 1100B of FIG. 11B, in time step 2, Packet PA is unicasted from PE 1000 to PE 1001. From PE 1000 to PE 1001 the path is via Router R8, vertical bus V(8,9), Router R9, and local outlet bus O(9,0). Concurrently in time step 2, Packet PB is unicasted from PE 1001 to PE 1000. From PE 1001 to PE 1000 the path is via Router R9, vertical bus V(9,8), Router R8, and local outlet bus O(8,0).

Concurrently in time step 2, Packet P8 is unicasted from PE 1010 to PE 1011. From PE 1010 to PE 1011 the path is via Router RA, vertical bus V(A,B), Router RB, and local outlet bus O(B,0). Concurrently in time step 2, Packet P9 is unicasted from PE 1011 to PE 1010. From PE 1011 to PE 1010 the path is via Router RB, vertical bus V(B,A), Router RA, and local outlet bus O(A,0).

As shown in diagram 1100B of FIG. 11B, in time step 2, Packet PE is unicasted from PE 1100 to PE 1101. From PE 1100 to PE 1101 the path is via Router RC, vertical bus V(C,D), Router RD, and local outlet bus O(D,0). Concurrently in time step 2, Packet PF is unicasted from PE 1101 to PE 1100. From PE 1101 to PE 1100 the path is via Router RD, vertical bus V(D,C), Router RC, and local outlet bus O(C,0).

Concurrently in time step 2, Packet PC is unicasted from PE 1110 to PE 1111. From PE 1110 to PE 1111 the path is via Router RE, vertical bus V(E,F), Router RF, and local outlet bus O(F,0). Concurrently in time step 2, Packet PD is unicasted from PE 1111 to PE 1110. From PE 1111 to PE 1110 the path is via Router RF, vertical bus V(F,E), Router RE, and local outlet bus O(E,0).

Also in time step 2, the thirty two vertical buses namely V(0,1), V(1,0), V(2,3), V(3,2), V(4,5), V(5,4), V(6,7), V(7,6), V(0,4), V(4,0), V(1,5), V(5,1), V(2,6), V(6,2), V(3,7), V(7,3), V(8,9), V(9,8), V(A,B), V(B,A), V(C,D), V(D,C), V(E,F), V(F,E), V(8,C), V(C,8), V(9,D), V(D,9), V(A,E), V(E,A), V(B,F), and V(F,B) and sixteen horizontal buses namely H(0,8), H(8,0), H(1,9), H(9,1), H(2,A), H(A,2), H(3,B), H(B,3), H(4,C), H(C,4), H(5,E), H(E,5), H(5,D), H(D,5), H(7,F), and H(F,7) are concurrently utilized.

To summarize in time step 2, PE 0000 received packet P3, P4 and P8; PE 0001 received packet P2, P5 and P9; PE 0010 received packet P1, P6 and PA; PE 0011 received packet P0, P6 and PB; PE 0100 received packet P7, P0 and PC; PE 0101 received packet P6, P1 and PD; PE 0110 received packet P5, P2 and PE; and PE 0111 received packet P4, P3 and PF. PE 1000 received packet PB, PC and P0; PE 1001 received packet PA, PD and P1; PE 1010 received packet P9, PE and P2; PE 1011 received packet P8, PF and P3; PE 1100 received packet PF, P8 and P4; PE 1101 received packet PE, P9 and P5; PE 1110 received packet PD, PA and P6; and PE 1111 received packet PC, PB and P7.

As shown in diagram 1100C of FIG. 11C, in time step 3, Packet P4 is multicasted with fan out 2 from PE 0000 to PE 0001 and PE 0010. From PE 0000 to PE 0001 the path is via Router R0, vertical bus V(0,1), Router R1, and local outlet bus O(1,0). From PE 0000 to PE 0010 the path is via Router R0, horizontal bus H(0,2), Router R2, and local outlet bus O(2,1). Also, Packet P8 is unicasted from PE 0000 to PE 0100. From PE 0000 to PE 0100 the path is via Router R0, vertical bus V(0,4), Router R4, and local outlet bus O(4,2). Also, Packet P3 is unicasted from PE 0000 to PE 1000. From PE 0000 to PE 1000 the path is via Router R0, horizontal bus V(0,8), Router R8, and local outlet bus O(8,3).

Concurrently in time step 3, Packet P5 is multicasted with fan out 2 from PE 0001 to PE 0000 and PE 0011. From PE 0001 to PE 0000 the path is via Router R1, vertical bus V(1,0), Router R0, and local outlet bus O(0,0). From PE 0001 to PE 0011 the path is via Router R1, horizontal bus H(1,3), Router R3, and local outlet bus O(3,1). Also, Packet P9 is unicasted from PE 0001 to PE 0101. From PE 0001 to PE 0101 the path is via Router R1, vertical bus V(1,5), Router R5, and local outlet bus O(5,2). Also, Packet P2 is unicasted from PE 0001 to PE 0101. From PE 0001 to PE 0101 the path is via Router R1, horizontal bus V(1,9), Router R9, and local outlet bus O(9,3).

As shown in diagram 1100C of FIG. 11C, in time step 3, Packet P6 is multicasted with fan out 2 from PE 0010 to PE 0011 and PE 0000. From PE 0010 to PE 0011 the path is via Router R2, vertical bus V(2,3), Router R3, and local outlet bus O(3,0). From PE 0010 to PE 0000 the path is via Router R2, horizontal bus H(2,0), Router R0, and local outlet bus O(0,1). Also, Packet PA is unicasted from PE 0010 to PE 0110. From PE 0010 to PE 0110 the path is via Router R2, vertical bus V(2,6), Router R6, and local outlet bus O(6,2). Also, Packet P1 is unicasted from PE 0010 to PE 1010. From PE 0010 to PE 1010 the path is via Router R2, horizontal bus V(2,A), Router RA, and local outlet bus O(A,3).

Concurrently in time step 3, Packet P7 is multicasted with fan out 2 from PE 0011 to PE 0010 and PE 0001. From PE 0011 to PE 0010 the path is via Router R3, vertical bus V(3,2), Router R2, and local outlet bus O(2,0). From PE 0011 to PE 0001 the path is via Router R3, horizontal bus H(3,1), Router R1, and local outlet bus O(1,1). Also Packet PB is unicasted from PE 0011 to PE 0111. From PE 0011 to PE 0111 the path is via Router R3, vertical bus V(3,7), Router R7, and local outlet bus O(7,2). Also Packet P0 is unicasted from PE 0011 to PE 1011. From PE 0011 to PE 1011 the path is via Router R3, horizontal bus V(3,B), Router RB, and local outlet bus O(B,3).

As shown in diagram 1100C of FIG. 11C, in time step 3, Packet P0 is multicasted with fan out 2 from PE 0100 to PE 0101 and PE 0110. From PE 0100 to PE 0101 the path is via Router R4, vertical bus V(4,5), Router R5, and local outlet bus O(5,0). From PE 0100 to PE 0110 the path is via Router R4, horizontal bus H(4,6), Router R6, and local outlet bus O(6,1). Also Packet PC is unicasted from PE 0100 to PE 0000. From PE 0100 to PE 0000 the path is via Router R4, vertical bus V(4,0), Router R0, and local outlet bus O(0,2). Also, Packet P7 is unicasted from PE 0100 to PE 1100. From PE 0100 to PE 1100 the path is via Router R4, horizontal bus V(4,C), Router RC, and local outlet bus O(C,3).

Concurrently in time step 3, Packet P1 is multicasted with fan out 2 from PE 0101 to PE 0100 and PE 0111. From PE 0101 to PE 0100 the path is via Router R5, vertical bus V(5,4), Router R4, and local outlet bus O(4,0). From PE 0101 to PE 0111 the path is via Router R5, horizontal bus H(5,7), Router R7, and local outlet bus O(7,1). Also, Packet PD is unicasted from PE 0101 to PE 0001. From PE 0101 to PE 0001 the path is via Router R5, vertical bus V(5,1), Router R1, and local outlet bus O(1,2). Also, Packet P6 is unicasted from PE 0101 to PE 1101. From PE 0101 to PE 1101 the path is via Router R5, horizontal bus V(5,D), Router RD, and local outlet bus O(D,3).

As shown in diagram 1100C of FIG. 11C, in time step 3, Packet P2 is multicasted with fan out 2 from PE 0110 to PE 0111 and PE 0100. From PE 0110 to PE 0111 the path is via Router R6, vertical bus V(6,7), Router R7, and local outlet bus O(7,0). From PE 0110 to PE 0100 the path is via Router R6, horizontal bus H(6,4), Router R4, and local outlet bus O(4,1). Also, Packet PE is unicasted from PE 0110 to PE 0010. From PE 0110 to PE 0010 the path is via Router R6, vertical bus V(6,2), Router R2, and local outlet bus O(2,2). Also, Packet P5 is unicasted from PE 0110 to PE 1110. From PE 0110 to PE 1110 the path is via Router R6, horizontal bus V(6,E), Router RE, and local outlet bus O(E,3).

Concurrently in time step 3, Packet P3 is multicasted with fan out 2 from PE 0111 to PE 0110 and PE 0101. From PE 0111 to PE 0110 the path is via Router R7, vertical bus V(7,6), Router R6, and local outlet bus O(6,0). From PE 0111 to PE 0101 the path is via Router R7, horizontal bus H(7,5), Router R5, and local outlet bus O(5,1). Also, Packet PF is unicasted from PE 0111 to PE 0011. From PE 0111 to PE 0011 the path is via Router R7, vertical bus V(7,3), Router R3, and local outlet bus O(3,2). Also, Packet P4 is unicasted from PE 0111 to PE 1111. From PE 0111 to PE 1111 the path is via Router R7, horizontal bus V(7,F), Router RF, and local outlet bus O(F,3).

As shown in diagram 1100C of FIG. 11C, in time step 3, Packet PC is multicasted with fan out 2 from PE 1000 to PE 1001 and PE 1010. From PE 1000 to PE 1001 the path is via Router R8, vertical bus V(8,9), Router R9, and local outlet bus O(9,0). From PE 1000 to PE 1010 the path is via Router R8, horizontal bus H(8,A), Router RA, and local outlet bus O(A,1). Also, Packet P0 is unicasted from PE 1000 to PE 1100. From PE 1000 to PE 1100 the path is via Router R8, vertical bus V(8,C), Router RC, and local outlet bus O(C,2). Also, Packet PB is unicasted from PE 1000 to PE 0000. From PE 1000 to PE 0000 the path is via Router R8, horizontal bus V(8,0), Router R0, and local outlet bus O(0,3).

Concurrently in time step 3, Packet PD is multicasted with fan out 2 from PE 1001 to PE 1000 and PE 1011. From PE 1001 to PE 1000 the path is via Router R9, vertical bus V(9,8), Router R8, and local outlet bus O(8,0). From PE 1001 to PE 1011 the path is via Router R9, horizontal bus H(9,B), Router RB, and local outlet bus O(B,1). Also, Packet P1 is unicasted from PE 1001 to PE 1101. From PE 1001 to PE 1101 the path is via Router R9, vertical bus V(9,D), Router RD, and local outlet bus O(D,2). Also, Packet PA is unicasted from PE 1001 to PE 0001. From PE 1001 to PE 0001 the path is via Router R9, horizontal bus V(9,1), Router R1, and local outlet bus O(1,3).

As shown in diagram 1100C of FIG. 11C, in time step 3, Packet PE is multicasted with fan out 2 from PE 1010 to PE 1011 and PE 1000. From PE 1010 to PE 1011 the path is via Router RC, vertical bus V(A,B), Router RB, and local outlet bus O(B,0). From PE 1010 to PE 1000 the path is via Router RA, horizontal bus H(A,8), Router R8, and local outlet bus O(8,1). Also, Packet P2 is unicasted from PE 1010 to PE 1110. From PE 1010 to PE 1110 the path is via Router RA, vertical bus V(A,E), Router RE, and local outlet bus O(E,2). Also, Packet P9 is unicasted from PE 1010 to PE 0010. From PE 1010 to PE 0010 the path is via Router RA, horizontal bus V(A,2), Router R2, and local outlet bus O(2,3).

Concurrently in time step 3, Packet PF is multicasted with fan out 2 from PE 1011 to PE 1010 and PE 1001. From PE 1011 to PE 1010 the path is via Router RB, vertical bus V(B,A), Router RA, and local outlet bus O(A,0). From PE 1011 to PE 1001 the path is via Router RB, horizontal bus H(B,9), Router R9, and local outlet bus O(9,1). Also, Packet P3 is unicasted from PE 1011 to PE 1111. From PE 1011 to PE 1111 the path is via Router RB, vertical bus V(B,F), Router RF, and local outlet bus O(F,2). Also, Packet P8 is unicasted from PE 1011 to PE 0011. From PE 1011 to PE 0011 the path is via Router RB, horizontal bus V(B,3), Router R3, and local outlet bus O(3,3).

As shown in diagram 1100C of FIG. 11C, in time step 3, Packet P8 is multicasted with fan out 2 from PE 1100 to PE 1101 and PE 1110. From PE 1100 to PE 1101 the path is via Router RC, vertical bus V(C,D), Router RD, and local outlet bus O(D,0). From PE 1100 to PE 1110 the path is via Router RC, horizontal bus H(C,E), Router RE, and local outlet bus O(E,1). Also, Packet P4 is unicasted from PE 1100 to PE 1000. From PE 1100 to PE 1000 the path is via Router RC, vertical bus V(C,8), Router R8, and local outlet bus O(8,2). Also, Packet PF is unicasted from PE 1100 to PE 0100. From PE 1100 to PE 0100 the path is via Router RC, horizontal bus V(C,4), Router R4, and local outlet bus O(4,3).

Concurrently in time step 3, Packet P9 is multicasted with fan out 2 from PE 1101 to PE 1100 and PE 1111. From PE 1101 to PE 1100 the path is via Router RD, vertical bus V(D,C), Router RC, and local outlet bus O(C,0). From PE 1101 to PE 1111 the path is via Router RD, horizontal bus H(D,F), Router RF, and local outlet bus O(F,1). Also, Packet P5 is unicasted from PE 1101 to PE 1001. From PE 1101 to PE 1001 the path is via Router RD, vertical bus V(D,9), Router R9, and local outlet bus O(9,2). Also, Packet PE is unicasted from PE 1101 to PE 0101. From PE 1100 to PE 0100 the path is via Router RD, horizontal bus V(D,5), Router R5, and local outlet bus O(5,3).

As shown in diagram 1100C of FIG. 11C, in time step 3, Packet PA is multicasted with fan out 2 from PE 1110 to PE 1111 and PE 1100. From PE 1110 to PE 1111 the path is via Router RE, vertical bus V(E,F), Router RF, and local outlet bus O(F,0). From PE 1110 to PE 1100 the path is via Router RE, horizontal bus H(E,C), Router RC, and local outlet bus O(C,1). Also, Packet P6 is unicasted from PE 1110 to PE 1010. From PE 1110 to PE 1010 the path is via Router RE, vertical bus V(E,A), Router RA, and local outlet bus O(A,2). Also, Packet PD is unicasted from PE 1110 to PE 0110. From PE 1110 to PE 0110 the path is via Router RE, horizontal bus V(E,6), Router R6, and local outlet bus O(6,3).

Concurrently in time step 3, Packet PB is multicasted with fan out 2 from PE 1111 to PE 1110 and PE 1101. From PE 1111 to PE 1110 the path is via Router RF, vertical bus V(F,E), Router RE, and local outlet bus O(E,0). From PE 1111 to PE 1101 the path is via Router RF, horizontal bus H (F,D), Router RD, and local outlet bus O(D,1). Also, Packet P7 is unicasted from PE 1111 to PE 1011. From PE 1111 to PE 1011 the path is via Router RF, vertical bus V(F,B), Router RB, and local outlet bus O(B,2). Also, Packet PC is unicasted from PE 1111 to PE 0111. From PE 1111 to PE 0111 the path is via Router RF, horizontal bus V(F,7), Router R7, and local outlet bus O(7,3).

Also in time step 3, the thirty two vertical buses namely V(0,1), V(1,0), V(2,3), V(3,2), V(4,5), V(5,4), V(6,7), V(7, 6), V(0,4), V(4,0), V(1,5), V(5,1), V(2,6), V(6,2), V(3,7), V(7,3), V(8,9), V(9,8), V(A,B), V(B,A), V(C,D), V(D,C), V(E,F), V(F,E), V(8,C), V(C,8), V(9,D), V(D,9), V(A,E), V(E,A), V(B,F), and V(F,B) and the thirty two horizontal buses namely H(0,2), H(2,0), H(1,3), H(3,1), H(4,6), H(6,4), H(5,7), H(7,5), H(0,8), H(8,0), H(1,9), H(9,1), H(2,A), H(A,2), H(3,B), H(B,3), H(8,A), H(A,8), H(9,B), H(B,9), H(C,E), H(E,C), H(D,F), H (F,D), H(4,C), H(C,4), H(5,E), H(E,5), H(5,D), H(D,5), H(7,F), and H (F,7) are completely and concurrently utilized. To summarize in time step 3, PE 0000 received packets P5 and P6; PE 0001 received packets P4 and P7; PE 0010 received packets P7 and P4; PE 0011 received packets P6 and P5; PE 0100 received packets P1 and P2; PE 0101 received packets P0 and P3; PE 0110 received packets P3 and P0; PE 0111 received packets P2 and P1. PE 1000 received packets PD and PE; PE 1001 received packets PC and PF; PE 1010 received packets PF and PC; PE 1011 received packets PE and PD; PE 1100 received packets P9 and PA; PE 1101 received packets P8 and PB; PE 1110 received packets PB and P8; PE 1111 received packets PA and P9.

As shown in diagram 1100D of FIG. 11D, in time step 4, Packet P8 is multicasted with fan out 2 from PE 0000 to PE 0001 and PE 0010. From PE 0000 to PE 0001 the path is via Router R0, vertical bus V(0,1), Router R1, and local outlet bus O(1,0). From PE 0000 to PE 0010 the path is via Router R0, horizontal bus H(0,2), Router R2, and local outlet bus O(2,1).

Concurrently in time step 4, Packet P9 is multicasted with fan out 2 from PE 0001 to PE 0000 and PE 0011. From PE 0001 to PE 0000 the path is via Router R1, vertical bus V(1,0), Router R0, and local outlet bus O(0,0). From PE 0001 to PE 0011 the path is via Router R1, horizontal bus H(1,3), Router R3, and local outlet bus O(3,1).

As shown in diagram 1100D of FIG. 11D, in time step 4, Packet PA is multicasted with fan out 2 from PE 0010 to PE 0011 and PE 0000. From PE 0010 to PE 0011 the path is via Router R2, vertical bus V(2,3), Router R3, and local outlet bus O(3,0). From PE 0010 to PE 0000 the path is via Router R2, horizontal bus H(2,0), Router R0, and local outlet bus O(0,1).

Concurrently in time step 4, Packet PB is multicasted with fan out 2 from PE 0011 to PE 0010 and PE 0001. From PE 0011 to PE 0010 the path is via Router R3, vertical bus V(3,2), Router R2, and local outlet bus O(2,0). From PE 0011 to PE 0001 the path is via Router R3, horizontal bus H(3,1), Router R1, and local outlet bus O(1,1).

As shown in diagram 1100D of FIG. 11D, in time step 4, Packet PC is multicasted with fan out 2 from PE 0100 to PE 0101 and PE 0110. From PE 0100 to PE 0101 the path is via Router R4, vertical bus V(4,5), Router R5, and local outlet bus O(5,0). From PE 0100 to PE 0110 the path is via Router R4, horizontal bus H(4,6), Router R6, and local outlet bus O(6,1).

Concurrently in time step 4, Packet PD is multicasted with fan out 2 from PE 0101 to PE 0100 and PE 0111. From PE 0101 to PE 0100 the path is via Router R5, vertical bus V(5,4), Router R4, and local outlet bus O(4,0). From PE 0101 to PE 0111 the path is via Router R5, horizontal bus H(5,7), Router R7, and local outlet bus O(7,1).

As shown in diagram 1100D of FIG. 11D, in time step 4, Packet PE is multicasted with fan out 2 from PE 0110 to PE 0111 and PE 0100. From PE 0110 to PE 0111 the path is via Router R6, vertical bus V(6,7), Router R7, and local outlet bus O(7,0). From PE 0110 to PE 0100 the path is via Router R6, horizontal bus H(6,4), Router R4, and local outlet bus O(4,1).

Concurrently in time step 4, Packet PF is multicasted with fan out 2 from PE 0111 to PE 0110 and PE 0101. From PE 0111 to PE 0110 the path is via Router R7, vertical bus V(7,6), Router R6, and local outlet bus O(6,0). From PE

0111 to PE 0101 the path is via Router R7, horizontal bus H(7,5), Router R5, and local outlet bus O(5,1).

As shown in diagram 1100D of FIG. 11D, in time step 4, Packet P0 is multicasted with fan out 2 from PE 1000 to PE 1001 and PE 1010. From PE 1000 to PE 1001 the path is via Router R8, vertical bus V(8,9), Router R9, and local outlet bus O(9,0). From PE 1000 to PE 1010 the path is via Router R8, horizontal bus H(8,A), Router RA, and local outlet bus O(A,1).

Concurrently in time step 4, Packet P1 is multicasted with fan out 2 from PE 1001 to PE 1000 and PE 1011. From PE 1001 to PE 1000 the path is via Router R9, vertical bus V(9,8), Router R8, and local outlet bus O(8,0). From PE 1001 to PE 1011 the path is via Router R9, horizontal bus H(9,B), Router RB, and local outlet bus O(B,1).

As shown in diagram 1100D of FIG. 11D, in time step 4, Packet P2 is multicasted with fan out 2 from PE 1010 to PE 1011 and PE 1000. From PE 1010 to PE 1011 the path is via Router RC, vertical bus V(A,B), Router RB, and local outlet bus O(B,0). From PE 1010 to PE 1000 the path is via Router RA, horizontal bus H(A,8), Router R8, and local outlet bus O(8,1).

Concurrently in time step 4, Packet P3 is multicasted with fan out 2 from PE 1011 to PE 1010 and PE 1001. From PE 1011 to PE 1010 the path is via Router RB, vertical bus V(B,A), Router RA, and local outlet bus O(A,0). From PE 1011 to PE 1001 the path is via Router RB, horizontal bus H(B,9), Router R9, and local outlet bus O(9,1).

As shown in diagram 1100D of FIG. 11D, in time step 4, Packet P4 is multicasted with fan out 2 from PE 1100 to PE 1101 and PE 1110. From PE 1100 to PE 1101 the path is via Router RC, vertical bus V(C,D), Router RD, and local outlet bus O(D,0). From PE 1100 to PE 1110 the path is via Router RC, horizontal bus H(C,E), Router RE, and local outlet bus O(E,1).

Concurrently in time step 4, Packet P5 is multicasted with fan out 2 from PE 1101 to PE 1100 and PE 1111. From PE 1101 to PE 1100 the path is via Router RD, vertical bus V(D,C), Router RC, and local outlet bus O(C,0). From PE 1101 to PE 1111 the path is via Router RD, horizontal bus H(D,F), Router RF, and local outlet bus O(F,1).

As shown in diagram 1100D of FIG. 11D, in time step 4, Packet P6 is multicasted with fan out 2 from PE 1110 to PE 1111 and PE 1100. From PE 1110 to PE 1111 the path is via Router RE, vertical bus V(E,F), Router RF, and local outlet bus O(F,0). From PE 1110 to PE 1100 the path is via Router RE, horizontal bus H(E,C), Router RC, and local outlet bus O(C,1).

Concurrently in time step 4, Packet P7 is multicasted with fan out 2 from PE 1111 to PE 1110 and PE 1101. From PE 1111 to PE 1110 the path is via Router RF, vertical bus V(F,E), Router RE, and local outlet bus O(E,0). From PE 1111 to PE 1101 the path is via Router RF, horizontal bus H (F,D), Router RD, and local outlet bus O(D,1).

Also in time step 4, the thirty two vertical buses namely V(0,1), V(1,0), V(2,3), V(3,2), V(4,5), V(5,4), V(6,7), V(7,6), V(0,4), V(4,0), V(1,5), V(5,1), V(2,6), V(6,2), V(3,7), V(7,3), V(8,9), V(9,8), V(A,B), V(B,A), V(C,D), V(D,C), V(E,F), V(F,E), V(8,C), V(C,8), V(9,D), V(D,9), V(A,E), V(E,A), V(B,F), and V(F,B) and the thirty two horizontal buses namely H(0,2), H(2,0), H(1,3), H(3,1), H(4,6), H(6,4), H(5,7), H(7,5), H(0,8), H(8,0), H(1,9), H(9,1), H(2,A), H(A,2), H(3,B), H(B,3), H(8,A), H(A,8), H(9,B), H(B,9), H(C,E), H(E,C), H(D,F), H (F,D), H(4,C), H(C,4), H(5,E), H(5,5), H(5,D), H(D,5), H(7,F), and H (F,7) are completely and concurrently utilized. To summarize in time step 4, PE 0000 received packets P9, PA, PC and PB; PE 0001 received packets P8, PB, PD and PA; PE received packets P8, PB, PE and P9; PE 0011 received packets P9, PA, PF and P8; PE 0100 received packets PD, PE, P8 and PF; PE 0101 received packets PC, PF, P9 and PE; PE 0110 received packets PC, PF, PA and PD; PE 0111 received packets PD, PE, PB and PC. PE 1000 received packets P1, P2, P4 and P3; PE 1001 received packets P0, P3, P5 and P2; PE 1010 received packets P0, P3, P6 and P1; PE 1011 received packets P1, P2, P7 and P0; PE 1100 received packets P5, P6, P0 and P7; PE 1101 received packets P4, P7, P1 and P6; PE 1110 received packets P4, P7, P2 and P5; PE 1111 received packets P5, P6, P3 and P4.

As shown in diagram 1100E of FIG. 11E, in time step 5, Packet PC is multicasted with fan out 2 from PE 0000 to PE 0001 and PE 0010. From PE 0000 to PE 0001 the path is via Router R0, vertical bus V(0,1), Router R1, and local outlet bus O(1,0). From PE 0000 to PE 0010 the path is via Router R0, horizontal bus H(0,2), Router R2, and local outlet bus O(2,1).

Concurrently in time step 5, Packet PD is multicasted with fan out 2 from PE 0001 to PE 0000 and PE 0011. From PE 0001 to PE 0000 the path is via Router R1, vertical bus V(1,0), Router R0, and local outlet bus O(0,0). From PE 0001 to PE 0011 the path is via Router R1, horizontal bus H(1,3), Router R3, and local outlet bus O(3,1).

As shown in diagram 1100E of FIG. 11E, in time step 5, Packet PE is multicasted with fan out 2 from PE 0010 to PE 0011 and PE 0000. From PE 0010 to PE 0011 the path is via Router R2, vertical bus V(2,3), Router R3, and local outlet bus O(3,0). From PE 0010 to PE 0000 the path is via Router R2, horizontal bus H(2,0), Router R0, and local outlet bus O(0,1).

Concurrently in time step 5, Packet PF is multicasted with fan out 2 from PE 0011 to PE 0010 and PE 0001. From PE 0011 to PE 0010 the path is via Router R3, vertical bus V(3,2), Router R2, and local outlet bus O(2,0). From PE 0011 to PE 0001 the path is via Router R3, horizontal bus H(3,1), Router R1, and local outlet bus O(1,1).

As shown in diagram 1100E of FIG. 11E, in time step 5, Packet P8 is multicasted with fan out 2 from PE 0100 to PE 0101 and PE 0110. From PE 0100 to PE 0101 the path is via Router R4, vertical bus V(4,5), Router R5, and local outlet bus O(5,0). From PE 0100 to PE 0110 the path is via Router R4, horizontal bus H(4,6), Router R6, and local outlet bus O(6,1).

Concurrently in time step 5, Packet P9 is multicasted with fan out 2 from PE 0101 to PE 0100 and PE 0111. From PE 0101 to PE 0100 the path is via Router R5, vertical bus V(5,4), Router R4, and local outlet bus O(4,0). From PE 0101 to PE 0111 the path is via Router R5, horizontal bus H(5,7), Router R7, and local outlet bus O(7,1).

As shown in diagram 1100E of FIG. 11E, in time step 5, Packet PA is multicasted with fan out 2 from PE 0110 to PE 0111 and PE 0100. From PE 0110 to PE 0111 the path is via Router R6, vertical bus V(6,7), Router R7, and local outlet bus O(7,0). From PE 0110 to PE 0100 the path is via Router R6, horizontal bus H(6,4), Router R4, and local outlet bus O(4,1).

Concurrently in time step 5, Packet PB is multicasted with fan out 2 from PE 0111 to PE 0110 and PE 0101. From PE 0111 to PE 0110 the path is via Router R7, vertical bus V(7,6), Router R6, and local outlet bus O(6,0). From PE 0111 to PE 0101 the path is via Router R7, horizontal bus H(7,5), Router R5, and local outlet bus O(5,1).

As shown in diagram 1100E of FIG. 11E, in time step 5, Packet P4 is multicasted with fan out 2 from PE 1000 to PE 1001 and PE 1010. From PE 1000 to PE 1001 the path is via Router R8, vertical bus V(8,9), Router R9, and local outlet bus O(9,0). From PE 1000 to PE 1010 the path is via Router R8, horizontal bus H(8,A), Router RA, and local outlet bus O(A,1).

Concurrently in time step 5, Packet P5 is multicasted with fan out 2 from PE 1001 to PE 1000 and PE 1011. From PE 1001 to PE 1000 the path is via Router R9, vertical bus V(9,8), Router R8, and local outlet bus O(8,0). From PE 1001 to PE 1011 the path is via Router R9, horizontal bus H(9,B), Router RB, and local outlet bus O(B,1).

As shown in diagram 1100E of FIG. 11E, in time step 5, Packet P6 is multicasted with fan out 2 from PE 1010 to PE 1011 and PE 1000. From PE 1010 to PE 1011 the path is via Router RC, vertical bus V(A,B), Router RB, and local outlet bus O(B,0). From PE 1010 to PE 1000 the path is via Router RA, horizontal bus H(A,8), Router R8, and local outlet bus O(8,1).

Concurrently in time step 5, Packet P7 is multicasted with fan out 2 from PE 1011 to PE 1010 and PE 1001. From PE 1011 to PE 1010 the path is via Router RB, vertical bus V(B,A), Router RA, and local outlet bus O(A,0). From PE 1011 to PE 1001 the path is via Router RB, horizontal bus H(B,9), Router R9, and local outlet bus O(9,1).

As shown in diagram 1100E of FIG. 11E, in time step 5, Packet P0 is multicasted with fan out 2 from PE 1100 to PE 1101 and PE 1110. From PE 1100 to PE 1101 the path is via Router RC, vertical bus V(C,D), Router RD, and local outlet bus O(D,0). From PE 1100 to PE 1110 the path is via Router RC, horizontal bus H(C,E), Router RE, and local outlet bus O(E,1).

Concurrently in time step 5, Packet P1 is multicasted with fan out 2 from PE 1101 to PE 1100 and PE 1111. From PE 1101 to PE 1100 the path is via Router RD, vertical bus V(D,C), Router RC, and local outlet bus O(C,0). From PE 1101 to PE 1111 the path is via Router RD, horizontal bus H(D,F), Router RF, and local outlet bus O(F,1).

As shown in diagram 1100E of FIG. 11E, in time step 5, Packet P2 is multicasted with fan out 2 from PE 1110 to PE 1111 and PE 1100. From PE 1110 to PE 1111 the path is via Router RE, vertical bus V(E,F), Router RF, and local outlet bus O(F,0). From PE 1110 to PE 1100 the path is via Router RE, horizontal bus H(E,C), Router RC, and local outlet bus O(C,1).

Concurrently in time step 5, Packet P3 is multicasted with fan out 2 from PE 1111 to PE 1110 and PE 1101. From PE 1111 to PE 1110 the path is via Router RF, vertical bus V(F,E), Router RE, and local outlet bus O(E,0). From PE 1111 to PE 1101 the path is via Router RF, horizontal bus H (F,D), Router RD, and local outlet bus O(D,1).

Also in time step 5, the sixteen vertical buses namely V(0,1), V(1,0), V(2,3), V(3,2), V(4,5), V(5,4), V(6,7), V(7, 6), V(8,9), V(9,8), V(A,B), V(B,A), V(C,D), V(D,C), V(E, F), V(F,E) and the sixteen horizontal buses namely H(0,2), H(2,0), H(1,3), H(3,1), H(4,6), H(6,4), H(5,7), H(7,5), H(8, A), H(A,8), H(9,B), H(B,9), H(C,E), H(E,C), H(D,F), H (F,D) are concurrently utilized.

To summarize in time step 5, PE 0000 received packets PD and PE; PE 0001 received packets PC and PF; PE 0010 received packets PF and PC; PE 0011 received packets PE and PD; PE 0100 received packets P9 and PA; PE 0101 received packets PB and PC; PE 0110 received packets PC and PB; PE 0111 received packets PA and P9. PE 1000 received packets P5 and P6; PE 1001 received packets P4 and P7; PE 1010 received packets P7 and P4; PE 1011 received packets P6 and P5; PE 1100 received packets P1 and P2; PE 1101 received packets P0 and P3; PE 1110 received packets P3 and P0; PE 1111 received packets P2 and P1.

As shown in diagram 1100F of FIG. 11F, in time step 6, Packet P6 is unicasted from PE 0000 to PE 0001. From PE 0000 to PE 0001 the path is via Router R0, vertical bus V(0,1), Router R1, and local outlet bus O(1,0). Packet PD is unicasted from PE 0000 to PE 0010. From PE 0000 to PE 0010 the path is via Router R0, horizontal bus H(0,2), Router R2, and local outlet bus O(2,1).

Concurrently in time step 6, Packet P7 is unicasted from PE 0001 to PE 0000. From PE 0001 to PE 0000 the path is via Router R1, vertical bus V(1,0), Router R0, and local outlet bus O(0,0). Packet PC is unicasted from PE 0001 to PE 0011. From PE 0001 to PE 0011 the path is via Router R1, horizontal bus H(1,3), Router R3, and local outlet bus O(3,1).

As shown in diagram 1100F of FIG. 11F, in time step 6, Packet PF is unicasted from PE 0010 to PE 0011. From PE 0010 to PE 0011 the path is via Router R2, vertical bus V(2,3), Router R3, and local outlet bus O(3,0). Packet P4 is unicasted from PE 0010 to PE 0000. From PE 0010 to PE 0000 the path is via Router R2, horizontal bus H(2,0), Router R0, and local outlet bus O(0,1).

Concurrently in time step 6, Packet PE is unicasted from PE 0011 to PE 0010. From PE 0011 to PE 0010 the path is via Router R3, vertical bus V(3,2), Router R2, and local outlet bus O(2,0). Packet P5 is unicasted from PE 0011 to PE 0001. From PE 0011 to PE 0001 the path is via Router R3, horizontal bus H(3,1), Router R1, and local outlet bus O(1,1).

As shown in diagram 1100F of FIG. 11F, in time step 6, Packet P2 is unicasted from PE 0100 to PE 0101. From PE 0100 to PE 0101 the path is via Router R4, vertical bus V(4,5), Router R5, and local outlet bus O(5,0). Packet P9 is unicasted from PE 0100 to PE 0110. From PE 0100 to PE 0110 the path is via Router R4, horizontal bus H(4,6), Router R6, and local outlet bus O(6,1).

Concurrently in time step 6, Packet P3 is unicasted from PE 0101 to PE 0100. From PE 0101 to PE 0100 the path is via Router R5, vertical bus V(5,4), Router R4, and local outlet bus O(4,0). Packet P8 is unicasted from PE 0101 to PE 0111. From PE 0101 to PE 0111 the path is via Router R5, horizontal bus H(5,7), Router R7, and local outlet bus O(7,1).

As shown in diagram 1100F of FIG. 11F, in time step 6, Packet PB is unicasted from PE 0110 to PE 0111. From PE 0110 to PE 0111 the path is via Router R6, vertical bus V(6,7), Router R7, and local outlet bus O(7,0). Packet P0 is unicasted from PE 0110 to PE 0100. From PE 0110 to PE 0100 the path is via Router R6, horizontal bus H(6,4), Router R4, and local outlet bus O(4,1).

Concurrently in time step 6, Packet PA is unicasted from PE 0111 to PE 0110. From PE 0111 to PE 0110 the path is via Router R7, vertical bus V(7,6), Router R6, and local outlet bus O(6,0). Packet P1 is unicasted from PE 0111 to PE 0101. From PE 0111 to PE 0101 the path is via Router R7, horizontal bus H(7,5), Router R5, and local outlet bus O(5,1).

As shown in diagram 1100F of FIG. 11F, in time step 6, Packet P6 is unicasted from PE 1000 to PE 1001. From PE 1000 to PE 1001 the path is via Router R8, vertical bus V(8,9), Router R9, and local outlet bus O(9,0). Packet PD is unicasted from PE 1000 to PE 1010. From PE 1000 to PE 1010 the path is via Router R8, horizontal bus H(8,A), Router RA, and local outlet bus O(A,1).

Concurrently in time step 6, Packet P7 is unicasted from PE 1001 to PE 1000. From PE 1001 to PE 1000 the path is via Router R9, vertical bus V(9,8), Router R8, and local outlet bus O(8,0). Packet PC is unicasted from PE 1001 to PE 1011. From PE 1001 to PE 1011 the path is via Router R9, horizontal bus H(9,B), Router RB, and local outlet bus O(B,1).

As shown in diagram 1100F of FIG. 11F, in time step 6, Packet PF is unicasted from PE 1010 to PE 1011. From PE 1010 to PE 1011 the path is via Router RC, vertical bus V(A,B), Router RB, and local outlet bus O(B,0). Packet P4 is unicasted from PE 1010 to PE 1000. From PE 1010 to PE 1000 the path is via Router RA, horizontal bus H(A,8), Router R8, and local outlet bus O(8,1).

Concurrently in time step 6, Packet PE is unicasted from PE 1011 to PE 1010. From PE 1011 to PE 1010 the path is via Router RB, vertical bus V(B,A), Router RA, and local outlet bus O(A,0). Packet P5 is unicasted from PE 1011 to PE 1001. From PE 1011 to PE 1001 the path is via Router RB, horizontal bus H(B,9), Router R9, and local outlet bus O(9,1).

As shown in diagram 1100F of FIG. 11F, in time step 6, Packet P2 is unicasted from PE 1100 to PE 1101. From PE 1100 to PE 1101 the path is via Router RC, vertical bus V(C,D), Router RD, and local outlet bus O(D,0). Packet P9 is unicasted from PE 1100 to PE 1110. From PE 1100 to PE 1110 the path is via Router RC, horizontal bus H(C,E), Router RE, and local outlet bus O(E,1).

Concurrently in time step 6, Packet P3 is unicasted from PE 1101 to PE 1100. From PE 1101 to PE 1100 the path is via Router RD, vertical bus V(D,C), Router RC, and local outlet bus O(C,0). Packet P8 is unicasted from PE 1101 to PE 1111. From PE 1101 to PE 1111 the path is via Router RD, horizontal bus H(D,F), Router RF, and local outlet bus O(F,1).

As shown in diagram 1100F of FIG. 11F, in time step 6, Packet PA is unicasted from PE 1110 to PE 1111. From PE 1110 to PE 1111 the path is via Router RE, vertical bus V(E,F), Router RF, and local outlet bus O(F,0). Packet P1 is unicasted from PE 1110 to PE 1100. From PE 1110 to PE 1100 the path is via Router RE, horizontal bus H(E,C), Router RC, and local outlet bus O(C,1).

Concurrently in time step 6, Packet PB is unicasted from PE 1111 to PE 1110. From PE 1111 to PE 1110 the path is via Router RF, vertical bus V(F,E), Router RE, and local outlet bus O(E,0). Packet P0 is unicasted from PE 1111 to PE 1101. From PE 1111 to PE 1101 the path is via Router RF, horizontal bus H (F,D), Router RD, and local outlet bus O(D,1).

Also in time step 6, the sixteen vertical buses namely V(0,1), V(1,0), V(2,3), V(3,2), V(4,5), V(5,4), V(6,7), V(7, 6), V(8,9), V(9,8), V(A,B), V(B,A), V(C,D), V(D,C), V(E, F), V(F,E) and the sixteen horizontal buses namely H(0,2), H(2,0), H(1,3), H(3,1), H(4,6), H(6,4), H(5,7), H(7,5), H(8, A), H(A,8), H(9,B), H(B,9), H(C,E), H(E,C), H(D,F), H (F,D) are concurrently utilized.

To summarize in time step 6, PE 0000 received packets P7 and PF; PE 0001 received packets P6 and PE; PE 0010 received packets P5 and PD; PE 0011 received packets P4 and PC; PE 0100 received packets P3 and PB; PE 0101 received packets P2 and PA; PE 0110 received packets P1 and P9; PE 0111 received packets P0 and P8. PE 1000 received packets PF and P7; PE 1001 received packets PE and P6; PE 1010 received packets PD and P5; PE 1011 received packets PC and P4; PE 1100 received packets PB and P3; PE 1101 received packets PA and P2; PE 1110 received packets P9 and P1; PE 1111 received packets P8 and P0.

In general, with a×b processing elements arranged in two dimensional grid according to the current invention, in the path of a packet from a source processing element to a target processing element there will be one or more intermediate processing elements unless source processing element and target processing element are directly connected to each other by a vertical bus or horizontal bus. Applicant notes that, for example, in diagram 1100A of FIG. 11A, diagram 1100B of FIG. 11B, diagram 1100C of FIG. 11C, diagram 1100D of FIG. 11D, diagram 1100E of FIG. 11E and diagram 1100F of FIG. 11F for example in the path of Packet P0 from PE 0000 to PE 1111, packet P0 traverses from PE 0000 to PE 1000 to PE 1110 to PE 1101 to PE 1111. In this example, in the path for packet P0, PE 0000 is the source processing element; PE 1111 is the target processing element; And PE 1000, PE 1110 and PE 1101 are intermediate processing elements.

So, in the 2D-BFTHypercube interconnection network with 4*4 2D-grid of PEs shown in diagrams 1100A-E of FIG. 11A-E respectively for concurrent broadcast by each of the sixteen PEs to transmit a packet to all the rest of the PEs, it takes six time steps. A time step is certain time duration determined by the length of the packet, the length of the bus, the number of wires in the vertical buses, the number of wires in the horizontal buses, the implemented non-transitory medium of each bus and clock speed of operation. Since the interconnection network is non-blocking, as illustrated in diagrams 1100A-E of FIG. 11A-E respectively, no queuing of packets is needed, and no collisions will occur.

Also, the thirty two vertical buses and the thirty two horizontal buses are completely and concurrently utilized in time step 1, time step 2, time step 3, and time step 4. In time step 5, and time step 6 only sixteen vertical buses and sixteen horizontal buses are concurrently used.

To broadcast "n" number of packets, where n is positive number, by each PE to the rest of the PEs, it requires 6*n number of time steps in the exemplary 2D-BFTHypercube interconnection network with 4*4 2D-grid of 16 PEs shown in diagram 100A1 of FIG. 1A1 or diagram 100A2 of FIG. 1A2 and diagram 100B of FIG. 1B.

As illustrated in diagrams 1100A-E of FIG. 11A-E respectively, in one embodiment, applicant notes that all "n" packets from PE 0 will be transmitted to PE 1 in the same fixed path as packet P0; All "n" packets from PE 0 will be transmitted to PE 2 in the same fixed path as packet P0; All "n" packets from PE 0 will be transmitted to PE 3 in the same fixed path as packet P0; All "n" packets from PE 0 will be transmitted to PE 4 in the same fixed path as packet P0; All "n" packets from PE 0 will be transmitted to PE 5 in the same fixed path as packet P0; All "n" packets from PE 0 will be transmitted to PE 6 in the same fixed path as packet P0; And all "n" packets from PE 0 will be transmitted to PE 7 in the same fixed path as packet P0.

Similarly as illustrated in diagrams 1100A-E of FIG. 11A-E respectively, all "n" packets from PE 1 will be transmitted to PE 0, PE 2, PE 3, PE 4, PE 5, PE 6 and PE 7 in the same path as packet P1; All "n" packets from PE 2 will be transmitted to PE 0, PE 1, PE 3, PE 4, PE 5, PE 6 and PE 7 in the same path as packet P2; All "n" packets from PE 3 will be transmitted to PE 0, PE 1, PE 2, PE 4, PE 5, PE 6 and PE 7 in the same path as packet P3; All "n" packets from PE 4 will be transmitted to PE 0, PE 1, PE 2, PE 3, PE 5, PE 6 and PE 7 in the same path as packet P4; All "n" packets from PE 5 will be transmitted to PE 0, PE 1, PE 2, PE 3, PE 4, PE 6 and PE 7 in the same path as packet P5; All "n" packets from PE 6 will be transmitted to PE 0, PE 1, PE 2, PE 3, PE 4, PE 5 and PE 7 in the same path as packet P6; And all "n" packets from PE 7 will be transmitted to PE 0, PE 1, PE 2, PE 3, PE 4, PE 5 and PE 6 in the same path as packet P7.

Applicant also notes that "n" number of packets from each PE will reach the rest of PEs in the order they are transmitted as they are transmitted in the same fixed path. For example, "n" number of packets from PE 0 will reach PE 1, PE 2, PE 3, PE 4, PE 5, PE 6 and PE 7 in the order they are transmitted as they are transmitted in the same fixed path as packet P0 as illustrated in diagrams 1100A-E of FIG. 11A-E respectively. Accordingly, concurrent broadcast "n" number of packets from each PE to the rest of PEs, as shown in the exemplary 2D-BFTHypercube interconnection network with 4*4 2D-grid of 16 PEs shown in diagram 100A1 of FIG. 1A1 or diagram 100A2 of FIG. 1A2 and diagram 100B of FIG. 1B, it requires "6*n" number of time steps and no out of order arrival of packets occurs.

Applicant also notes that in each PE packets arrive in different order as can be observed in the foregoing disclosure, particularly in diagrams 900A-B of FIG. 9A-B, diagrams 1000A-D of FIG. 10A-D, diagrams 1100A-E of FIG. 11A-E respectively. So each processor will be enabled to execute the instructions in the order of the arrival of packets in each PE, which means processor in each PE is based on dataflow architecture. For example, PE 000 in the 2D-BFT-Hypercube interconnection network of diagram 1100A-E of FIG. 11A-E respectively, executes instructions requiring P1, P2, P4, P3, P5, P6, and P7 in that order whereas example PE 0001 executes instructions requiring P0, P3, P5, P2, P4, P7, and P6 in that order and so both PEs execute the data in different order which is dataflow architecture. Applicant notes that each time step is not the same duration as other time steps as a time duration of a time step is determined by the length of the packet, the length of the bus, the number of wires in the local inlet buses, local outlet buses and vertical buses, the number of wires in the horizontal buses, the implemented non-transitory medium of each bus and clock speed of operation. However, the packet received sooner is transmitted through the interconnection network so that time steps are interleaved without changing the order of transmission of the packets, according to the current invention.

Also Applicant notes that, in one embodiment, from each PE to one or more fan outs of multicast of a packet to one or more of the rest of PEs in the 2D-BFTHypercube interconnection network, in accordance with the current invention, is performed by concurrent broadcast by each PE to all the rest of PEs in the 2D-BFTHypercube interconnection network as disclosed in diagram 800 of FIG. 8, diagram 900A of FIG. 9A, in diagram 900B of FIG. 9B, in diagram 1000A of FIG. 10A, diagram 1000B of FIG. 10B, in diagram 1000C of FIG. 10C, diagram 1000D of FIG. 10D, in diagram 1100A of FIG. 11A, diagram 1100B of FIG. 11B, in diagram 1100C of FIG. 11C, diagram 1100D of FIG. 11D, in diagram 1100E of FIG. 11E, and diagram 1100F of FIG. 11F.

In one embodiment, in diagram 100A1 of FIG. 1A1, diagram 100B of FIG. 1B, in diagram 100C of FIG. 1C, diagram 200B of FIG. 2B, in diagram 300 of FIG. 3, diagram 400 of FIG. 4, in diagram 500A of FIG. 5A, diagram 500B of FIG. 5B, in diagram 600A of FIG. 6A, diagram 600B of FIG. 6B, in diagram 700A of FIG. 7A, diagram 700B of FIG. 7B, in diagram 800 of FIG. 8, diagram 900A of FIG. 9A, in diagram 900B of FIG. 9B, in diagram 1000A of FIG. 10A, diagram 1000B of FIG. 10B, in diagram 1000C of FIG. 10C, and diagram 1000D of FIG.

Figure 12:
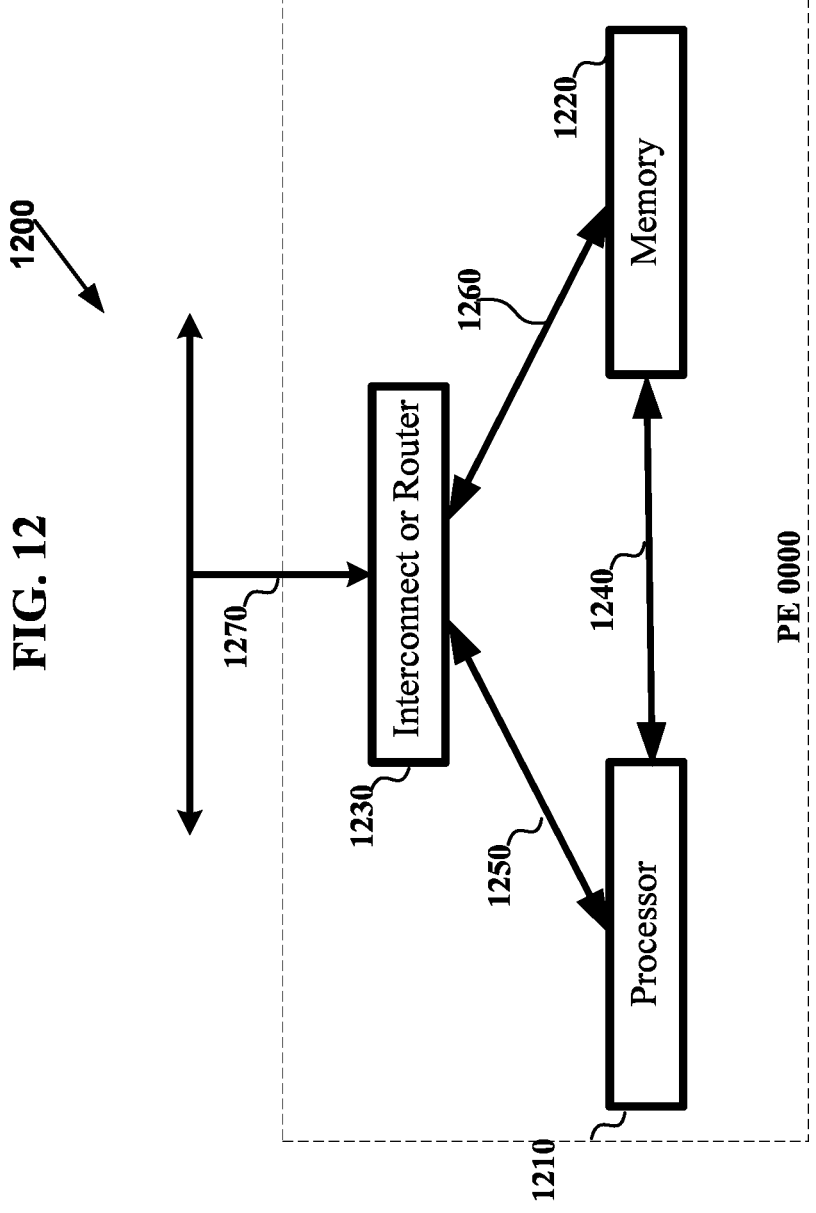
FIG. 12 is a diagram 1200, in one embodiment, with illustration of processor, local memory and interconnect and the connections between them at each PE in an exemplary 2D-BFTHypercube interconnection network with a*b 2D-grid of PEs scalable for distributed computing system, in accordance with the invention.

10D, in diagram 1100A of FIG. 11A, diagram 1100B of FIG. 11B, in diagram 1100C of FIG. 11C, diagram 1100D of FIG. 11D, in diagram 1100E of FIG. 11E, and diagram 1100F of FIG. 11F each PE comprises, in addition to the interconnect, a processor and local memory as shown in diagram 1200 of FIG. 12.

Referring to diagram 1200 of FIG. 12, in an exemplary processing element PE 0000 comprises a processor 1210, local memory or computer local memory 1220, and interconnect 1230. Processor 1210 and local memory 1220 is connected by a bus 1240. Processor 1210 and interconnect 1230 is connected by a bus 1250. Interconnect 1230 and local memory 1220 is connected by a bus 1260. Interconnect 1230 is connected to the rest of processing elements through buses 1270 and so to the interconnection network. In general, in accordance with the current invention, each of axb processing elements arranged in a two dimensional grid comprise a processor, local memory and interconnect as shown in diagram 1200 of FIG. 12.

In one embodiment, in diagram 100A1 of FIG. 1A1, diagram 100B of FIG. 1B, in diagram 100C of FIG. 1C, diagram 200B of FIG. 2B, in diagram 300 of FIG. 3, diagram 400 of FIG. 4, in diagram 500A of FIG. 5A, diagram 500B of FIG. 5B, in diagram 600A of FIG. 6A, diagram 600B of FIG. 6B, in diagram 700A of FIG. 7A, diagram 700B of FIG. 7B, in diagram 800 of FIG. 8, diagram 900A of FIG. 9A, in diagram 900B of FIG. 9B, in diagram 1000A of FIG. 10A, diagram 1000B of FIG. 10B, in diagram 1000C of FIG. 10C, diagram 1000D of FIG. 10D, and diagram 1200 of FIG. 12 processor of each processing element is a Central Processing Unit ("CPU") comprises functional units that perform such as additions, multiplications, or logical operations, for executing computer programs.

In another embodiment, in diagram 100A1 of FIG. 1A1, diagram 100B of FIG. 1B, in diagram 100C of FIG. 1C, diagram 200B of FIG. 2B, in diagram 300 of FIG. 3, diagram 400 of FIG. 4, in diagram 500A of FIG. 5A, diagram 500B of FIG. 5B, in diagram 600A of FIG. 6A, diagram 600B of FIG. 6B, in diagram 700A of FIG. 7A, diagram 700B of FIG. 7B, in diagram 800 of FIG. 8, diagram 900A of FIG. 9A, in diagram 900B of FIG. 9B, in diagram 1000A of FIG. 10A, diagram 1000B of FIG. 10B, in diagram 1000C of FIG. 10C, diagram 1000D of FIG. 10D, and diagram 1200 of FIG. 12 processor of each processing element comprises a domain specific architecture ("DSA") based Deep Neural Network ("DNN") processor comprising one or more multiply accumulate ("MAC") units for matrix multiply operations.

Figure 13:
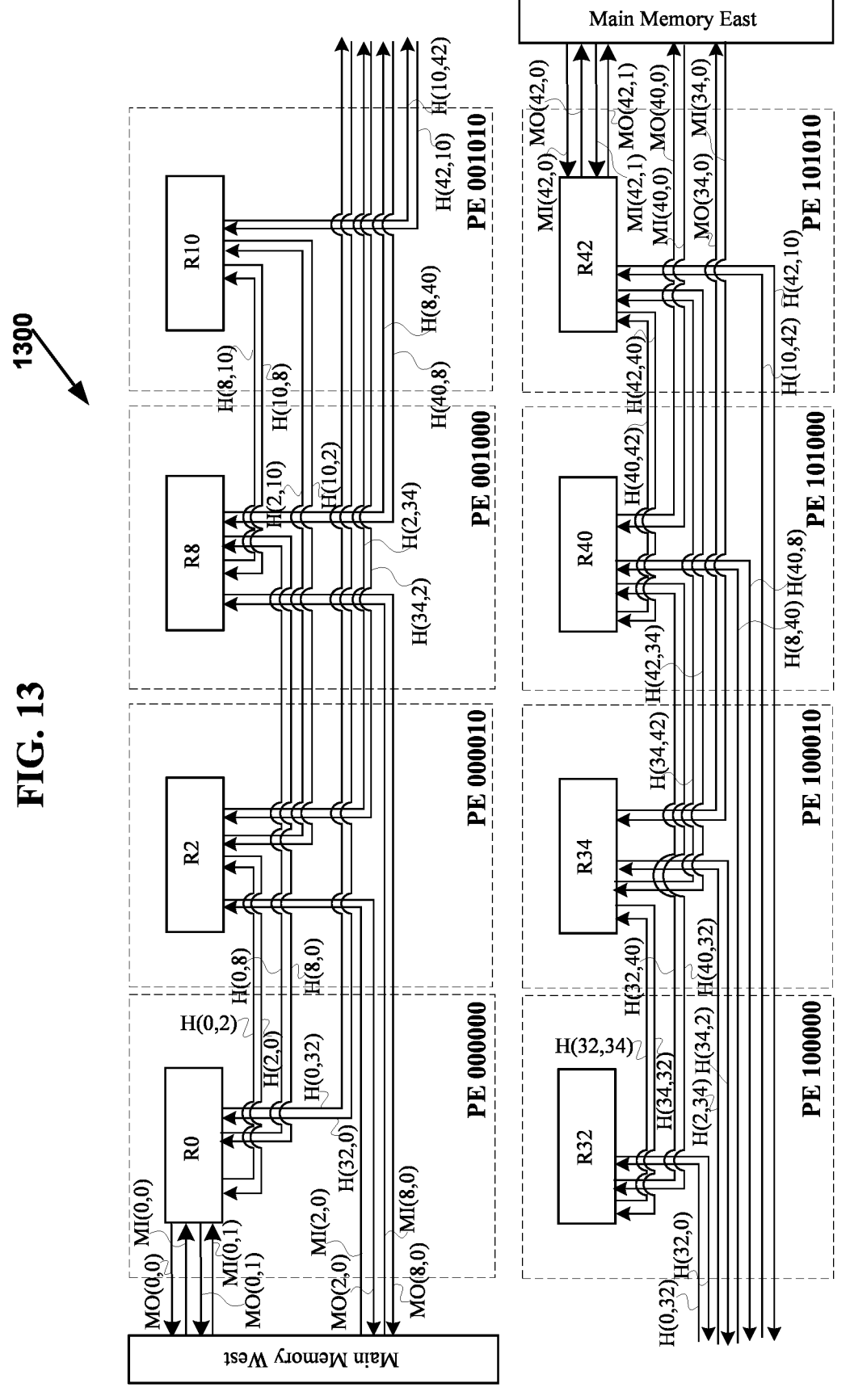
FIG. 13 is a diagram 1300 of illustration of a top row of PEs in an exemplary 2D-BFTHypercube interconnection network either with diagrams 200C-D in FIG. 2C-D of an 8*8 2D-grid of PEs or with diagrams 200E-F in FIG. 2E-F of 16*8 2D-grid of PEs scalable for distributed computing system coupled with shared memory in the east and west sides, in accordance with the invention.

Referring to FIG. 13 is a diagram 1300 of illustration of the top row of PEs in an exemplary 2D-BFTHypercube interconnection network either with diagrams 200C-D in FIG. 2C-D of an 8*8 2D-grid of PEs or with diagrams 200E-F in FIG. 2E-F of 16*8 2D-grid of PEs scalable for distributed computing system coupled with shared memory in the east and west sides. Specifically, the top row of PEs is PE 000000, PE 000010, PE 001000, PE 001010, PE 100000, PE 100010, PE 101000, and PE 101010.

The interconnect bus topology of the top row of PEs is illustrated in diagram 1300 in FIG. 13. For example, since PE 100000 is placed $2^2=4$ hop away from PE 000000 since $(2\times2+2)th=6^{th}$ least significant bit for PE 000000 is 0 which is different from 6th least significant bit of PE 100000 which is 1. Accordingly, PE 100000 is placed four hops away horizontally right from PE 000000. And horizontal bus denoted by H(0,32) is connected from PE 0 to PE 32 and a horizontal bus denoted by H(32,0) is connected from PE 32 to PE 0; Both H(0,32) and H(32,0) have hop length of four. For the simplicity of illustration diagram 1300 in FIG. 13 illustrates only the horizontal buses in the top row of PEs.

Referring to diagram 1300 in FIG. 13, in one embodiment, there is main memory or shared main memory physically located on the east side and west side of the 2D-grid of PEs and all the PEs in the 2D-grid access (i.e., read data or write data) main memory via the 2D-BFTHypercube interconnection network. PE 000000 is directly connected to the Main Memory West. Router R0 in PE 000000 is connected from Main Memory West with two buses MI(0,0) and MI(0,1). Main Memory West is connected from Router R0 in PE 000000 with two buses MO(0,0) and MO(0,1).

Router R2 in PE 000010 is connected from Main Memory West with one bus MI(2,0). Main Memory West is connected from Router R2 in PE 000010 with one bus MO(2,0). Router R8 in PE 001000 is connected from Main Memory West with one bus MI(8,0). Main Memory West is connected from Router R8 in PE 001000 with one bus MO(8,0).

Similarly, PE 101010 is directly connected to the Main Memory East. Router R42 in PE 101010 is connected from Main Memory East with two buses MI(42,0) and MI(42,1). Main Memory East is connected from Router RA in PE 101010 with two buses MO(42,0) and MO(42,1).

Router R40 in PE 101000 is connected from Main Memory East with one bus MI(40,0). Main Memory East is connected from Router R40 in PE 101000 with one bus MO(40,0). Router R34 in PE 100010 is connected from Main Memory East with one bus MI(34,0). Main Memory East is connected from Router R34 in PE 100010 with one bus MO(34,0).

Accordingly, the leftmost PE i.e., PE 000000 is connected to Main Memory West with two memory buses in both directions. Second leftmost PE i.e., PE 000010 is connected to Main Memory West with one memory bus in both directions. Third leftmost PE i.e., PE 001000 is connected to Main Memory West with one memory bus in both directions. Also, the rightmost PE i.e., PE 101010 is connected to Main Memory East with two memory buses in both directions. Second rightmost PE i.e., PE 101000 is connected to Main Memory East with one memory bus in both directions. Third rightmost PE i.e., PE 100010 is connected to Main Memory East with one memory bus in both directions.

Just the way it is illustrated for the top row of PEs in diagram 1300 in FIG. 13, the memory buses in all the rows in diagrams 200C-D in FIG. 2C-D of an 8*8 2D-grid of PEs and in diagrams 200E-F in FIG. 2E-F of 16*8 2D-grid of PEs are connected scalable for distributed computing system coupled with shared memory in the east and west sides, according to the current invention. Specifically, the leftmost PE in each row is connected to Main Memory West with two memory buses in both directions. Second leftmost PE in each row is connected to Main Memory West with one memory bus in both directions.

Third leftmost PE in each row is connected to Main Memory West with one memory bus in both directions. Also, the rightmost in each row is connected to Main Memory East with two memory buses in both directions. Second rightmost PE in each row is connected to Main Memory East with one memory bus in both directions. Third rightmost PE in each row is connected to Main Memory East with one memory bus in both directions.

Figure 14A:
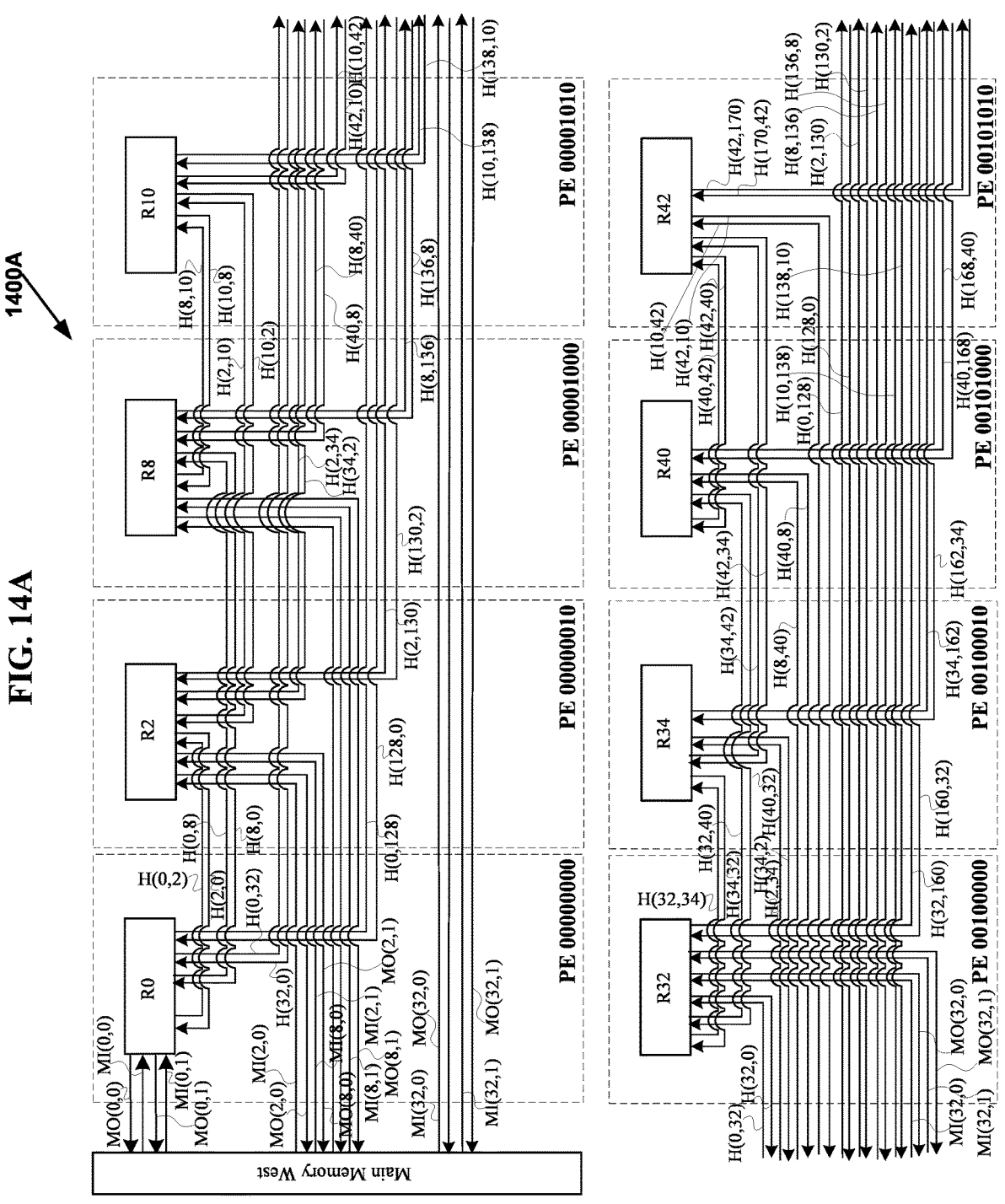
FIG. 14A is a diagram 1400A of illustration of a left half of top row of PEs in an exemplary 2D-BFTHypercube interconnection network either with diagrams 200G-H in FIG. 2G-H of 16*16 2D-grid of PEs or with a 32*16 2D-grid of PEs scalable for distributed computing system coupled with shared memory in the east and west sides, in accordance with the invention.
Figure 14B:
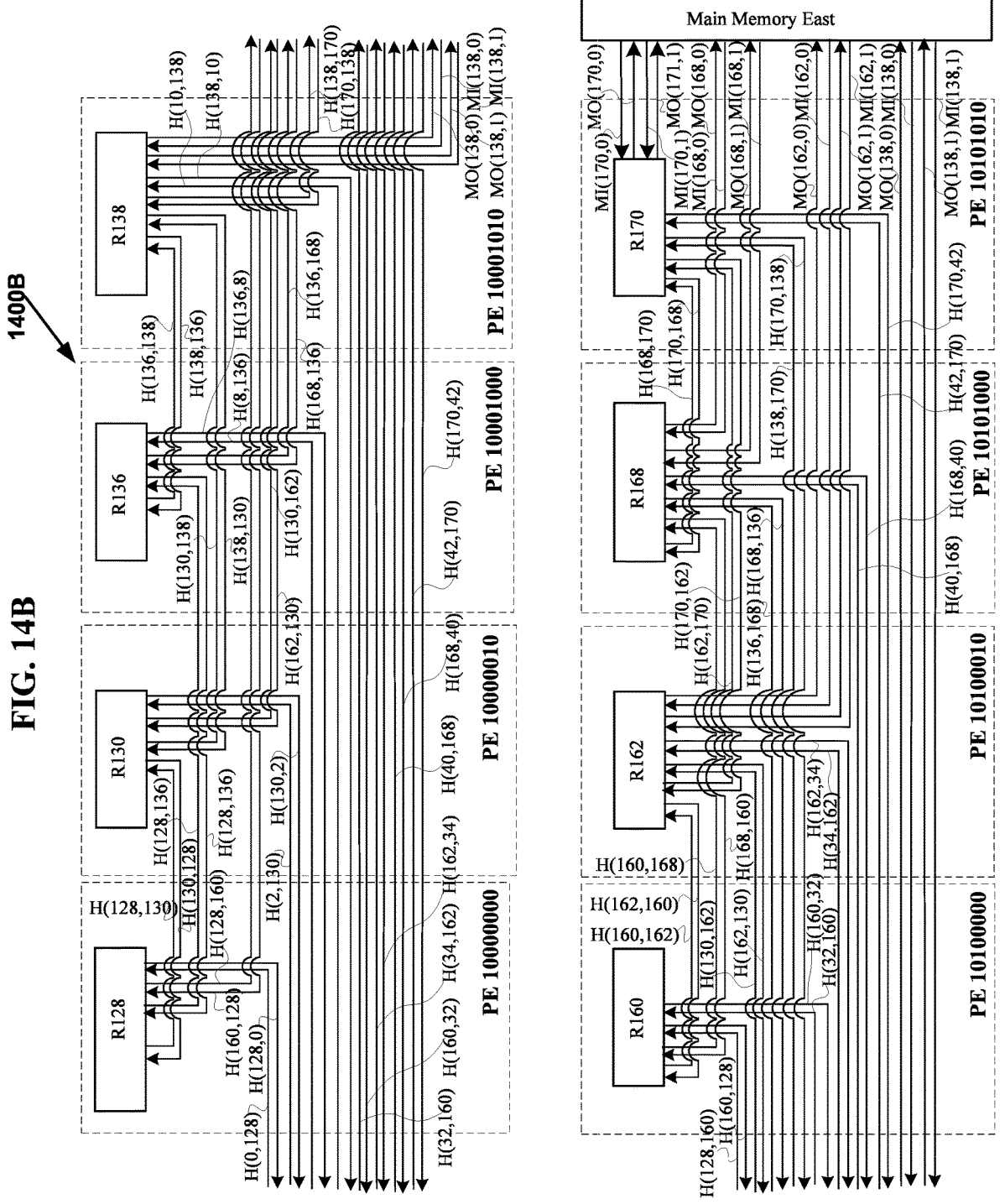
FIG. 14B is a diagram 1400B of illustration of a right half of top row of PEs in an exemplary 2D-BFTHypercube interconnection network either with diagrams 200G-H in FIG. 2G-H of 16*8 2D-grid of PEs or with a 16*16 2D-grid of PEs scalable for distributed computing system coupled with shared memory in the east and west sides, in accordance with the invention.

Referring to FIG. 14A is a diagram 1400A of illustration of the left half of top row of PEs in an exemplary 2D-BFT-Hypercube interconnection network either with diagrams 200G-H in FIG. 2G-H of 16*16 2D-grid of PEs or with a 32*16 2D-grid of PEs scalable for distributed computing system coupled with shared memory in the east and west sides. Referring to FIG. 14B is a diagram 1400B of illustration of the right half of top row of PEs in an exemplary 2D-BFTHypercube interconnection network either with diagrams 200G-H in FIG. 2G-H of 16*16 2D-grid of PEs or with a 16*16 2D-grid of PEs scalable for distributed computing system coupled with shared memory in the east and west sides. Accordingly, together FIGS. 14A-B in diagrams 1400A-B illustrate the top row of PEs in an exemplary 2D-BFTHypercube interconnection network either with diagrams 200G-H in FIG. 2G-H of 16*16 2D-grid of PEs or with a 16*16 2D-grid of PEs scalable for distributed computing system coupled with shared memory in the east and west sides.

Specifically the top row of PEs comprises the left half of top row of PEs illustrated in diagram 1400A of FIG. 14A are PE 00000000, PE 00000010, PE 00001000, PE 00001010, PE 00100000, PE 00100010, PE 00101000, and PE 00101010, and the right half of top row of PEs illustrated in diagram 1400B of FIG. 14B going from left to right are PE 10000000, PE 10000010, PE 10001000, PE 10001010, PE 10100000, PE 10100010, PE 10101000, and PE 10101010.

The interconnect bus topology of the top row of PEs is illustrated in diagrams 1400A-B in FIGS. 14A-B. For example, since PE 10000000 is placed $2^3$=8 hop away from PE 00000000 since (2×3+2)th=$8^{th}$ least significant bit for PE 00000000 is 0 which is different from $8^{th}$ least significant bit of PE 10000000 which is 1. Accordingly, PE 10000000 is placed eight hops away horizontally right from PE 00000000. And horizontal bus denoted by H(0,128) is connected from PE 0 to PE 128 and a horizontal bus denoted by H(128,0) is connected from PE 128 to PE 0; Both H(0,128) and H(128,0) have hop length of eight. For the simplicity of illustration diagram 1400A-B in FIG. 14A-B illustrates only the horizontal buses in the top row of PEs.

Referring to diagram 1400A-B in FIG. 14A-B, in one embodiment, there is main memory or shared main memory physically located on the east side and west side of the 2D-grid of PEs and all the PEs in the 2D-grid access (i.e., read data or write data) main memory via the 2D-BFTHypercube interconnection network. PE 00000000 is directly connected to the Main Memory West. Router R0 in PE 00000000 is connected from Main Memory West with two buses MI(0,0) and MI(0,1). Main Memory West is connected from Router R0 in PE 00000000 with two buses MO(0,0) and MO(0,1).

Router R2 in PE 00000010 is connected from Main Memory West with two buses MI(2,0) and MI(2,1). Main Memory West is connected from Router R2 in PE 00000010 with one bus MO(2,0) and MO(2,1). Router R8 in PE 00001000 is connected from Main Memory West with two buses MI(8,0) and MI(8,1). Main Memory West is connected from Router R8 in PE 00001000 with two buses MO(8,0) and MO(8,1). Router R32 in PE 00100000 is connected from Main Memory West with two buses MI(32, 0) and MI(32,1). Main Memory West is connected from Router R32 in PE 00100000 with two buses MO(32,0) and MO(32,1).

Similarly, PE 10101010 is directly connected to the Main Memory West. Router R170 in PE 10101010 is connected from Main Memory West with two buses MI(170,0) and MI(170,1). Main Memory West is connected from Router R170 in PE 10101010 with two buses MO(170,0) and MO(170,1).

Router R168 in PE 10101000 is connected from Main Memory West with two buses MI(168,0) and MI(168,1). Main Memory West is connected from Router R168 in PE 10101000 with one bus MO(168,0) and MO(168,1). Router R162 in PE 10100010 is connected from Main Memory West with two buses MI(162,0) and MI(162,1). Main Memory West is connected from Router R162 in PE 10100010 with two buses MO(162,0) and MO(162,1). Router R138 in PE 10001010 is connected from Main Memory West with two buses MI(138,0) and MI(138,1). Main Memory West is connected from Router R138 in PE 10100010 with two buses MO(138,0) and MO(138,1).

Accordingly, the leftmost PE i.e., PE 00000000 is connected to Main Memory West with two memory buses in both directions. Second leftmost PE i.e., PE 00000010 is connected to Main Memory West with two memory buses in both directions. Third leftmost PE i.e., PE 00001000 is connected to Main Memory West with two memory buses in both directions. Fifth leftmost PE i.e., PE 00100000 is connected to Main Memory West with two memory buses in both directions.

And the rightmost PE i.e., PE 10101010 is connected to Main Memory East with two memory buses in both directions. Second rightmost PE i.e., PE 10101000 is connected to Main Memory East with two memory buses in both directions. Third rightmost PE i.e., PE 10100010 is connected to Main Memory East with two memory buses in both directions. Fifth rightmost PE i.e., PE 10001010 is connected to Main Memory East with two memory buses in both directions.

Just the way it is illustrated for the top row of PEs together in diagrams 1400A-B in FIG. 14-B, the memory buses in all the rows in diagrams 200G-H in FIG. 2G-H of an 16*16 2D-grid of PEs and in a 32*16 2D-grid of PEs are connected scalable for distributed computing system coupled with shared memory in the east and west sides, according to the current invention. Specifically, the leftmost PE in each row is connected to Main Memory West with two memory buses in both directions. Second leftmost PE in each row is connected to Main Memory West with two memory buses in both directions. Third leftmost PE in each row is connected to Main Memory West with two memory buses in both directions. Fifth leftmost PE in each row is connected to Main Memory West with two memory buses in both directions.

Figure 15A:
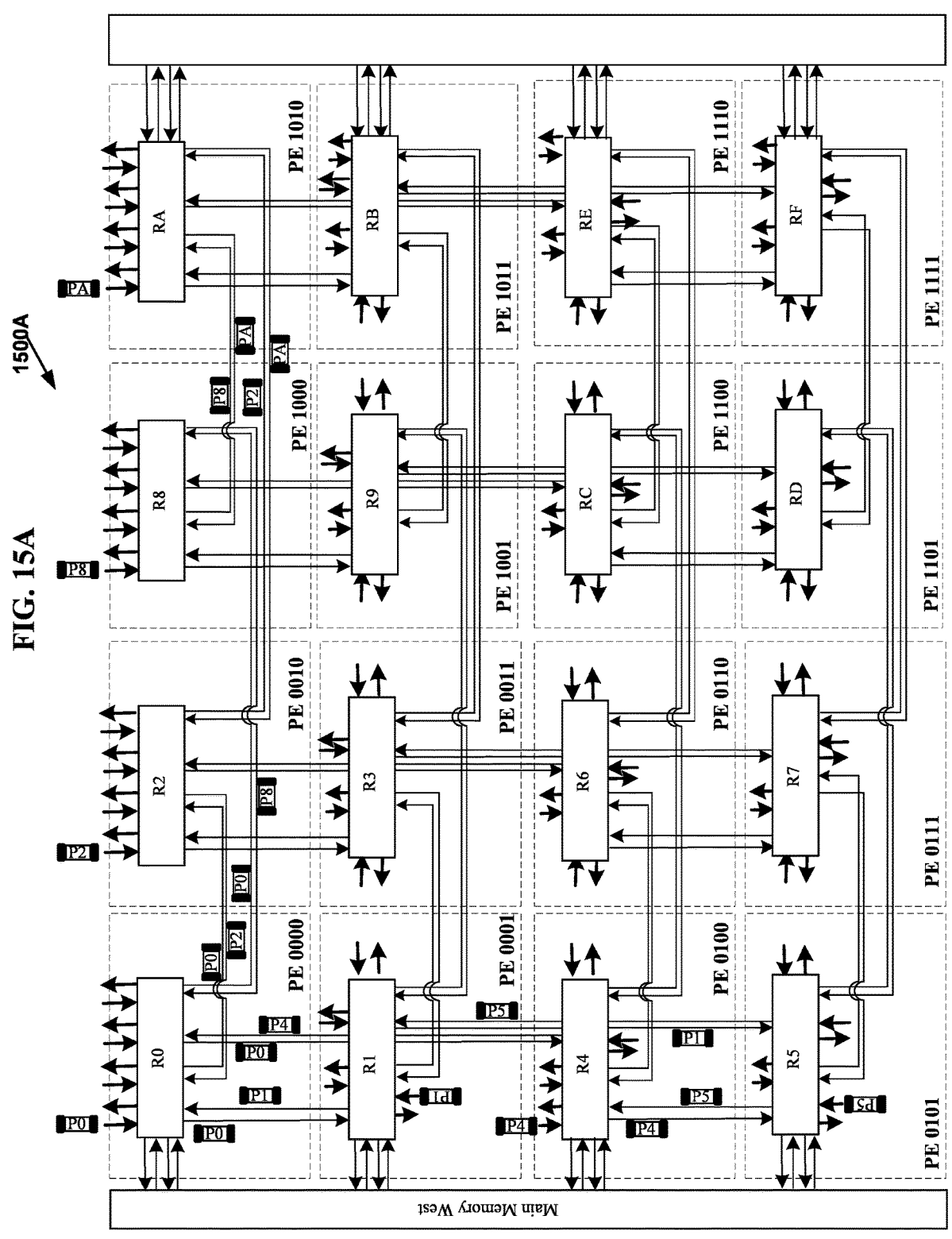
FIG. 15A is a diagram 1500A of illustration of time step 1 of deterministic concurrent broadcast by all PEs in a row in two time steps and simultaneously concurrent broadcast by all PEs in a column in two time steps in an exemplary 2D-BFTHypercube interconnection network with 4*4 2D-grid of PEs scalable for distributed computing system with shared memory, in accordance with the invention.
Figure 15B:
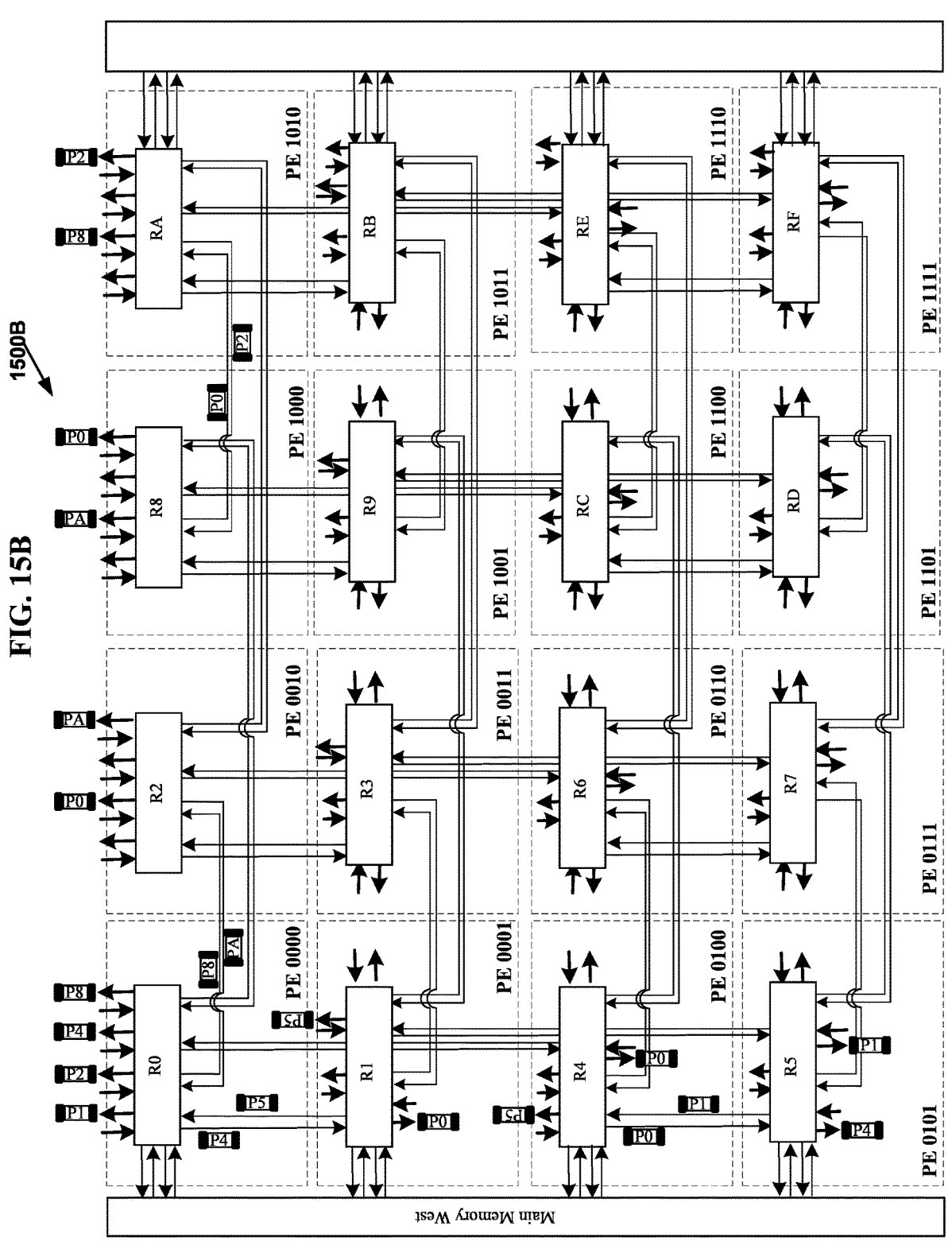
FIG. 15B is a diagram 1500B of illustration of time step 2 of deterministic concurrent broadcast by all PEs in a row in two time steps and simultaneously concurrent broadcast by all PEs in a column in two time steps in an exemplary 2D-BFTHypercube interconnection network with 4*4 2D-grid of PEs scalable for distributed computing system with shared memory, in accordance with the invention.

Also, the rightmost in each row is connected to Main Memory East with two memory buses in both directions. Second rightmost PE in each row is connected to Main Memory East with two memory buses in both directions. Third rightmost PE in each row is connected to Main Memory East with two memory buses in both directions. Fifth rightmost PE in each row is connected to Main Memory East with two memory buses in both directions. Deterministic Concurrent Broadcast by all PEs in a Sub-1D-Grid of PEs Either in a Row Or a Column in Two Time Steps in an Exemplary 2D-BFTHypercube Interconnection Network with 4*4 2D-Grid of PEs:

Referring to diagrams 1500A of FIGS. 15A and 1500B of FIG. 15B illustrate deterministic concurrent broadcast by all PEs in a sub-1D-grid with 1) all the PEs are in a row hereinafter "row-grid" or 2) if all the PEs are in a column hereinafter "column-grid", simultaneously, in two time steps in the exemplary 2D-BFTHypercube interconnection network with 4*4 2D-grid of 16 PEs shown in diagram 100A1 of FIG. 1A1 or diagram 100A2 of FIG. 1A2 and diagram 100C of FIG. 1C.

Specifically, PE 0000 has packet P0, PE 0001 has packet P1, PE 0010 has packet P2, PE 0100 has packet P4, PE 0101 has packet P5, PE 1000 has packet P8, and PE 1010 has packet P10 or PA. PE 0000, PE 0001, PE 0100, and PE 0101 are the top row of PEs and a row-grid. PE 0000, PE 0010, PE 1000, and PE 1010 are the leftmost column of PEs and a column-grid. Diagrams 1500A of FIGS. 15A and 1500B of FIG. 15B illustrate simultaneous deterministic concurrent broadcast by all PEs in the top row or row-grid, and deterministic concurrent broadcast by all PEs in the leftmost column or a column-grid in two time steps.

As shown in diagram 1500A of FIG. 15A, in time step 1, Packet P0 is multicasted with fan out 4 from PE 0000 to PE 0001, PE 0010, PE 0100 and PE 1000. From PE 0000 to PE 0001 the path is via local inlet bus I(0,0), Router R0, vertical bus V(0,1), Router R1, and local outlet bus O(1,0). From PE 0000 to PE 0010 the path is via local inlet bus I(0,0), Router R0, horizontal bus H(0,2), Router R2, and local outlet bus O(2,1). From PE 0000 to PE 0100 the path is via local inlet bus I(0,0), Router R0, vertical bus V(0,4), Router R4, and local outlet bus O(4,2). From PE 0000 to PE 1000 the path is via local inlet bus I(0,0), Router R0, horizontal bus V(0,8), Router R8, and local outlet bus O(8,3).

Concurrently in time step 1, Packet P1 is multicasted with fan out 2 from PE 0001 to PE 0000 and PE 0101. From PE 0001 to PE 0000 the path is via local inlet bus I(1,0), Router R1, vertical bus V(1,0), Router R0, and local outlet bus O(0,0). From PE 0001 to PE 0101 the path is via local inlet bus I(1,0), Router R1, vertical bus V(1,5), Router R5, and local outlet bus O(5,2).

As shown in diagram 1500A of FIG. 15A, in time step 1, Packet P2 is multicasted with fan out 2 from PE 0010 to PE 0000 and PE 1010. From PE 0010 to PE 0000 the path is via local inlet bus I(2,0), Router R2, horizontal bus H(2,0), Router R0, and local outlet bus O(0,1). From PE 0010 to PE 1010 the path is via local inlet bus I(2,0), Router R2, horizontal bus V(2,A), Router RA, and local outlet bus O(A,3).

As shown in diagram 1500A of FIG. 15A, in time step 1, Packet P4 is multicasted with fan out 2 from PE 0100 to PE 0101 and PE 0000. From PE 0100 to PE 0101 the path is via local inlet bus I(4,0), Router R4, vertical bus V(4,5), Router R5, and local outlet bus O(5,0). From PE 0100 to PE 0000 the path is via local inlet bus I(4,0), Router R4, vertical bus V(4,0), Router R0, and local outlet bus O(0,2).

Concurrently in time step 1, Packet P5 is multicasted with fan out 2 from PE 0101 to PE 0100 and PE 0001. From PE 0101 to PE 0100 the path is via local inlet bus I(5,0), Router R5, vertical bus V(5,4), Router R4, and local outlet bus O(4,0). From PE 0101 to PE 0001 the path is via local inlet bus I(5,0), Router R5, vertical bus V(5,1), Router R1, and local outlet bus O(1,2).

As shown in diagram 1500A of FIG. 15A, in time step 1, Packet P8 is multicasted with fan out 2 from PE 1000 to PE 1010 and PE 0000. From PE 1000 to PE 1010 the path is via local inlet bus I(8,0), Router R8, horizontal bus H(8,A), Router RA, and local outlet bus O(A,1). From PE 1000 to PE 0000 the path is via local inlet bus I(8,0), Router R8, horizontal bus V(8,0), Router R0, and local outlet bus O(0,3).

As shown in diagram 1500A of FIG. 15A, in time step 1, Packet PA is multicasted with fan out 2 from PE 1010 to PE 1000 and PE 0010. From PE 1010 to PE 1000 the path is via local inlet bus I(A,0), Router RA, horizontal bus H(A,8), Router R8, and local outlet bus O(8,1). From PE 1010 to PE 0010 the path is via local inlet bus I(A,0), Router RA, horizontal bus V(A,2), Router R2, and local outlet bus O(2,3).

Also in time step 1, eight vertical buses namely V(0,1), V(1,0), V(4,5), V(5,4), V(0,4), V(4,0), V(1,5), and V(5,1) and eight horizontal buses namely H(0,2), H(2,0), H(0,8), H(8,0), H(2,A), H(A,2), H(8,A), and H(A,8) are concurrently utilized.

To summarize in time step 1, PE 0000 received packets P1, P2, P4 and P8; PE 0001 received packets P0 and P5; PE 0010 received packets P0 and PA; PE 0100 received packets P5 and P0; PE 0101 received packets P4 and P1; PE 1000 received packets PA and P0; PE 1010 received packets P8 and P2.

PE 0000 receives packets P1 and P2 in a shorter time and packets P4 and P8 in a longer time, since V(4,0) and H(8,0) have hop length of 2 which is greater than the hop length 1 of V(1,0) and H(2,0). In this embodiment time step 1 is the duration of the time until the packets P4 and P8 are received by PE 0000. Similarly for all the PEs in the row-grid and for all the PEs in the column-grid, time step 1 is the duration of the time until the all the packets are received by each PE.

As shown in diagram 1500B of FIG. 15B, in time step 2, Packet P4 and P8 are multicasted with fanout 2 from PE 0000 to PE 0001, packet P5 is unicasted from PE 0001 to PE 0000 and packet PA is unicasted from PE 0010 to PE 0000. In the column-grid, from PE 0000 to PE 0001 the path is via Router R0, vertical bus V(0,1), Router R1, and local outlet bus O(1,0). Concurrently in time step 2, Packet P5 is unicasted from PE 0001 to PE 0000. In the column-grid, from PE 0001 to PE 0000 the path is via Router R1, vertical bus V(1,0), Router R0, and local outlet bus O(0,0).

In the row-grid, from PE 0000 to PE 0010 the path is via Router R0, horizontal bus V(0,2), Router R2, and local outlet bus O(2,0). Concurrently in time step 2, Packet PA is unicasted from PE 0010 to PE 0000. In the row-grid, from PE 0010 to PE 0000 the path is via Router R2, horizontal bus V(2,0), Router R0, and local outlet bus O(0,0).

As shown in diagram 1500B of FIG. 15B, in time step 2, Packet P0 is unicasted from PE 0100 to PE 0101. In the column-grid, from PE 0100 to PE 0101 the path is via Router R4, vertical bus V(4,5), Router R5, and local outlet bus O(5,0). Concurrently in time step 2, Packet P1 is unicasted from PE 0101 to PE 0100. In the column-grid, from PE 0101 to PE 0100 the path is via Router R5, vertical bus V(5,4), Router R4, and local outlet bus O(4,0).

As shown in diagram 1500B of FIG. 15B, in time step 2, Packet P0 is unicasted from PE 1000 to PE 1010. In the column-grid, from PE 1000 to PE 1010 the path is via Router R8, horizontal bus V(8,A), Router RA, and local outlet bus O(A,0). Concurrently in time step 2, Packet P2 is unicasted from PE 1010 to PE 1000. In the column-grid, from PE 1010 to PE 1000 the path is via Router RA, horizontal bus V(A,8), Router R8, and local outlet bus O(8,0).

Also in time step 2, four vertical buses namely V(0,1), V(1,0), V(4,5) and V(5,4) and four horizontal buses namely H(0,2), H(2,0), H(8,A), and H(A,8) are concurrently utilized.

To summarize in time step 2, PE 0000 received packet P5 and PA; PE 0001 received packet P4; PE 0010 received packet P8; PE 0100 received packet P1; PE 0101 received packet P0. PE 1000 received packet P2; PE 1010 received packet P0.

In general, with processing elements arranged in two dimensional grid according to the current invention, in the concurrent broadcast of packets by each PE in a row-grid or column-grid, in the path of a packet from a source processing element to a target processing element there will be one or more intermediate processing elements unless source processing element and target processing element are directly connected to each other by a vertical bus or horizontal bus. Applicant notes that, for example, in diagram

1500A of FIG. 15A and diagram 1500B of FIG. 15B for example in the path of Packet P0 from PE 0000 to PE 1010, packet P0 traverses from PE 0000 to PE 0010 to PE 1010. In this example, in the path for packet P0, PE 0000 is the source processing element; PE 1010 is the target processing element; And PE 0010 is an intermediate processing element.

So, in a row-grid or column-grid of the 2D-BFTHypercube interconnection network with 4*4 2D-grid shown in diagrams 1500A-B of FIG. 15A-B for concurrent broadcast by PEs to all the rest of the PEs, it takes two time steps. Since the interconnection network is non-blocking, as illustrated in diagrams 1500A-B of FIG. 15A-B respectively, no queuing of packets is needed, and no collisions will occur.

To broadcast "n" number of packets, where n is positive number, by each PE to the rest of the PEs in a row-grid or column-grid, it requires 2*n number of time steps in the exemplary 2D-BFTHypercube interconnection network with 4*4 2D-grid of 16 PEs shown in diagram 100A1 of FIG. 1A1 or diagram 100A2 of FIG. 1A2 and diagram 100B of FIG. 1B.

As illustrated in diagrams 1500A-B of FIG. 15A-B respectively, in one embodiment, all "n" packets, from each PE to every other PE in a row-grid or column-grid, is transmitted in the same fixed path. Accordingly, concurrent broadcast "n" number of packets from each PE to the rest of PEs, as shown in the exemplary 2D-BFTHypercube interconnection network with 4*4 2D-grid of 16 PEs shown in diagram 100A1 of FIG. 1A1 or diagram 100A2 of FIG. 1A2 and diagram 100B of FIG. 1B, it requires "2*n" number of time steps and no out of order arrival of packets occurs.

Applicant also notes that in a row-grid or column-grid of the 2D-BFTHypercube interconnection network with 4*4 2D-grid shown in diagrams 1500A-B of FIG. 15A-B, in each PE packets arrive in different order. So, each processor will be enabled to execute the instructions in the order of the arrival of packets in each PE.

Even though it is not illustrated, all the methods disclosed are applicable for any number of row-grids or column-grids simultaneously for concurrent broadcast of packets by each PE in a row-grid or column-grid. Also the size of 2D-BFT-Hypercube interconnection network with 4*4 2D-grid is scalable for a large sizes for example as disclosed in 4*8 2D-grid in diagram 200A of FIG. 2A, 4*8 2D-grid in diagram 200B of FIG. 2B, 8*8 2D-grid in diagram 200C of FIG. 2C, 8*8 2D-grid in diagram 200D of FIG. 2D, 8*16 2D-grid in diagram 200E of FIG. 2E, 16*16 2D-grid in diagram 200F of FIG. 2F, 16*32 2D-grid in diagram 200G of FIG. 2G, and 32*32 2D-grid in diagram 200H of FIG. 2H.

Figure 18A:
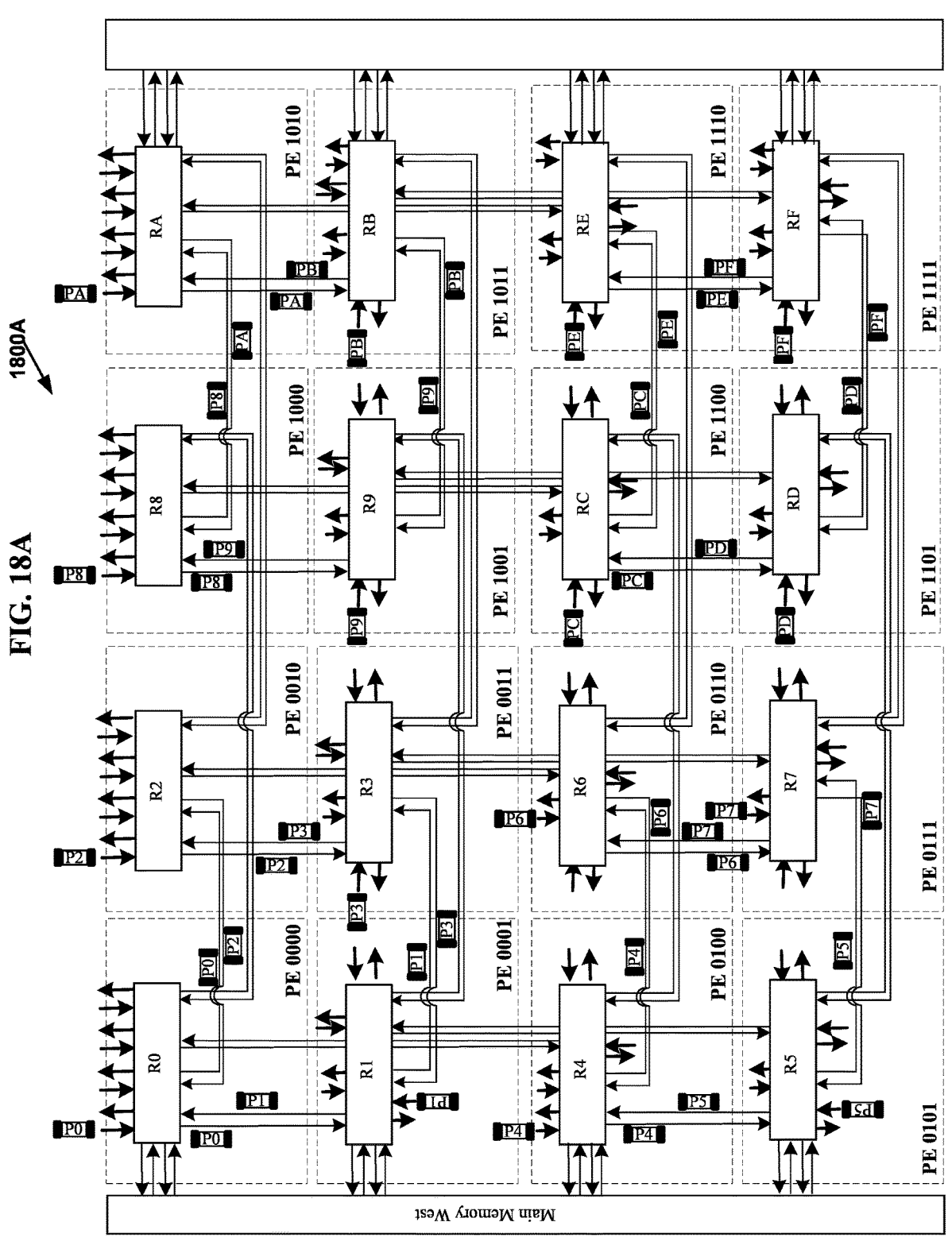
FIG. 18A is a diagram 1800A of illustration of time step 1 of simultaneous and deterministic concurrent broadcast by PEs in four different 2*2 sub-grids in two time steps in an exemplary 2D-BFTHypercube interconnection network with 4*4 2D-grid of PEs scalable for distributed computing system with shared memory, in accordance with the invention.
Figure 18B:
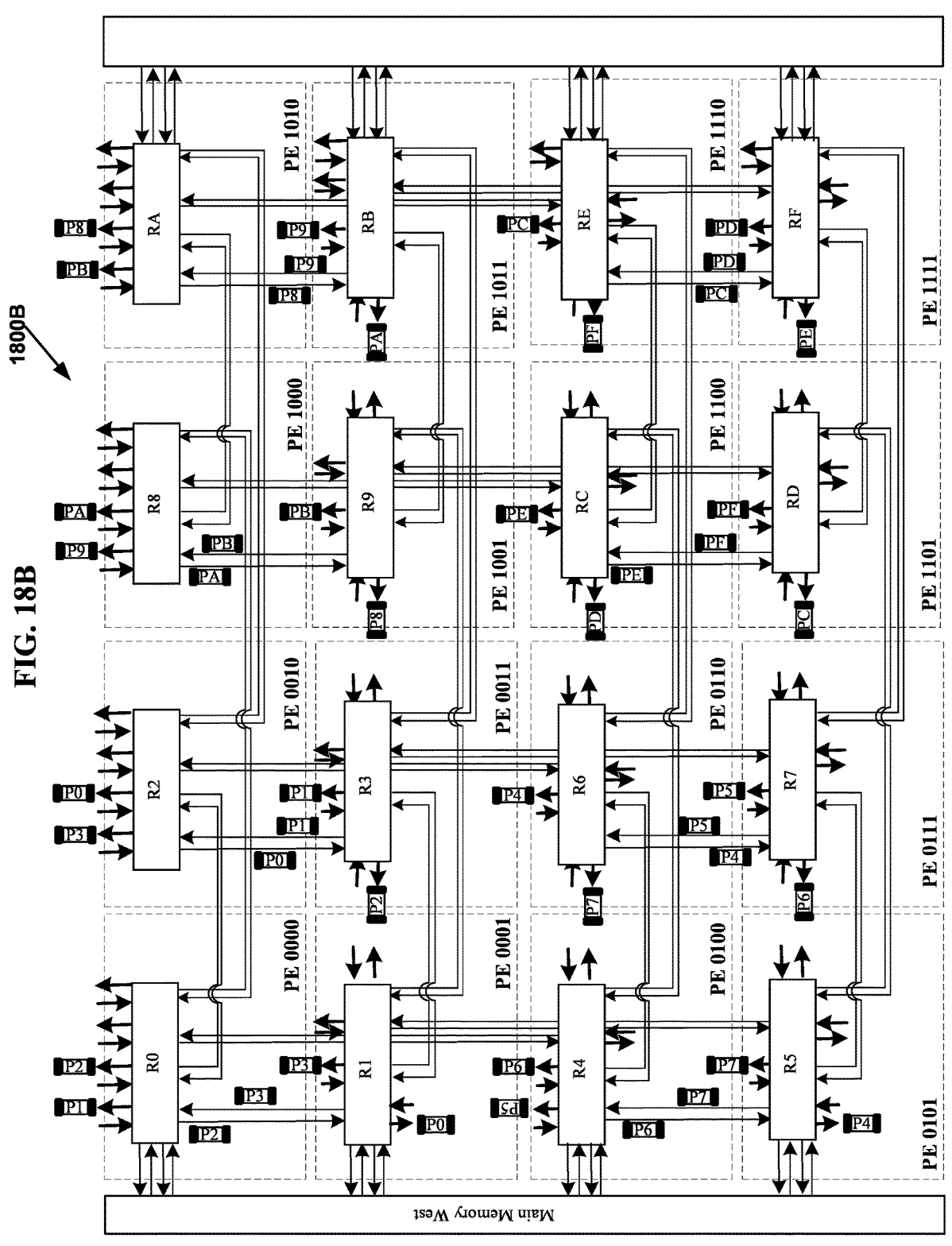
FIG. 18B is a diagram 1800B of illustration of time step 2 of simultaneous and deterministic concurrent broadcast by PEs in four different 2*2 sub-grids in two time steps in an exemplary 2D-BFTHypercube interconnection network with 4*4 2D-grid of PEs scalable for distributed computing system with shared memory, in accordance with the invention.

Simultaneous and Deterministic Concurrent Broadcast by PEs in Multiple Sub-2D-Grids in an Exemplary 2D-BFT-Hypercube Interconnection Network with 4*4 2D-Grid of PEs:

FIG. 18A is a diagram 1800A and FIG. 18B is a diagram of illustration of time step 1 and time step 2 respectively, of simultaneous and deterministic concurrent broadcast by PEs in four 2*2 sub-2D-grids namely 1) first 2*2 sub-2D-grid comprising PE 0000, PE 0001, PE 0010 and PE0011; 2) second 2*2 sub-2D-grid comprising PE 0100, PE 0101, PE 0110 and PE0111; 3) third 2*2 sub-2D-grid comprising PE 1000, PE 1001, PE 1010 and PE 1011; and 4) fourth 2*2 sub-2D-grid comprising PE 1100, PE 1101, PE 1110 and PE 1111, in two time steps of an exemplary 2D-BFTHypercube interconnection network with 4*4 2D-grid of PEs.

PE 0000 has packet P0, PE 0001 has packet P1, PE 0010 has packet P2 and PE 0011 has packet P3 to concurrently broadcast in the first 2*2 sub-2D-grid. PE 0100 has packet P4, PE 0101 has packet P5, PE 0110 has packet P6 and PE 0111 has packet P7 to concurrently broadcast in the second 2*2 sub-2D-grid. PE 1000 has packet P8, PE 1001 has packet P9, PE 1010 has packet P10 or PA and PE 1011 has packet P11 or PB to concurrently broadcast in the third 2*2 sub-2D-grid. PE 1100 has packet P12 or PC, PE 1101 has packet P13 or PD, PE 1110 has packet P14 or PE, and PE 1111 has packet P15 or PF to concurrently broadcast in the fourth 2*2 sub-2D-grid.

Deterministic concurrent broadcast by PEs in the first 2*2 sub-2D-grid as illustrated in diagram 1800A of FIG. 18A and diagram 18B of FIG. 18B of time step 1 and time step 2 respectively is the same as the deterministic concurrent broadcast by all PEs in 2*2 2D-grid of 4 PEs in Diagrams 900A of FIGS. 9A and 900B of FIG. 9B in time step 1 and time step 2 respectively.

Deterministic concurrent broadcast by PEs in the second, third and fourth 2*2 sub-2D-grid as illustrated in diagram 1800A of FIG. 18A and diagram 18B of FIG. 18B of time step 1 and time step 2 respectively are also similar to the deterministic concurrent broadcast by all PEs in 2*2 2D-grid of 4 PEs in diagrams 900A of FIGS. 9A and 900B of FIG. 9B in time step 1 and time step 2 respectively.

In general, with processing elements arranged in two dimensional grid according to the current invention, in the concurrent broadcast of packets by each PE in multiple sub-2D-grids, in the path of a packet from a source processing element to a target processing element there will be one or more intermediate processing elements unless source processing element and target processing element are directly connected to each other by a vertical bus or horizontal bus. Applicant notes that, for example, in diagram 1800A of FIG. 18A and diagram 1800B of FIG. 18B for example in the path of Packet P0 from PE 0000 to PE 0011, packet P0 traverses from PE 0000 to PE 0010 to PE 0011. In this example, in the path for packet P0, PE 0000 is the source processing element; PE 0010 is the target processing element; And PE 0011 is an intermediate processing element.

So, in multiple 2*2 sub-2D-grids of the 2D-BFTHypercube interconnection network with 4*4 2D-grid shown in diagrams 1800A-B of FIG. 18A-B for concurrent broadcast by PEs to the rest of the PEs in each 2*2 sub-2D-grid, it takes two time steps. Since the interconnection network is non-blocking, as illustrated in diagrams 1500A-B of FIG. 15A-B respectively, no queuing of packets is needed, and no collisions will occur.

To broadcast "n" number of packets, where n is positive number, by each PE to the rest of the PEs in each 2*2 sub-2D-grid, it requires 2*n number of time steps in the exemplary 2D-BFTHypercube interconnection network with 4*4 2D-grid of 16 PEs shown in diagram 100A1 of FIG. 1A1 or diagram 100A2 of FIG. 1A2 and diagram 100B of FIG. 1B.

As illustrated in diagrams 1800A-B of FIG. 18A-B respectively, in one embodiment, all "n" packets, from each PE to every other PE in each 2*2 sub-2D-grid, is transmitted in the same fixed path. Accordingly, concurrent broadcast "n" number of packets from each PE to the rest of PEs in multiple 2*2 sub-2D--grids, as shown in the exemplary 2D-BFTHypercube interconnection network with 4*4 2D-grid of 16 PEs shown in diagram 100A1 of FIG. 1A1 or diagram 100A2 of FIG. 1A2 and diagram 100B of FIG. 1B, it requires "2*n" number of time steps and no out of order arrival of packets occurs.

Applicant also notes that in multiple 2*2 sub-2D-grids of the 2D-BFTHypercube interconnection network with 4*4

2D-grid shown in diagrams 1800A-B of FIG. 18A-B, in each PE, packets arrive in different order. So, each processor will be enabled to execute the instructions in the order of the arrival of packets in each PE.

Even though it is not illustrated in the current invention, each of the multiple sub-2D-grids are of any size for example 1) two 2*4 sub-2D-grids, 2) two 4*2 sub-2D-grids, 3) one 2*4 sub-2D-grid, two 2*2 sub-2D-grids; Even in these scenarios simultaneous concurrent broadcast by PEs in multiple sub-2D-grids is deterministic in number of time steps, non-blocking, no queuing of packets is needed, and no collisions will occur. In general, all the methods disclosed are applicable in all these scenarios just like disclosed for four 2*2 sub-2D-grids.

Figure 16:
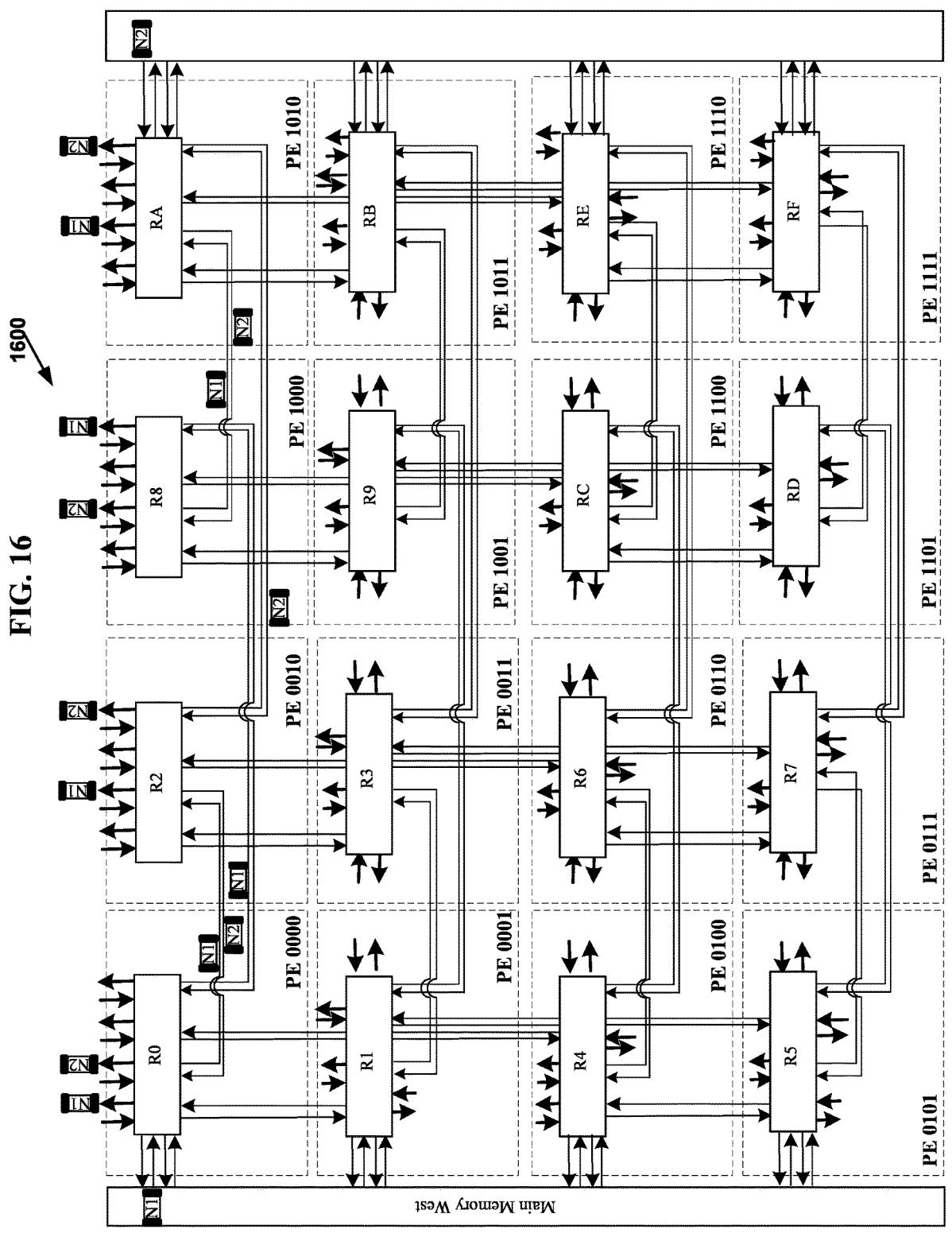
FIG. 16 is a diagram 1600 of illustration of simultaneous non-blocking multicast of a packet from main memory west to all PEs in a row and non-blocking multicast of another packet from main memory east to all PEs in the same row in an exemplary 2D-BFTHypercube interconnection network with 4*4 2D-grid of PEs scalable for distributed computing system with shared memory, in accordance with the invention.

Non-Blocking Multicast of a Packet from Main Memory West to all PEs in a Row and Non-Blocking Multicast of Another Packet from Main Memory East to all PEs in the Same Row:

FIG. 16 is a diagram 1600 of illustration of non-blocking multicast of a packet from main memory west to all PEs in a row and non-blocking multicast of another packet from main memory east to all PEs in the same row in an exemplary 2D-BFTHypercube interconnection network with 4*4 2D-grid of PEs.

Referring to diagram 1600 in FIG. 16, Packet N1 is in Main Memory West to be multicasted to all PEs in the top row consisting of PE 0000, PE 0010, PE 1000 and PE 1010; Packet N2 is in Main Memory East to be multicasted to all PEs in the top row consisting of PE 0000, PE 0010, PE 1000 and PE 1010.

Packet N1 is unicasted from Main Memory West to PE 0000. From Main Memory West to PE 0000 the path is via MI(0,0), Router R0, O(0,x) where x={0,3}. From PE 0000 packet N1 is multicasted with fan out 2 to PE 0010 and PE 1000. From PE 0000 to PE 0010 the path is via Router R0, horizontal bus H(0,2), Router R2, O(2,x). From PE 0000 to PE 1000 the path is via Router R0, horizontal bus H(0,8), Router R8, O(8,x). From PE 1000 packet N1 is unicasted to PE 1010. From PE 1000 to PE 1010 the path is via Router R8, horizontal bus H(8,A), Router RA, O(A,x).

Packet N2 is unicasted from Main Memory East to PE 1010. From Main Memory East to PE 1010 the path is via MI(A,0), Router RA, O(A,x) where x={0,3}. From PE 1010 packet N2 is multicasted with fan out 2 to PE 1000 and PE 0010. From PE 1010 to PE 1000 the path is via Router RA, horizontal bus H(A,8), Router R8, O(8,x). From PE 1010 to PE 0010 the path is via Router RA, horizontal bus H(A,2), Router R2, O(2,x). From PE 0010 packet N2 is unicasted to PE 0000. From PE 0010 to PE 0000 the path is via Router R2, horizontal bus H(2,0), Router R0, O(0,x).

Figure 19:
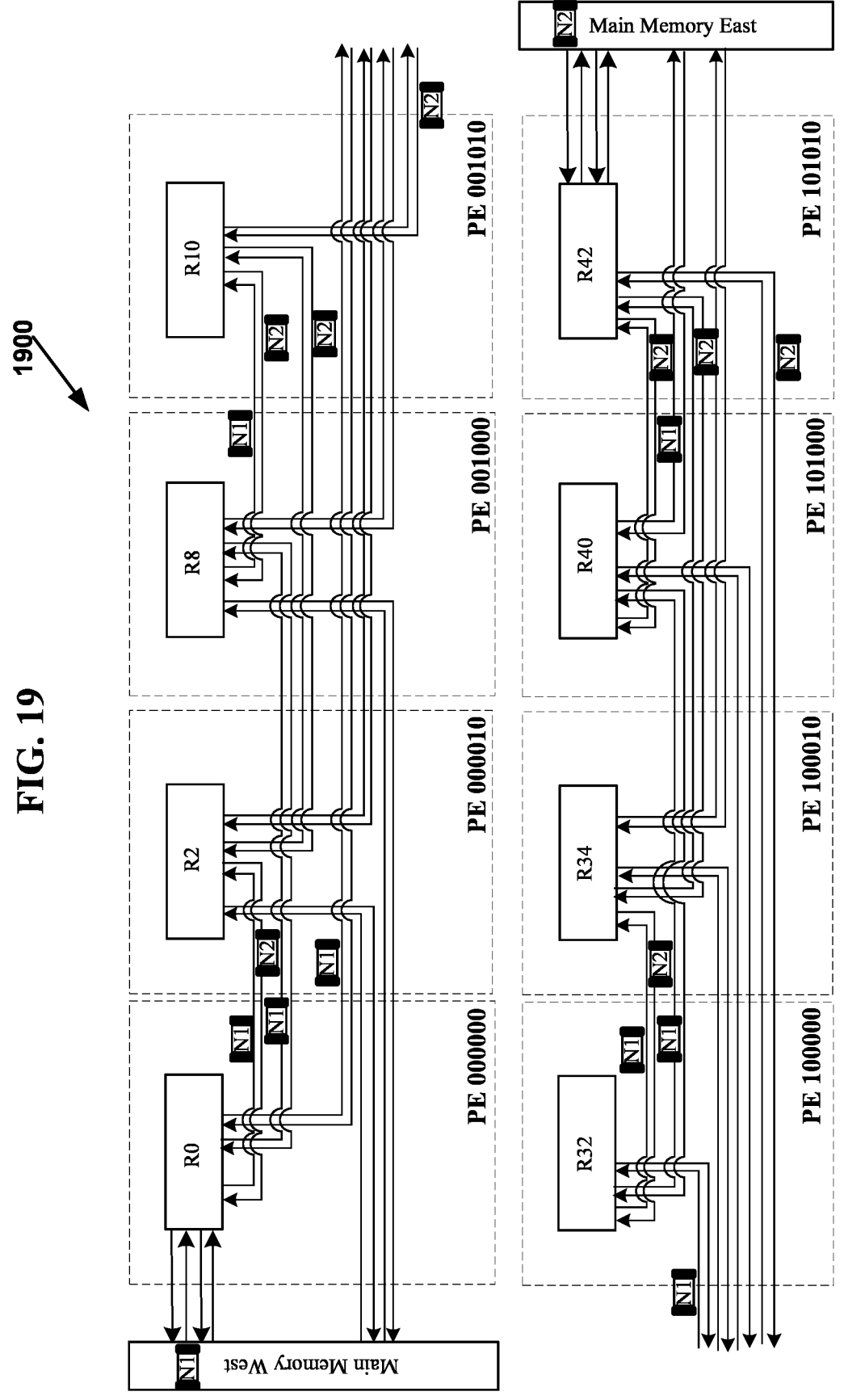
FIG. 19 is a diagram 1900 of illustration of simultaneous non-blocking multicast of a packet from main memory west to all PEs in the top row and non-blocking multicast of another packet from main memory east to all PEs in the same row in an exemplary 2D-BFTHypercube interconnection network either with diagrams 200C-D in FIG. 2C-D of an 8*8 2D-grid of PEs or with diagrams 200E-F in FIG. 2E-F of 16*8 2D-grid of PEs scalable for distributed computing system coupled with shared memory in the east and west sides, in accordance with the invention.

FIG. 19 is a diagram 1900 of illustration of non-blocking multicast of a packet from main memory west to all PEs in the top row and non-blocking multicast of another packet from main memory east to all PEs in the same row in an exemplary 2D-BFTHypercube interconnection network either with diagrams 200C-D in FIG. 2C-D of an 8*8 2D-grid of PEs or with diagrams 200E-F in FIG. 2E-F of 16*8 2D-grid of PEs.

Referring to diagram 1900 in FIG. 19, Packet N1 is in Main Memory West to be multicasted to all PEs in the top row consisting of PE 000000, PE 000010, PE 001000, PE 001010, PE 100000, PE 100010, PE 101000, PE 101010; Packet N2 is in Main Memory East to be multicasted to all PEs in the top row consisting of PE 000000, PE 000010, PE 001000, PE 001010, PE 100000, PE 100010, PE 101000, and PE 101010.

Packet N1 is unicasted from Main Memory West to PE 000000. From Main Memory West to PE 000000 the path is via MI(0,0), Router R0, O(0,x) where x={0,3}. From PE 000000 packet N1 is multicasted with fan out 3 to PE 000010, PE 001000 and PE 100000. From PE 000000 to PE 000010 the path is via Router R0, horizontal bus H(0,2), Router R2, O(2,x). From PE 000000 to PE 001000 the path is via Router R0, horizontal bus H(0,8), Router R8, O(8,x). From PE 000000 to PE 100000 the path is via Router R0, horizontal bus H(0,32), Router R32, O(32,x). From PE 001000 packet N1 is unicasted to PE 001010. From PE 001000 to PE 001010 the path is via Router R8, horizontal bus H(8,10), Router R10, O(10,x).

From PE 100000 packet N1 is multicasted with fan out 3 to PE 100010 and PE 101000. From PE 100000 to PE 100010 the path is via Router R32, horizontal bus H(32,34), Router R34, O(34,x). From PE 100000 to PE 101000 the path is via Router R32, horizontal bus H(32,40), Router R40, O(40,x). From PE 101000 packet N1 is unicasted to PE 101010. From PE 101000 to PE 101010 the path is via Router R40, horizontal bus H(40,42), Router R42, O(42,x).

Packet N2 is unicasted from Main Memory East to PE 101010. From Main Memory East to PE 101010 the path is via MI(42,0), Router R42, O(42,x) where x={0,3}. From PE 101010 packet N2 is multicasted with fan out 3 to PE 101000, PE 100010 and PE 001010. From PE 101010 to PE 101000 the path is via Router R42, horizontal bus H(42,40), Router R40, O(40,x). From PE 101010 to PE 100010 the path is via Router R42, horizontal bus H(42,34), Router R34, O(34,x). From PE 100010 packet N2 is unicasted to PE 100000. From PE 100010 to PE 100000 the path is via Router R32, horizontal bus H(32,30), Router R30, O(30,x).

From PE 001010 packet N2 is multicasted with fan out 2 to PE 001000 and PE 000010. From PE 001010 to PE 001000 the path is via Router R10, horizontal bus H(10,8), Router R8, O(8,x). From PE 001010 to PE 000010 the path is via Router R10, horizontal bus H(10,2), Router R2, O(2,x). From PE 000010 packet N2 is unicasted to PE 000000. From PE 000010 to PE 000000 the path is via Router R2, horizontal bus H(2,0), Router R0, O(0,x).

FIG. 21A1 is a diagram 2100A1 and FIG. 21A2 is a diagram 2100A2 together are an illustration of non-blocking multicast of a packet from main memory west to all PEs and simultaneously non-blocking multicast of another packet from main memory east to all PEs in the left half of top row of PEs illustrated in diagram 1400A of FIG. 14A and also in the right half of top row of PEs illustrated in diagram 1400B of FIG. 14B in an exemplary 2D-BFTHypercube interconnection network either with diagrams 200G-H in FIG. 2G-H of 16*16 2D-grid of PEs or with a 32*16 2D-grid of PEs.

Referring to diagram 2100A1 in FIG. 21A1, Packet N1 is in Main Memory West to be multicasted to all PEs in the top row consisting of PE 00000000, PE 00000010, PE 00001000, PE 00001010, PE 00100000, PE 00100010, PE 00101000, PE 00101010, PE 10000000, PE 10000010, PE 10001000, PE 10001010, PE 10100000, PE 10100010, PE 10101000, and PE 10101010. Packet N2 is in Main Memory East to be multicasted to all PEs in the top row consisting of PE 00000000, PE 00000010, PE 00001000, PE 00001010, PE 00100000, PE 00100010, PE 00101000, PE 00101010, PE 10000000, PE 10000010, PE 10001000, PE 10001010, PE 10100000, PE 10100010, PE 10101000, and PE 10101010.

Packet N1 is unicasted from Main Memory West to PE 00000000. From Main Memory West to PE 000000 the path is via MI(0,0), Router R0, O(0,x) where x={0,3}. From PE 00000000 packet N1 is multicasted with fan out 4 to PE

00000010, PE 00001000, PE 00100000 and PE 10000000. From PE 00000000 to PE 00000010 the path is via Router R0, horizontal bus H(0,2), Router R2, O(2,x). From PE 00000000 to PE 00001000 the path is via Router R0, horizontal bus H(0,8), Router R8, O(8,x). From PE 00000000 to PE 00100000 the path is via Router R0, horizontal bus H(0,32), Router R32, O(32,x). From PE 00000000 to PE 10000000 the path is via Router R0, horizontal bus H(0,128), Router R128, O(128,x). From PE 00001000 packet N1 is unicasted to PE 00001010. From PE 00001000 to PE 00001010 the path is via Router R8, horizontal bus H(8,10), Router R10, O(10,x).

From PE 00100000 packet N1 is multicasted with fan out 2 to PE 00100010 and PE 00101000. From PE 00100000 to PE 00100010 the path is via Router R32, horizontal bus H(32,34), Router R34, O(34,x). From PE 00100000 to PE 00101000 the path is via Router R32, horizontal bus H(32, 40), Router R40, O(40,x). From PE 00101000 packet N1 is unicasted to PE 00101010. From PE 00101000 to PE 00101010 the path is via Router R40, horizontal bus H(40, 42), Router R42, O(42,x).

From PE 10000000 packet N1 is multicasted with fan out 3 to PE 10000010, PE 10001000, and PE 10100000. From PE 00000000 to PE 00000010 the path is via Router R128, horizontal bus H(128,130), Router R130, O(130,x). From PE 10000000 to PE 10001000 the path is via Router R128, horizontal bus H(128,136), Router R136, O(136,x). From PE 10000000 to PE 10100000 the path is via Router R128, horizontal bus H(128,160), Router R160, O(160,x). From PE 10001000 packet N1 is unicasted to PE 10001010. From PE 10001000 to PE 10001010 the path is via Router R136, horizontal bus H(136,138), Router R138, O(138,x).

From PE 10100000 packet N1 is multicasted with fan out 2 to PE 10100010 and PE 10101000. From PE 10100000 to PE 10100010 the path is via Router R160, horizontal bus H(160,162), Router R162, O(162,x). From PE 10100000 to PE 10101000 the path is via Router R160, horizontal bus H(160,168), Router R168, O(168,x). From PE 10101000 packet N1 is unicasted to PE 10101010. From PE 10101000 to PE 10101010 the path is via Router R168, horizontal bus H(168,170), Router R170, O(170,x).

Packet N2 is unicasted from Main Memory East to PE 10101010. From Main Memory East to PE 10101010 the path is via MI(170,0), Router R170, O(170,x) where x ={0,3}. From PE 10101010 packet N2 is multicasted with fan out 4 to PE 10101000, PE 10100010, PE 10001010 and PE 00101010. From PE 10101010 to PE 10101000 the path is via Router R170, horizontal bus H(170,168), Router R168, O(168,x). From PE 10101010 to PE 10100010 the path is via Router R170, horizontal bus H(170,162), Router R162, O(162,x). From PE 10101010 to PE 10001010 the path is via Router R170, horizontal bus H(170,138), Router R138, O(138,x). From PE 10101010 to PE 00101010 the path is via Router R170, horizontal bus H(170,42), Router R42, O(42,x). From PE 10100010 packet N2 is unicasted to PE 10100000. From PE 10100010 to PE 10100000 the path is via Router R162, horizontal bus H(162,160), Router R160, O(160,x).

From PE 10001010 packet N2 is multicasted with fan out 2 to PE 10001000 and PE 10000010. From PE 10001010 to PE 10001000 the path is via Router R138, horizontal bus H(138,136), Router R136, O(136,x). From PE 10001010 to PE 10000010 the path is via Router R138, horizontal bus H(138,130), Router R130, O(130,x). From PE 10000010 packet N2 is unicasted to PE 10000000. From PE 10000010 to PE 10000000 the path is via Router R130, horizontal bus H(130,128), Router R128, O(128,x).

From PE 00101010 packet N2 is multicasted with fan out 3 to PE 00101000, PE 00100010, and PE 00001010. From PE 00101010 to PE 00101000 the path is via Router R42, horizontal bus H(42,40), Router R40, O(40,x). From PE 00101010 to PE 00100010 the path is via Router R40, horizontal bus H(40,34), Router R34, O(34,x). From PE 00101010 to PE 00001010 the path is via Router R42, horizontal bus H(42,10), Router R10, O(10,x). From PE 00100010 packet N2 is unicasted to PE 00100000. From PE 00100010 to PE 00100000 the path is via Router R34, horizontal bus H(34,32), Router R32, O(32,x).

From PE 00001010 packet N2 is multicasted with fan out 2 to PE 00001000 and PE 00000010. From PE 00001010 to PE 00001000 the path is via Router R10, horizontal bus H(10,8), Router R8, O(8,x). From PE 00001010 to PE 00000010 the path is via Router R10, horizontal bus H(10, 2), Router R2, O(2,x). From PE 00000010 packet N2 is unicasted to PE 00000000. From PE 00000010 to PE 00000000 the path is via Router R2, horizontal bus H(2,0), Router R0, O(0,x).

Diagram 1600 of FIG. 16, Diagram 1900 of FIG. 19, and Diagrams 2100A1-A2 of FIG. 21A1-A2 illustrate scalable non-blocking multicast of a packet from main memory west to all PEs in a row and non-blocking multicast of another packet from main memory east to all PEs in the same row, in exemplary 2D-BFTHypercube interconnection networks with rows of size 4 PEs, 8 PEs and 16 PEs in a row respectively.

Figure 17:
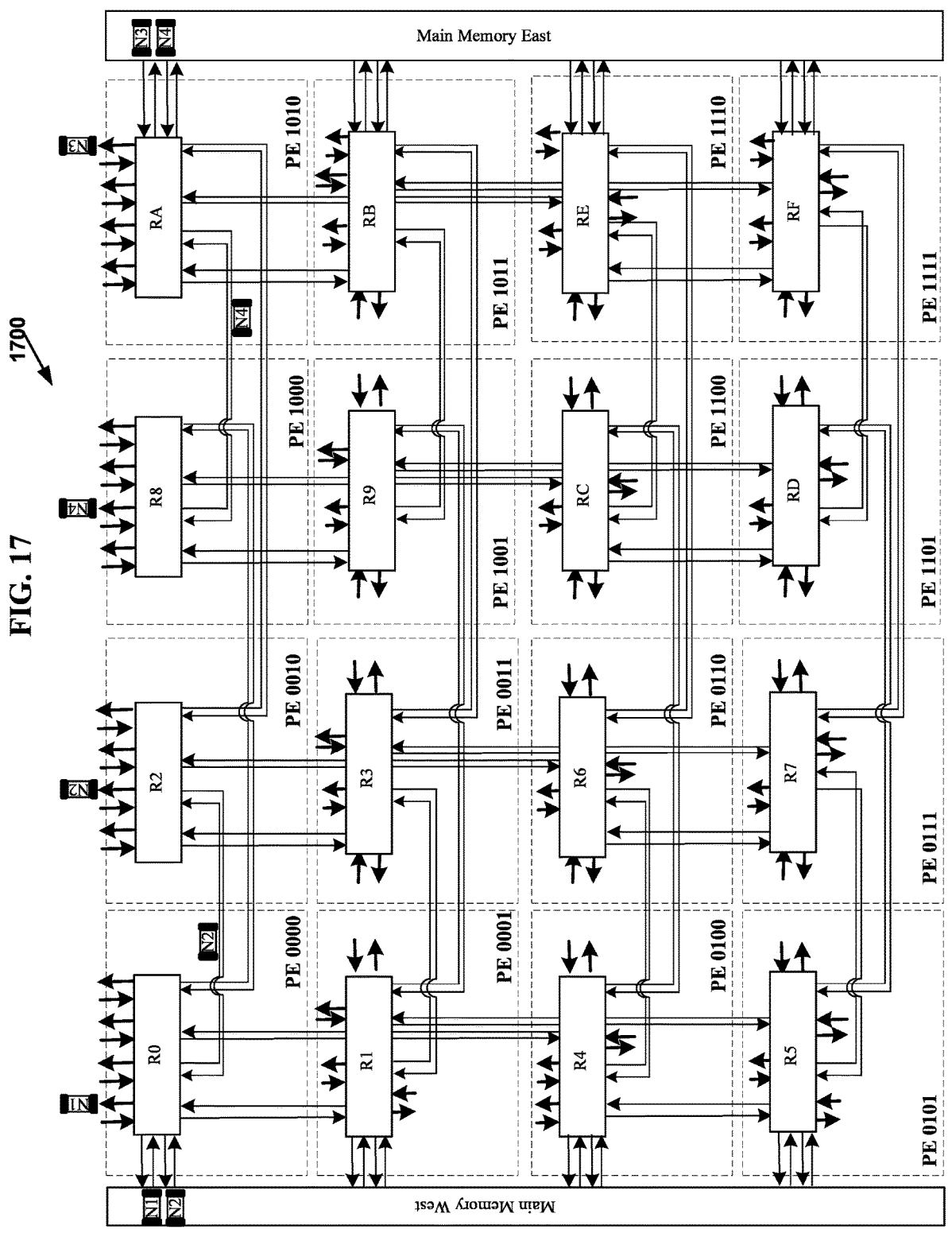
FIG. 17 is a diagram 1700 of illustration of non-blocking multiple unicast or parallel loading of two packets from main memory west to the two leftmost PEs in a row and simultaneously non-blocking multiple unicast or parallel loading of two packets from main memory east to the two rightmost PEs in the same row in an exemplary 2D-BFTHypercube interconnection network with 4*4 2D-grid of PEs scalable for distributed computing system with shared memory, in accordance with the invention.

Non-Blocking Multiple Unicast or Parallel Loading of Multiple Packets from Main Memory West to the Left-Half PEs in a Row and Non-Blocking Multiple Unicast or Parallel Loading of Multiple Packets from Main Memory East to the Right-Half PEs in the Same Row:

FIG. 17 is a diagram 1700 of illustration of non-blocking multiple unicast or parallel loading of two packets from main memory west to the two leftmost PEs in a row and non-blocking multiple unicast or parallel loading of two packets from main memory east to the two rightmost PEs in the same row in an exemplary 2D-BFTHypercube interconnection network illustrated either in diagrams 100A1, 100A2, 100B in FIGS. 1A1, 1A2, 1B with 4*4 2D-grid of PEs or diagrams in 200A-B in FIG. 2A-B with 8*4 2D-grid of PEs.

Referring to diagram 1700 in FIG. 17, Packets N1, N2 are in Main Memory West to be unicasted to different PEs in the top-left row consisting of PE 0000, PE 0010. Packets N3, N4 are in Main Memory East to be unicasted to different PEs in the top-right row consisting of PE 1000 and PE 1010.

Packet N1 is unicasted from Main Memory West to PE 0000. From Main Memory West to PE 0000 the path is via MI(0,0), Router R0, O(0,x) where x={0,3}. Packet N2 is unicasted from Main Memory West to PE 0010. From Main Memory West to PE 0000 the path is via MI(0,1), Router R0, horizontal bus H(0,2), Router R2, and O(2,x).

Simultaneously Packet N3 is unicasted from Main Memory East to PE 1010. From Main Memory East to PE 1010 the path is via MI(A,0), Router RA, O(A,x) where x={0,3}. packet N4 is unicasted from Main Memory East to PE 1000. From Main Memory East to PE 1010 the path is via Router RA, horizontal bus H(A,8), Router R8, O(8,x).

Figure 20:
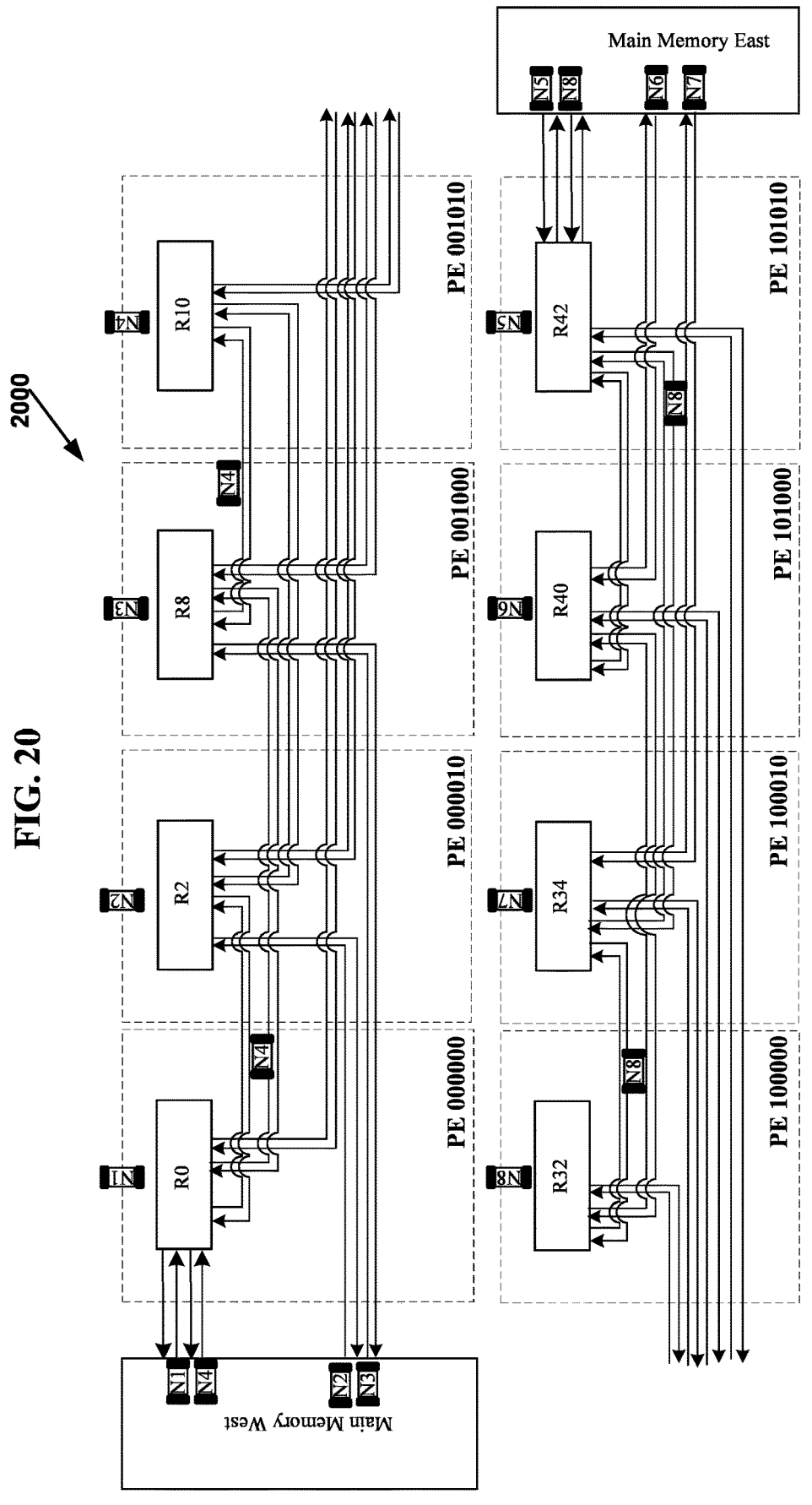
FIG. 20 is a diagram 2000 of illustration of non-blocking multiple unicast or parallel loading of four packets from main memory west to the four leftmost PEs in a row and simultaneously non-blocking multiple unicast or parallel loading of four packets from main memory east to the four rightmost PEs in the same row in an exemplary 2D-BFTHypercube interconnection network either with diagrams 200C-D in FIG. 2C-D of an 8*8 2D-grid of PEs or with diagrams 200E-F in FIG. 2E-F of 16*8 2D-grid of PEs scalable for distributed computing system coupled with shared memory in the east and west sides, in accordance with the invention.

FIG. 20 is a diagram 2000 of illustration of non-blocking multiple unicast or parallel loading of four packets from main memory west to the four leftmost PEs in a row and non-blocking multiple unicast or parallel loading of four packets from main memory east to the four rightmost PEs in the same row in an exemplary 2D-BFTHypercube interconnection network illustrated either in diagrams 200C-D in FIG. 2C-D of an 8*8 2D-grid of PEs or with diagrams 200E-F in FIG. 2E-F of 16*8 2D-grid of PEs.

Referring to diagram 2000 in FIG. 20, Packets N1, N2, N3, and N4 are in Main Memory West to be unicasted to different PEs in the top-left row consisting of PE 000000, PE 000010, PE 001000, and PE 001010. Packets N5, N6, N7, and N8 are in Main Memory East to be unicasted to different PEs in the top-right row consisting of PE 100000, PE 100010, PE 101000, and PE 101010.

Packet N1 is unicasted from Main Memory West to PE 000000. From Main Memory West to PE 000000 the path is via MI(0,0), Router R0, O(0,x) where x={0,3}. Packet N2 is unicasted from Main Memory West to PE 000010. From Main Memory West to PE 000010 the path is via MI(0,2), Router R2, and O(2,x).

Packet N3 is unicasted from Main Memory West to PE 000100. From Main Memory West to PE 001000 the path is via MI(0,3), Router R8, and O(8,x). Packet N4 is unicasted from Main Memory West to PE 000100. From Main Memory West to PE 001000 the path is via MI(0,1), Router R0, horizontal bus H(0,8), Router R8, horizontal bus H(8, 10), Router10 and O(10,x).

Packet N5 is unicasted from Main Memory East to PE 101010. From Main Memory West to PE 101010 the path is via MI(42,0), Router R42, O(42,x) where x={0,3}. Packet N6 is unicasted from Main Memory East to PE 101000. From Main Memory West to PE 101000 the path is via MI(0,2), Router R40, and O(40,x).

Packet N7 is unicasted from Main Memory East to PE 100010. From Main Memory West to PE 100010 the path is via MI(0,3), Router R34, and O(34,x). Packet N8 is unicasted from Main Memory West to PE 100000. From Main Memory East to PE 100000 the path is via MI(0,1), Router R42, horizontal bus H(42,34), Router R34, horizontal bus H(34,32), Router R32 and O(32,x).

FIG. 22A1 is a diagram 2200A1 and FIG. 22A2 is a diagram 2200A2 together are an illustration of non-blocking multiple unicast or parallel loading of eight packets from main memory west to the eight left half of top row of PEs and non-blocking multiple unicast or parallel loading of eight packets from main memory east to the eight right half of top row of PEs in the same row in the left half of top row of PEs illustrated in diagram 1400A of FIG. 14A and in the right half of top row of PEs illustrated in diagram 1400B of FIG. 14B in an exemplary 2D-BFTHypercube interconnection network either with diagrams 200G-H in FIG. 2G-H of 16*16 2D-grid of PEs or with a 32*16 2D-grid of PEs.

Referring to diagram 2200A1 in FIG. 22A1 and diagram 2200A2 in FIG. 22A2, Packets N1, N2, N3, N4, N5, N6, N7, and N8 are in Main Memory West to be unicasted to eight different PEs in the top-left row consisting of PE 00000000, PE 00000010, PE 00001000, PE 00001010, 00100000, PE 00100010, PE 00101000, and PE 00101010. Packets N5, N6, N7, N8, N9, NA, NB, NC, ND, NE, NF, and NG are in Main Memory East to be unicasted to eight different PEs in the top-right row consisting of PE 10000000, PE 10000010, PE 10001000, PE 10001010, 10100000, PE 10100010, PE 10101000, and PE 10101010.

Packet N1 is unicasted from Main Memory West to PE 00000000. From Main Memory West to PE 00000000 the path is via MI(0,0), Router R0, O(0,x) where x={0,3}. Packet N2 is unicasted from Main Memory West to PE 00000010. From Main Memory West to PE 00000010 the path is via MI(0,2), Router R2, and O(2,x).

Packet N3 is unicasted from Main Memory West to PE 00000100. From Main Memory West to PE 00001000 the path is via MI(0,4), Router R8, and O(8,x). Packet N4 is unicasted from Main Memory West to PE 00001010. From Main Memory West to PE 00001010 the path is via MI(0,5), Router R8, horizontal bus H(8,10), Router R10, and O(10, x).

Packet N5 is unicasted from Main Memory West to PE 00100000. From Main Memory West to PE 00100000 the path is via MI(0,1), Router R0, horizontal bus H(0,32), Router R32, O(32,x) where x={0,3}. Packet N6 is unicasted from Main Memory West to PE 00100010. From Main Memory West to PE 00100010 the path is via MI(0,3), Router R2, horizontal bus H(2,34), Router R34 and O(34,x).

Packet N7 is unicasted from Main Memory West to PE 00101000. From Main Memory West to PE 00101000 the path is via MI(0,6), Router R32, horizontal bus H(32,40), Router R40, and O(40,x). Packet N8 is unicasted from Main Memory West to PE 00101010. From Main Memory West to PE 00101010 the path is via MI(0,7), Router R32, horizontal bus H(32,34), Router R34, horizontal bus H(34,42), Router R42 and O(42,x).

Packet N9 is unicasted from Main Memory East to PE 10101010. From Main Memory East to PE 10101010 the path is via MI(170,0), Router R170, O(170,x) where x ={0,3}. Packet NA is unicasted from Main Memory East to PE 10101000. From Main Memory East to PE 10101000 the path is via MI(170,2), Router R168, and O(168,x).

Packet NB is unicasted from Main Memory East to PE 10100010. From Main Memory East to PE 10100010 the path is via MI(170,4), Router R162, and O(162,x). Packet NC is unicasted from Main Memory East to PE 10100000. From Main Memory East to PE 10100000 the path is via MI(170,5), Router R162, horizontal bus H(162,160), Router R160, and O(160,x).

Packet ND is unicasted from Main Memory East to PE 10001010. From Main Memory East to PE 10001010 the path is via MI(170,1), Router R170, horizontal bus H(170, 138), Router R138, O(138,x) where x={0,3}. Packet NE is unicasted from Main Memory East to PE 10001000. From Main Memory East to PE 10001000 the path is via MI(170, 3), Router R168, horizontal bus H(168,136), Router R136 and O(136,x).

Packet NF is unicasted from Main Memory East to PE 10101010. From Main Memory East to PE 10101010 the path is via MI(170,6), Router R138, horizontal bus H(138, 130), Router R130, and O(130,x). Packet NG is unicasted from Main Memory East to PE 10000000. From Main Memory East to PE 10000000 the path is via MI(170,7), Router R138, horizontal bus H(138,136), Router R136, horizontal bus H(136,128), Router R128 and O(128,x).

Diagram 1700 of FIG. 17, Diagram 2000 of FIG. 20, and Diagrams 2200A1-A2 of FIG. 22A1-A2 illustrate scalable non-blocking multiple unicast or parallel loading of multiple packets from main memory west to the left-half PEs in a row and simultaneous non-blocking multiple unicast or parallel loading of multiple packets from main memory east to the right-half PEs in the same row, in exemplary 2D-BFTHy-percube interconnection networks with rows of size 4 PEs, 8 PEs and 16 PEs in a row respectively.

In diagrams 100A1, 100A2, 100B, 200A-H, 300A-B, 400A-B, 500A1, 500A2, 500B1, 500B2, 500C, 600A1, 600A2, 600B, 700A1, 700A2, 700B, 1300, 1400A-B of FIGS. 1A1, 1A2, 1B, 2A-H, 3A-B, 4A-B, 5A1, 5A2, 5B1, 5B2, 5C, 6A1, 6A2, 6B, 7A1, 7A2, 7B, 13, 14A-B, a×b processing elements are implemented in a two dimensional grid ("2D-grid") 1) in a single die, or 2) in a plurality of dies on a semiconductor wafer, or 3) in a plurality of integrated circuit chips.

Numerous modifications and adaptations of the embodiments, implementations, and examples described herein will be apparent to the skilled artisan in view of the disclosure.

What is claimed is:

1. A scalable distributed computing system with deterministic interconnection network and shared memory comprising:

wherein said scalable distributed computing system with deterministic interconnection network and shared memory further comprising an a×b processing elements arranged in a two dimensional grid with one side of said two dimensional grid having the size of a processing elements and the other side of said two dimensional grid having the size of b processing elements where a>2, b>2, and both a and b are non-negative numbers; and Wherein said a×b processing elements are numbered with a representation in binary format having n bits, where $2^{n-1}<a\times b\leq2^n$ and where n is a positive number; and Wherein said a×b processing elements are arranged in said two dimensional grid so that a first processing element of said a×b processing elements is placed $2_k$ hops away either vertically or horizontally from a second processing element of said a×b processing elements when said all n bits of said representation in binary format of said first processing element and said representation in binary format of said second processing element are the same in each bit excepting in one of either (2×k+1)th least significant bit or (2×k+2)th least significant bit differ where k is a non-negative number; and Wherein each processing element of said a×b processing elements arranged in said two dimensional grid comprising a router; and Wherein said router comprising one or more local inlet buses and one or more local outlet buses; and Wherein said router of a first processing element of said a×b processing elements is connected, by a $2^k$ hop length horizontal bus or a $2^k$ hop length vertical bus, to said router of a second processing element of said a×b processing elements when said all n bits of said representation in binary format of said first processing element and said representation in binary format of said second processing element are the same in each bit excepting in one of either (2×k+1)th least significant bit or (2×k+2)th least significant bit differ where k is a non-negative number and also said router of said first processing element of said a×b processing elements is connected, by a $2^k$ hop length horizontal bus or a $2^k$ hop length vertical bus, from said router of said second processing element of said a×b processing elements when said all n bits of said representation in binary format of said first processing element and said representation in binary format of said second processing element are the same in each bit excepting in one of either (2×k+1)th least significant bit or (2×k+2)th least significant bit differ where k is a non-negative number so that said router of each processing element of said a×b processing elements comprising one or more horizontal buses connecting to said router of one or more processing elements of said a×b processing elements and said router of each processing element of said a×b processing elements comprising one or more vertical buses connecting to said router of one or more processing elements of said a×b processing elements.

2. The scalable distributed computing system with deterministic interconnection network and shared memory of claim 1, wherein each processing element of said a×b processing elements further comprises a processor or local memory.

3. The scalable distributed computing system with deterministic interconnection network and shared memory of claim 2, wherein said processor of each processing element of said a×b processing elements is a Central Processing Unit (CPU) comprises functional units that perform such as additions, multiplications, or logical operations, for executing computer programs.

4. The scalable distributed computing system with deterministic interconnection network and shared memory of claim 2, wherein said processor of each processing element of said a×b processing elements comprises a domain specific architecture (DSA) based Deep Neural Network (DNN) processor comprising one or more multiply accumulate (MAC) units for performing matrix multiply operations.

5. The scalable distributed computing system with deterministic interconnection network and shared memory of claim 2, wherein said processor, said local memory and said router of each processing element of said a×b processing elements are directly connected to each other.

6. The scalable distributed computing system with deterministic interconnection network and shared memory of claim 1, wherein said two dimensional grid with one side of said two dimensional grid having said size of a processing elements and said other side of said two dimensional grid having said size of b processing elements is recursively scaled for larger sizes of said size of a processing elements or said other side of said two dimensional grid scaled for larger sizes of said size of b processing elements.

7. The scalable distributed computing system with deterministic interconnection network and shared memory of claim 1, wherein said a×b processing elements are implemented in said two dimensional grid 1) in a single die, or 2) in a plurality of dies on a semiconductor wafer, or 3) in a plurality of integrated circuit chips.

8. A method for communication in a scalable distributed computing system with deterministic interconnection network and shared memory comprising:

wherein said scalable distributed computing system with deterministic interconnection network and shared memory further comprising an a×b processing elements arranged in a two dimensional grid with one side of said two dimensional grid having the size of a processing elements and the other side of said two dimensional grid having the size of b processing elements where a>1, b>1, and both a and b are non-negative numbers; and Wherein said a×b processing elements are numbered with a representation in binary format having n bits, where $2^{n-1}<a\times b\le 2^n$ and where n is a positive number; and Wherein said a×b processing elements are arranged in said two dimensional grid so that a first processing element of said a×b processing elements is placed $2^k$ hops away either vertically or horizontally from a second processing element of said a×b processing elements when said all n bits of said representation in binary format of said first processing element and said representation in binary format of said second processing element are the same in each bit excepting in one of either (2×k+1)th least significant bit or (2×k+2)th least significant bit differ where k is a non-negative number; and Wherein each processing element of said a×b processing elements arranged in said two dimensional grid comprising a router; and Wherein said router comprising one or more local inlet buses and one or more local outlet buses; and Wherein each horizontal bus of said one or more $2^k$ hop length horizontal buses comprises one or more wires and each vertical bus of said one or more $2^k$ hop length vertical buses comprises one or more wires; and Wherein said router of a first processing element of said a×b processing elements is connected, by a $2^k$ hop length horizontal bus of said one or more $2^k$ hop length horizontal buses or a $2^k$ hop length vertical bus of said one or more $2^k$ hop length vertical buses, to said router of a second processing element of said a×b processing elements when said all n bits of said representation in binary format of said first processing element and said representation in binary format of said second processing element are the same in each bit excepting in one of either (2×k+1)th least significant bit or (2×k+2)th least significant bit differ where k is a non-negative number and also said router of said first processing element of said a×b processing elements is connected, by a $2^k$ hop length horizontal bus of said one or more $2^k$ hop length horizontal buses or a $2^k$ hop length vertical bus of said one or more $2^k$ hop length vertical buses, from also said router of said second processing element of said a×b processing elements when if said all n bits of said representation in binary format of said first processing element and said representation in binary format of said second processing element are the same in each bit excepting in one of either (2×k+1)th least significant bit or (2×k+2)th least significant bit differ where k is a non-negative number so that said router of each processing element of said a×b processing elements comprising said one or more $2^k$ hop length horizontal buses connecting to said router of one or more processing elements of said a×b processing elements and said router of each processing element of said a×b processing elements comprising said one or more $2^k$ hop length vertical buses connecting to said router of one or more processing elements of said a×b processing elements; and each processing element of said a×b processing elements further comprising one or more packets wherein each packet of said one or more packets comprises a data token and a length; and said router of each processing element of said a×b processing elements is capable of concurrently transmitting, in a clock speed of operation, one or more packets of said one or more packets through one or more horizontal buses of said one or more $2^k$ hop length horizontal buses connected from said router of each processing element of said a×b processing elements (source processing element) to a processing element of said a×b processing elements (target processing element) and also through one or more vertical buses of said one or more $2^k$ hop length vertical buses connected from said router of each processing element of said a×b processing elements (source processing element) to a processing element of said a×b processing elements (target processing element); and said method for communication further comprising:

performing concurrent broadcast of each packet of said one or more packets from each source processing element of said a×b processing elements to target processing elements of all the rest of said a×b processing elements in a plurality of deterministic number of time steps through said one or more $2^k$ hop length horizontal buses or said one or more $2^k$ hop length vertical buses; and wherein said each packet of said one or more packets traverses through one or more processing element of said a×b processing elements (intermediate processing element) when said source processing element of said a×b processing elements and said target processing element of said a×b processing elements are not directly connected by one of either said one or more $2^k$ hop length horizontal buses or said one or more $2^k$ hop length vertical buses; and wherein duration of each time step of said plurality of deterministic number of time steps is determined by the length of said one or more packets, the hop length of said one or more $2^k$ hop length horizontal buses, the hop length of said one or more $2^k$ hop length vertical buses, the number of wires in each bus of said one or more $2^k$ hop length horizontal buses, the number of wires in each bus of said one or more $2^k$ hop length vertical buses, an implemented non-transitory medium of said one or more $2^k$ hop length horizontal buses or said one or more $2^k$ hop length vertical buses, and said clock speed of operation; and wherein said concurrent broadcast of each packet of said one or more packets of each processing element of said a×b processing elements is performed in a non-blocking, collision-free or without requiring queuing at the one or more intermediate processing elements of said a×b processing elements.

9. The method for communication in a scalable distributed computing system with deterministic interconnection network and shared memory of claim 8, wherein said each packet of said one or more packets of said each source processing element of said a×b processing elements broadcasts to said each target processing element of said a×b processing elements in a fixed path, by passing through said router of a predetermined number of intermediate processing elements of said a×b processing elements in said plurality of deterministic number of time steps or passing through said router of a predetermined order of intermediate processing elements of said a×b processing elements in said plurality of deterministic number of time steps.

10. The method for communication in a scalable distributed computing system with deterministic interconnection network and shared memory of claim 9, wherein a first said target processing element of said a×b processing elements receives said each packet of said one or more packets from said each source processing element of said a×b processing elements in a first predetermined order in said plurality of deterministic number of time steps.

11. The method for communication in a scalable distributed computing system with deterministic interconnection network and shared memory of claim 10, wherein a second said target processing element of said a×b processing elements receives said each packet of said one or more packets from said each source processing element of said a×b processing elements in a second predetermined order in said plurality of deterministic number of time steps and said second predetermined order is not the same as said first predetermined order.

12. The method for communication in a scalable distributed computing system with deterministic interconnection network and shared memory of claim 8, wherein said performing concurrent broadcast of each packet of said one or more packets at each processing element of said a×b processing elements in said plurality of deterministic number of time steps is repeated for every packet of said one or more packets of each processing element of said a×b processing elements in said deterministic number of time steps.

13. The method for communication in a scalable distributed computing system with deterministic interconnection network and shared memory of claim 12, wherein a first said target processing element of said a×b processing elements receives said each packet of said one or more packets from said every each source processing element of said a×b processing elements in a predetermined order in said plurality of deterministic number of time steps and said first said target processing element of said a×b processing elements receives said one or more packets from said each source processing element of said a×b processing elements in a predetermined order in said plurality of deterministic number of time steps multiplied by number of said one or more packets where said first said target processing element of said a×b processing elements receives said one or more packets from said each source processing element of said a×b processing elements in the same order they were broadcasted by said first said target processing element of said a×b processing elements.

14. The method for communication in a scalable distributed computing system with deterministic interconnection network and shared memory of claim 8, when a=2; b=2, said performing concurrent broadcast of each packet of said one or more packets at each processing element of said a×b processing elements to all the rest of said a×b processing elements in a plurality of deterministic number of time steps is equal to 2.

15. The method for communication in a scalable distributed computing system with deterministic interconnection network and shared memory of claim 8, when a=4; b=2 or a=2; b=4, said performing concurrent broadcast of each packet of said one or more packets at each processing element of said a×b processing elements to all the rest of said a×b processing elements in a plurality of deterministic number of time steps is equal to 4.

16. A scalable distributed computing system with deterministic interconnection network and shared memory comprising:

wherein said scalable distributed computing system with deterministic interconnection network and shared memory further comprising an a×b processing elements arranged in a two dimensional grid with one side of said two dimensional grid having the size of a processing elements and the other side of said two dimensional grid having the size of b processing elements where a>2, b>2, and both a and b are non-negative numbers; and wherein each processing element of said a×b processing elements further comprises a processor or local memory; and Wherein said a×b processing elements are numbered with a representation in binary format having n bits, where $2^{n-1} < a \times b \leq 2^n$ and where n is a positive number; and Wherein said a×b processing elements are arranged in said two dimensional grid so that a first processing element of said a×b processing elements is placed $2^k$ hops away either vertically or horizontally from a second processing element of said a×b processing elements when said all n bits of said representation in binary format of said first processing element and said representation in binary format of said second processing element are the same in each bit excepting in one of either (2×k+1)th least significant bit or (2×k+2)th least significant bit differ where k is a non-negative number; and Wherein each processing element of said a×b processing elements arranged in said two dimensional grid comprising a router; and Wherein said router comprising one or more local inlet buses and one or more local outlet buses; and Wherein said router of a first processing element of said a×b processing elements is connected, by a $2^k$ hop length horizontal bus or a $2^k$ hop length vertical bus, to said router of a second processing element of said a×b processing elements when said all n bits of said representation in binary format of said first processing element and said representation in binary format of said second processing element are the same in each bit excepting in one of either (2×k+1)th least significant bit or (2×k+2)th least significant bit differ where k is a non-negative number and also said router of said first processing element of said a×b processing elements is connected, by a $2^k$ hop length horizontal bus or a hop length vertical bus, from said router of said second processing element of said a×b processing elements when said all n bits of said representation in binary format of said first processing element and said representation in binary format of said second processing element are the same in each bit excepting in one of either (2×k+1)th least significant bit or (2×k+2)th least significant bit differ where k is a non-negative number so that said router of each processing element of said a×b processing elements comprising one or more horizontal buses connecting to said router of one or more processing elements of said a×b processing elements and said router of each processing element of said a×b processing elements comprising one or more vertical buses connecting to said router of one or more processing elements of said a×b processing elements.

17. The scalable distributed computing system with deterministic interconnection network and shared memory of claim 16, wherein said processor of each processing element of said a×b processing elements is a Central Processing Unit (CPU) comprises functional units that perform such as additions, multiplications, or logical operations, for executing computer programs.

18. The scalable distributed computing system with deterministic interconnection network and shared memory of claim 16, wherein said processor of each processing element of said a×b processing elements comprises a domain specific architecture (DSA) based Deep Neural Network (DNN) processor comprising one or more multiply accumulate (MAC) units for performing matrix multiply operations.

19. The scalable distributed computing system with deterministic interconnection network and shared memory of claim 16, wherein said processor, said local memory and said router of each processing element of said a×b processing elements are directly connected to each other.

20. The scalable distributed computing system with deterministic interconnection network and shared memory of claim 16, wherein said two dimensional grid with one side of said two dimensional grid having said size of a processing elements and said other side of said two dimensional grid having said size of b processing elements is recursively scaled for larger sizes of said size of a processing elements or said other side of said two dimensional grid scaled for larger sizes of said size of b processing elements; and said a×b processing elements are implemented in said two dimensional grid 1) in a single die, or 2) in a plurality of dies on a semiconductor wafer, or 3) in a plurality of integrated circuit chips.

* * * * *